(12) United States Patent
Ashizaki et al.

(10) Patent No.: US 7,886,315 B2
(45) Date of Patent: Feb. 8, 2011

(54) OPTICAL DISC CASE, OPTICAL DISC TRAY, CARD MEMBER, AND MANUFACTURING METHOD

(75) Inventors: Koji Ashizaki, Tokyo (JP); Takahiro Toyoda, Tokyo (JP); Katsuhisa Orihara, Tochigi (JP)

(73) Assignee: Sony Corporation, Tokyo (JP)

(*) Notice: Subject to any disclaimer, the term of this patent is extended or adjusted under 35 U.S.C. 154(b) by 582 days.

(21) Appl. No.: 12/015,771

(22) Filed: Jan. 17, 2008

(65) Prior Publication Data
US 2008/0184281 A1 Jul. 31, 2008

(30) Foreign Application Priority Data

| Jan. 30, 2007 | (JP) | ............................. 2007-018682 |
| Mar. 7, 2007 | (JP) | ............................. 2007-056741 |
| Aug. 16, 2007 | (JP) | ............................. 2007-212424 |
| Aug. 16, 2007 | (JP) | ............................. 2007-212425 |

(51) Int. Cl.
*G11B 33/02* (2006.01)
(52) U.S. Cl. .................................................. 720/646
(58) Field of Classification Search ................. 720/640, 720/612, 639, 643, 613, 634, 647, 740, 741, 720/716, 646
See application file for complete search history.

(56) References Cited

U.S. PATENT DOCUMENTS

2003/0034257 A1   2/2003   Rufo, Jr. et al.
2004/0052202 A1 * 3/2004   Brollier ....................... 369/273
2009/0084846 A1 * 4/2009   Ashizaki et al. ............. 235/451
2010/0148939 A1 * 6/2010   Yamada et al. ........... 340/10.34

FOREIGN PATENT DOCUMENTS

| EP | 0 944 085 A2 | 9/1999 |
| JP | 9-245381 | 9/1997 |
| JP | 2004-343410 | 12/2004 |
| JP | 2005-276300 | 10/2005 |
| JP | 2005-332015 | 12/2005 |
| JP | 2005-339170 | 12/2005 |

* cited by examiner

*Primary Examiner*—Allen T Cao
(74) *Attorney, Agent, or Firm*—Oblon, Spivak, McClelland, Maier & Neustadt, L.L.P.

(57) ABSTRACT

An optical disc case, in which an optical disc is stored, wherein a face cover portion and a rear-face cover portion are connected so as to be rotated with the end portion side of each of the principal faces thereof as the center, and are configured so as to form a box-shaped appearance when the face cover portion and the rear-face cover portion are closed such that the respective principal faces of the face cover portion and the rear-face cover portion face each other, the case including: a protruding holding portion, configured to fit into a central hole formed in the optical disc to hold the optical disc, provided to the inner side of the principal face of the rear-face cover portion; and a booster antenna to which a first antenna and a second antenna are connected configured to relay a signal sent/received from one antenna to the other antenna.

14 Claims, 63 Drawing Sheets

NORMAL COMMUNICATION STATUS

COMMUNICATION STATUS WHEN AXES OF
ANTENNA COILS ARE ORTHOGONAL

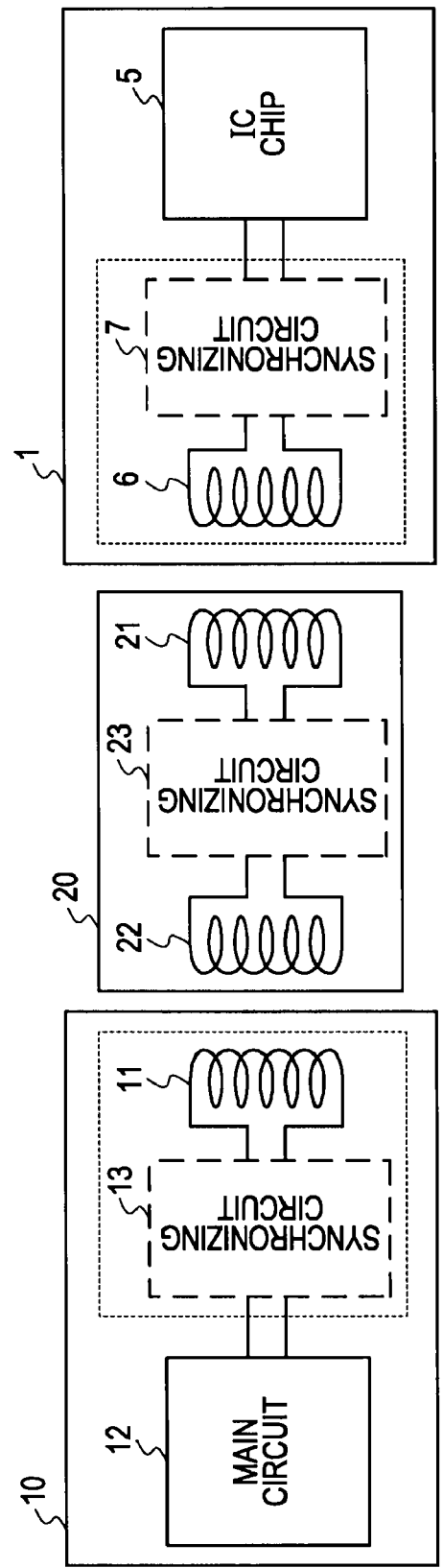

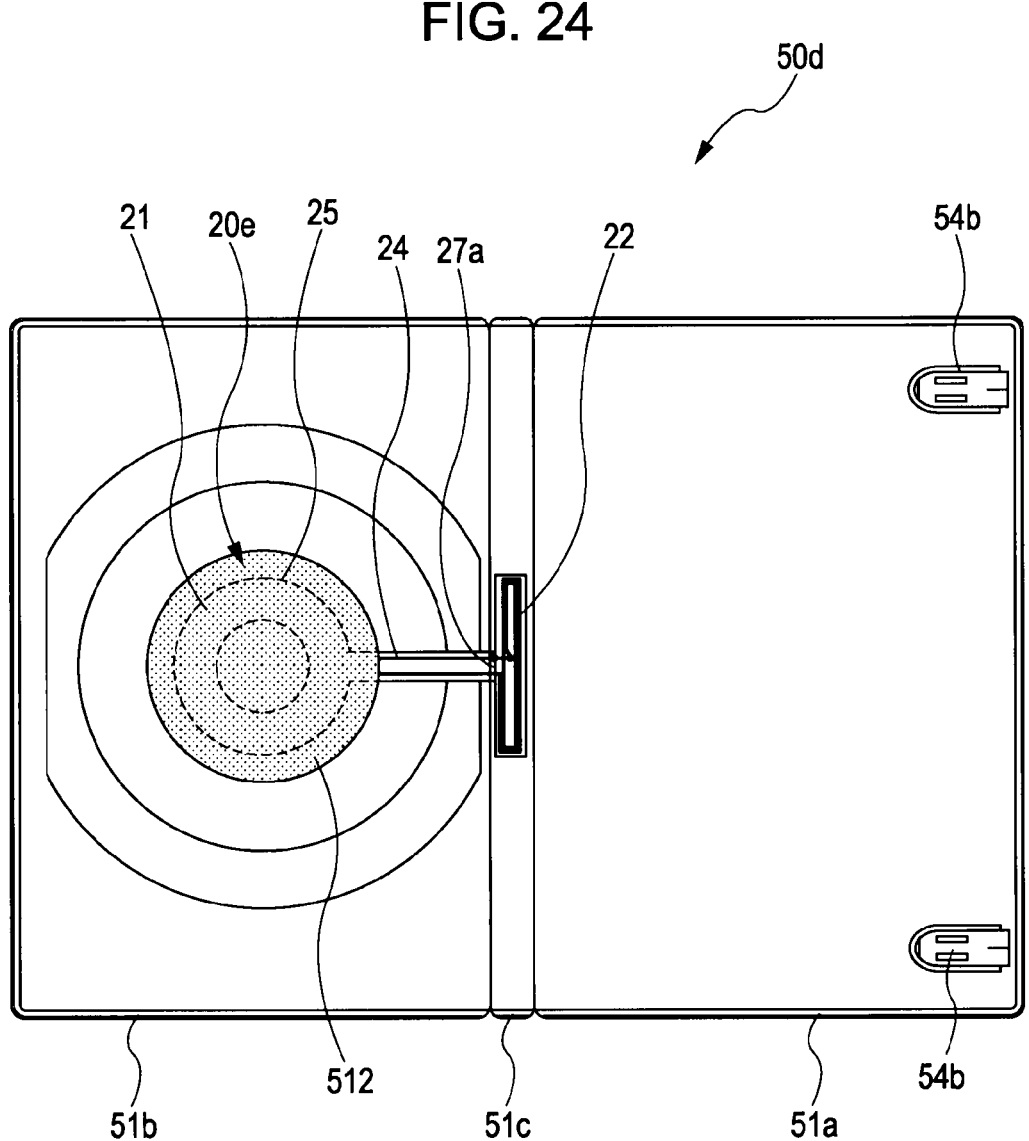

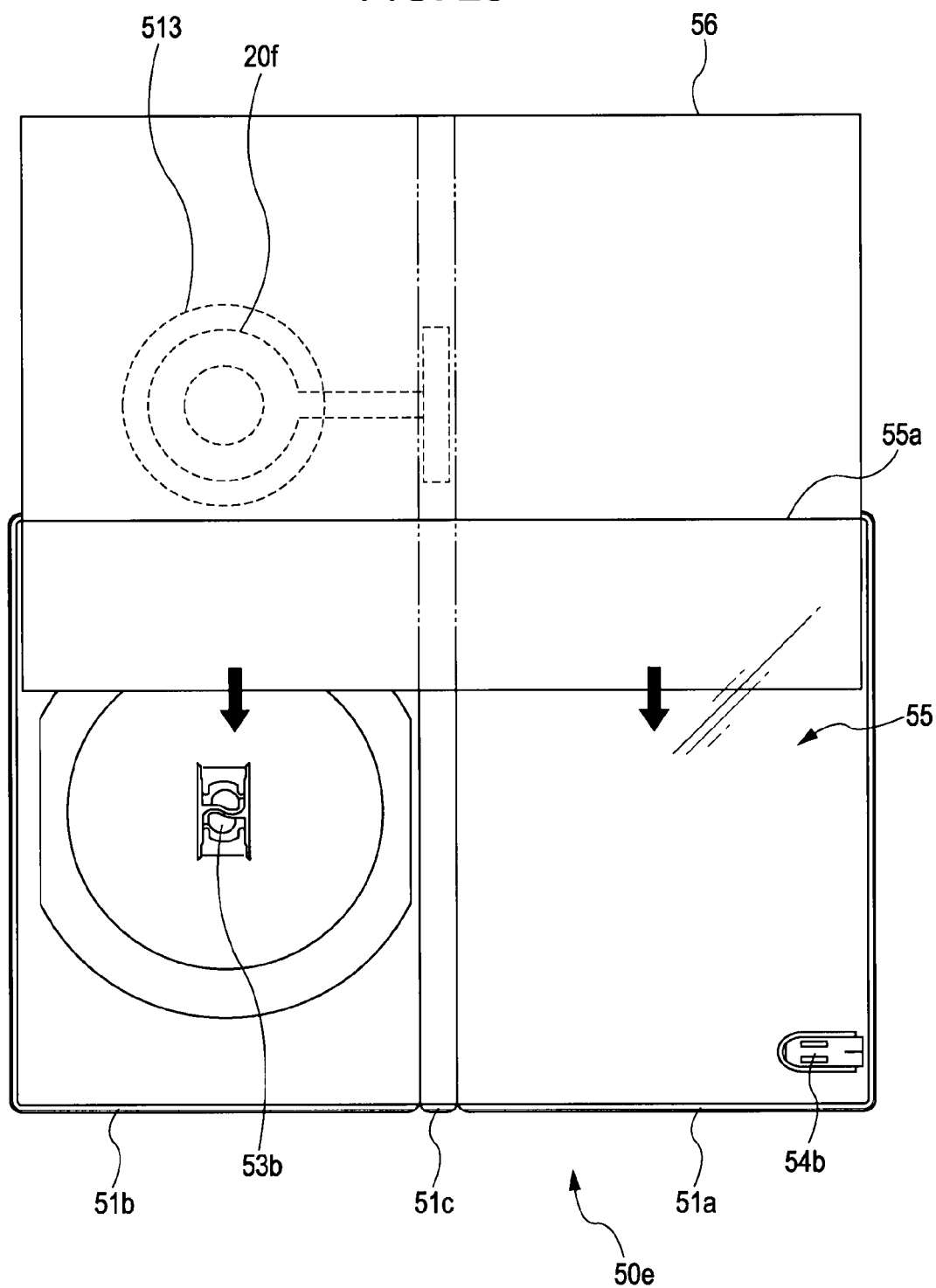

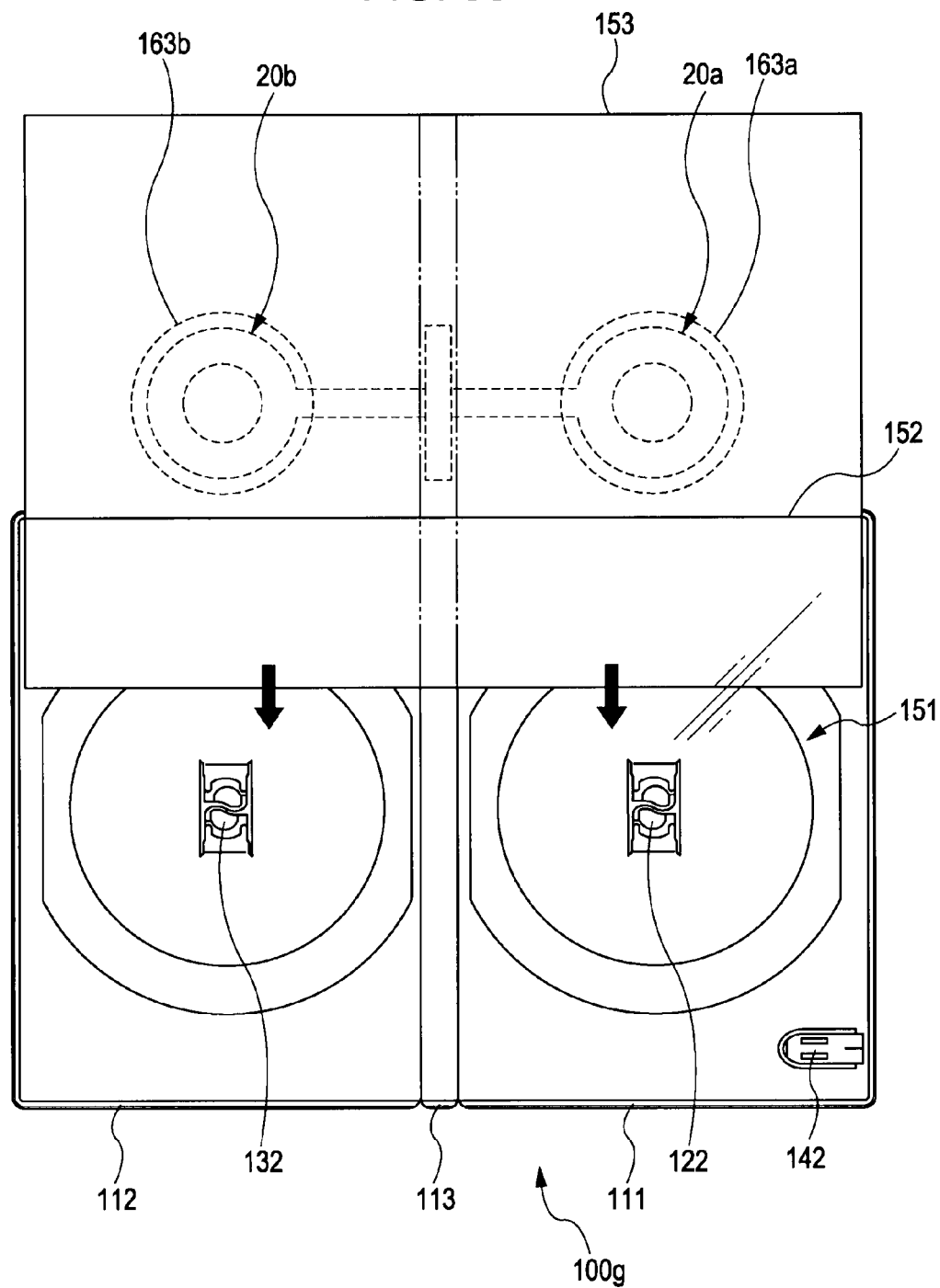

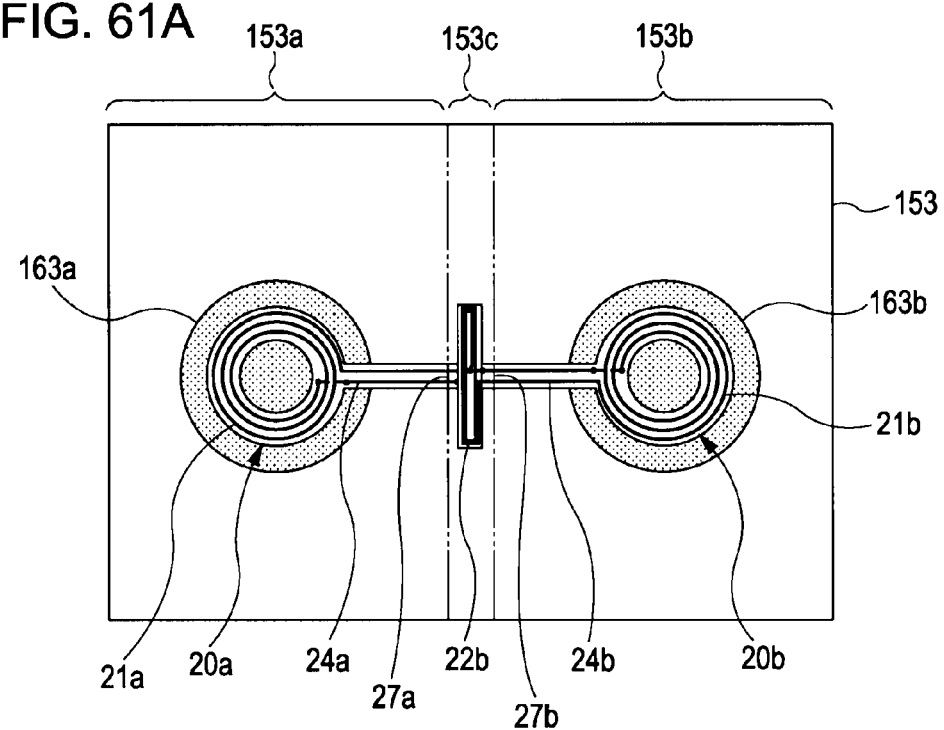
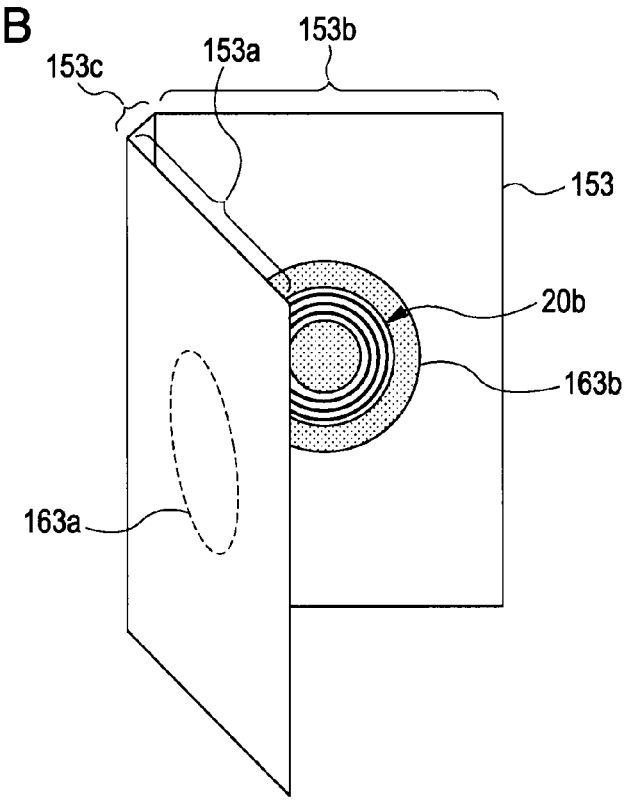

OPTICAL DISC CASE, OPTICAL DISC TRAY, CARD MEMBER, AND MANUFACTURING METHOD

CROSS REFERENCES TO RELATED APPLICATIONS

The present invention contains subject matter related to Japanese Patent Application JP 2007-018682 filed in the Japanese Patent Office on Jan. 30, 2007, Japanese Patent Application JP 2007-056741 filed in the Japanese Patent Office on Mar. 7, 2007, Japanese Patent Application JP 2007-212424 filed in the Japanese Patent Office on Aug. 16, 2007, and Japanese Patent Application JP 2007-212425 filed in the Japanese Patent Office on Aug. 16, 2007, the entire contents of which are incorporated herein by reference.

BACKGROUND OF THE INVENTION

1. Field of the Invention

The present invention relates to an optical disc case in which an optical disc is stored, a disc tray and a card member to be attached to this case, and a method for manufacturing the optical disc and optical disc tray, and particularly, relates to an optical disc case, a disc tray and a card member, which are suitable for storing an optical disc on which a non-contact IC chip is mounted, and a method for manufacturing the optical disc and optical disc tray.

2. Description of the Related Art

In recent years, optical discs such as CD (Compact Disc), DVD (Digital Versatile Disc), and so forth have come into widespread use as recording media capable of recording large data such as video or the like. Also, as for optical discs, not only discs only for playback called ROM (Read Only Memory) but also so-called recordable discs and so-called rewritable discs have been employed commonly.

On the other hand, a non-contact IC (Integrated Circuit) chip capable of exchanging information with a terminal-side reader/writer by non-contact has features such that processing time from start of connection to end of connection can be reduced due to a cause wherein physical contact is not necessary at the time of communication with a terminal device, and also provides a high level of security by advanced mutual authentication and encryption processing. Accordingly, this has spread to a broad range of applications, such as electronic money, traffic tickets, admission permits, and so forth.

An arrangement has been conceived wherein a non-contact IC chip having such excellent features is mounted on an optical disc substrate. For example, optical discs have been conceived wherein following a recessed portion being formed on each of two disc substrates, an IC chip and an antenna for transmission/reception thereof are disposed as an integral module in a gap formed between each of the recessed portions at the time of the disc substrates being adhered (e.g., see Japanese Unexamined Patent Application Publication No. 9-245381 (paragraph number [0011] through [0014], FIG. 1)).

Incidentally, communication is performed between a non-contact IC chip and a reader/writer via antennas which both include using electromagnetic waves. Note however, depending on the shape of each antenna, there is a case wherein directivity occurs at the time of transmission/reception due to the properties of electromagnetic waves, so depending on the intensity of electromagnetic waves generated by each antenna, and the positional relation between mutual antennas, a situation in which communication cannot be performed occurs.

Particularly with a non-contact IC card or RFID (Radio Frequency Identification) employing an electromagnetic induction method represented in the case of a communication frequency of 13.56 MHz, an arrangement has been made wherein a communicating state is in a good condition when the antenna coil of the non-contact IC chip and the antenna coil of a reader/writer side face each other, and accordingly, there are cases wherein communication cannot be performed when the directions of the respective antenna coils are perpendicular to each other (i.e., the normal lines of the antenna coils are perpendicular to each other).

On the other hand, in a case wherein communication cannot be performed in a good condition due to a problem caused from the positional relation between antennas, a technique has been known wherein a communicating state is improved using an antenna for relay called a booster antenna. For example, an information recording media management system has been conceived, which enables communication between a non-contact IC chip mounted on a recording medium and a reader/writer provided on a storage rack (e.g., see Japanese Unexamined Patent Application Publication No. 2005-339170 (paragraph number [0020] through [0025], FIG. 1)).

SUMMARY OF THE INVENTION

Incidentally, optical discs are frequently kept in a dedicated storage case, and a great number of optical discs stored in storage cases are frequently laid on a storage rack. Accordingly, with regard to optical discs on which a non-contact IC chip such as described above is mounted as well, a situation wherein they are each laid on a storage rack in a state of being stored in a storage case in the same way can be conceived as a matter of course. Note however, in such a situation, the optical discs on the storage rack are in a state in which the recording faces thereof are approached to face each other, so the antenna surface of a reader/writer cannot be approached in parallel to the recording faces thereof, which makes it difficult to perform communication with the non-contact IC chips.

For example, in a case wherein with a storage case, surfaces parallel to the recording faces of optical discs (hereafter, referred to as case principal face) are arrayed close to each other, in order to make between the antenna surface of a reader/writer and the antenna on an optical disc approach a facing state to perform communication in a good condition, an action needs to be performed such as providing space between adjacent storage cases, pulling out each of the storage cases, or the like. Therefore, when attempting to consecutively communicate with the non-contact IC chips of the multiple optical discs within a storage case in order, such a complex action needs to be performed, which requires time.

Thus, an arrangement has been expected wherein even in a state in which an optical disc is stored in a storage case, and is laid on a storage rack, a reader/writer is approached from a case side face perpendicular to the case principal face, whereby communication can be readily performed with the non-contact IC chip on the optical disc. Particularly, as for storage cases for optical disc, storage cases having a particular configuration, which are represented with jewel cases and tall cases, have come into widespread use, and it has been expected to communicate readily with a non-contact IC chip in the above-mentioned state without changing the configurations of those storage cases.

Also, with Japanese Unexamined Patent Application Publication No. 2005-339170 (paragraph number [0020] through [0025], FIG. 1), in a state in which an optical disc is stored in a storage case, and is laid on a storage rack, as a method for communicating with the non-contact IC chip of the optical disc, a storage rack is employed wherein there are disposed multiple reading coils for non-contact IC chip, or an antenna board where the multiple reading coils are disposed so as to be integral with partition plates and shelf boards, and a booster is provided within the storage case so as to communicate with the non-contact IC chip within the case when the storage case is laid on a predetermined position. Note however, this arrangement needs to provide a dedicated storage rack integral with a reading device, so neither a storage rack which the user has already used nor a general-purpose reading device which can be carried can be used.

There has been recognized a need for an optical disc case whereby communication with the non-contact IC chip on an optical disc can be readily performed even in a case wherein a reader/writer is approached from the case side face perpendicular to the recording face of the optical disc, and also there is no great difference from the basic configuration of an existing optical disc, an optical disc tray and card member for this optical disc case, and methods for manufacturing this optical disc case and optical disc tray.

There is provided an optical disc case according to an embodiment of the present invention, in which an optical disc is stored, wherein a face cover portion and a rear-face cover portion are connected so as to be rotated with the end portion side of each of the principal faces thereof as the center, and are configured so as to form a box-shaped appearance when the face cover portion and the rear-face cover portion are closed such that the respective principal faces of the face cover portion and the rear-face cover portion face each other, the optical disc case including: a protruding holding portion, configured to fit into a central hole formed in the optical disc to hold the optical disc, provided to the inner side of the principal face of the rear-face cover portion; and a booster antenna to which a first antenna and a second antenna are connected configured to relay a signal sent/received from one antenna to the other antenna; wherein the booster antenna is disposed such that the first antenna is disposed such that the central portion thereof is identical to the center of the protruding holding portion, and also the outer shape thereof is in a state of being parallel to the principal face of the rear-face cover portion, and the second antenna is disposed such that the outer shape thereof contacts or comes close to, in a parallel state, one side face at the time of the face cover portion and the rear-face cover portion being closed.

With such an optical disc, an optical disc is held by the protruding holding portion at the inner side of the principal face of the rear-face cover portion. Also, the first antenna of the booster antenna is disposed such that the central portion thereof is identical to the center of the protruding holding portion, and also the outer shape thereof is in a state parallel to the principal face of the rear-face cover portion. Accordingly, when an optical disc where a non-contact IC chip and a non-contact communication antenna formed with the rotation center of the optical disc as the center are provided is held by the protruding holding unit, a signal can be transmitted/received between the antenna on the optical disc and the first antenna.

On the other hand, the second antenna of the booster antenna is disposed such that the outer shape contacts or comes close to, in a parallel state, one side face at the time of the face cover portion and the rear-face cover portion being closed. Accordingly, in a state in which the optical disc case is closed, when the reader/writer of the IC chip comes close to a side face corresponding to the position of the second antenna, a signal can be transmitted/received between the antenna included in this reader/writer and the second antenna, and in this state, communication can be performed between the reader/writer and the IC chip on the optical disc.

Also, there is provided an optical disc tray according to an embodiment of the present invention including a function for holding an optical disc, and being disposed within a case casing which is configured of a face cover portion and a rear-face cover portion, which are connected in a rotatable state with the end portion side of each of the principal faces thereof as the center, so as to be fitted into and attached to the rear-face cover portion with the holding face of the optical disc being directed to the inner side of the case casing, thereby configuring an optical disc case in which the optical disc is stored, the optical disc tray including: a protruding holding portion configured to fit into a central hole formed in the optical disc to hold the optical disc; and a booster antenna to which a first antenna and a second antenna are connected configured to relay a signal sent/received from one antenna to the other antenna; wherein the booster antenna is disposed such that the first antenna is disposed in the holding face of the optical disc or the rear-face thereof and fastened such that the central portion thereof is identical to the center of the protruding holding portion, and the second antenna protrudes from the end portion of the optical disc tray.

With such an optical disc tray, the central hole of an optical disc is fitted into the protruding holding portion, thereby holding this optical disc. Also, the first antenna of the booster antenna is disposed on the holding face of an optical disc or the rear-face thereof and fastened such that the central portion thereof is identical to the center of the protruding holding portion. Accordingly, when an optical disc where a non-contact IC chip and a non-contact communication antenna formed with the rotation center of the optical disc as the center are provided is held by the protruding holding portion, a signal can be transmitted/received between the antenna on the optical disc and the first antenna.

On the other hand, the second antenna of the booster antenna is disposed so as to protrude from the end portion of the optical disc tray, so when the optical disc tray is attached to the rear-face cover portion of the optical disc case, this second antenna is disposed such that the outer shape thereof contacts or comes close to, in a parallel state, one side face at the time of the face cover portion and the rear-face cover portion being closed. Accordingly, in a state in which the optical disc case is closed, when the reader/writer of the IC chip comes close to a side face corresponding to the position of the second antenna, a signal can be transmitted/received between the antenna included in this reader/writer and the second antenna, and in this state, communication can be performed between the reader/writer and the IC chip on the optical disc.

Also, there is provided a card member according to an embodiment of the present invention attachable to an optical disc case wherein a face cover portion and a rear-face cover portion are connected so as to bend at both ends of a side-face portion making up one side face at the time of closing, and are configured so as to form a box-shaped appearance when the face cover portion and the rear-face cover portion are closed such that the respective principal faces of the face cover portion and the rear-face cover portion face each other, so as to cover the outer faces of the face cover portion, the rear-face cover portion, the side-face portion, the card member including: a booster antenna to which a first antenna and a second antenna are connected configured to relay a signal sent/received from one antenna to the other antenna; wherein the booster antenna is disposed such that the first antenna is disposed in a region corresponding to the rear-face cover portion, and the second antenna is disposed in a region corresponding to the side-face portion, and also the booster antenna is bendable at a portion corresponding to the boundary between the rear-face cover portion and the side-face portion.

With such a card member, when this card member is disposed so as to cover the outer faces of the face cover portion, rear-face cover portion, and side-face portion of the optical disc case, the first antenna of the booster antenna is disposed in a region corresponding to the rear-face cover portion of the optical disc case. Accordingly, when an optical disc where a non-contact IC chip, and a non-contact communication antenna formed with the rotation center of the optical disc as the center are provided is held within the rear-face cover portion of the optical disc case, a signal can be transmitted/received between the antenna on the optical disc and the first antenna.

On the other hand, when this card member is disposed so as to cover the outer faces of the face cover portion, rear-face cover portion, and side-face portion of the optical disc case, the second antenna of the booster antenna is disposed on a region corresponding to the side face portion of the optical disc case. Accordingly, in a state in which the optical disc case is closed, when the reader/writer of the IC chip comes close to the side face portion of the optical disc case, a signal can be transmitted/received between the antenna included in this reader/writer and the second antenna, and in this state, communication can be performed between the reader/writer and the IC chip on the optical disc.

Also, there is provided a card member according to an embodiment of the present invention which is stored between a disc tray member and a rear-face cover portion within an optical disc case including a face cover portion and the rear-face cover portion which are connected so as to be rotated with the end portion side of each of the principal faces thereof as the center, and the disc tray member, which is fitted into and attached to the rear-face cover portion, configured to hold the optical disc by a protruding holding portion provided on one of the faces being fitted into a central hole formed in an optical disc, configured so as to form a box-shaped appearance when the face cover portion and the rear-face cover portion are closed such that the respective principal faces of the face cover portion and the rear-face cover portion face each other sandwiching the disc tray member, the card member including: a booster antenna to which a first antenna and a second antenna are connected configured to relay a signal sent/received from one antenna to the other antenna; wherein the booster antenna is fastened to either face of the disc tray member side or the rear-face cover portion side such that the first antenna is disposed such that the central portion thereof is identical to the center of the protruding holding portion, and also the outer shape thereof is in a state of being parallel to the principal face of the rear-face cover portion, and the second antenna is disposed such that the outer shape thereof contacts or comes close to, in a parallel state, one side face at the time of the face cover portion and the rear-face cover portion being closed.

With such a card member, when this card member is stored between the disc tray member and the rear-face cover portion, the first antenna of the booster antenna is disposed such that the central portion thereof is identical to the center of the protruding holding portion. Accordingly, when an optical disc where a non-contact IC chip, and a non-contact communication antenna formed with the rotation center of the optical disc as the center are provided is held within the rear-face cover portion of the optical disc case, a signal can be transmitted/received between the antenna on the optical disc and the first antenna.

On the other hand, when this card member is stored between the disc tray member and the rear-face cover portion, the second antenna of the booster antenna is disposed such that the outer shape thereof contacts or comes close to, in a parallel state, one side face in a state in which the optical disc case is closed. Accordingly, in a state in which the optical disc case is closed, when the reader/writer of the IC chip comes close to the side face corresponding to the position of the second antenna, a signal can be transmitted/received between the antenna included in this reader/writer and the second antenna, and in this state, communication can be performed between the reader/writer and the IC chip on the optical disc.

Also, there is provided an optical disc case according to an embodiment of the present invention, in which a plurality of optical discs are stored, wherein a face cover portion and a rear-face cover portion are connected so as to be rotated with the end portion side of each of the principal faces thereof as the center, and are configured so as to form a box-shaped appearance when the face cover portion and the rear-face cover portion are closed such that the respective principal faces of the face cover portion and the rear-face cover portion face each other; the optical disc case including: a first protruding holding portion, configured to fit into a central hole formed in a first optical disc to hold the first optical disc, provided at the inner side of the principal face of the face cover portion; a second protruding holding portion, configured to fit into a central hole formed in a second optical disc to hold the second optical disc such that the center of the second protruding holding portion is mutually identical to the center of the first protruding holding portion when closing the face cover portion and the rear-face cover portion, provided to the inner side of the principal face of the rear-face cover portion; and at least one booster antenna to which a first antenna and a second antenna are connected configured to relay a signal sent/received from one antenna to the other antenna; wherein the booster antenna is disposed such that the first antenna is disposed such that the central portion thereof is identical to the respective centers of the first protruding holding portion and the second protruding holding portion, and also the outer shape thereof is in a state of being parallel to the principal face of the face cover portion or the principal face of the rear-face cover portion, and the second antenna is disposed such that the outer shape thereof contacts or comes close to, in a parallel state, one side face at the time of the face cover portion and the rear-face cover portion being closed.

With such an optical disc case, the first optical disc is held by the first protruding holding portion at the inner side of the principal face of the face cover portion, and the second optical disc is held by the second protruding holding portion at the inner side of the principal face of the rear-face cover portion. Also, the first antenna of the booster antenna is disposed such that the central portion thereof is identical to the respective centers of the first protruding holding portion and the second protruding holding portion, and also the outer shape thereof is in a state of being parallel to the principal face of the face cover portion or the principal face of the rear-face cover portion. Accordingly, the first optical disc and second optical disk each of which includes a non-contact IC chip and a non-contact communication antenna formed around the disc rotation center are each held by the first protruding holding portion and second protruding holding portion, and when the optical disc case is closed, a signal can be transmitted/received between the antenna on each optical disc and the first antenna.

On the other hand, the second antenna of the booster antenna is disposed such that such that the outer shape thereof contacts or comes close to, in a parallel state, one side face at the time of the face cover portion and the rear-face cover portion being closed. Accordingly, in a state in which the optical disc case is closed, when the reader/writer of the IC chip comes close to the side face portion corresponding to the position of the second antenna, a signal can be transmitted/received between the antenna included in this reader/writer and the second antenna, and in this state, communication can be performed between the reader/writer and the IC chip on each optical disc.

Also, there is provided an optical disc case according to an embodiment of the present invention in which a plurality of optical discs are stored, including: a central tray member wherein a first protruding holding portion configured to fit into a central hole formed in a first optical disc to hold the first optical disc is provided on one face of the principal faces thereof, and a second protruding holding portion configured to fit into a central hole formed in a second optical disc to hold the second optical disc is provided on the other face parallel to the one face; a face cover portion and a rear-face cover portion which are connected in a rotatable state as to the central tray member with one end side of the central tray member as the center; and at least one booster antenna to which a first antenna and a second antenna are connected configured to relay a signal sent/received from one antenna to the other antenna; wherein when the face cover portion and the rear-face cover portion are closed such that the respective principal faces of the face cover portion and the rear-face cover portion face each other, the face cover portion and the rear-face cover portion are configured so as to form a box-shaped appearance; and wherein the booster antenna is disposed on at least the one face of the central tray member such that the first antenna is disposed such that the central portion thereof is identical to the respective centers of the first protruding holding portion and the second protruding holding portion, and also the outer shape thereof is in a state of being parallel to the principal face of the central tray member, and the second antenna is disposed such that the outer shape thereof is in a state perpendicular to the outer shape of the first antenna in the vicinity of one end of the principal face of the central tray member.

With such an optical disc case, the first optical disc is held by the first protruding holding portion at one face of the principal faces of the central tray member, and the second optical disc is held by the second protruding holding portion at the other face. Also, the first antenna of the booster antenna is disposed such that the central portion thereof is identical to the respective centers of the first protruding holding portion and the second protruding holding portion, and also the outer shape thereof is in a state of being parallel to the principal face of the central tray member. Accordingly, the first optical disc and second optical disk each of which includes a non-contact IC chip and a non-contact communication antenna formed around the disc rotation center are each held by the first protruding holding portion and second protruding holding portion, and when the optical disc case is closed, a signal can be transmitted/received between the antenna on each optical disc and the first antenna.

On the other hand, the second antenna of the booster antenna is disposed such that such that the outer shape thereof is in a state perpendicular to the outer shape of the first antenna in the vicinity of one end of the principal face of the central tray member. Accordingly, in a state in which the optical disc case is closed, when the reader/writer of the IC chip comes close to the case side face corresponding to the position of the second antenna, a signal can be transmitted/received between the antenna included in this reader/writer and the second antenna, and in this state, communication can be performed between the reader/writer and the IC chip on each optical disc.

Also, there is provided a card member according to an embodiment of the present invention attachable to an optical disc case wherein a face cover portion and a rear-face cover portion are connected so as to bend at both ends of a side-face portion making up one side face at the time of closing, and are configured so as to form a box-shaped appearance when the face cover portion and the rear-face cover portion are closed such that the respective principal faces of the face cover portion and the rear-face cover portion face each other, and an optical disc is held in the inner face of the face cover portion and the inner face of the rear-face cover portion, so as to cover the outer faces of the face cover portion, the rear-face cover portion, the side-face portion, the card member including: at least one booster antenna to which a first antenna and a second antenna are connected configured to relay a signal sent/received from one antenna to the other antenna; wherein the booster antenna is disposed such that the first antenna is disposed in a region corresponding to the face cover portion or the rear-face cover portion, and the second antenna is disposed in a region corresponding to the side-face portion, and also the booster antenna is bendable at a portion corresponding to the boundary between the rear-face cover portion and the side-face portion.

With such a card member, when this card member is disposed so as to cover the outer faces of the face cover portion, rear-face cover portion, and side-face portion of the optical disc case, the first antenna of the booster antenna is disposed in a region corresponding to the face cover portion or rear-face cover portion of the optical disc case. Accordingly, when multiple optical discs each on which a non-contact IC chip, and a non-contact communication antenna formed around the disc rotation center are provided are held within the optical disc case, and the optical disc case is closed, a signal can be transmitted/received between the antenna on each optical disc and the first antenna.

On the other hand, when this card member is disposed so as to cover the outer faces of the face cover portion, rear-face cover portion, and side-face portion of the optical disc case, the second antenna of the booster antenna is disposed on a region corresponding to the side face portion of the optical disc case. Accordingly, in a state in which the optical disc case is closed, when the reader/writer of the IC chip comes close to the side face portion of the optical disc case, a signal can be transmitted/received between the antenna included in this reader/writer and the second antenna, and in this state, communication can be performed between the reader/writer and the IC chip on each optical disc.

With the optical disc case according to an embodiment of the present invention, an optical disc where a non-contact IC chip and a non-contact communication antenna formed with the rotation center of the optical disc as the center are provided is held by the protruding holding portion, and also in a state in which this optical disc case is closed, the reader/writer of the IC chip comes close to the case side face corresponding to the position of the second antenna, whereby communication can be performed between the reader/writer and the IC chip of the optical disc in a sure manner. Also, there is no need to change the basic configuration of an optical disc case which has already come into widespread use, and the booster antenna is disposed in the optical disc case thereof, whereby the above-mentioned advantages can be obtained.

Also, with the optical disc tray according to an embodiment of the present invention, this optical disc tray is disposed within the case casing of the optical disc case configured of the face cover portion and the rear-face cover portion which are connected so as to be rotated with the end portion side of each principal face as the center by the optical disc tray being fitted into and attached to the rear-face cover portion so as to direct the holding face of an optical disc to the inner side of the case casing, and also an optical disc where a non-contact IC chip, and a non-contact communication antenna formed with the rotation center of the optical disc as the center are provided is held by the protruding holding portion, and in a state in which the optical disc case thereof is closed, the reader/writer of the IC chip comes close to the case side face corresponding to the position of the second antenna, whereby communication can be performed between the reader/writer and the IC chip on the optical disc in a sure manner. Also, there is no need to change the basic configuration of an optical disc case which has already come into widespread use, and the booster antenna is disposed in an optical disc tray making up the optical disc case thereof, whereby the above-mentioned advantages can be obtained.

Further, with the card member according to an embodiment of the present invention, this card member is disposed so as to cover the outer faces of the face cover portion, rear-face cover portion, and side-face portion of the optical disc case, and also an optical disc where a non-contact IC chip, and a non-contact communication antenna formed with the rotation center of the optical disc as the center are provided is held within the rear-face cover portion of the optical disc case thereof, and in a state in which the optical disc case thereof is closed, the reader/writer of the IC chip comes close to the side face portion of the optical disc case, whereby communication can be performed between the reader/writer and the IC chip on the optical disc in a sure manner. Also, there is no need at all to change the configuration of the optical disc case which has already come into widespread use, and rather the card member is simply disposed so as to cover the outer face of the optical disc case thereof, whereby the above-mentioned advantages can be obtained.

Also, with the card member according to an embodiment of the present invention, this card member is accommodated between the disc tray member and the rear-face cover portion, and also an optical disc where a non-contact IC chip, and a non-contact communication antenna formed with the rotation center of the optical disc as the center are provided is held within the rear-face cover portion of the optical disc case thereof, and in a state in which the optical disc case thereof is closed, the reader/writer of the IC chip comes close to the side face portion of the optical disc case, whereby communication can be performed between the reader/writer and the IC chip on the optical disc in a sure manner. Also, there is no need at all to change the configuration of an optical disc case which has already come into widespread use, and rather the card member is simply disposed between the disc tray member and the rear-face cover portion, whereby the above-mentioned advantages can be obtained.

With the optical disc case according to an embodiment of the present invention, the first optical disc and second optical disc each on which a non-contact IC chip and a non-contact communication antenna formed around a disc rotation center are provided are held by the first protruding holding portion and second protruding holding portion respectively, and also in a state in which the optical disc case is closed, the reader/writer of the IC chip comes close to the case side face corresponding to the position of the second antenna, whereby communication can be performed between the reader/writer and the IC chip on each optical disc in a sure manner. Also, there is no need to change the basic configuration of an optical disc case which has already come into widespread use, and the booster antenna is disposed in the optical disc case thereof, whereby the above-mentioned advantages can be obtained.

Also, with the card member according to an embodiment of the present invention, this card member is disposed so as to cover the outer faces of the face cover portion, rear-face cover portion, and side-face portion of the optical disc case, and also multiple optical discs each on which a non-contact IC chip, and a non-contact communication antenna formed around the disc rotation center are provided are held within the optical disc case thereof, and in a state in which the optical disc case thereof is closed, the reader/writer of the IC chip comes close to the side face portion of the optical disc case, whereby communication can be performed between the reader/writer and the IC chip on each optical disc in a sure manner. Also, there is no need at all to change the configuration of an optical disc case which has already come into widespread use, and rather the card member is simply disposed so as to cover the outer face of the optical disc case thereof, whereby the above-mentioned advantages can be obtained.

BRIEF DESCRIPTION OF THE DRAWINGS

FIG. 3 is a diagram schematically illustrating circuit configurations necessary for communication between an IC chip and a reader/writer via a booth antenna;

FIG. 24 is a rear view illustrating the configuration of an optical disc case according to Embodiment 4-6;

FIG. 25 is a rear view illustrating the configuration of an optical disc case according to Embodiment 4-7;

FIG. 60 is a rear view illustrating the configuration of an optical disc case according to Embodiment 9-3;

FIGS. 61A and 61B are diagrams illustrating the configuration of a card member on which booster antenna units are mounted, with Embodiment 9-3;

DESCRIPTION OF THE PREFERRED EMBODIMENTS

Embodiments of the present invention will be described below in detail with reference to the drawings. First, description will be made regarding the basic configuration of an optical disc with a non-contact IC chip to be employed for embodiments, and a communication method with the IC chip on this optical disc.

Figure 1:
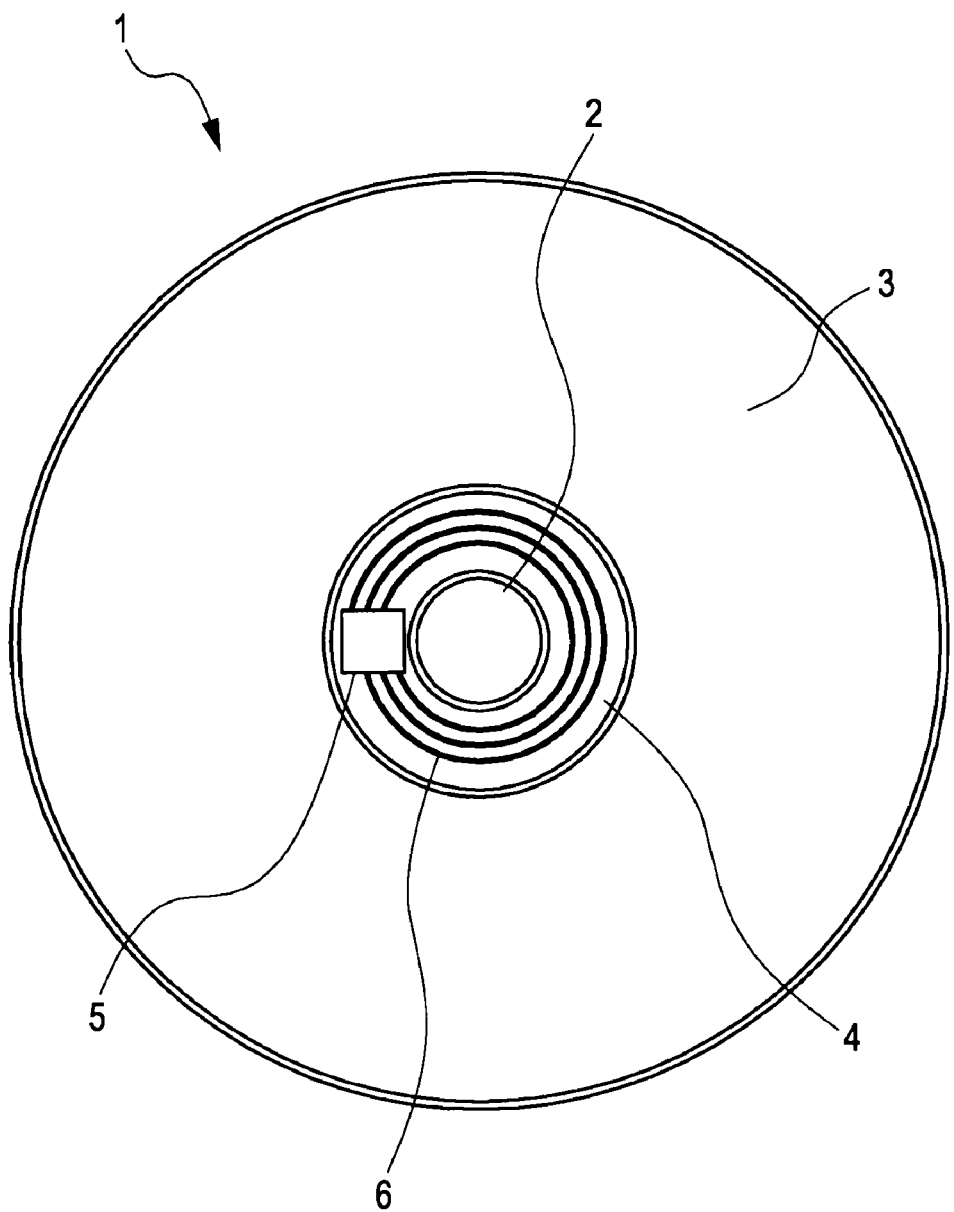
FIG. 1 is a plan view illustrating a configuration example of an optical disc on which a non-contact IC chip is mounted.

FIG. 1 is a plan view illustrating a configuration example of an optical disc on which a non-contact IC chip is mounted. The optical disc 1 shown in FIG. 1 has a basic configuration such as shown below, which is common to a general disc medium such as CDs, DVDs, Blu-ray Discs (registered trademark of Sony Corp.), HD DVDs (registered trademark), and so forth. That is to say, with this optical disc 1, the central portion thereof is provided with a center hole 2, and when this optical disc 1 is inserted into a disc drive, the optical disc 1 is rotated with this central hole 2 as the center, a laser beam is irradiated upon a signal recording face, and a signal is read depending on the light quantity of the reflected light thereof.

An outside region departed from the center hole 2 of the optical disc 1 by predetermined distance is a signal recording region 3 where there is formed a reflection film made up of an electro-conductive material, such as Ag (silver), Al (aluminum), or the like. Note that in the case of a rewritable optical disc, with this signal recording region 3, a record film, dielectric film, and so forth are formed in addition to the reflection film.

Between the signal recording region 3 and center hole 2 is a region for chucking this optical disc 1 within the disc drive, and is called a chucking region 4 or the like. This chucking region 4 is provided with a non-contact IC chip 5, and an antenna coil 6 for the IC chip 5 performing non-contact communication with an external reader/writer. With the example shown in FIG. 1, a spiral-shaped antenna coil of three turns is employed as the antenna coil 6. The antenna coil 6 having such a shape is suitable in the case of employing a short wave band represented by 13.56 MHz as a communication frequency, for example.

Note that it is desirable to provide the antenna for non-contact communication of the IC chip 5 on the peripheral region of the center hole 2 in a spiral shape (or loop shape) centered on the rotation axis to maintain the weight balance at the time of rotation of a disc. Also, such an antenna may be provided on, for example, the rear face of a region where the reflection film is formed, or the disc substrate of a disc edge portion further outer side than the region thereof, which is not restricted to the chucking region 4 such as shown in FIG. 1. Note however, in the event that the antenna is disposed in the chucking region 4 or in the vicinity thereof, there is provided an advantage wherein the processing region as to the optical disc 1 can be reduced. Disposing the antenna so as to avoid the film formation region of the reflection film also provides advantages such as being capable of recording a signal on disc both sides, being capable of reducing electromagnetic effects by the reflection film, and so forth.

Figure 2A:
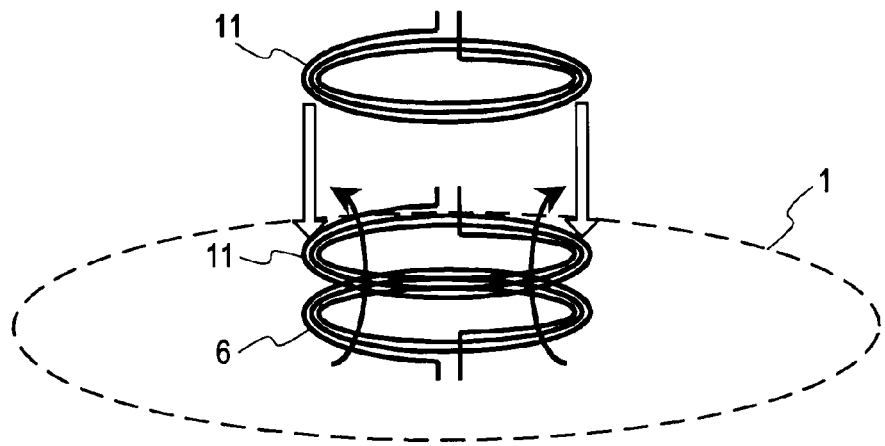
FIGS. 2A and 2B are diagrams for describing antenna positions at the IC chip side and reader/writer side at the time of non-contact communication.
Figure 2B:
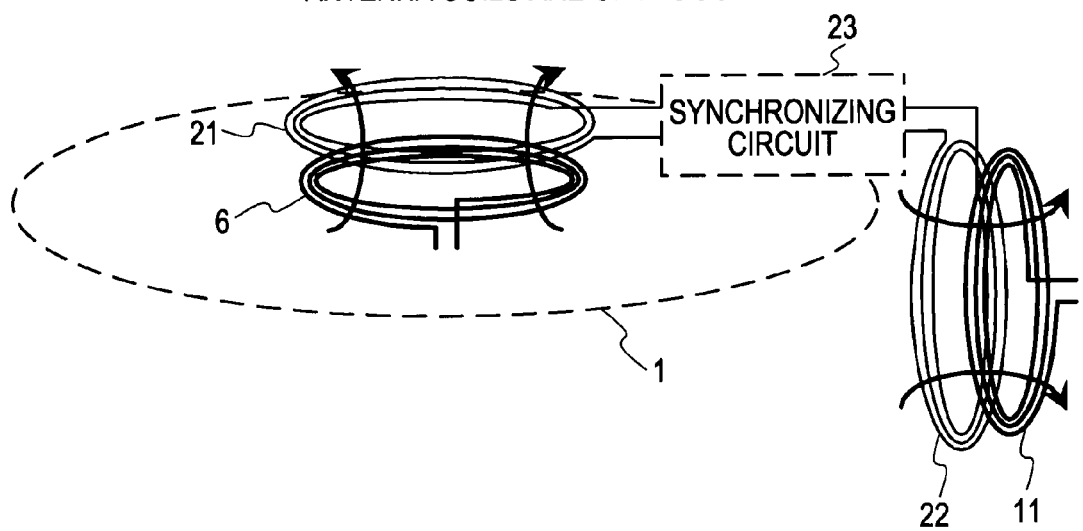

FIGS. 2A and 2B are diagrams for describing antenna positions at the IC chip side and reader/writer side at the time of non-contact communication.

In the event of performing communication with the IC chip 5 on the optical disc 1 in a good condition, it is desirable for an antenna coil 11 at the reader/writer side to come close to and face the antenna coil 6 at the IC chip 5 side, and also exist on the same axis as the antenna coil 6. Note however, as the positional relation between the antenna coil 6 at the IC chip 5 side and the antenna coil 11 at the reader/writer side is shifted from the above-mentioned state, a communication state between both deteriorates. Further, as shown in FIG. 2B, when the antenna coil 11 at the reader/writer side is positioned further outside the outer edge of the optical disc 1, and also the axis of the antenna coil 11 and the axis the antenna coil 6 at the IC chip 5 side are perpendicular to each other, communication cannot be performed in most cases.

Thus, even in the event that communication cannot be performed in a good condition due to the positional relation of the antennas, employing a booster antenna interfacing communication between antennas enables communication to be performed in a good condition. The booster antenna shown in FIG. 2B is configured of an antenna coil 21 facing the antenna coil 6 at the IC chip 5 side, and an antenna coil 22 facing the antenna coil 11 at the reader/writer side, which are connected to each other via a synchronizing circuit 23. Employing such a booster antenna enables a communication state between the antenna coil 6 at the IC chip 5 side and the antenna coil 11 at the reader/writer side to be improved.

FIG. 3 is a diagram schematically illustrating circuit configurations necessary for communication between an IC chip and a reader/writer via a booth antenna.

First, an IC chip 5 provided on an optical disc 1 is configured of a modulation/demodulation circuit of a signal to be transmitted/received to/from a reader/writer 10, a control circuit, a nonvolatile storage medium, and so forth. Here, as an example, let us say that the IC chip 5 communicates with the reader/writer 10 using electromagnetic waves, and also this IC chip 5 has no battery, and obtains operating power from the electromagnetic waves supplied from the reader/writer 10 side by electromagnetic induction. Also, an antenna coil 6 for transmitting/receiving electromagnetic waves to/from the reader/writer 10 side is connected to the IC chip 5 via a synchronizing circuit 7. The synchronizing circuit 7 is configured of, for example, a coil, a capacitor, a resistor, and so forth, and the parameters of these circuit parts are selected such that a circuit including the antenna coil 6 and synchronizing circuit 7 forms a resonance circuit for resonating with a communication frequency.

On the other hand, the main circuit 12 of the reader/writer 10 is configured of a modulation/demodulation circuit of a signal or electromagnetic waves for power supply to be transmitted/received to/from the IC chip 5, and so forth. This main circuit 12 is connected to an antenna coil 11, which transmits/receives electromagnetic waves to/from the IC chip 5 side, via a synchronizing circuit 13. The function of the synchronizing circuit 13 is the same as the function of the synchronizing circuit 7 at the IC chip 5 side.

A booster antenna 20 is configured of, as described above, antenna coils 21 and 22 which correspond to the IC chip 5 side and reader/writer 10 side respectively, and a synchronizing circuit 23 for connecting those. The function of the synchronizing circuit 23 is the same as the functions of the synchronizing circuits 7 and 13, which is for performing adjustment so as to match the impedance of each of the antenna coils 21 and 22 as to the communication frequency of a signal to be transmitted/received between the IC chip 5 and reader/writer 10, and is configured of, for example, a coil, a capacitor, a resistor, and so forth.

Note that in the event that the impedance of each of the antenna coils 21 and 22 matches the communication frequency, the synchronizing circuit 23 is unnecessary, and in this case, the antenna coils 21 and 22 can be directly connected. Also, the synchronizing circuit 7 at the IC chip side, and the synchronizing circuit 13 at the reader/writer 10 side may be provided in the same way as necessary.

Figure 31:
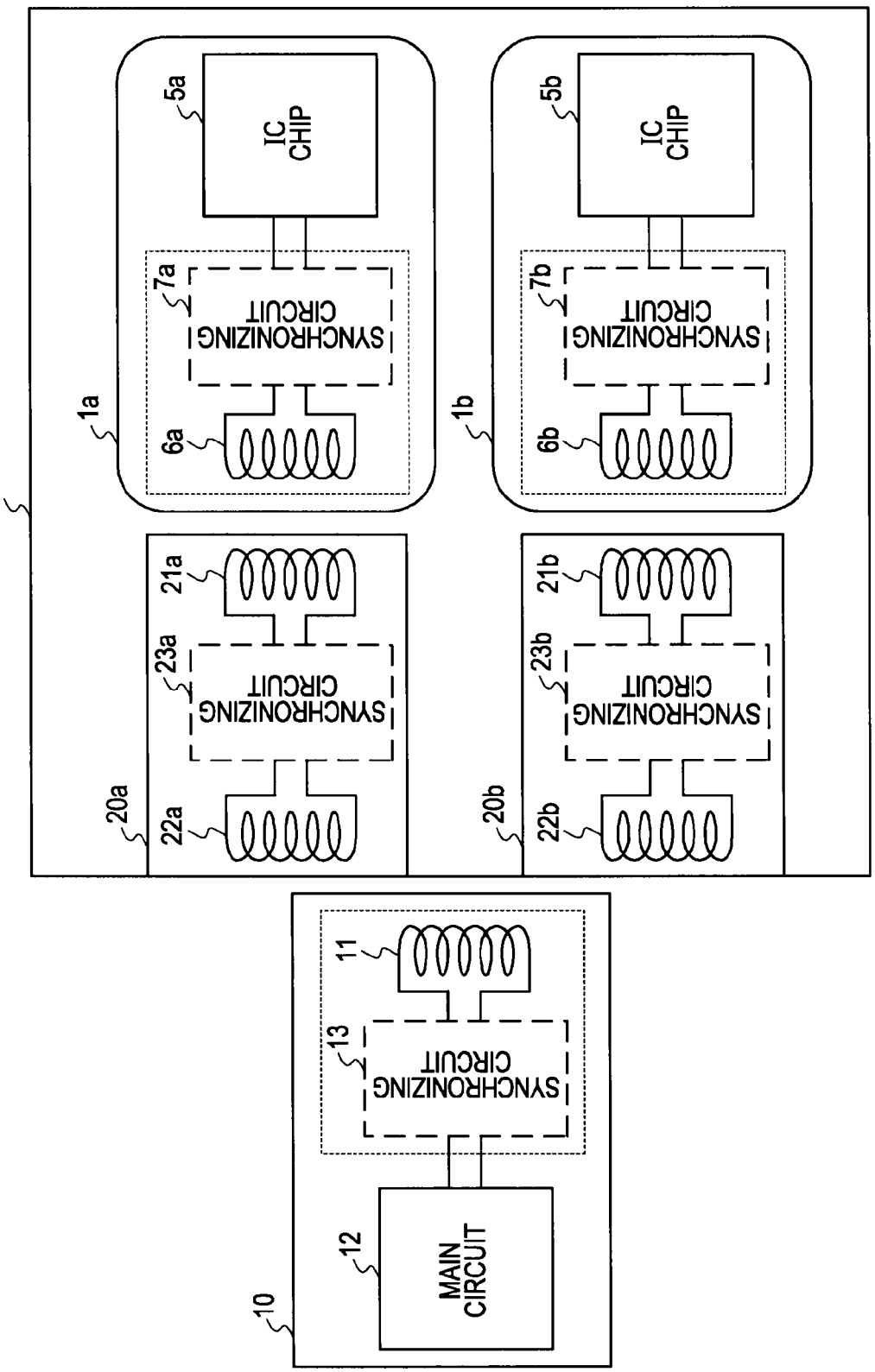
FIG. 31 is a diagram schematically illustrating circuit configurations necessary for communication between an IC chip and a reader/writer via a booth antenna.

FIG. 31 is a diagram schematically illustrating circuit configurations necessary for communication between an IC chip and a reader/writer via a booth antenna. In FIG. 31, as a representative example of later-described embodiments, a basic circuit configuration in the case of two booster antennas being provided as to an optical disc case 100 which can accommodate two optical discs 1a and 1b is illustrated. Also, each booster antenna is provided as a booster antenna unit wherein two antenna coils and a synchronizing circuit 23 therebetween are formed on one substrate, as described later. That is to say, a booster antenna unit 20a in FIG. 31 is provided for communication between an IC chip 5a on one optical disc 1a and a reader/writer 10, and a booster antenna unit 20b is provided for communication between an IC chip 5b on the other optical disc 1b and the reader/writer 10.

Now, description will be made regarding the circuit configurations shown in FIG. 31. First, the IC chips 5a and 5b provided on the optical discs 1a and 1b are each configured of a modulation/demodulation circuit of a signal to be transmitted/received to/from a reader/writer 10, a control circuit, a nonvolatile storage medium, and so forth. Here, as an example, let us say that the IC chips 5a and 5b communicate with the reader/writer 10 using electromagnetic waves, and also this IC chips 5a and 5b have no battery, and obtain operating power from the electromagnetic waves supplied from the reader/writer 10 side by electromagnetic induction.

Also, with the optical disc 1a, an antenna coil 6a for transmitting/receiving electromagnetic waves to/from the reader/writer 10 side is connected to the IC chip 5a via a synchronizing circuit 7a. The synchronizing circuit 7a is configured of, for example, a coil, a capacitor, a resistor, and so forth, and the parameters of these circuit parts are selected such that a circuit including the antenna coil 6a and synchronizing circuit 7a forms a resonance circuit for resonating with a communication frequency. Note that with the optical disc 1b, the IC chip 5b, an antenna coil 6b, and a synchronizing circuit 7b are provided, and each have the same functions as the functions of the IC chip 5a, antenna coil 6a, and synchronizing circuit 7a of the optical disc 1a.

On the other hand, the main circuit 12 of the reader/writer 10 is configured of, for example, a modulation/demodulation circuit of a signal or electromagnetic waves for power supply to be transmitted/received to/from the IC chips 5a and 5b, and so forth. This main circuit 12 is connected to an antenna coil 11, which transmits/receives electromagnetic waves to/from the IC chips 5a and 5b side, via a synchronizing circuit 13. The function of the synchronizing circuit 13 is the same as the functions of the synchronizing circuits 7a and 7b at the IC chips 5a and 5b side.

The booster antenna 20a is configured of, as described above, antenna coils 21a and 22a which correspond to the IC chip 5a side and reader/writer 10 side respectively, and a synchronizing circuit 23a for connecting those. Also, the booster antenna 20b is configured of, as described above, antenna coils 21b and 22b which correspond to the IC chip 5b side and reader/writer 10 side respectively, and a synchronizing circuit 23b for connecting those. The functions of the synchronizing circuits 23a and 23b are the same as the functions of the synchronizing circuits 7a, 7b, and 13, which are for performing adjustment so as to match the impedance of each of the connected antenna coils as to the communication frequency of a signal to be transmitted/received between the IC chip 5 and reader/writer 10, and is configured of, for example, a coil, a capacitor, a resistor, and so forth.

Note that in the event that the impedance of each of the antenna coils 21a and 22a matches the communication frequency, the synchronizing circuit 23a is unnecessary, and in this case, the antenna coils 21a and 22a can be directly connected. With regard to the synchronizing circuit 23b within the booth antenna unit 20b as well, this point is the same. Further, the synchronizing circuits 7a and 7b at the IC chips 5a and 5b side, and the synchronizing circuit 13 at the reader/writer 10 side may be provided in the same way as necessary.

Next, description will be made specifically regarding an optical disc case according to an embodiment, but with the following respective embodiments, a booster antenna 20, which realizes a positional relation such as shown in FIG. 2B between the antenna coil 6 at the IC chip 5 side and the antenna coil 11 at the reader/writer 10 side, is provided within an optical disc case which accommodates an optical disc 1. Thus, in a state in which the optical disc 1 is accommodated in the optical disc case, even in the event that the reader/writer 10 comes close to the optical disc case from the normal-line direction of the optical disc 1 such as shown in FIG. 2B, communication can be performed in a good condition.

Embodiment 1-1

Figure 4:
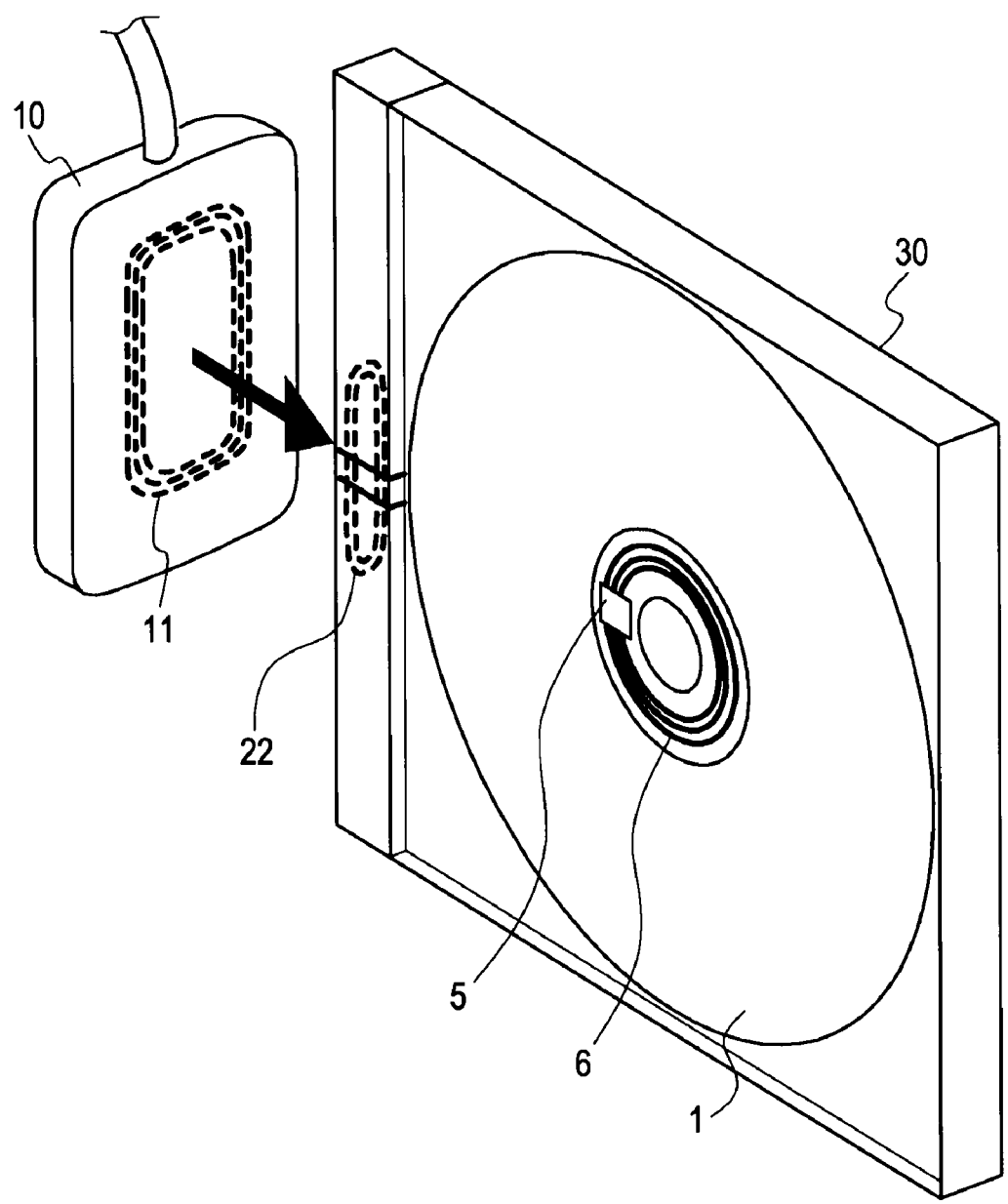
FIG. 4 is a diagram illustrating the outer shape of an optical disc case according to Embodiment 1-1.

FIG. 4 is a diagram illustrating the outer shape of an optical disc case according to Embodiment 1-1. In FIG. 4, an optical disc case 30 is a container case made of a resin where the optical disc 1 is attached to the inside thereof, and the outer shape thereof forms a rectangular solid of which the direction perpendicular to the disc face is thinner. Also, with the side face to be connected to one side of the face (case principal face) parallel to the disc face, an antenna coil 22 making up the booster antenna 20 for transmitting/receiving a signal to/from the external reader/writer 10 is provided close thereto. With the example shown in FIG. 4, the side face at the connection portion side where the cover portion is connected to the base portion of the optical disc case 30 rotatably is provided with the antenna coil 22 for performing communication with the reader/writer 10. Also, the other antenna coil 21 (not shown) making up the booster antenna 20 is provided within the optical disc case 30 so as to come close to and face the antenna coil 6 on the attached optical disc 1. Note that description will be made later regarding the detailed configurations of the optical disc case 30 and booster antenna 20.

Thus, providing the antenna coil 22 of the booster antenna 20 along the side face of the optical disc case 30 enables communication between the reader/writer 10 and the IC chip 5 on the optical disc 1 when the reader/writer 10 is brought close to the antenna coil 22 of the booster antenna 20 in a state of facing the antenna coil 22 of the booster antenna 20 and the antenna coil 11 of the reader/writer 10.

Particularly in the case of a great number of such optical disc cases 30 being accommodated on a storage rack, the optical disc cases 30 come into contact with (or come close to) each other with the faces (case principal faces) parallel to the disc faces, and accordingly, it becomes difficult to communicate with the IC chip 5 by holding the reader/writer 10 against the case principal faces. Note however, even in a state of being accommodated on the storage rack, at least one side face of the optical case 30 is exposed outside, so this side face is provided with the antenna coil 22 of the booster antenna 20 such as shown in FIG. 4, and accordingly, communication with the IC chip 5 can be performed by holding the reader/writer 10 against this side face.

If communication can be performed with the IC chip 5 on the optical disc 1 in a state of being accommodated in the storage rack, usage which facilitates the search of the optical disc 1 where a desired music or data is recorded, for example, such that information such as a music or the like is recorded in the IC chip 5 beforehand, and this information is read out by the reader/writer 10 to display this on a display device, or when information matching the specified keyword is recorded in the IC chip 5, this is informed by audio or light or the like.

Note that in FIG. 4, an example of the reader/writer 10 only for a non-contact IC chip is illustrated, but the shape and configuration of the reader/writer 10 are only an example. As for another configuration of the reader/writer, for example, it can be conceived that a reader/writer function is provided in a remote controller for a playing/recording device of the optical disc 1 or the like, and an antenna coil is disposed at the tip portion of the remote controller thereof.

Figure 5:
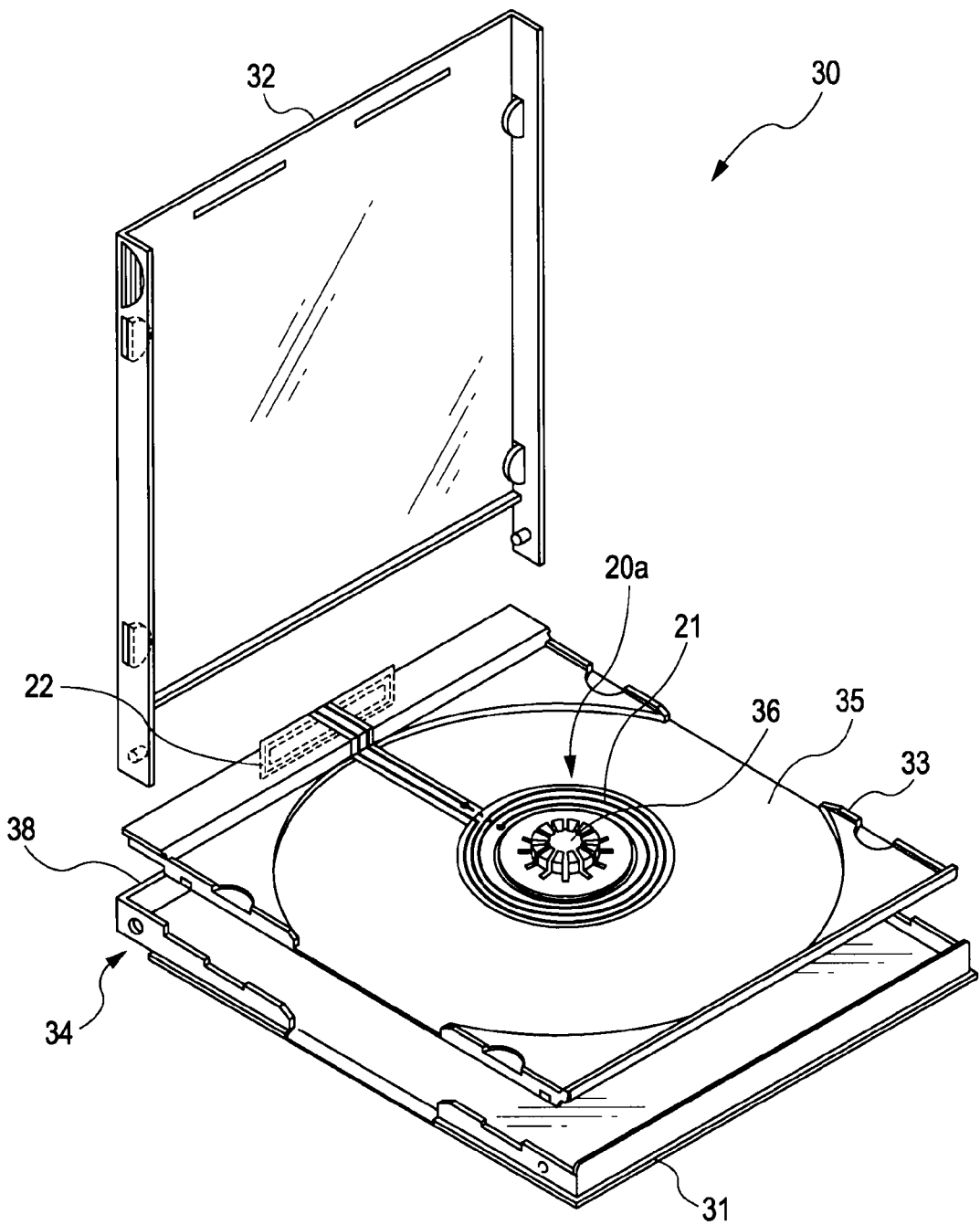
FIG. 5 is an exploded perspective view of an optical disc according to Embodiment 1-2.

FIG. 5 is an exploded perspective view of an optical disc case according to Embodiment 1-1. As shown in FIG. 5, the optical disc case 30 according to the present embodiment is basically configured of a base portion 31 and a cover portion 32 which make up an external casing, and a disc tray 33 to be accommodated therein. The base portion 31 and cover portion 32 are connected in a rotatable state at a connection portion 34, and the cover portion 32 is configured to be opened/closed as to the base portion 31 with the connection portion 34 as the center. Also, in a state in which the cover portion 32 is closed, the cover portion 32 is fitted into the base portion 31 to form a box-shaped outer shape, and the inside thereof is sealed.

The disc tray 33 is a member to which the optical disc 1 is attached, and is fitted into and attached to the inside of the base portion 31. With this disc tray 33, a circular recessed-shaped disc mounting surface 35 where the optical disc 1 is mounted is formed, and a protruding shaped holding portion 36 is formed at the center portion thereof. The circumference of the disc holding portion 36 has elasticity, the center hole 2 of the optical disc 1 is fitted into this disc holding portion 36, whereby the optical disc 1 is held.

Such an optical disc case 30 configured of the three members of the base portion 31, cover portion 32, and disc tray 33 is circulating most generally as an container case for CDs, and is called a "jewel case" or the like. Note that the base portion 31, cover portion 32, and disc tray 33 are formed of a polystyrene resin material for example, and generally, at least the base portion 31 and cover portion 32 are formed of a transparent resin material. Also, the base portion 31 and cover portion 32, and the internal disc tray 33 are manufactured by different makers, and are circulated separately in some cases.

Figure 6:
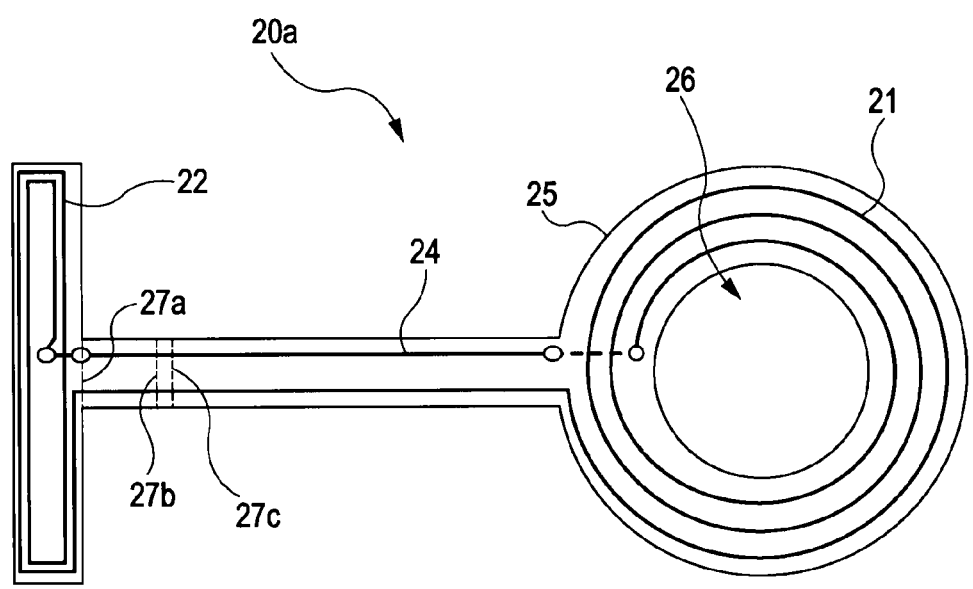
FIG. 6 is a diagram illustrating the configuration of a booth antenna unit.

With the present embodiment, a booth antenna 20 for communicating with the IC chip 5 on the optical disc 1 accommodated in the optical disc case 30 is provided. As shown in FIG. 6, with the present embodiment, the booth antenna 20 is configured as a booth antenna unit 20a where the antenna coils 21 and 22 are integral with the substrate.

FIG. 6 is a diagram illustrating the configuration of the booth antenna unit. As shown in FIG. 6, the booth antenna unit 20a has a configuration wherein the antenna coil 21 for communication with the IC chip 5, the antenna coil 22 for communication with the reader/writer 10, and the booster antenna 20 configured of a connection wiring 24 for connecting the respective antenna coils 21 and 22 are formed on a flexible substrate 25. The respective antenna coils 21 and 22, connection wiring 24 are parts by forming a metal material such as aluminum (Al) in a thin-plate shape (or thin film shape) on the flexible substrate 25 by printing or the like.

Also, a center hole 26 for passing the disc holding portion 36 of the disc tray 33 through the flexible substrate 25 is formed at the center region of the antenna coil 21 at the IC chip 5 side. Further, in this case, bending portions 27a through 27c for matching with the surface shape of the disc tray 33 are formed on a region between the antenna coils 21 and 22 of the flexible substrate 25.

Note that the antenna diameters, the number of turns, and so forth of the antenna coils 21 and 22 may be suitably determined so as to perform communication in a good condition depending on the antenna diameters, the number of turns, and so forth of the antenna coil 6 at the IC chip 5 side and the antenna coil 11 at the reader/writer 10 side, respectively.

Also, the circuit configuration of the booth antenna 20 formed in the booth antenna unit 20a is such as those shown in FIG. 3. FIG. 6 illustrates an example of the booster antenna unit 20a where the synchronizing circuit 23 is not formed. In the event that the synchronizing circuit 23 is necessary, in FIG. 6, for example, the synchronizing circuit 23 may be provided on a region where the connection wiring 24 is formed in the flexible substrate 25.

As described above, the synchronizing circuit 23 is configured of, for example, a coil, a capacitor, a resistor, and so forth. As for a specific configuration example of the synchronizing circuit 23, for example, a pair of electrodes of a capacitor (chip capacitor) are each connected to the connection wiring 24, whereby the capacitor is connected to the antenna coils 21 and 22 in parallel. At this time, adjusting the capacity of the capacitor enables the impedance to be changed, and consequently, impedance matching as to the communication frequency can be adjusted.

Figure 7:
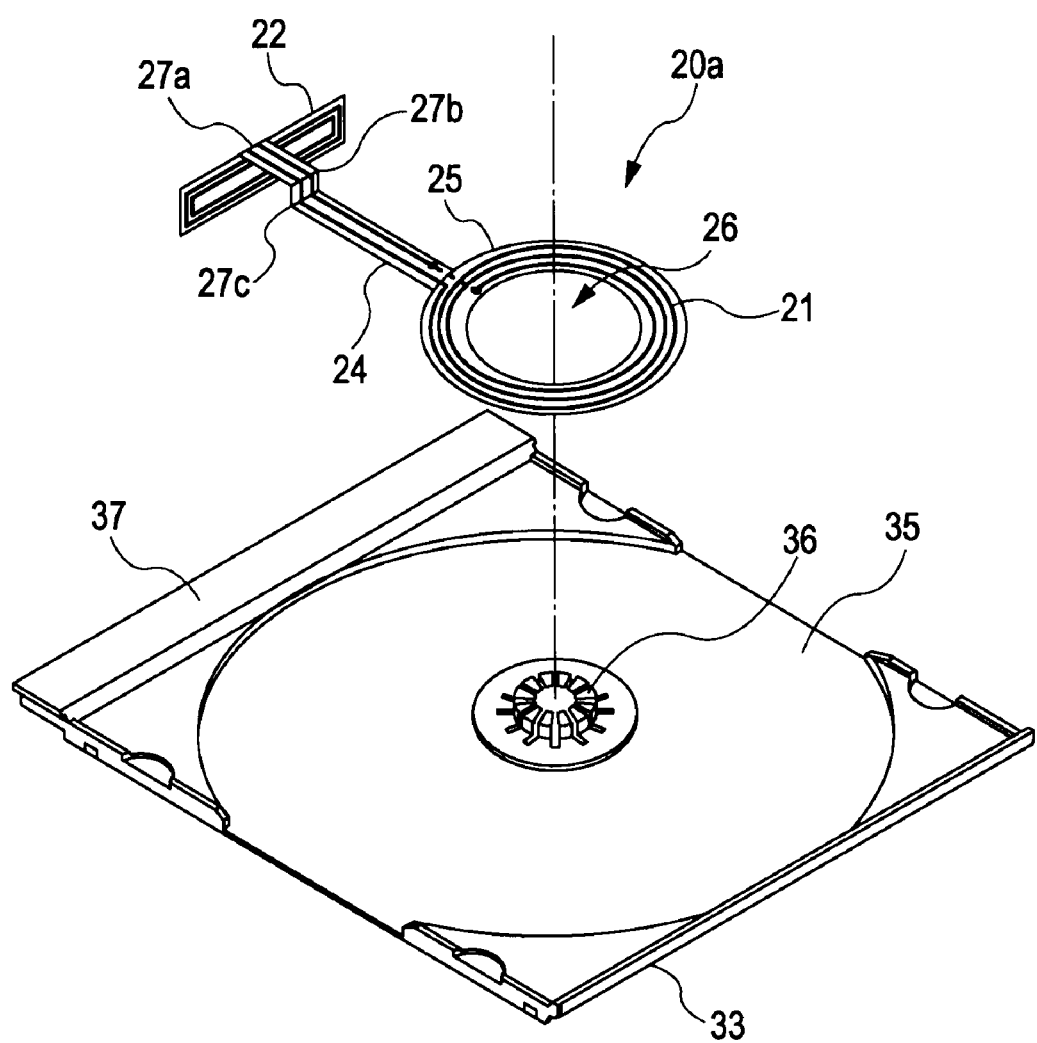
FIG. 7 is an exploded perspective view of a disc tray and the booster antenna unit which make up an optical disc case.

FIG. 7 is an exploded perspective view of the disc tray and the booster antenna unit which make up the optical disc case. The optical disc case 30 according to the present embodiment is manufactured with the following processes, for example.

First, as described above, the booster antenna unit 20a wherein the antenna coils 21 and 22, and the connection wiring 24 are formed by printing or the like is fabricated on the flexible substrate 25 in a flat state such as shown in FIG. 6. On the other hand, the disc tray 33 is formed with injection molding or the like.

Next, the bending portions 27a through 27c of the booth antenna unit 20a are subjected to bending work in a predetermined direction, following which the booth antenna unit 20a thereof is fastened on the upper face of the disc tray 33 (the face at the disc mounting surface 35 side) in a state in which the center hole 26 is subjected to positioning with the disc holding portion 36 of the disc tray 33. With this example, of the flexible substrate 25, the rear face of the face where the antenna coil 21 and connection wiring 24 are formed is fastened as to the disc tray 33. As a result thereof, the antenna coil 21 is disposed so as to surround the circumference of the disc holding unit 36, and when the optical disc 1 is fitted into the disc holding portion 36, electromagnetic coupling between the antenna coil 6 at the disc side and the antenna coil 21 at the tray side is carried out in a sure manner, whereby a signal can be transmitted/received.

Here, between the flexible substrate 25 and disc tray 33 is adhered with an adhesive or tackiness agent such as ultraviolet curing resin, hot melt resin, epoxy resin, cyanoacrylate, synthetic-rubber (preferably a styrene butadiene rubber), or the like. At this time, the faces to be adhered may be reformed so as to be adhered in a sure manner, by applying primer to the faces to be adhered beforehand.

Note that with the present embodiment, a protruding portion 37 is formed on a region at the connection portion side 34 where the base portion 31 and cover portion 32 are connected when the base portion 31 is disposed later with the disc tray 33, and the bending portions 27a through 27c of the booster antenna unit 20a are bent so as to come into contact with the surface of the protruding portion 37 tightly. As a result thereof, the region of the flexible substrate 25 where the antenna coil 22 is formed is bent downward at the edge portion of the protruding portion 37 so as to be perpendicular to the disc mounting surface 35. The disc tray 33 including such a protruding portion 37 is most common with the jewel-case-shaped optical disc case 30, and the booster antenna unit 20a having the above-mentioned configuration can be fastened to such an existing disc tray 33 without being subjected to any processing.

Also, an arrangement may be made wherein when attaching the booster antenna unit 20a, bending work is not performed before attaching to the disc tray 33, and rather the bending portions 27a through 27c are subjected to bending work, for example, by pressing from the upper face in a state in which the center hole 26 is subjected to positioning with the disc holding portion 36 of the disc tray 33 without changing the flat state thereof.

Also, another arrangement may be made, for example, wherein a notched portion is provided on the protruding portion 37 of the disc tray 33 whereby the region of the connection wiring 24 of the booster antenna unit 20a is fitted therein, and the booster antenna unit 20a can be fastened to the disc tray 33 in a flat state thereof without bending the bending portions 27b and 27c. In this case, the antenna coil 22 may be subjected to bending work upward at the bending portion 27a.

Also, the booster antenna 20 is not restricted to such a configuration according to the present embodiment wherein the booster antenna 20 is integral with the substrate, and rather may be configured of only a thin metal wire, for example. In this case, the antenna coils 21 and 22 are formed as air-core coils each subjected to winding by a winding machine or the like, for example.

While according to the above-mentioned process the booster antenna unit 20a is attached to the disc tray 33, the base portion 31 and cover portion 32 are formed with injection molding, and those are connected at the connection portion 34 so as to be rotated. Subsequently, in a state in which the cover portion 32 is opened, the disc tray 33 to which the booster antenna unit 20a is fastened is fitted into and fixed within the base portion 31. At this time, the antenna coil 22 of the booster antenna unit 20a is disposed at the lower portion of the end portion of the protruding portion 37 of the disc tray 33 so as to tightly come into contact with the inner side of the side face 38 at the rotation center side of the base portion 31 (see FIG. 5).

Note that with the optical disc case 30 having the above-mentioned configuration, an arrangement may be made wherein a component in a state in which the booster antenna unit 20a is fastened to the disc tray 33 is circulated, and this component is attached to the base portion 31 and cover portion 32 which are separately circulated by another maker or user.

Also, following the disc tray 33 being fitted into and attached to the base portion 31, the cover portion 32 may be connected to the base portion 31 thereof, as a matter or course. Alternatively, following all of the base portion 31, cover portion 32, and disc tray 33 being assembled, the booster antenna unit 20a may be fastened onto the disc tray 33.

With the above-mentioned Embodiment 1-1, the booster antenna 20 can be mounted with a simple process without changing the configuration and shape of an existing jewel case type optical disc case (or only by subjecting the original shape to processing or shape change slightly). As a result thereof, the reader/writer 10 is brought close to the side face 38 of the base portion 31 in a state of the reader/writer 10 facing the side face 38, whereby communication can be performed between the reader/writer 10 and the IC chip 5 of the optical disc 1.

Also, in the event that the disc tray 33 in a state of the booster antenna unit 20a being fastened thereto has been sold independently, a user who has already owns an existing jewel case type optical disc case can obtain the advantages based on the above-mentioned additional functions not by replacing the entire case thereof but by purchasing and replacing the internal disc tray alone.

Note that the antenna coil 22 of the booster antenna unit 20a needs to be disposed so as to come into contact with (come close to) any of the side faces to be connected to the four sides of the tray-attached surface of the base portion 31. That is to say, the reader/writer 10 is holding against the side with which the antenna coil 22 comes into contact, whereby the communication can be performed with the IC chip 5 of the optical disc 1.

Note however, with the optical disc case 30 having the above-mentioned configuration, in general, a paper member is disposed within the side face 38 at the rotation center side of the cover portion 32, the title of a content recoded in the optical disc 1 through this side face 38, or the like is frequently displayed. Therefore, when this optical disc case 30 is accommodated in a storage rack, the side face 38 is in a state of being exposed outside the storage rack in many cases. Also, disposing the antenna coil 22 on the side face 38 side can prevent a situation wherein a user comes contact with the antenna coil 22 and destroys it at the time of mounting/detaching of the optical disc 1 as compared with the case of disposing the antenna coil 22 on the other side faces. It is most desirable for the antenna coil 22 to be disposed so as to come into contact with the side face 38 from such a point, and with all of the embodiments described in the present Specification, an example will be shown wherein the antenna coil 22 for communication with the reader/writer 10 is disposed on the side face at the rotation center side of the cover portion.

Embodiment 1-2

Figure 8:
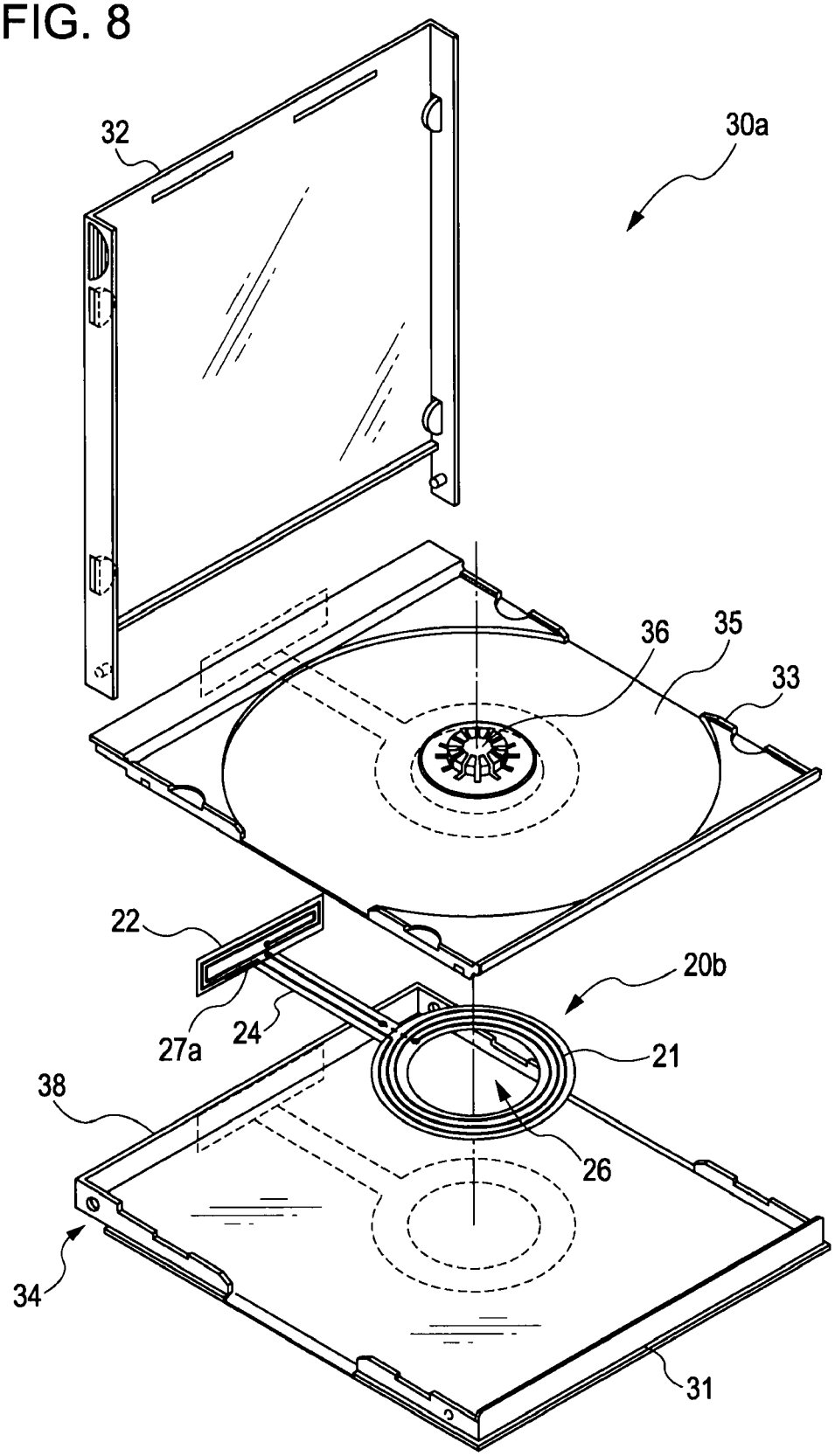
FIG. 8 is an exploded perspective view of an optical disc according to Embodiment 1-2.

FIG. 8 is an exploded perspective view of an optical disc case according to Embodiment 1-2. The optical case 30a shown in FIG. 8 is a modification of the optical disc case 30 according to Embodiment 1-1, wherein the booster antenna unit 20b is disposed not on the disc-mounted face 35 of the disc tray 33 but on the rear face thereof. With the booster antenna unit 20b to be implemented in the optical disc case 30, the antenna coil 22 for communication with the reader/writer 10 is bent upward with the bending portion 27a between the antenna coil 22 and connection wiring 24 as a boundary, and is in a state perpendicular to the case principal face.

In the event of manufacturing such an optical disc case 30a, for example, following the booster antenna unit 20b being subjected to bending work at the bending portion 27a, the booster antenna unit 20b is fastened to the opposite face of the disc-mounted face 35 of the disc tray 33. Subsequently, the disc tray 33 to which the booster antenna unit 20b is fastened is fitted into and attached to the inside of the base portion 31, and the cover portion 32 is connected to this base portion 31 at the connection portion 34. Note that an arrangement may be made wherein following the booster antenna unit 20b being fastened to the disc tray 33 in a flat state as a whole, the booster antenna unit 20b is pressed at the time of attaching the disc tray 33 to the base portion, whereby the bending portion 27a is bent. Also, the disc tray 33 to which the booster antenna unit 20b is fastened may be circulated. Further, a procedure may be employed wherein, following the booster antenna unit 20b being fastened to the inside of the base portion 31, the disc tray 33 is fitted into and attached thereupon.

With such a process, when disposing the booster antenna unit 20b, the center positions of the disc holding portion 36 and the center hole 26 of the booster antenna unit 20b are aligned, and accordingly, when accommodating the optical disc 1 in the disc tray 33, electromagnetic coupling between the antenna coil 6 at the IC chip 5 side and the antenna coil 21 at the booster antenna unit 20b side is carried out, whereby transmission/reception of a signal can be performed between those. Also, with the optical disc case 30a after assembly, the other antenna coil 22 of the booster antenna unit 20b is in a state of coming into contact with the inside of the side face 38 of the cover portion 32. Thus, the reader/writer 10 is brought close to the side face 38 from the outside thereof, whereby communication can be performed between the reader/writer 10 and the IC chip 5.

Embodiment 2

Figure 9:
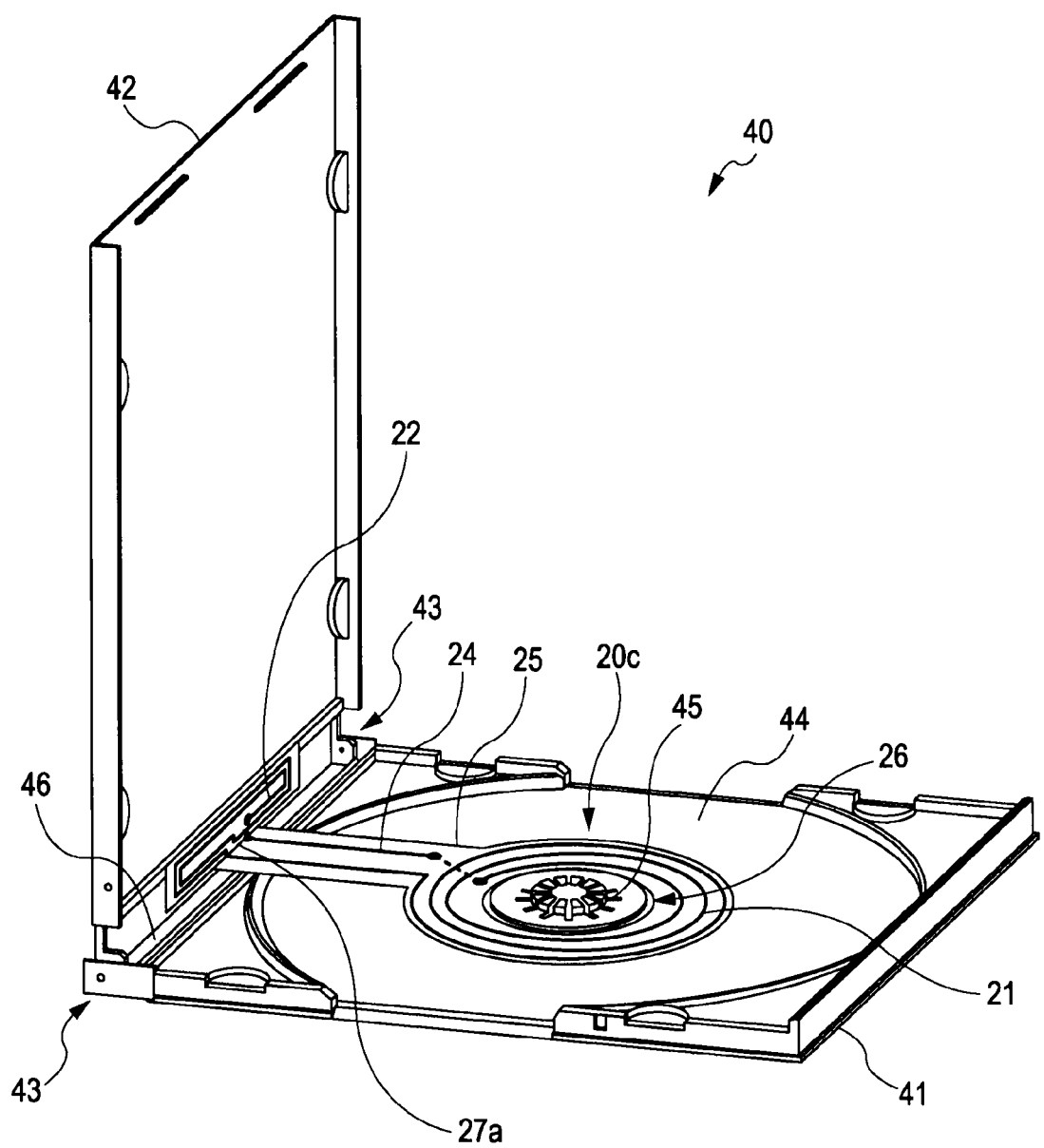
FIG. 9 is a perspective view illustrating the configuration of an optical disc case according to Embodiment 2.

FIG. 9 is a perspective view illustrating the configuration of an optical disc case according to Embodiment 2. The optical disc case 40 shown in this FIG. 9 is configured of a base portion 41 and a cover portion 42, and the base portion 41 and cover portion 43 are connected at a connection portion 43 so as to be rotated. Also, unlike Embodiments 1-1 and 1-2, an arrangement is made wherein a disc-mounted face 44 and a disc holding portion 45 are formed integral with the inner face of the base portion 41, and the optical disc 1 is accommodated at the inner side of the base portion 41. The base portion 41 and cover portion 42 are formed of a polystyrene resin material. The optical disc case 40 having such a basic configuration is an optical disc case which has been widely circulated as a container case for CDs, DVDs, and so forth, which is thinner than the optical disc cases having the configurations shown in Embodiments 1-1 and 1-2.

Subsequently, with the present embodiment, the booster antenna unit 20c where a booster antenna is formed is fastened to the disc-mounted face 44 of such an optical disc case 40. The configuration of the booster antenna unit 20c shown here is generally the same as that of the booster antenna unit 20b shown in FIG. 8, the antenna coil 22 at the reader/writer 10 side is bent at the bending portion 27a between the antenna coil 22 and connection wiring 24, which is in a state of being perpendicular to the antenna coil 21 for the IC chip 5. Note that the region where the connection wiring 24 of the flexible substrate 25 is formed needs to be bent along the irregularities of the inner face of the base portion 41 as appropriate, and formed so as to come into contact with the inner face thereof. Alternatively, the region in the inner face of the base portion 41 to which the flexible substrate 25 is fastened may be formed in a flat state beforehand.

The antenna coil 22 of the booster antenna unit 20c becomes a state of coming into contact with the inner side of the end face 46 at the connection portion 43 side of the cover portion 42 when the cover portion 42 is closed, and thus, the reader/writer 10 is brought close to the end face 46 from the outside when the cover portion 42 is closed in a state of the optical disc 1 being accommodated, whereby communication can be performed between the reader/writer 10 and IC chip 5. On the other hand, the center position of the center hole 26 formed at the inner side of the antenna coil 21, and the center position of the disc holding portion 45 are aligned, and accordingly, electromagnetic coupling between the antenna coil 21 and the IC chip 5 on the optical disc 1 is carried out in a sure manner.

Note that with the above-mentioned Embodiment 2, the booster antenna unit 20c has been fastened to the inner face of the base portion 41, but the booster antenna unit 20c may be fastened to the inner face of the cover portion 42.

Embodiment 3-1

Figure 10:
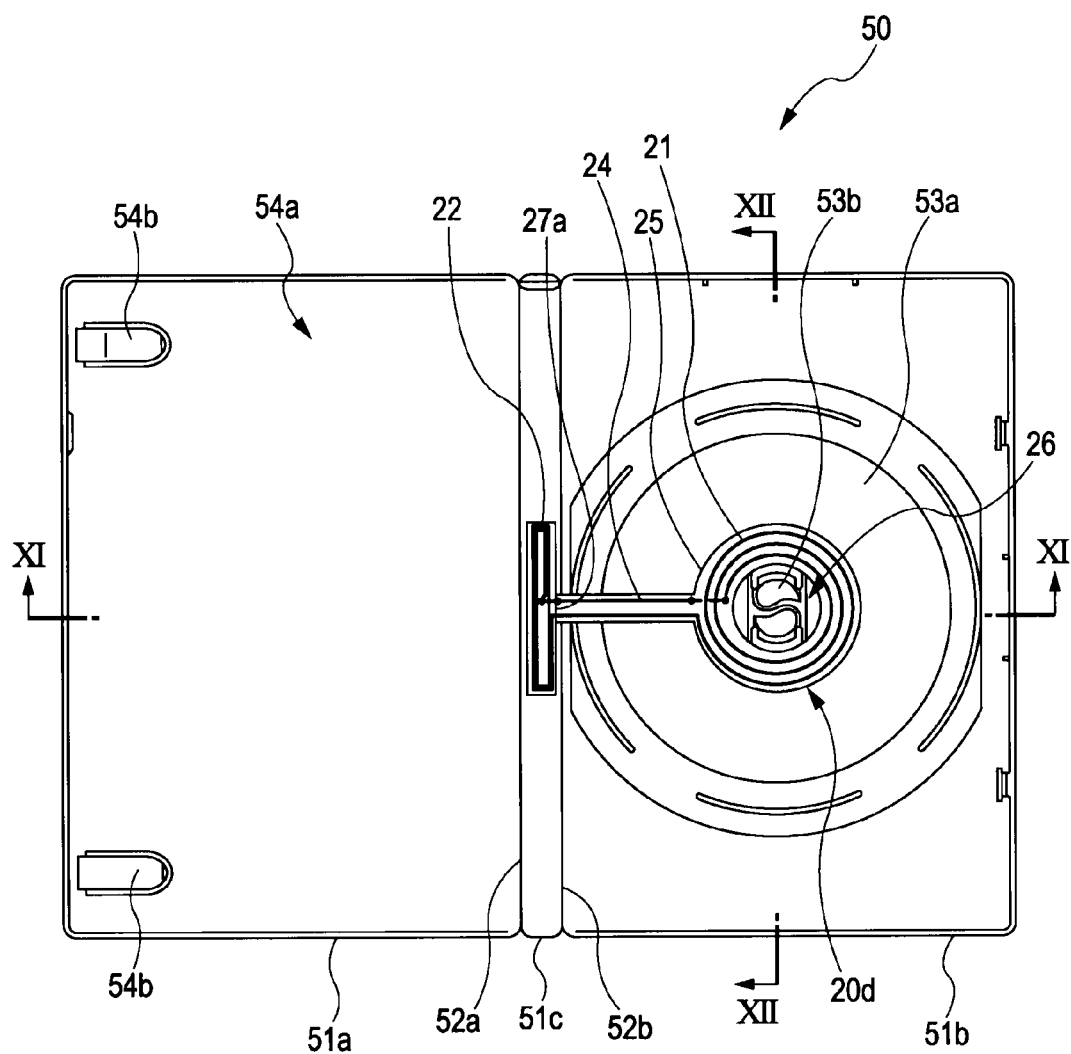
FIG. 10 is a diagram (front view) illustrating the configuration of an optical disc case according to Embodiment 3-1.
Figure 11:
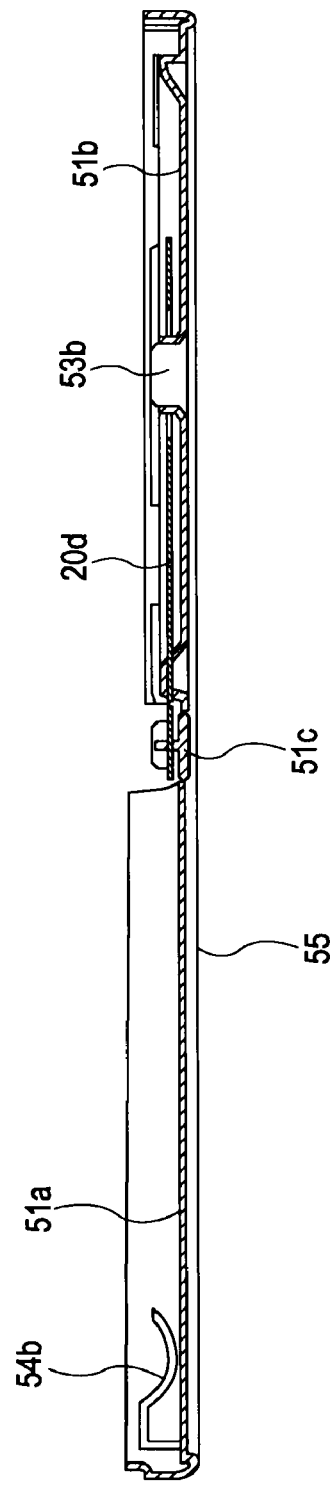
FIG. 11 is a diagram (cross-sectional view taken along XI-XI) illustrating the configuration of the optical disc case according to Embodiment 3-1.
Figure 12:
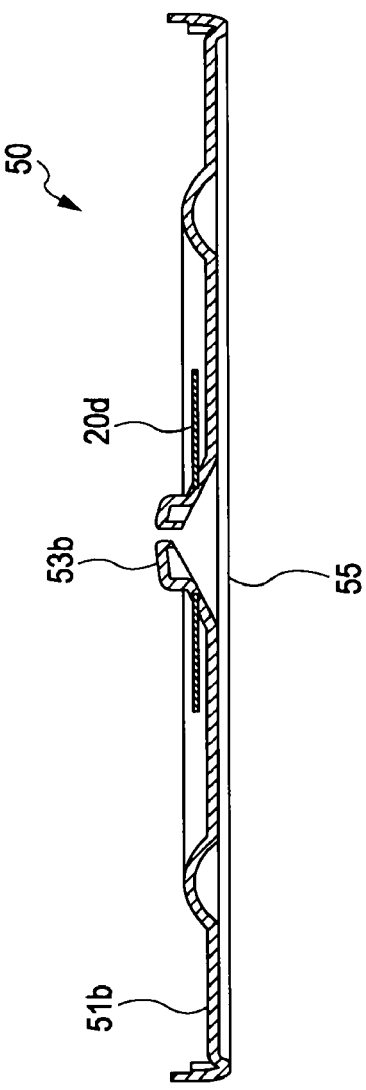
FIG. 12 is a diagram (cross-sectional view taken along XII-XII) illustrating the configuration of the optical disc case according to Embodiment 3-1.
Figure 13:
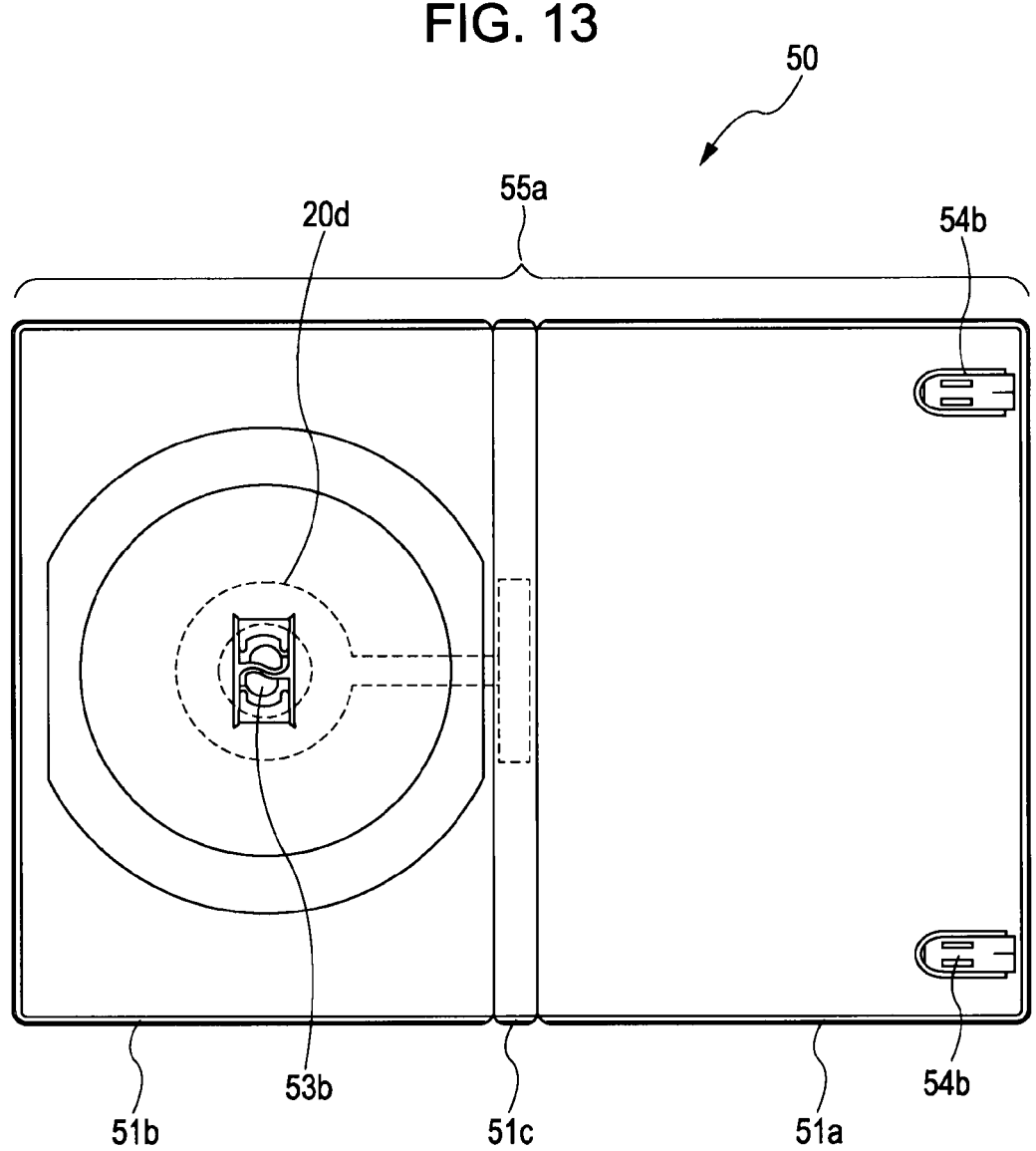
FIG. 13 is a diagram (rear view) illustrating the configuration of the optical disc case according to Embodiment 3-1.

FIGS. 10 through 13 are diagrams illustrating the configuration of an optical disc case according to Embodiment 3-1. FIG. 10 illustrates a front view, FIG. 11 illustrates a cross-sectional view of FIG. 10 taken along XI-XI, FIG. 12 illustrates a cross-sectional view of FIG. 10 taken along XII-XII, and FIG. 13 illustrates a rear view, respectively.

An optical disc case 50 according to the present embodiment basically has a double-folded box-type shape including a face cover portion 51a and a rear-face cover portion 51b. The face cover portion 51a and rear-face cover portion 51b are connected through a case side face portion 51c so as to be bent, which are formed integral with resin materials, such as a polypropylene or the like, for example. That is to say, the face cover portion 51a and rear-face cover portion 51b are bent by 90 degrees at bending portions 52a and 52b which are each boundary portions as to a case side face portion 51c, and at this time, the face cover portion 51a and rear-face cover portion 51b become a face-to-face state to seal the internal portion thereof. Also, at this time, the case side face portion 51c becomes a state perpendicular to the face cover portion 51a and rear-face cover portion 51b, which makes up one side face of the optical disc case 50.

A disc-mounted face 53a where the optical disc 1 is mounted, and a protruding disc holding portion 53b for holding the optical disc 1 are formed integral with the inner face of the rear-face cover portion 51b. In the same way as with the above-mentioned respective embodiments, the circumference of the disc holding portion 53b has elasticity, and the center hole 2 of the optical disc 1 is fitted into and attached to the disc holding portion 53b, whereby the optical disc 1 is held. On the other hand, the inner face of the face cover portion 51a becomes a booklet accommodation face 54a for accommodating a booklet or the like for describing a content recorded in the optical disc 1 for example, and a protruding retaining portion 54b for holding and retaining a booklet is formed on this face.

Further, the outer faces of the face cover portion 51a, rear-face cover portion 51b, and case side face portion 51c (i.e., the opposite faces of the disc-mounted face 53a and booklet accommodation face 54a) are covered with one sheet of a transparent sheet 55. With the transparent sheet 55, the three sides of the four sides thereof are fastened to the end portions of the face cover portion 51a, rear-face cover portion 51b, and case side face portion 51c, but the remaining one side is not fastened but opened. Note that here as an example, let us say that the upper side in FIG. 13 (and FIG. 10) is an opened end portion 55a. Subsequently, a card member for package display (not shown) on which a jacket photograph or the like is printed for example can be inserted from the opened end portion 55a to the inner portion of the transparent sheet 55.

The optical disc case 50 having the above-mentioned basic configuration is an optical disc case which has been most commonly circulated principally as a container case for DVDs, and is called a "tall case" or the like. Subsequently, with the present embodiment, a booster antenna unit 20d where a booster antenna 20 is formed is attached to such an existing optical disc case 50.

The basic configuration of the booster antenna unit 20d is the same as those in the above-mentioned embodiments, wherein the antenna coils 21 and 22 are formed on the flexible substrate 25. The booster antenna unit 20d is fastened to the inner face of the rear-face cover portion 51b in a state of the disc holding portion 53b being passed through the center hole 26 provided on the center region of the antenna coil 21. At this time, the antenna coil 22 is disposed so as to come into contact with the inner face of the case side face portion 51c in a state of the optical disc case 50 being closed. Note that the adhesion agent and adhesion procedures described with Embodiment 1-1 may be applied to fastening of the booster antenna unit 20d.

Here, with the booster antenna unit 20d, for example, the entire rear face of the flexible substrate 25 is fastened to the inner face of the optical disc case 50 without changing a flat sate. Subsequently, when the optical disc case 50 is closed, in conjunction with the bending portion 52a and 52b being bent, the bending portion 27a which is the boundary between the region where the antenna coil 22 is formed and the region where the connection wiring 24 is formed is also bent. As a result thereof, when holding the reader/writer 10 against the outer side of the case side face portion 51c, electromagnetic coupling between the antenna coil 11 of the reader/writer 10 and the antenna coil 22 is carried out.

Also, following the bending portions 52a and 52b being subjected to bending work by 90 degrees with the bending portion 27a as the boundary thereof beforehand, the booster antenna unit 20d may be fastened to the inner face of the rear-face cover portion 51b. In this case, with the rear face of the flexible substrate 25, only the region where the antenna coil 21 and connection wiring 24 are formed needs to be fastened to the rear-face cover portion 51b.

Note that when fastening the booster antenna unit 20d to the rear-face cover portion 51b, the flexible substrate 25 is subjected to bending work so as to match the irregularities of the rear-face cover portion 51b such that the rear face of the flexible substrate 25 comes into contact with the inner face of the rear-face cover portion 51b tightly. This bending work may be performed before attachment to the rear-face cover portion 51b, or may be performed by being pressed when attaching to the rear-face cover portion 51b. Also, with the region to which the flexible substrate 25 is fastened, the inner face of the rear-face cover portion 51b may be formed in a flat state beforehand such that the flexible substrate 25 (particularly the region where the connection wiring 24 is formed) can be fastened without changing its flat state.

With the above-mentioned Embodiment 3-1, the booster antenna can be attached with a simple process without changing the configuration and shape of an existing toll-case-type optical disc case (or only by subjecting the original shape to processing or shape change slightly). As a result thereof, the antenna coil 11 of the reader/writer 10 is brought close to the case side face portion 51c in a state of facing this face, whereby communication can be performed between the reader/writer 10 and the IC chip 5 of the optical disc 1.

Embodiment 3-2

Figure 14:
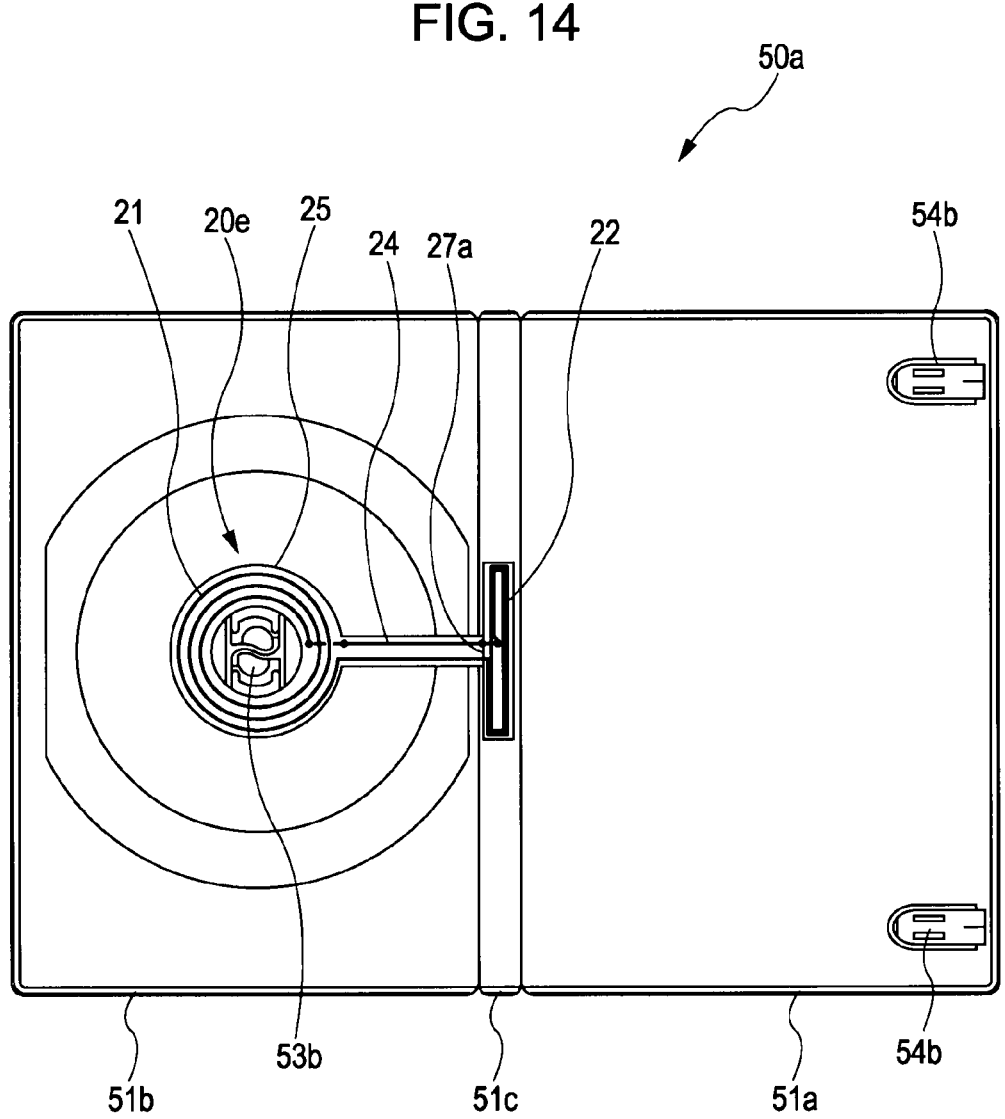
FIG. 14 is a diagram illustrating the configuration of an optical disc case according to Embodiment 3-2.

FIG. 14 is a diagram illustrating the configuration of an optical disc case according to Embodiment 3-2.

The optical case 50a shown in FIG. 14 is a modification of the optical disc case 50 according to Embodiment 3-1, wherein the booster antenna unit 20e is disposed not on the inner faces of the rear-face cover portion 51b and case side face portion 51c but on the outer faces thereof. Note that FIG. 14 is the rear view of the optical disc case 50a, and the components corresponding to those in FIG. 13 are denoted with the same reference numerals.

With the booster antenna unit 20e, the center position of the antenna coil 21 and the center position of the disc holding portion 53b are aligned, the antenna coil 22 is disposed so as to be disposed on the outer face of the case side face portion 51c, and the entire face thereof is fastened to the rear-face cover portion 51b and case side face portion 51c. Subsequently, when the optical disc case 50a is closed, in conjunction with the boundary portion between the rear-face cover portion 51b and case side face portion 51c being bent, the bending portion 27a which is the boundary between the region where the antenna coil 22 is formed and the region where the connection wiring 24 is formed is also bent. Thus, when holding the reader/writer 10 against the outer side of the case side face portion 51c, electromagnetic coupling between the antenna coil 10 of the reader/writer 10 and the antenna coil 22 is carried out.

Note that in the case of the outer faces of the face cover portion 51a, rear-face cover portion 51b, and case side face portion 51c being covered with a transparent sheet, the booster antenna unit 20e is disposed in the inner side of this transparent sheet.

Embodiment 3-3

Figure 15:
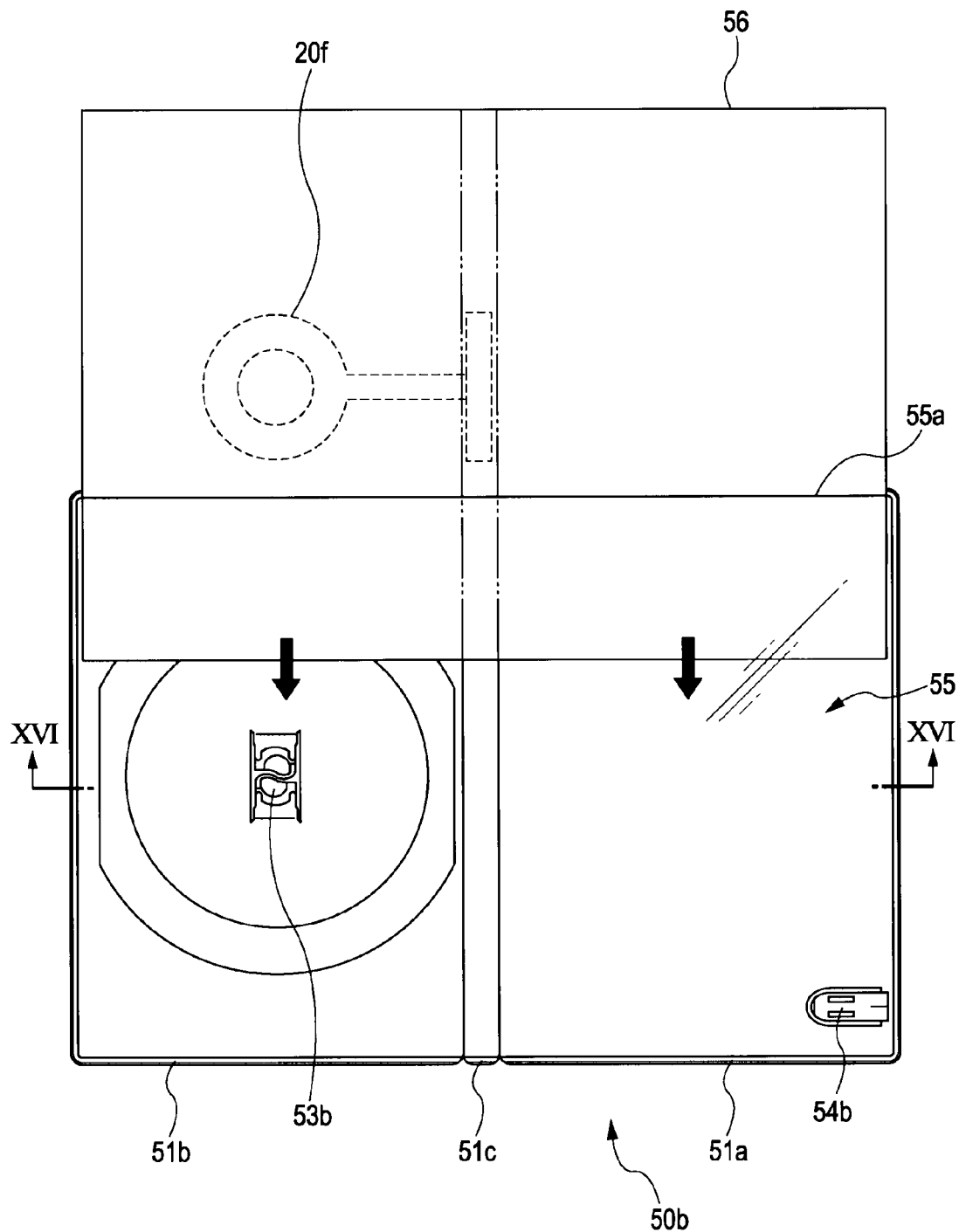
FIG. 15 is a diagram (rear view) illustrating the configuration of an optical disc case according to Embodiment 3-3.
Figure 16:
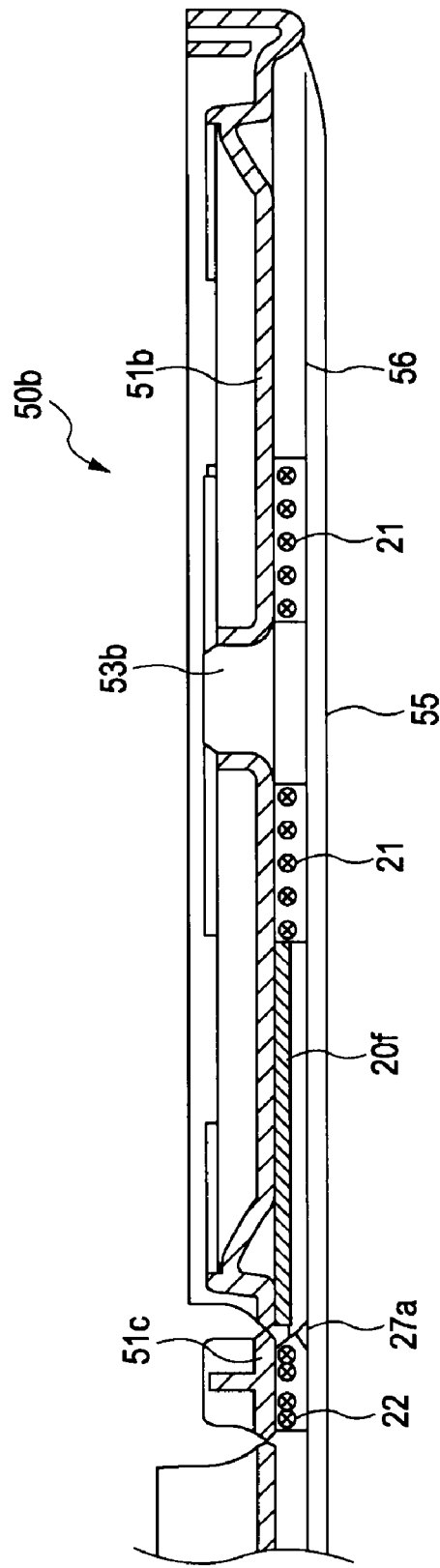
FIG. 16 is a diagram (cross-sectional view taken along XVI-XVI) illustrating the configuration of the optical disc case according to Embodiment 3-3.

FIGS. 15 and 16 are diagrams illustrating the configuration of an optical disc case according to Embodiment 3-3. FIG. 15 illustrates the rear view thereof, and FIG. 16 illustrates the cross-sectional view of FIG. 15 taken along XVI-XVI, and in these diagrams, the components corresponding to those in FIGS. 13 and 11 are denoted with the same reference numerals.

The basic configuration of the booster antenna unit 50b shown in FIG. 15 is the same as that in the above-mentioned Embodiment 3-1, wherein the face cover portion 51a and rear-face cover portion 51b are connected through the case side face portion 51c so as to be bent.

With the optical disc case 50b, the outer faces of the face cover portion 51a, rear-face cover portion 51b, and case side face portion 51c are covered with a transparent sheet 55, and a card member 56 for package display is inserted between the transparent sheet 55 and case body. With this example, the upper side in FIG. 15 is taken as the opened end portion 55a of the transparent sheet 55, and the card member 56 can be inserted from the opened end portion 55a. Subsequently, a booster antenna unit 20f is mounted as to the card member 56. The booster antenna unit 20f is basically fastened to the case body side of the card member 56, thereby preventing influence to the package display face of the card member 56.

Figure 17A:
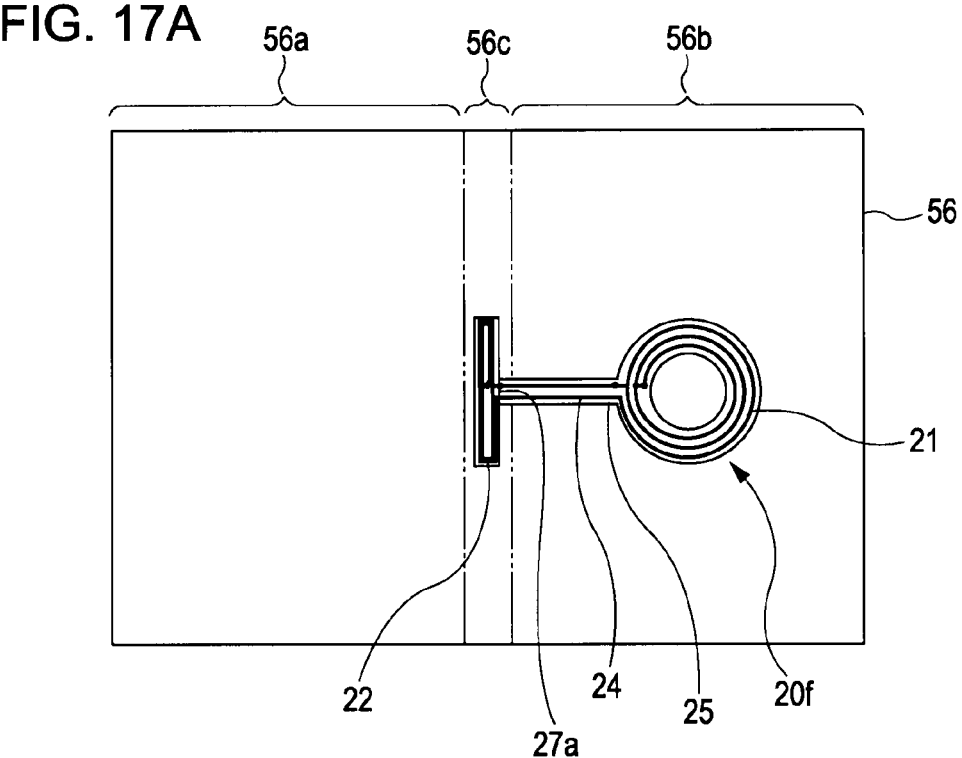
FIGS. 17A and 17B are diagrams illustrating the configuration of a card member on which a booster antenna unit is mounted.
Figure 17B:
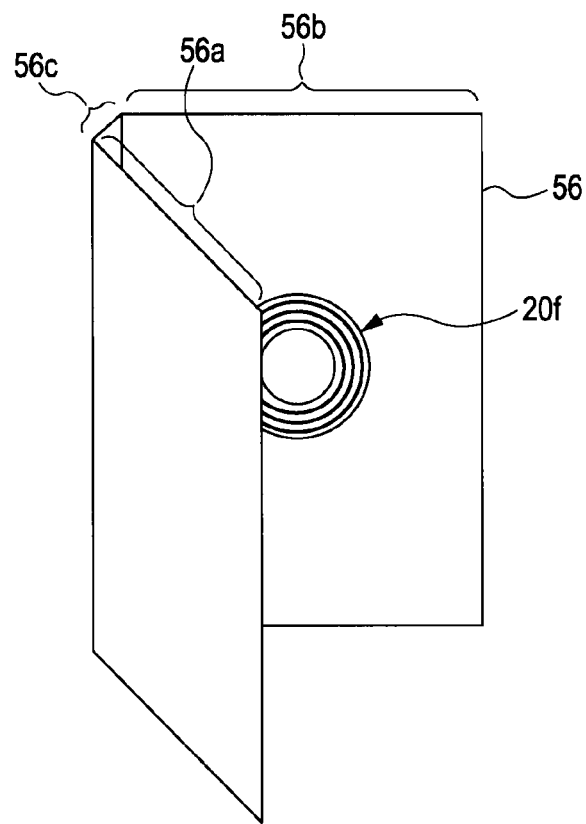

FIGS. 17A and 17B are diagrams illustrating the configuration of the card member on which the booster antenna unit is mounted. FIG. 17A illustrates a diagram illustrating the card member 56 as viewed from the rear side of the package display face. Such as shown in this drawing, the regions 56a through 56c of the card member 56 are the regions with which the face cover portion 51a, rear-face cover portion 51b, and case side face portion 51c come into contact at the time of insertion to the case respectively, and as shown in FIG. 17B, when the optical disc case 50b is closed, the boundary portion corresponding to each of the regions 56a through 56c is bent.

Subsequently, of those regions, the booster antenna unit 20f is fastened to the regions 56b and 56c. With the booster antenna unit 20f, the boundary between the region where the antenna coil 22 is formed and the region where the connection wiring 24 is formed is taken as a bending portion 27a, and the bending portion 27a can also be bent in conjunction with bending of the card member 56.

Upon such a card member 56 being inserted between the transparent sheet 55 and case body, the booster antenna unit 20f is disposed such that the center of the antenna coil 21 is matched with the center of the disc holding portion 53b, and when the optical disc 1 is accommodated in the optical disc case 50b, electromagnetic coupling between the antenna coil 6 at the optical disc 1 side and the antenna coil 21 of the booster antenna unit 20f is carried out. Also, the antenna coil 22 is disposed so as to be positioned on the outer face of the case side face portion 51c, and thus, when holding the reader/writer 10 against the outer side of the case side face portion 51c, electromagnetic coupling between the antenna coil 11 of the reader/writer 10 and the antenna coil 22 is carried out, whereby communication can be performed between the reader/writer 10 and IC chip 5.

In the case of manufacturing the optical disc case 50b according to the present embodiment, basically, following the case body configured of the face cover portion 51a, rear-face cover portion 51b, and case side face portion 51c being formed integrally by injection molding, the transparent sheet 55 is attached to the outer face of the case body thereof. With the transparent sheet 55, the end portions corresponding to the three sides thereof are connected (e.g., adhered) to the end portions of the case body, and from the opened end portion corresponding to the remaining one side the card member 56 in a state of being fastened to the booster antenna unit 20f beforehand is inserted.

Therefore, according to the present embodiment, communication can be performed from the case side face portion 51c to the IC chip 5 only by inserting the card member 56 on which the booster antenna unit 20f is mounted into an existing toll-case-type optical disc case without being subjected to any processing. Also, the card member 56 on which the booster antenna unit 20f is mounted can also be circulated separately from the optical disc case body.

Note that with the present embodiment, an arrangement has been made wherein the booster antenna unit 20f formed on the flexible substrate 25 such as a metal wire or the like making up a booster antenna is fastened to the card member 56, but a metal wire may be formed directly as to the card member 56 by printing or the like without employing the flexible substrate 25.

Also, as an example of an optical disc case having the same basic configuration as the above-mentioned tall case type, an optical disc case also exists wherein there is provided a detaching/mounting portion capable of detaching/mounting a memory card including flash memory, which is adjacent to the mounted face of the optical disc 1 on the inner face of the case. A booster antenna can be mounted to even such an optical disc case with the techniques shown in the above-mentioned Embodiments 3-1 through 3-3.

Incidentally, in the case of accommodating a great number of optical disc cases according to the above-mentioned embodiments in parallel in a storage rack or the like, the booster antennas included in the adjacent optical disc cases are disposed very close to each other. At this time, the antenna coils for performing communication with an IC chip within the respective booster antennas are disposed close to each other in a state in which the respective antenna coil faces are parallel, so when communicating with an IC chip through one of the antennas, communication interference occurs between the antennas in some cases. Accordingly, for example, from a state in which communication is performed in a good condition with a single optical disc case, upon the same optical disc cases being disposed adjacent to both sides thereof, a phenomenon wherein communication is unstable, or a phenomenon wherein communication cannot be performed occurs. Also, of the optical discs arrayed in parallel, when a reader/writer is brought close to the side face of a certain optical disc, a phenomenon also occurs wherein the storage information within the adjacent optical disc case of a target optical disc case is read out.

It can be conceived that those phenomena are caused due to lack of power supply as to each IC chip when attempting to communicate with multiple IC chips within multiple optical disc cases, occurrence of a collision state, or the like, and accordingly, normal communication cannot be performed with a desired IC chip. Also, in the case of the IC chip corresponding to another adjacent antenna coil having higher communication capability, communication with the IC chip thereof is performed unintentionally, and consequently, communication cannot be performed with a desired IC chip, which is also conceived as being a factor in causing the above-mentioned phenomena.

Therefore, with the following Embodiments 4-1 through 4-8, as to an optical disc case having the above-mentioned configuration, a sheet-shaped high-magnetic-permeability member is provided further outside than the antenna coil at the IC chip side within the booster antenna, whereby communication interference between the adjacent optical disc cases can be prevented, and communication capability can be improved.

Embodiment 4-1

Figure 18:
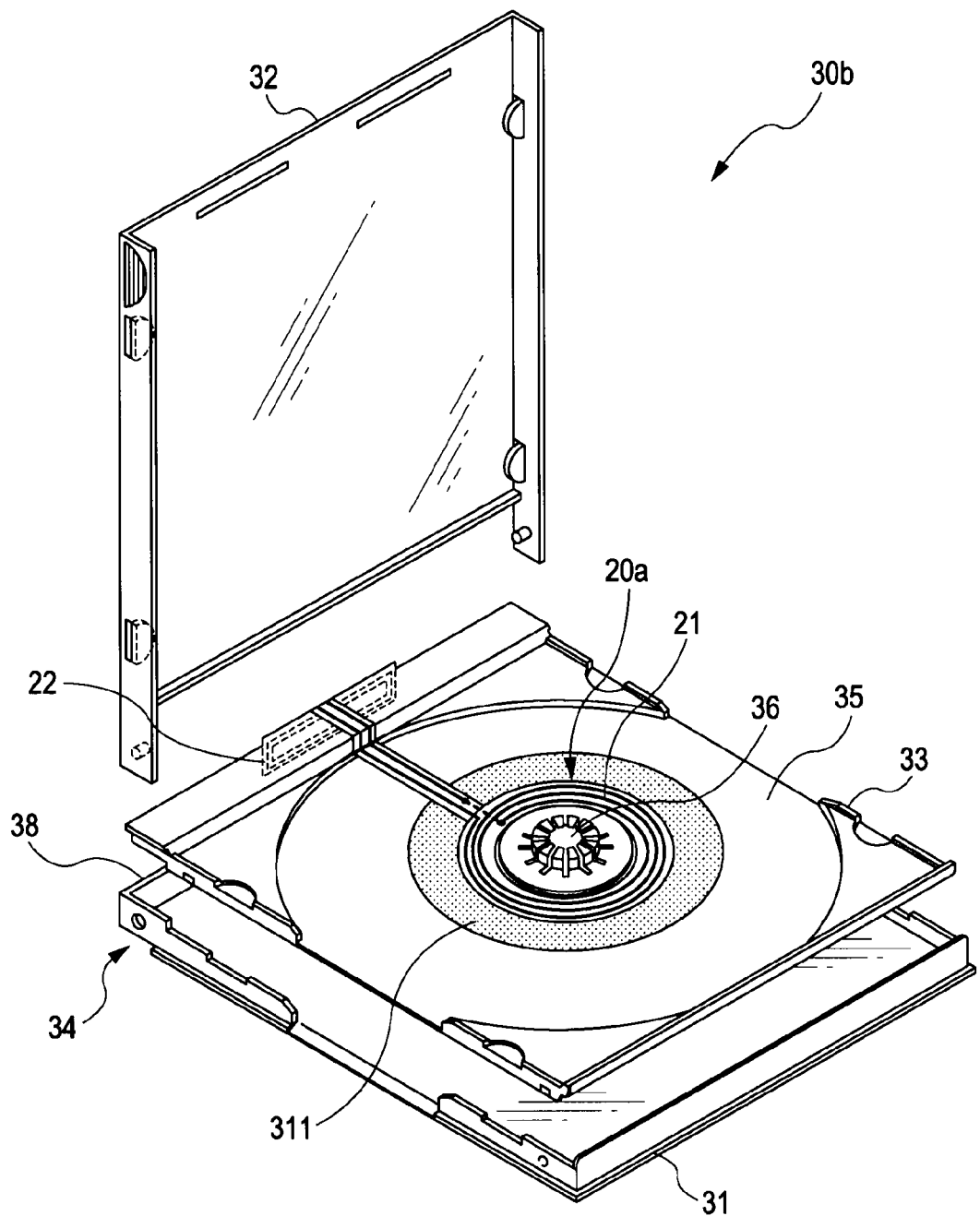
FIG. 18 is an exploded perspective view of an optical disc case according to Embodiment 4-1.
Figure 19:
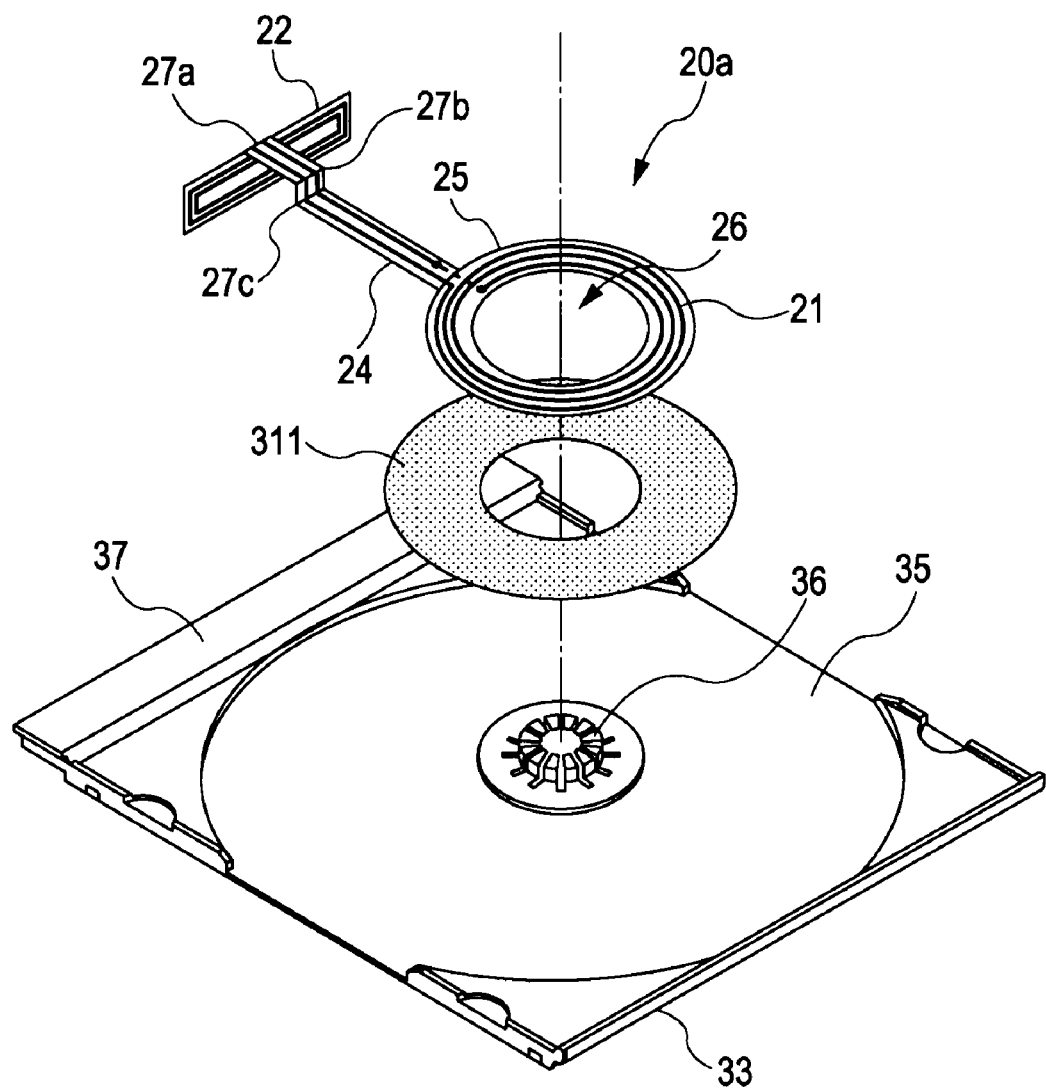
FIG. 19 is an exploded perspective view illustrating the attachment configuration of a booster antenna unit and a high-magnetic-permeability member as to a disc tray, according to Embodiment 4-1.

FIG. 18 is an exploded perspective view of an optical disc case according to Embodiment 4-1. Also, FIG. 19 is an exploded perspective view illustrating a configuration wherein a booster antenna unit and a high-magnetic-permeability member are attached to a disc tray. Note that in FIGS. 18 and 19, the components corresponding to those in FIGS. 5 and 6 are denoted with the same reference numerals.

The optical disc case 30b shown in FIG. 18 is an optical disc case obtained by additionally providing a high-magnetic-permeability member 311 between the antenna coil 21 at the IC chip 5 side of the booster antenna unit 20a and the disc tray 33 of the optical disc case 30 according to Embodiment 1-1. The high-magnetic-permeability member 311 is formed as an annular sheet member which is wider than the region where the antenna coil 21 is formed, and is disposed on the periphery of the disc holding portion 36 in a state in which the center of the high-magnetic-permeability member 311 and the center of the antenna coil 21 are matched.

Even in the case of the optical disc cases 30b having the same configuration being arrayed in the same direction of a storage rack for example, the antenna coils 21 of the booster antenna units 20a within the adjacent optical disc cases 30b via the base portion 31 can be separated electrically and electromagnetically by the high-magnetic-permeability member 311. Accordingly, the reader/writer 10 is brought close to the side face 38 of a desired optical disc case 30b from the outside thereof, whereby communication can be performed with the IC chip within the case thereof in a sure manner.

As shown in FIG. 19, for example, following the booster antenna unit 20a and high-magnetic-permeability member 311 being attached to the disc tray 33 beforehand, the disc tray 33 is fitted into and attached to the base portion 31. When attaching to the disc tray 33, for example, following the high-magnetic-permeability member 311 being fastened to the lower face side of the antenna coil 21 by an adhesive agent or the like, the lower face of the high-magnetic-permeability member 311 is fastened to the disc tray 33 by an adhesive agent or the like. Alternatively, following the high-magnetic-permeability member 311 being fastened to the disc tray 33, the booster antenna 20a may be fastened from thereupon. Thus, the disc tray 33 in a state in which the booster antenna unit 20a and high-magnetic-permeability member 311 are mounted beforehand may be circulated separately from the base portion 31 and cover portion 32.

Note that the booster antenna unit 20a and high-magnetic-permeability member 311 may be attached later to an existing optical disc case configured of the base portion 31, cover portion 32, and disc tray 33. Also, an arrangement may be made wherein the booster antenna unit 20a is fastened to the disc holding face of the disc tray 33, and the high-magnetic-permeability member 311 is fastened to the rear face of the disc tray 33. Alternatively, only the high-magnetic-permeability member 311 may be fastened to the inner face or outer face of the base portion 31.

Also, the above-mentioned high-magnetic-permeability member 311 may be manufactured by a method for taking a soft magnetic material as magnetic powder, and sintering the magnetic powder thereof, or a method for mixing the magnetic powder thereof in a binder to shape this, or the like. As for a soft magnetic material, for example, sendust (Fe—Al—Si), permalloy (Ni—Fe), amorphous alloy (Fe—Si—B, Co—Fe—Si—B, etc.), ferrite (Ni—Zn ferrite, Mn—Zn ferrite, etc.), and so forth can be employed.

As for a method for sintering magnetic powder (method for forming a sintered object), for example, a method can be employed wherein following metal paste formed by distributing the impalpable powder of a ferrite material in an organic solvent being applied in a sheet shape, thermolysis of an organic solvent is performed, thereby obtaining an sintering ferrite plate subjected to actual baking. Also, as for a method for mixing magnetic powder in a binder to shape this, for example, a method can be employed wherein magnetic powder is mixed in a binder using a synthetic resin material such as nylon 12, PPS (polyphenylene sulfide), polyethylene, or the like as a binder, and then this is molded in a sheet shape or plate shape by injection molding or the like.

Also, a sheet member employing a similar magnetic material has been widely circulated as a RFID magnetic sheet, an electromagnetic noise suppression sheet, or the like, for example, and the above-mentioned high-magnetic-permeability member 311 can also be formed by employing such an existing sheet member.

Embodiment 4-2

Figure 20:
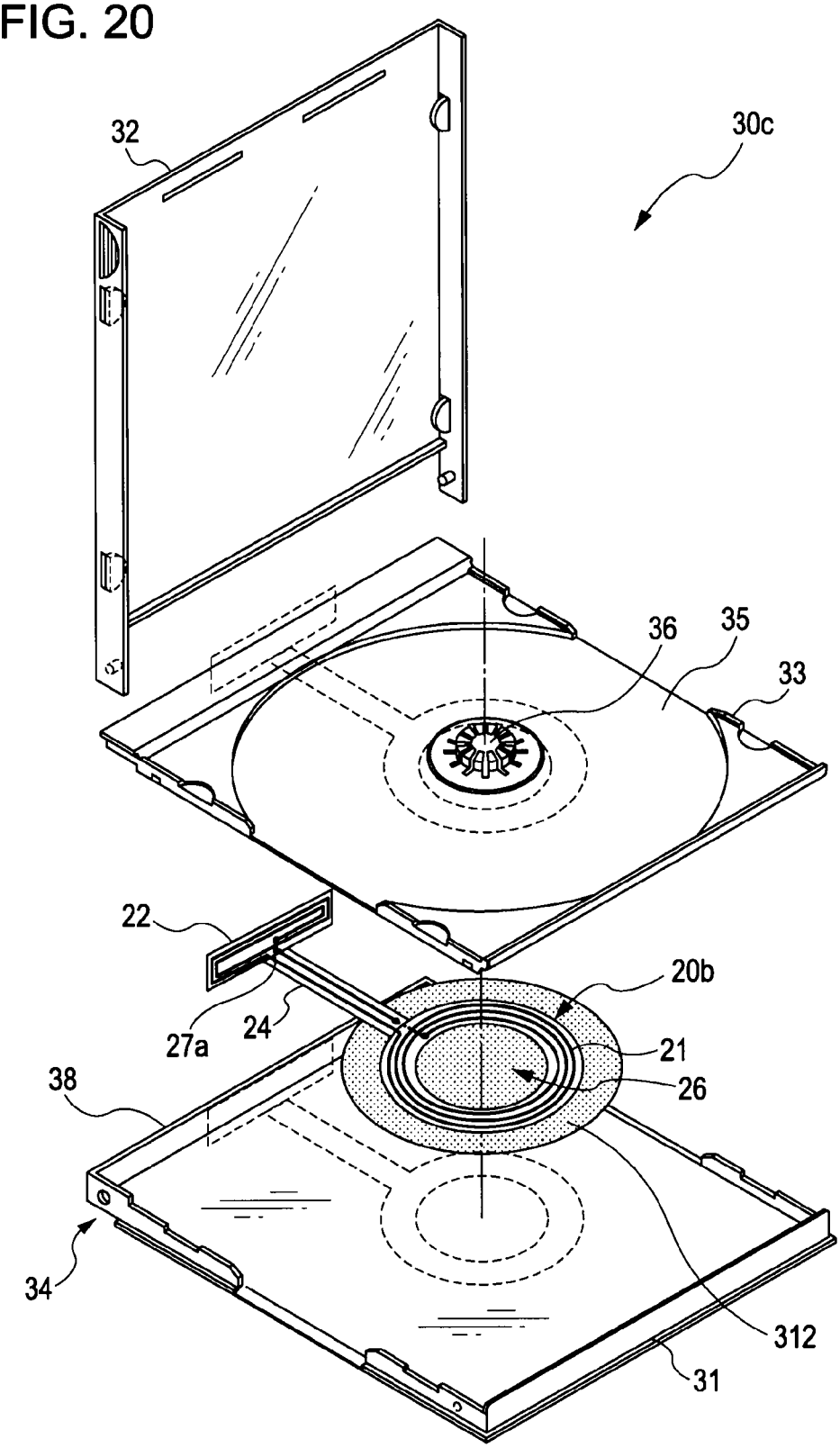
FIG. 20 is an exploded perspective view of an optical disc case according to Embodiment 4-2.

FIG. 20 is an exploded perspective view of an optical disc case according to Embodiment 4-2. Note that in FIG. 20, the components corresponding to those in FIG. 8 are denoted with the same reference numerals.

The optical disc case shown in FIG. 20 is an optical disc case obtained by additionally providing a high-magnetic-permeability member 312 between the booster antenna unit 20b and the base portion 31 of the optical disc case 30a according to Embodiment 1-2. The high-magnetic-permeability member 312 is formed as a circular sheet member which is wider than the region where the antenna coil 21 is formed, and is disposed in a state in which the center of the high-magnetic-permeability member 312 and the center of the antenna coil 21 are matched.

Note here that the high-magnetic-permeability member 312 is formed in a circular shape, but if this member is in a state of covering at least the region where the antenna coil 21 is formed, this member may be formed in another shape such as an annular shape or the like.

Even in the case of the optical disc cases 30c having the same configuration being arrayed in the same direction of a storage rack for example, the antenna coils 21 of the booster antenna units 20b within the adjacent optical disc cases 30c via the base portion 31 can be separated electrically and electromagnetically by the high-magnetic-permeability member 312. Accordingly, the reader/writer 10 is brought close to the side face 38 of a desired optical disc case 30c from the outside thereof, whereby communication can be performed with the IC chip within the case thereof in a sure manner.

In the event of manufacturing the optical disc case 30c, for example, following the high-magnetic-permeability member 312 being fastened to the lower face of the antenna coil 21 of the booster antenna unit 20b (the face at the base portion 31 side), those are fastened to the rear face of the disc tray 33. Subsequently, the disc tray 33 on which the booster antenna unit 20b and high-magnetic-permeability member 312 are mounted is fitted into and attached to the inner face of the base portion 31. In this case, the disc tray 33 on which the booster antenna unit 20b and high-magnetic-permeability member 312 are mounted beforehand can also be circulated separately from the base portion 31 and cover portion 32.

Also, following the booster antenna unit 20b being fastened to the rear face of the disc tray 33, the high-magnetic-permeability member 312 may be fastened to the disc tray 33 side sandwiching the antenna coil 21. Also, a component into which the booster antenna unit 20b and high-magnetic-permeability member 312 are integrated may be fastened not to the disc tray 33 but to the inner face of the base portion 31. Alternatively, the high-magnetic-permeability member 312 may be fastened to the base portion 31, and the booster antenna unit 20b may be fastened to the disc tray 33. In this case, the high-magnetic-permeability member 312 may be fastened to the outer face of the base portion 31.

Embodiment 4-3

Figure 21:
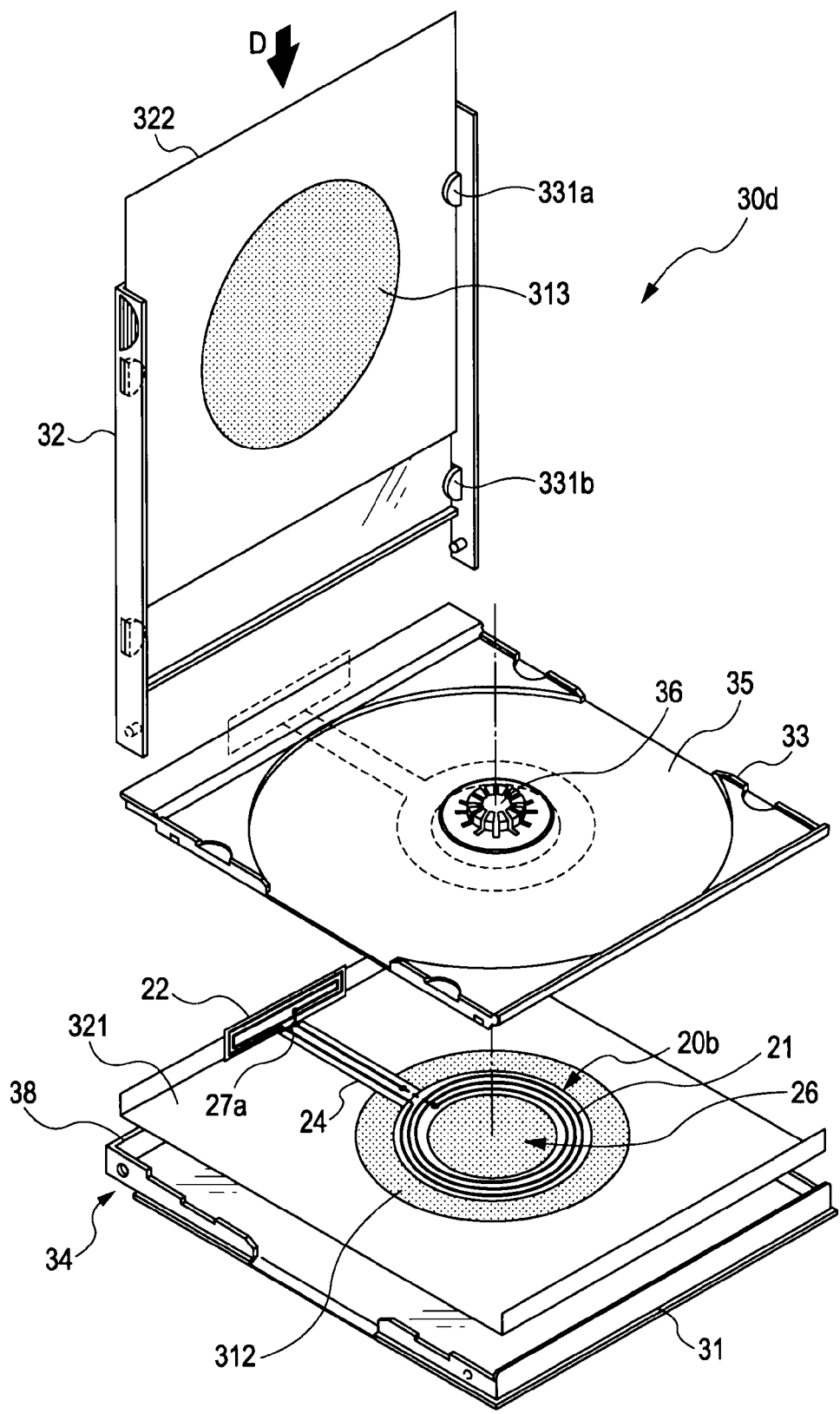
FIG. 21 is an exploded perspective view of an optical disc case according to Embodiment 4-3.

FIG. 21 is an exploded perspective view of an optical disc case according to Embodiment 4-3. Note that in FIG. 21, the components corresponding to those in FIGS. 8 and 20 are denoted with the same reference numerals.

With the optical disc case 30d shown in FIG. 21, the high-magnetic-permeability member 312 shown in Embodiment 4-2 is disposed in a state of being fastened to a card member 321 made from paper or the like. Also, in this example, the booster antenna unit 20b is also fastened to the card member 321 through the high-magnetic-permeability member 312. Subsequently, such a card member 321 is disposed on the inner face of the base portion 31, and the disc tray 33 is fitted into and attached to the inner face of the base portion 31 in a state of sandwiching the card member 321. In the case of employing such an arrangement, the card member 321 on which the booster antenna unit 20b and high-magnetic-permeability member 312 are mounted beforehand can also be circulated separately from the case body configured of the base portion 31, cover portion 32, and disc tray 33.

Note that an arrangement may be made wherein only the high-magnetic-permeability member 312 is fastened to the card member 321, and the booster antenna unit 20b is fastened to the disc tray 33. In this case, an arrangement may be made wherein the booster antenna unit 20b having the shape shown in FIG. 5 is disposed at the surface side of the disc tray 33.

Also, with the present Embodiment 4-3, in addition to the base portion 31 side of the booster antenna unit 20b, a high-magnetic-permeability member 313 is also disposed at the cover portion 32 side. The high-magnetic-permeability member 313 is formed as a circular sheet member which is wider than the region where the antenna coil 21 is formed, and when the base portion 31 and cover portion 32 are closed, the high-magnetic-permeability member 313 is disposed at the position where the center of the high-magnetic-permeability member 312 and the center of the antenna coil 21 are matched.

Even in the case of the optical disc cases 30d having the same configuration being arrayed in different directions of a storage rack for example, or even in the case of optical disc cases in which a booster antenna including no high-magnetic-permeability member is mounted being arrayed in parallel, not only between optical disc cases adjacent to each other through the base portion 31 but also between optical disc cases adjacent to each other through the cover portion 32 the antenna coils 21 of the booster antenna units 20b can be separated electrically and electromagnetically by the high-magnetic-permeability member 313 being disposed. Accordingly, in a state of the optical disc cases being arrayed in parallel, communication can be performed with the IC chip within a desired optical disc case in a sure manner.

Incidentally, the high-magnetic-permeability member 313 may be fastened to the inner face or outer face of the cover portion 32 for example, here as an example, the high-magnetic-permeability member 313 is disposed on the inner face of the cover portion 32 in a state of being fastened to a card member 322 made from paper or the like. The inner face of the cover portion 32 is a booklet accommodation face for accommodating a booklet or the like for describing a content recorded in the optical disc 1 for example, and holding members 331a and 331b for holding a booklet are formed integral with the cover portion 32 on this face. The card member 322 to which the high-magnetic-permeability member 313 is fastened beforehand is inserted between the cover portion 32 and holding members 331a and 331b in the direction of arrow D in the drawing, and is retained at a predetermined position. Employing such an arrangement also enables the card member 322 on which the high-magnetic-permeability member 313 is mounted beforehand to be circulated separately from the case body configured of the base portion 31, cover portion 32, and disc tray 33.

Note that the high-magnetic-permeability members 312 and 313 may be fastened to either face of the card members 321 and 322, respectively. Note however, fastening the high-magnetic-permeability members 312 and 313 to the case inner face sides of the card members 321 and 322 enables the faces at the case outer face sides of the card members 321 and 322 to display, for example, text for describing a content recorded in the optical disc 1, a jacket photo, or the like, respectively.

Embodiment 4-4

Figure 22:
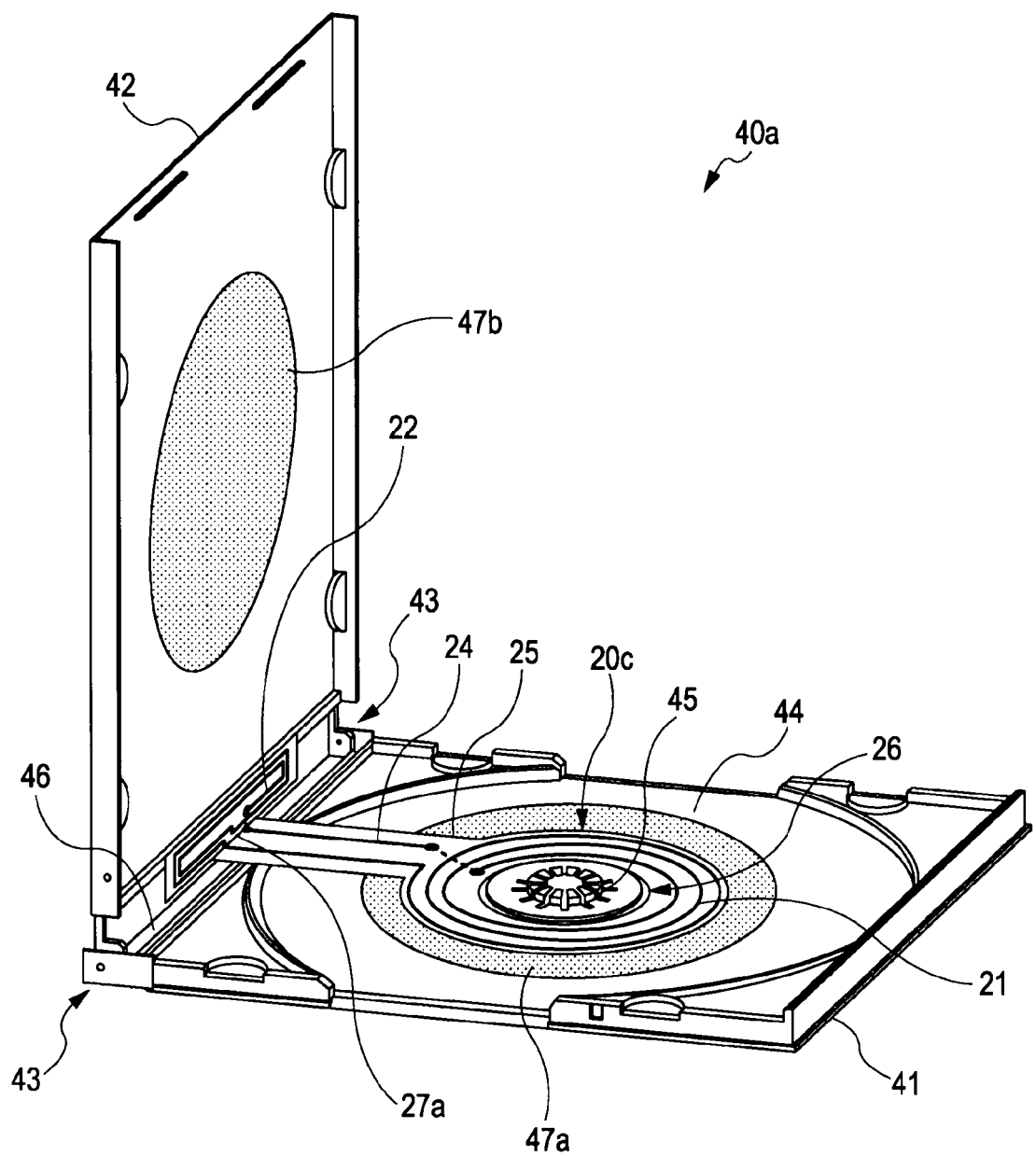
FIG. 22 is a perspective view illustrating the configuration of an optical disc case according to Embodiment 4-4.

FIG. 22 is a perspective view illustrating the configuration of an optical disc case according to Embodiment 4-4. Note that in FIG. 22, the components corresponding to those in FIG. 9 are denoted with the same reference numerals.

The optical disc case 40a shown in FIG. 22 is an optical disc case obtained by additionally providing high-magnetic-permeability members 47a and 47b to the base portion 41 and cover portion 42 of the optical disc case 40 according to Embodiment 2 respectively. The high-magnetic-permeability member 47a is formed as an annular sheet member which is wider than the region where the antenna coil 21 is formed, and is disposed on the periphery of the disc holding portion 45 between the antenna coil 21 and base portion 41 in a state in which the center of the high-magnetic-permeability member 47a and the center of the antenna coil 21 are matched.

On the other hand, the high-magnetic-permeability member 47b is formed as a circular sheet member which is wider than the region where the antenna coil 21 is formed, and when the base portion 31 and cover portion 32 are closed, the high-magnetic-permeability member 47b is disposed at the position where the center of the high-magnetic-permeability member 47b and the center of the antenna coil 21 are matched. Note here that the high-magnetic-permeability member 47b is formed in a circular shape, but if this member is in a state of covering at least the region where the antenna coil 21 is formed, this member may be formed in another shape such as an annular shape or the like.

Even in the case of optical disc cases including a booster antenna unit having the same configuration being arrayed in parallel in a storage rack for example, the antenna coil 21 within the optical disc case 40a can be separated electrically and electromagnetically from the antenna coils within the adjacent optical disc cases by the above-mentioned configuration. Accordingly, in a state of the optical disc cases being arrayed in parallel, communication can be performed with the IC chip within a desired optical disc case in a sure manner.

In the event of manufacturing the optical disc case 40a, for example, following the high-magnetic-permeability member 47a being fastened to the lower face of the booster antenna unit 20c (the face at the base portion 41 side), those are fastened to the inner face of the base portion 41. In this case, a component into which the booster antenna unit 20c and high-magnetic-permeability member 47a are integrated can also be circulated separately from the case body. Also, following the high-magnetic-permeability member 47a being fastened to the inner face of the base portion 41, the booster antenna unit 20c may be fastened from thereupon. Also, the high-magnetic-permeability member 47a may be fastened to the outer face of the base portion 41.

On the other hand, the high-magnetic-permeability member 47b is fastened to the inner face or outer face of the cover portion 42. Also, the high-magnetic-permeability member 47b can be disposed on the inner face of the cover portion 42 in a state of being fastened to the card member 322 shown in FIG. 21, instead of being fastened to the cover portion 42. In this case, the card member 322 in a state of fastening the high-magnetic-permeability member 47b can also be circulated separately from the case body.

Embodiment 4-5

Figure 23:
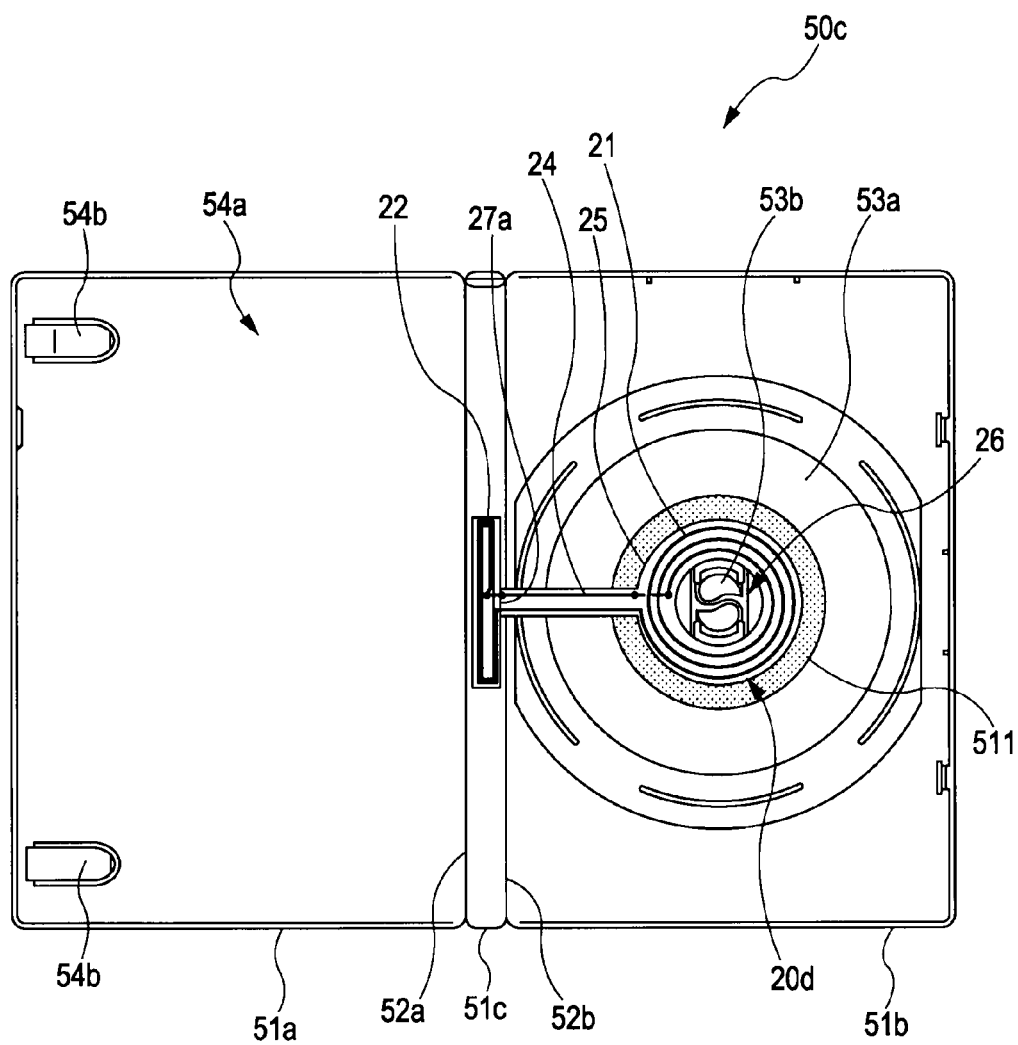
FIG. 23 is a front view illustrating the configuration of an optical disc case according to Embodiment 4-5.

FIG. 23 is a front view illustrating the configuration of an optical disc case according to Embodiment 4-5. Note that in FIG. 23, the components corresponding to those in FIG. 10 are denoted with the same reference numerals.

The optical disc case 50c shown in FIG. 23 is an optical disc case obtained by additionally providing a high-magnetic-permeability member 511 between the antenna coil 21 of the booster antenna unit 20d and the rear-face cover portion 51b of the optical disc case 50 according to Embodiment 3-1. The high-magnetic-permeability member 511 is formed as an annular sheet member which is wider than the region where the antenna coil 21 is formed, and is disposed on the periphery of the disc holding portion 53b between the antenna coil 21 and rear-face cover portion 51b in a state in which the center of the high-magnetic-permeability member 511 and the center of the antenna coil 21 are matched.

Even in the case of the optical disc cases 50c having the same configuration being arrayed in the same direction of a storage rack for example, the antenna coils 21 of the booster antenna units 20d within the adjacent optical disc cases 50c via the rear-face cover portion 51b can be separated electrically and electromagnetically by the high-magnetic-permeability member 511. Accordingly, the reader/writer 10 is brought close to the outer side of the case side face portion 51c of a desired optical disc case 50c from the outside thereof, whereby communication can be performed with the IC chip within the case thereof in a sure manner.

In the event of manufacturing the optical disc case 50c, for example, following the high-magnetic-permeability member 511 being fastened to the lower face of the booster antenna unit 20d (the face at the rear-face cover portion 51b side) beforehand, those are fastened to the inner face of the rear-face cover portion 51b. In this case, a component into which the booster antenna unit 20d and high-magnetic-permeability member 511 are integrated can also be circulated separately from the case body. Also, following the high-magnetic-permeability member 511 being fastened to the inner face of the rear-face cover portion 51b, the booster antenna unit 20d may be fastened from thereupon. Also, the high-magnetic-permeability member 511 may be fastened to the outer face of the rear-face cover portion 51b.

Embodiment 4-6

FIG. 24 is a rear view illustrating the configuration of an optical disc case according to Embodiment 4-6. Note that in FIG. 24, the components corresponding to those in FIG. 14 are denoted with the same reference numerals.

The optical disc case 50d shown in FIG. 24 is an optical disc case obtained by additionally providing a high-magnetic-permeability member 512 further at the outer face side of the booster antenna 20 of the booster antenna unit 20e of the optical disc case 50a according to Embodiment 3-2. The high-magnetic-permeability member 512 is formed as a circular sheet member which is wider than the region where the antenna coil 21 is formed, and is fastened to further the outer face side of the antenna coil 21 in a state in which the center of the high-magnetic-permeability member 512 and the center of the antenna coil 21 are matched.

Even in the case of the optical disc cases 50d having the same configuration being arrayed in the same direction of a storage rack for example, the antenna coils 21 of the booster antenna units 20e within the adjacent optical disc cases 50d via the rear-face cover portion 51b can be separated electrically and electromagnetically by the high-magnetic-permeability member 512. Accordingly, the reader/writer 10 is brought close to the case side face portion 51c of a desired optical disc case 50d from the outside thereof, whereby communication can be performed with the IC chip within the case thereof in a sure manner.

In the event of manufacturing the optical disc case 50d, for example, following the high-magnetic-permeability member 512 being fastened to the outer face side of the booster antenna unit 20e beforehand, those are fastened to the outer face of the rear-face cover portion 51b. In this case, a component into which the booster antenna unit 20e and high-magnetic-permeability member 512 are integrated can also be circulated separately from the case body. Also, following the booster antenna unit 20e being fastened to the outer face of the rear-face cover portion 51b, the high-magnetic-permeability member 512 may be fastened from thereupon.

Note that though not shown in the drawing, in either case of the above-mentioned Embodiment 4-5 or 4-6, an arrangement may be made wherein a sheet-shaped high-magnetic-permeability member is also disposed on the face cover portions 51a, and thus the antenna coils 21 within the optical disc cases 50c and 50d, and the antenna coils 21 of optical disc cases adjacent thereto via the face cover portions 51a are separated electrically and electromagnetically. In this case, this high-magnetic-permeability member is molded in a circular shape or the like which is wider than the region where the antenna coil 21 is formed, and is fastened to the inner face or outer face of the face cover portions 51a such that the center of the high-magnetic-permeability member the center of the antenna coil 21 are matched when the face cover portion 51a and rear-face cover portion 51b are closed.

Embodiment 4-7

Figure 26A:
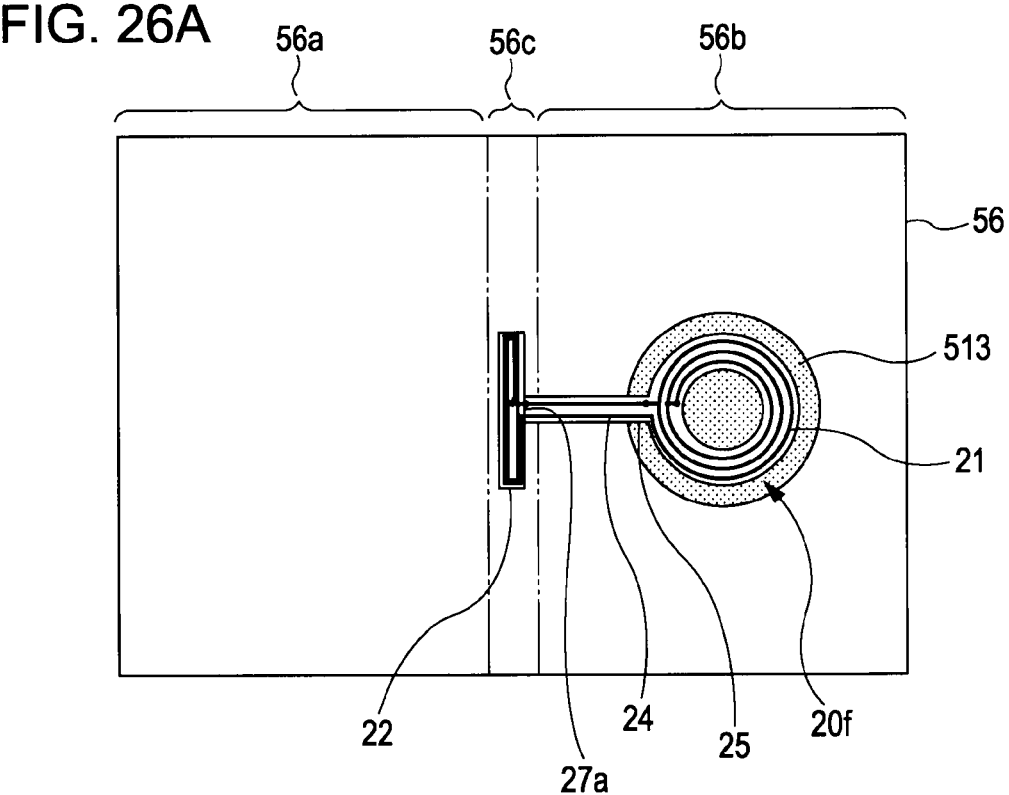
FIGS. 26A and 26B are diagrams illustrating the configuration of a card member on which a booster antenna unit is mounted, with Embodiment 4-7.
Figure 26B:
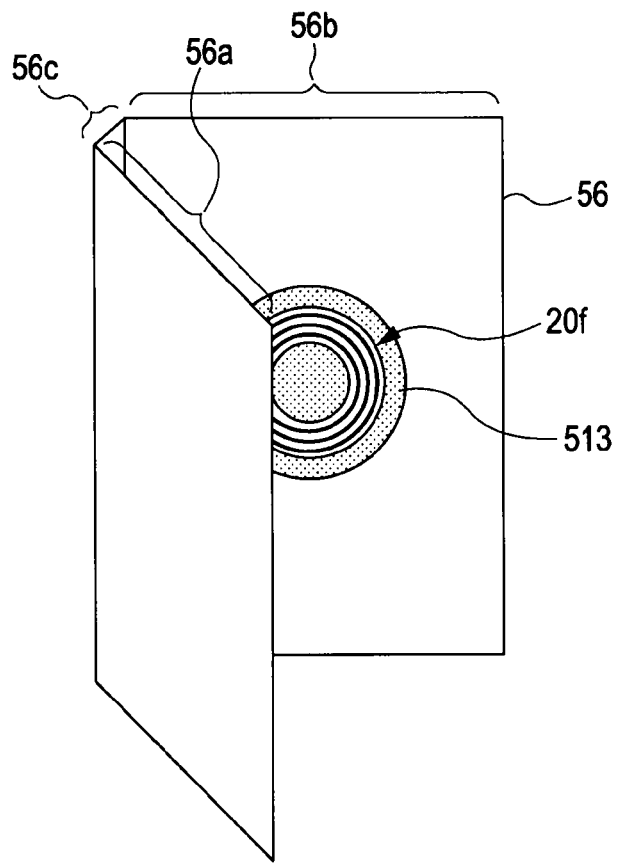

FIG. 25 is a rear view illustrating the configuration of an optical disc case according to Embodiment 4-7. Also, FIG. 26 is a diagram illustrating the configuration of a card member attached to a booster antenna unit with Embodiment 4-7. Note that in FIGS. 25 and 26, the components corresponding to those in FIGS. 15 and 17 are denoted with the same reference numerals.

The optical disc case 50e shown in FIG. 25 is an optical disc case obtained by additionally providing a high-magnetic-permeability member 513 between the booster antenna unit 20f and card member 56 of the optical disc case 50b according to Embodiment 3-3. The high-magnetic-permeability member 513 is formed as a circular sheet member which is wider than the region where the antenna coil 21 (see FIG. 26) is formed, and is disposed such that the center of the high-magnetic-permeability member 513 and the center of the antenna coil 21 are matched when the card member 56 is inserted between the face cover portion 51a and rear-face cover portion 51b, and the transparent sheet 55. Note here that the high-magnetic-permeability member 513 is formed in a circular shape, but if this member is in a state of covering at least the region where the antenna coil 21 is formed, this member may be formed in another shape such as an annular shape or the like.

Even in the case of the optical disc cases 50e having being arrayed and accommodated in a storage rack, the booster antennas (particularly antenna coils at the IC chip side) within the adjacent optical disc cases 50e can be separated electrically and electromagnetically by the high-magnetic-permeability member 513, whereby communication can be performed with a desired IC chip using the reader/writer 10 in a sure manner.

The high-magnetic-permeability member 513 is, for example, fastened to the booster antenna unit 20f with an adhesive agent or the like, and then fastened to the card member 56. Alternatively, following the high-magnetic-permeability member 513 being fastened to the card member 56, the booster antenna unit 20f may be fastened thereupon. Subsequently, the card member 56 to which the booster antenna unit 20f and high-magnetic-permeability member 513 are fastened (see FIG. 26) is inserted between the case body of the optical disc case 50e and the transparent sheet 55.

Accordingly, the card member 56 to which the booster antenna unit 20f and high-magnetic-permeability member 513 are attached beforehand is circulated as another product different from the case body, whereby a high-performance communication function with an IC chip can be readily added to an existing toll-case-type optical disc case.

Note that the high-magnetic-permeability member 513 may be fastened to not the case inner face side but the case outer face side of the card member 56. Also, an arrangement may be made wherein the booster antenna unit 20f is disposed at the case outer face side, and the high-magnetic-permeability member 513 is disposed further at the outer face side thereof.

Embodiment 4-8

Figure 27A:
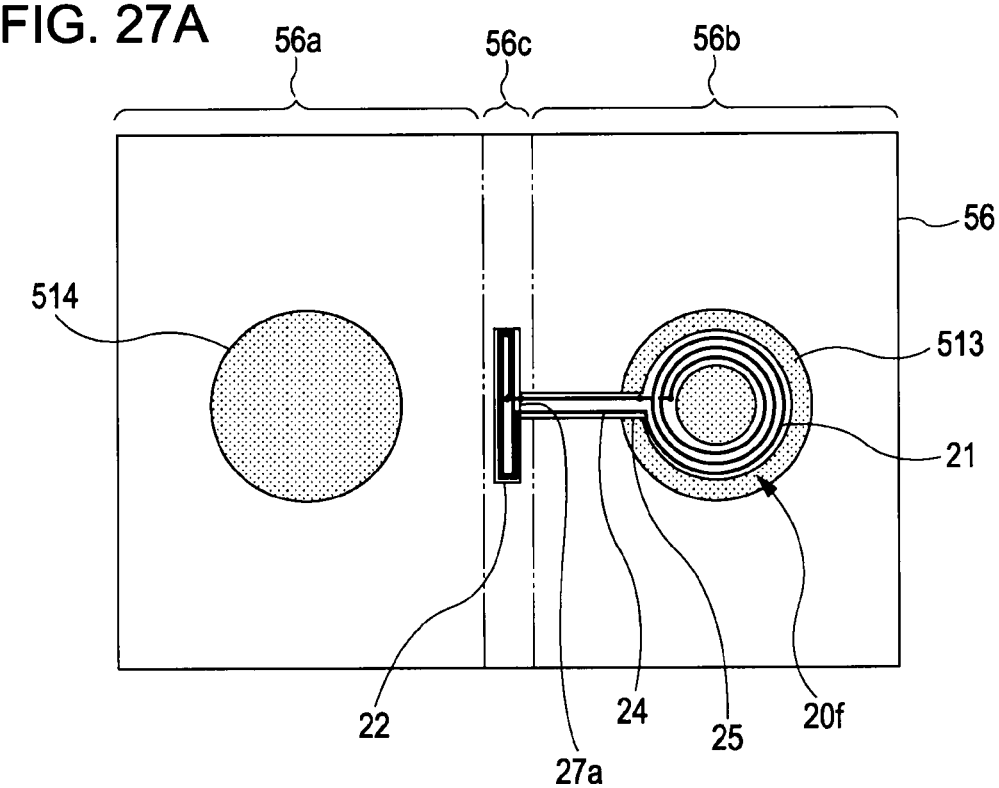
FIGS. 27A and 27B are diagrams illustrating the configuration of a card member to be attached to an optical disc case according to Embodiment 4-8.
Figure 27B:
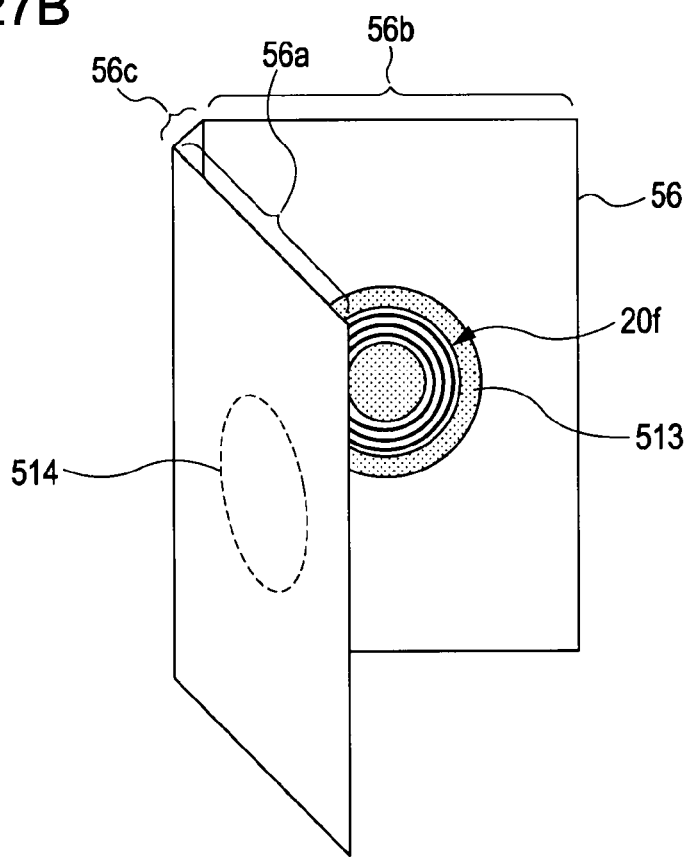

FIG. 27 is a diagram illustrating the configuration of a card member to be attached to an optical disc case according to Embodiment 4-8. With the card member 56 shown in FIG. 27, in addition to the configuration in Embodiment 4-7, a high-magnetic-permeability member 514 is also provided on a region 56a which comes into contact with the face cover portion 51a in the card member 56. The high-magnetic-permeability member 514 is formed as a circular sheet member which is wider than the region where the antenna coil 21 of the booster antenna unit 20f is formed, and is disposed such that the center of the high-magnetic-permeability member 514 and the center of the antenna coil 21 are matched when the card member 56 is inserted between the face cover portion 51a and rear-face cover portion 51b, and the transparent sheet 55.

Note here that the high-magnetic-permeability member 514 is formed in a circular shape, but if this member is in a state of covering at least the region where the antenna coil 21 is formed, this member may be formed in another shape such as an annular shape or the like. Also, the high-magnetic-permeability member 514 is fastened to the case inner side face of the card member 56 here, but may be fastened to the case outer side face.

Thus, the high-magnetic-permeability member 514 is disposed in addition to the high-magnetic-permeability member 513, whereby the antenna coil 21 within the optical disc case 50e can be separated electrically and electromagnetically from the antenna coils 21 within the adjacent optical disc cases, even in the case of optical disc cases including a booster antenna unit having the same configuration being arrayed in parallel and accommodated in a storage rack for example. Accordingly, even in a state in which optical disc cases are arrayed in parallel, communication can be performed with the IC chip within a desired optical disc case in a sure manner.

Note that with the above-mentioned Embodiments 4-1 through 4-8, it is desirable for each of the high-magnetic-permeability members 311 through 313, 47a, and 511 through 514 to have the same size as or wider than the region where the antenna coil 21 is formed. Note however, in the case in which there is restriction due to case shape, or restriction due to costs, the high-magnetic-permeability members 311 through 313, 47a, and 511 through 514 may be formed narrower than the region where the antenna coil 21 is formed. Note however, it is desirable for the high-magnetic-permeability members 311 through 313, 47a, and 511 through 514 and the region where the antenna coil 21 is formed to be disposed such that the centers thereof are matched, when the case is closed.

That is to say, in the event that communication is performed with an IC chip through a certain antenna coil by disposing the above-mentioned high-magnetic-permeability members, even if electromagnetic field cannot be shielded completely as to the opposite side of the IC chip of the antenna coil thereof, it is enough to obtain an advantage for weakening electromagnetic field to an extent as to the IC chips within the adjacent optical disc cases which are not communication objects. Accordingly, the size of the high-magnetic-permeability member needs to be a size whereby an advantage for weakening leakage of electromagnetic field to the adjacent optical disc cases, and communication with the IC chips within the optical disc cases thereof is substantially impossible.

Also, with the above-mentioned Embodiments 4-1 through 4-8, there is distance equivalent to the thickness of the case body between the base portion and cover portion, or between the face cover portion and rear-face cover portion. Therefore, in the case of optical disc cases having such an arrangement being arrayed in parallel in a storage rack or the like, distance of around 2 mm through 10 mm frequently occurs between the antenna coils at the IC chip side within the adjacent cases, and electric and electromagnetic influence to be applied to the mutual antenna coils at the IC chip side is reduced by the distance thereof.

Accordingly, in this case, there is no need to set the thickness of the high-magnetic-permeability member which is equivalent to the thickness for completely shielding electromagnetic field to the outside of the case from the antenna coil at the IC chip side, and rather the high-magnetic-permeability member is formed even thinner, thereby preventing a situation wherein communication is performed with the antenna coil within the adjacent optical disc case unintentionally, or communication is disabled due to occurrence of a collision. That is to say, with regard to the high-magnetic-permeability members 311 through 313, 47a, and 511 through 514, an even thinner high-magnetic-permeability member can be employed as long as it has the thickness whereby an advantage for weakening leakage of electromagnetic field can be obtained, and communication with the IC chips within the adjacent optical disc cases which are not communication objects is substantially impossible.

For example, in the event that the communication frequency of the IC chip is set to 13.56 MHz, it is desirable to set the thickness of the high-magnetic-permeability member to generally 100 μm or less from the perspective of intention to dispose the high-magnetic-permeability member without changing the thickness of an existing optical disc case. Note however, with the optical disc case having the above-mentioned configuration, even if the thickness of the high-magnetic-permeability member is set to 50 μm or less, sufficient shielding effects can be obtained between the antenna coils at the IC chip side within the adjacent cases. Also, thinning high-magnetic-permeability member enables material cost to be suppressed.

Figure 28:
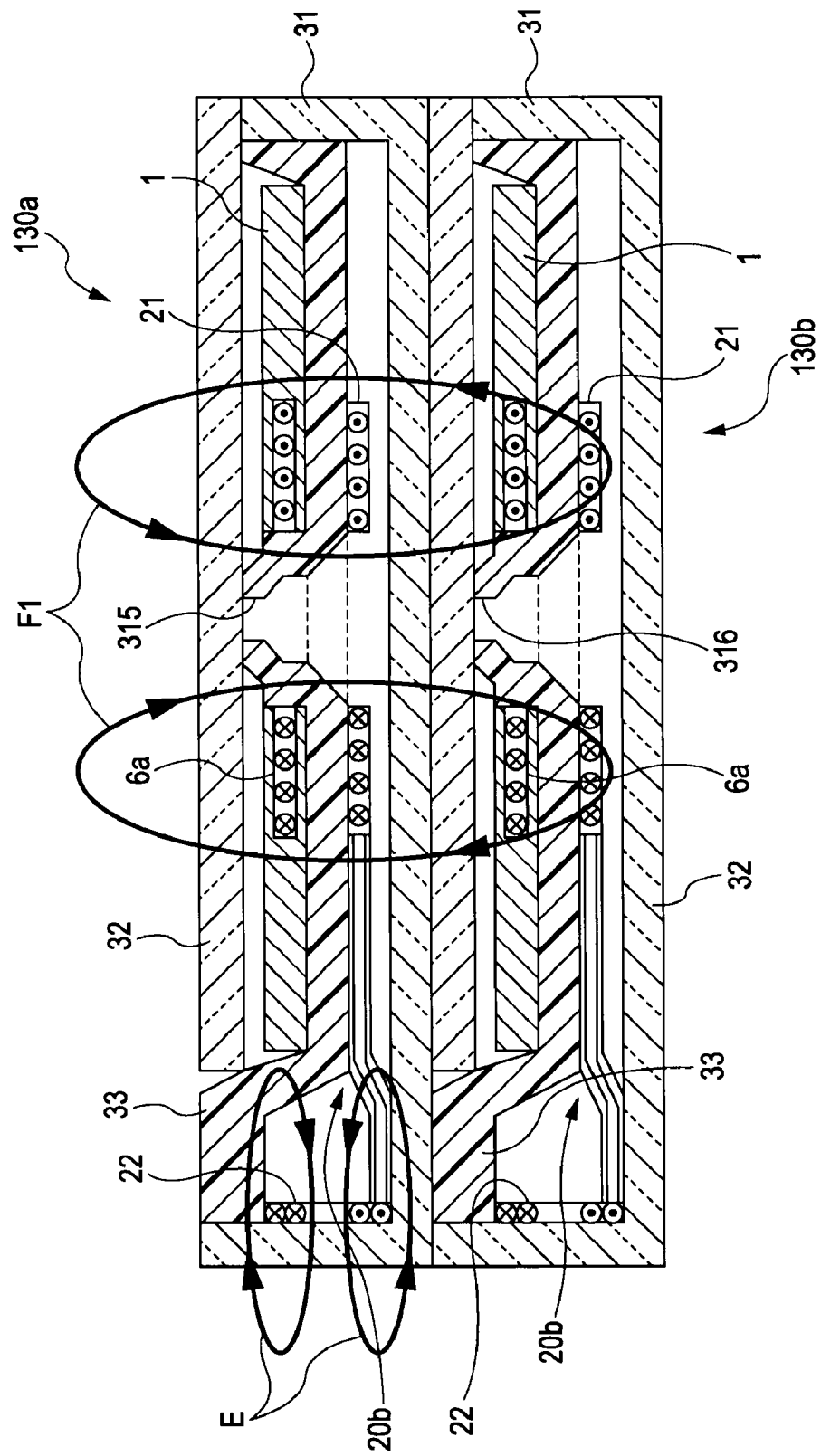
FIG. 28 is a diagram for describing the shielding effects of electromagnetic field according to an optical disc case in the event that a high-magnetic-permeability member is not disposed.

Supplementary description will be made below regarding shielding effects of electromagnetic field due to a high-magnetic-permeability member. First, FIG. 28 is a diagram for describing shielding effects of electromagnetic field in an optical disc case in the case of no high-magnetic-permeability member being disposed. Note that the components corresponding to those in FIG. 8 are denoted with the same reference numerals, and description thereof will be omitted.

The optical disc case 130a shown in FIG. 28 has generally the same configuration as the optical disc case 30a according to Embodiment 1-2 shown in FIG. 8, wherein the booster antenna unit 20b is disposed on the rear face of the disc-mounted face 35 of the disc tray 33. Note that FIG. 28 illustrates a cross-sectional view of the optical disc case 130a in a state of the optical disc 1 being mounted on the disc tray 33.

Also, in FIG. 28, at the lower side of the optical disc case 130a, an optical disc case 130b having the same configuration thereof is disposed in an overlapped manner in the same direction. That is to say, these are arrayed in parallel such that the base portion 31 of the optical disc case 130a and the cover portion 32 of the optical disc case 130b come into contact with each other at the principal faces thereof.

In a state of the optical disc case 130a and optical disc case 130b being thus arrayed in parallel, in the event that the reader/writer 10 is brought close to the optical disc case 130a, and the antenna coil 11 of the reader/writer 10 is directed to the antenna coil 22 within the optical disc case 130a in a face-to-face manner, electromagnetic field generated at the time of communication can be represented schematically such as shown in arrow E. Also, in response to the electromagnetic field generated between the antenna coil 11 of the reader/writer 10 and the antenna coil 22 within the optical disc case 130a, electromagnetic field is generated at another antenna coil 21 making up the booster antenna 20b along with the antenna coil 22, and this electromagnetic field can be represented schematically such as shown in arrow F1.

At the time of communication, as shown in FIG. 28, in the case of no high-magnetic-permeability member being disposed outside the antenna coil 21 of the optical disc case 130a, there is a possibility that electromagnetic field generated at the antenna coil 21 (corresponding to arrow F1) affects not only the antenna coil 6a and IC chip (not shown) of the optical disc 1 within the corresponding case but also the antenna coil 6a and IC chip (not shown) of the optical disc 1 within the adjacent optical disc case 130b. Subsequently, in the case of the IC chips on the both optical discs 1 being affected, as described above, there is caused a phenomenon wherein communication is unstable, a phenomenon wherein communication is disabled, a phenomenon wherein the recorded information within the case adjacent to a target case is read out, or the like.

Figure 29:
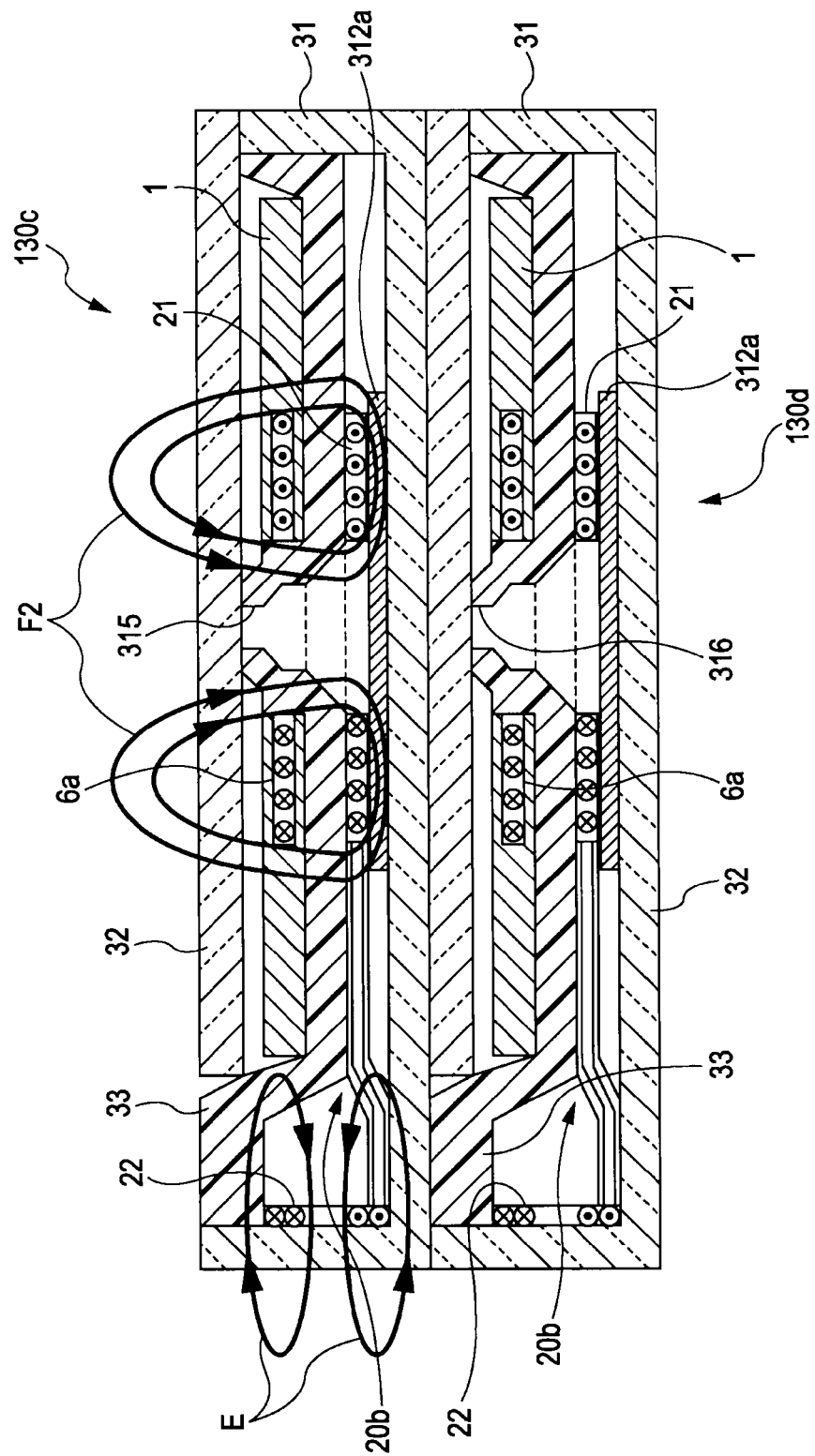
FIG. 29 is a diagram for describing the shielding effects of electromagnetic field in the event that a high-magnetic-permeability member having a high shielding effect is disposed.

FIG. 29 is a diagram for describing shielding effects of electromagnetic field in the case of a high-magnetic-permeability member which excels in shielding effects being disposed. Note that in FIG. 29, the components corresponding to those in FIG. 28 are denoted with the same reference numerals, and description thereof will be omitted.

The optical disc cases 130c and 130d shown in FIG. 29 have generally the same configuration as the optical disc case 30c according to Embodiment 4-2 shown in FIG. 20. That is to say, with each of the optical disc cases 130a and 130b shown in FIG. 28, a sheet-shaped high-magnetic-permeability member 312a is disposed between the antenna coil 21 at the IC chip side of the booster antenna unit 20b and the base portion 31.

In FIG. 29, let us say that there is disposed a high-magnetic-permeability member 312a which excels in shielding effects of electromagnetic field as to the adjacent another optical disc case. Subsequently, in a state in which the optical disc cases 130c and 130d including such a high-magnetic-permeability member 312a are arrayed in parallel, the reader/writer 10 is brought close to the optical disc case 130c, the antenna coil 11 of the reader/writer 10 is directed to the antenna coil 22 within the optical case 130c in a face-to-face manner, and communication is executed. At this time, in response to the electromagnetic field generated at the antenna coil 22 within the optical disc case 130c, electromagnetic field is generated at the other antenna coil 21 connected thereto, and this electromagnetic field can be represented schematically such as shown in arrow F2.

In this case, the electromagnetic field generated at the antenna coil 21 (corresponding to arrow F2) affects only the antenna coil 6a and IC chip (not shown) of the optical disc 1 within the optical disc case 130c by the shielding effects of the high-magnetic-permeability member 312a adjacent to the antenna coil 21, and does not affect the antenna coil 6a and IC chip (not shown) of the optical disc 1 within the adjacent optical disc case 130d. Accordingly, as described above, a situation wherein communication is performed with the antenna coil 6a within the adjacent optical disc case 130d unintentionally, or communication is disabled due to occurrence of a collision, can be prevented.

Figure 30:
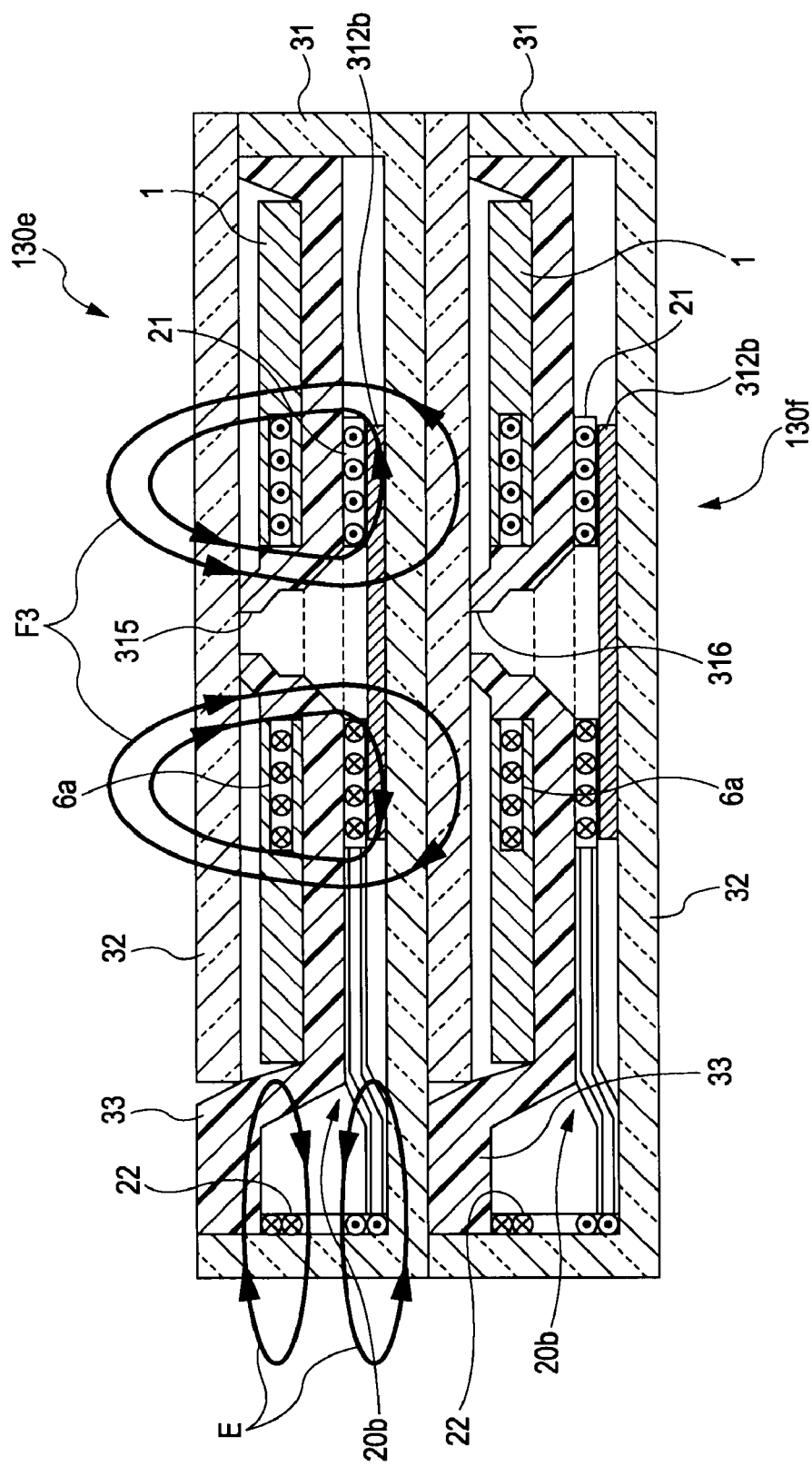
FIG. 30 is a diagram for describing the shielding effects of electromagnetic field in the event that a high-magnetic-permeability member having a low shielding effect is disposed.

On the other hand, FIG. 30 is a diagram for describing the shielding effects of electromagnetic field in the case of a high-magnetic-permeability member which is low in shielding effects being disposed. Note that in FIG. 30, the components corresponding to those in FIG. 29 are denoted with the same reference numerals, and description thereof will be omitted.

The optical disc cases 130e and 130f shown in FIG. 30 have the same basic configuration as those shown in FIG. 29, but differ from those in that the shielding effects of a high-magnetic-permeability member 312b is low compared with the high-magnetic-permeability member 312a shown in FIG. 29. For example, a case can be assumed wherein the high-magnetic-permeability member 312b is formed thin, or formed with a small area.

In such a state in which the optical disc cases 130e and 130f are overlapped, in the case of the reader/writer being brought close to the antenna coil 22 of the optical disc case 130e to attempt communication, in response to the electromagnetic field generated at the antenna coil 22, electromagnetic field is also generated at the other antenna coil 21 connected thereto, and this electromagnetic field can be represented schematically such as shown in arrow F3 in the drawing.

At this time, the electromagnetic field generated at the antenna coil 21 (corresponding to arrow F3) affects the antenna coil 6a and IC chip (not shown) of the optical disc 1 within the optical disc case 130a, and also leaks at the antenna coil 6a and IC chip (not shown) of the optical disc 1 within the adjacent optical disc case 130f by the shielding effects of the high-magnetic-permeability member 312b adjacent to the antenna coil 21.

Note however, if the intensity ratio of electromagnetic field is great between the positions of both optical discs 1, and electromagnetic field leaking at the optical disc case 130f reaches a level wherein the IC chip therein is not operated, as described above, a situation wherein communication is performed with the antenna coil 6a within the adjacent optical disc case 130f unintentionally, or communication is disabled due to occurrence of a collision, can be prevented.

Also, even if the IC chip within the optical disc case 130f operates due to leaked electromagnetic field, in the event that great difference is provided to the level of a response signal to the reader/writer 10 between the optical disc cases 130e and 130f, consequently, communication is disabled between the reader/writer 10 and the IC chip within the optical disc case 130f. Accordingly, in the same way as above, a situation wherein communication is performed with the antenna coil 6a within the adjacent optical disc case 130f unintentionally, or communication is disabled due to occurrence of a collision, can be prevented.

As described above, the thickness or size of a high-magnetic-permeability member, or both thereof is adjusted as appropriate, whereby shielding effects of electromagnetic field to be obtained can be adjusted, so the above-mentioned respective design values can be appropriately selected so as to substantially disable the IC chip within the adjacent optical disc case, which is not a communication object, from communication.

According to the above-mentioned embodiments, a booster antenna can be mounted within the optical disc case thereof with a simple process, without greatly changing the configuration of various types of optical disc cases which have come into widespread use, and thus, communication can be performed with the IC chip on an optical disc by a reader/writer bringing close to the side face of the optical disc case (the face perpendicular to the case principal face).

Therefore, there is no need to perform a significant change such as metal mold, manufacturing process, manufacturing facilities, or the like, which is necessary for manufacturing optical disc cases, whereby optical disc cases including additional functions such as described above can be manufactured without increasing manufacturing cost as compared with the conventional method.

Also, as shown in Embodiments 4-1 through 4-8, a high-magnetic-permeability sheet member is further provided as a member at the case outer face side, and thus, even in the case of optical disc cases being arrayed in parallel and accommodated in a storage rack or the like, communication can be performed with the IC chip within a desired optical disc case in a sure and stable manner, and such an advantage can be readily obtained without changing the configuration of an existing optical disc case greatly.

Also, from the perspective of the user, there is provided an advantage wherein regardless of the above-mentioned additional functions being included, there is no difference regarding carrying and open/close operations of an optical disc case, and detaching/mounting operations of an optical disc as compared with the conventional method. Further, there is no particular modification regarding the shape and size of an optical disc case, optical disc cases including the additional functions can be accommodated in a storage rack in which optical disc cases have been accommodated without problems, and accordingly, inconvenience such as replacing with a new storage rack is not caused.

Also, with regard to a storage rack provided in an optical disc (or contents recorded in an optical disc) dealer or the like, a case (shipping container or the like including packaging such a carton box, etc.) for transporting optical disc cases as well, the conventional one can be employed as it is. Accordingly, the advantage due to the above-mentioned additional functions can also be received at a distribution side, such as merchandise management employing IC chips, or the like, without increasing cost at a distribution process at all.

Note that with the above-mentioned embodiments, the respective antennas at a non-contact IC chip side included in a booster antenna and at the reader/writer side have been taken as a coil shape (spiral shape), but these antennas are not restricted to such a shape, and rather the shape thereof can be selected depending on the communication specification of a non-contact IC chip (such as communication frequency, intensity of electric waves/electromagnetic waves necessary for communication, radiating pattern of electric waves/electromagnetic waves by an antenna, etc.) as appropriate. For example, an antenna at a non-contact IC chip side of a booster antenna needs to be disposed close to the periphery of the disc holding portion of an optical disc case centered on the disc holding portion. Further, in the case of employing a dipole-type antenna as the antenna thereof, the antenna needs to be disposed close to the periphery of the disc holding portion, for example, not in a simple linear but a bent shape or curved shape.

Embodiment 5-1

Figure 33:
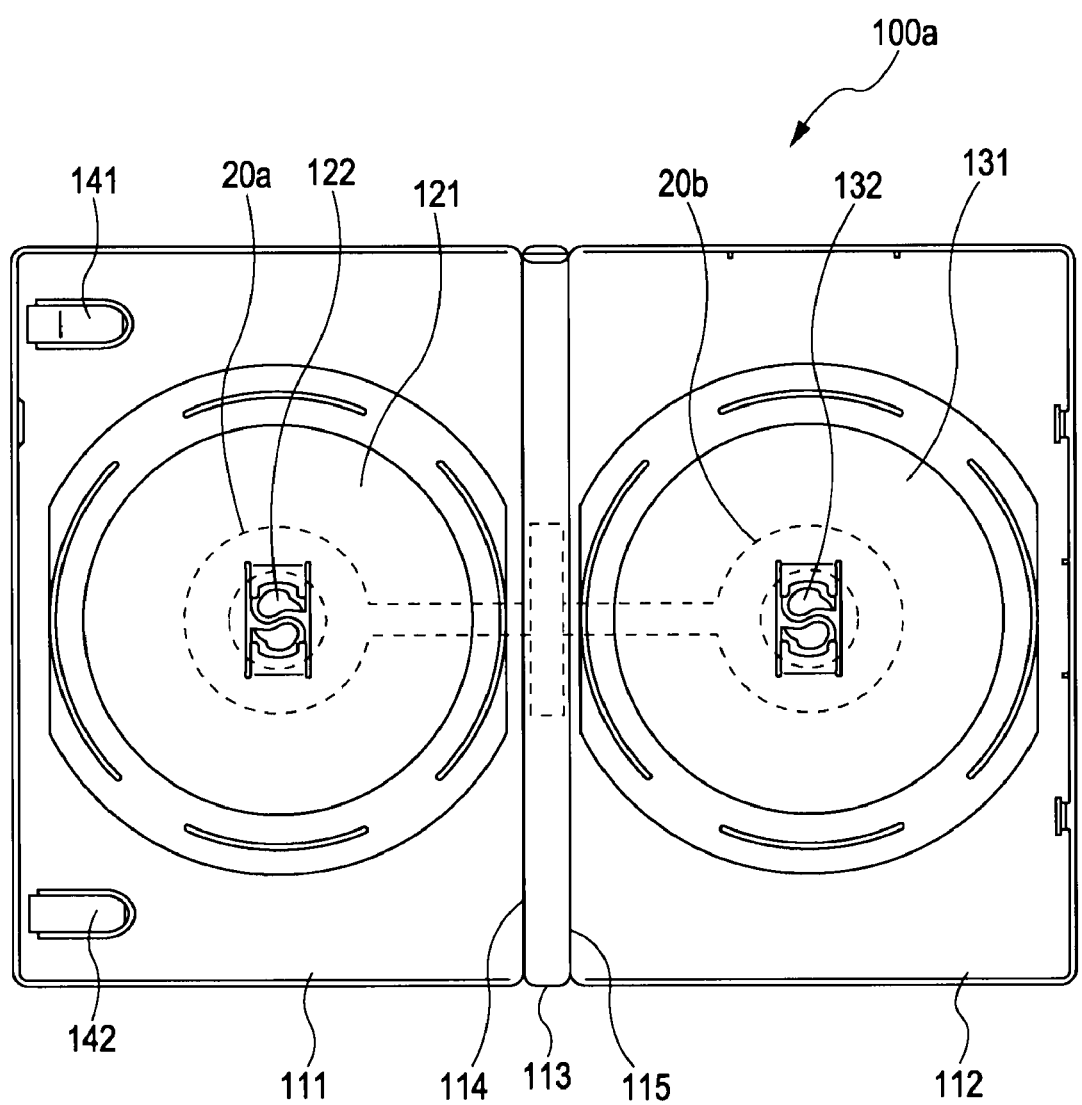
FIG. 33 is a front view illustrating the configuration of an optical disc case according to Embodiment 5-1.
Figure 34:
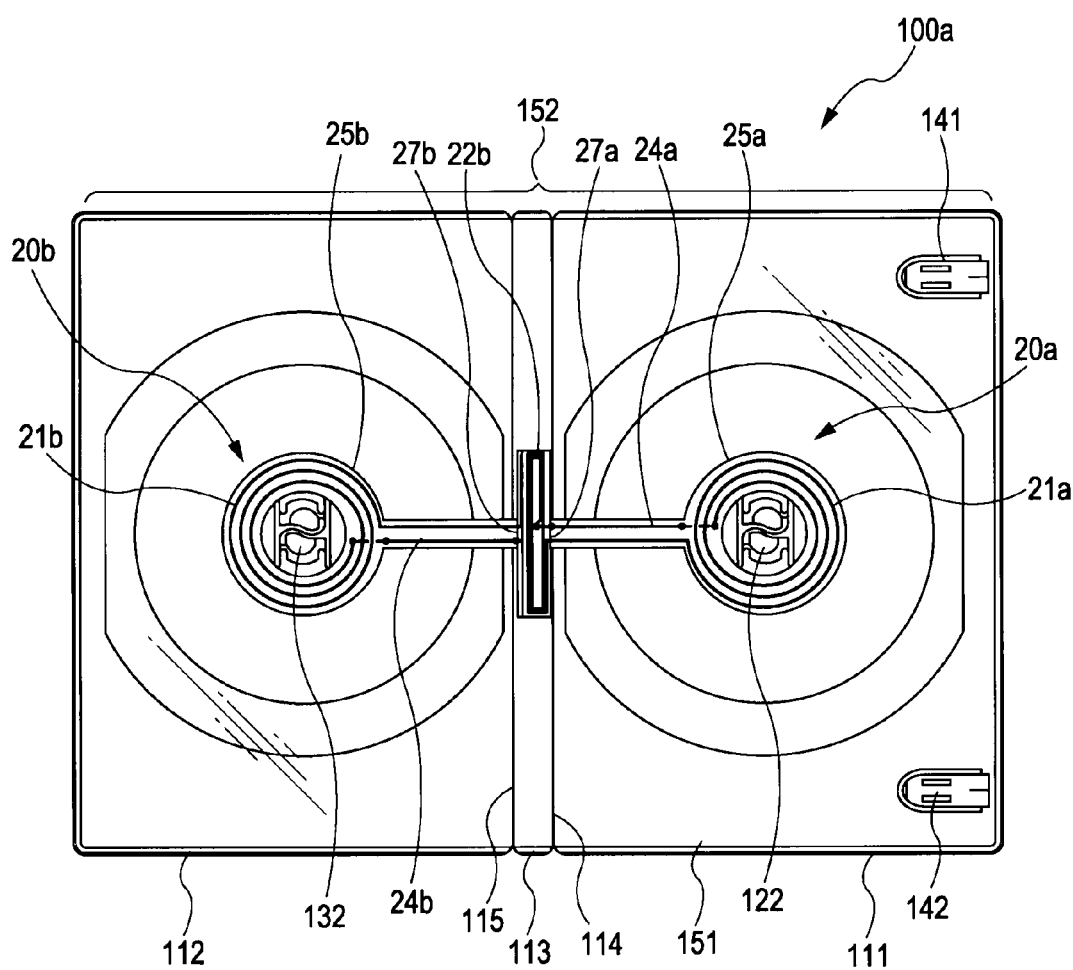
FIG. 34 is a rear view illustrating the configuration of the optical disc case according to Embodiment 5-1.
Figure 35:
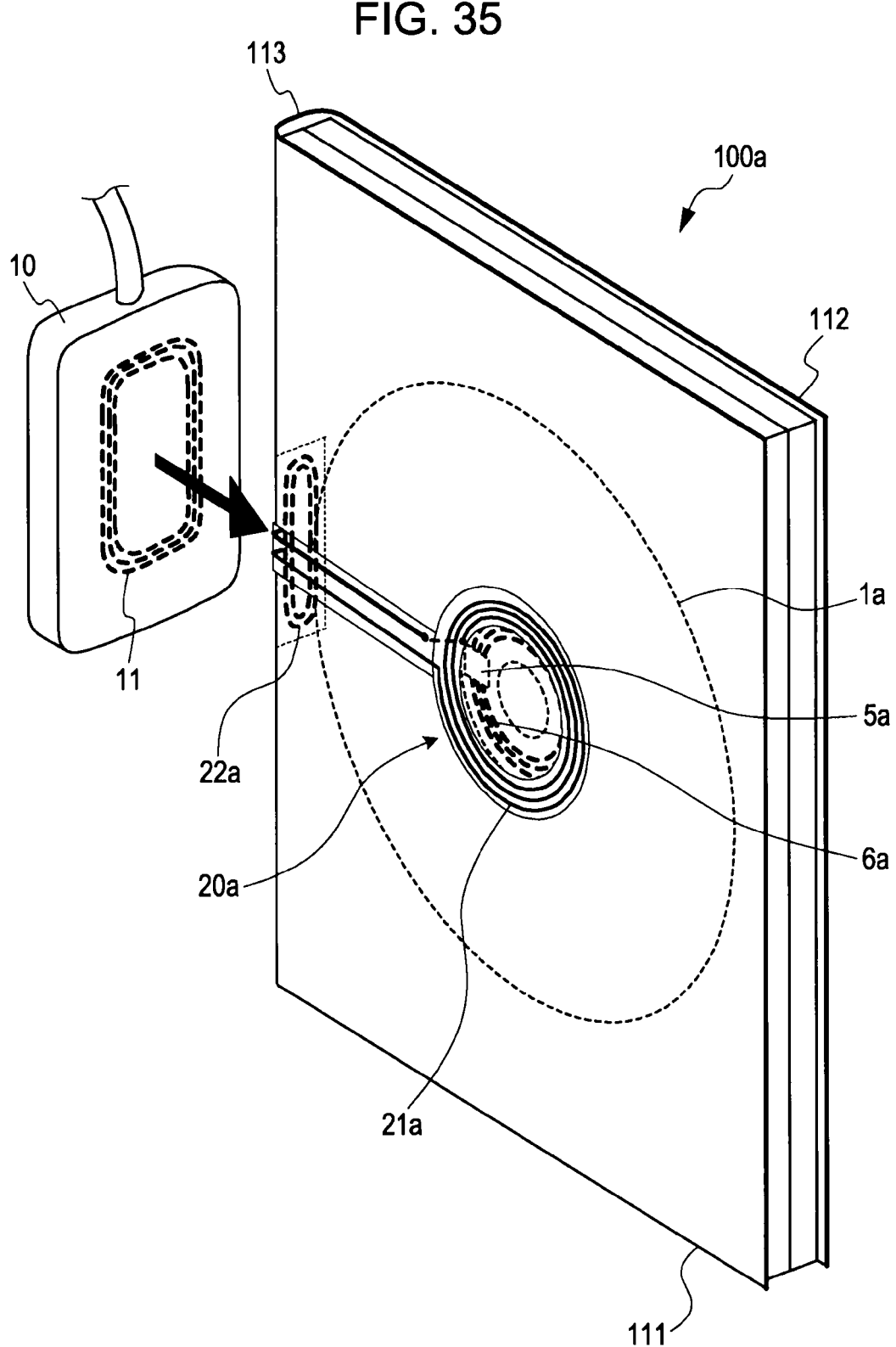
FIG. 35 is a diagram illustrating the outer shape of the optical disc case according to Embodiment 5-1.

FIGS. 33 and 34 are a front view and a rear view illustrating the configuration of an optical disc case according to Embodiment 5-1. Also, FIG. 35 is a diagram illustrating the outer shape of the optical disc case according to Embodiment 5-1.

The optical disc case 100a according to the present embodiment basically has a double-folded box-type shape including a face cover portion 111 and a rear-face cover portion 112. That is to say, the outer shape when the optical disc case 100a is closed is, as shown in FIG. 35, forms a rectangular solid of which the direction perpendicular to the face (case principal face) parallel to the disc face is thinner. Note that FIGS. 33 and 34 illustrate a state wherein the optical disc case 100a is opened.

The face cover portion 111 and rear-face cover portion 112 are connected through a case side face portion 113 so as to be bent, which are formed integral with resin materials, such as polypropylene or the like, for example. That is to say, the face cover portion 111 and rear-face cover portion 112 are, when these are closed, bent by 90 degrees at bending portions 114 and 115 which are each boundary portions as to a case side face portion 113, and at this time, the face cover portion 111 and rear-face cover portion 112 become a face-to-face state to seal the internal portion thereof. Also, at this time, the case side face portion 113 becomes a state perpendicular to the face cover portion 111 and rear-face cover portion 112, which makes up one side face of the optical disc case 100a.

With the inner faces of the face cover portion 111 and rear-face cover portion 112, disc-mounted faces 121 and 131 where optical discs 1a and 1b are mounted respectively, and protruding disc holding portions 122 and 132 for holding the optical discs 1a and 1b respectively are formed in an integral manner. The circumferences of the disc holding portions 122 and 132 have elasticity, and the center holes 2 of the optical discs 1a and 1b are fitted into and attached to the disc holding portions 122 and 132 respectively whereby the optical discs 1a and 1b are held.

Also, the inner face of the face cover portion 111 becomes a booklet accommodation face 54a for accommodating a booklet or the like for describing a content recorded in the optical discs 1a and 1b for example, and protruding retaining portions 141 and 142 for holding and retaining a booklet is formed on this face.

Further, the outer faces of the face cover portion 111, rear-face cover portion 112, and case side face portion 113 (i.e., the opposite faces of the disc-mounted faces 121 and 131) are covered with one transparent sheet 151. With the transparent sheet 151, the three sides of the four sides thereof are fastened to the end portions of the face cover portion 111, rear-face cover portion 112, and case side face portion 113, but the remaining one side is not fastened but opened. Note here that as an example, let us say that the upper side in FIG. 34 (and FIG. 33) is an opened end portion 152. Subsequently, a card member for package display (not shown) on which a jacket photograph or the like is printed for example can be inserted from the opened end portion 152 to the inner portion of the transparent sheet 151.

The optical disc case 100a having the above-mentioned basic configuration is an optical disc case which has been most commonly circulated principally as a container case for DVDs, and is called a "tall case" or the like. Subsequently, with the present embodiment, booster antenna units 20a and 20b are mounted as to such an existing optical disc case 100a.

The booster antenna unit 20a is fastened to the outer face of the face cover portion 111 (i.e., the rear face of the disc-mounted face 121). The booster antenna unit 20a is disposed such that the center of an antenna coil 21a is identical to the center of the disc holding portion 122. Thus, when the optical disc 1a is fitted into and attached to the disc holding portion 122, electromagnetic coupling between the antenna coil 6a at the disc side and the antenna coil 21a at the case side is carried out in a sure manner, thereby enabling a signal to be transmitted/received.

Also, the region where the antenna coil 22a for communication with the reader/writer 10 is formed is fastened to the outer face of the case side face portion 113. Subsequently, when the optical disc case 100a is closed, an arrangement is made wherein as the bending portion 114 is bent, the bending portion 27a of the booster antenna 20a is also bent 90 degrees.

On the other hand, the booster antenna unit 20b is disposed and fastened to the outer face of the rear-face cover portion 112 (i.e., the rear face of the disc-mounted face 131) such that the center of the antenna coil 21b is identical to the center of the disc holding portion 132. Thus, when the optical disc 1b is fitted into and attached to the disc holding portion 132, electromagnetic coupling between the antenna coil 6b at the disc side and the antenna coil 21b at the case side is carried out in a sure manner, thereby enabling a signal to be transmitted/received.

Also, the antenna coil 22b for communication with the reader/writer 10 is disposed on the outer face of the case side face portion 113, but with this example, the antenna coil 22b is fastened so as to be overlapped on the upper face of the antenna coil 22a of the booster antenna unit 20a. Subsequently, when the optical disc case 100a is closed, an arrangement is made wherein as the bending portion 115 is bent, the bending portion 27b of the booster antenna 20b is also bent 90 degrees.

Figure 32:
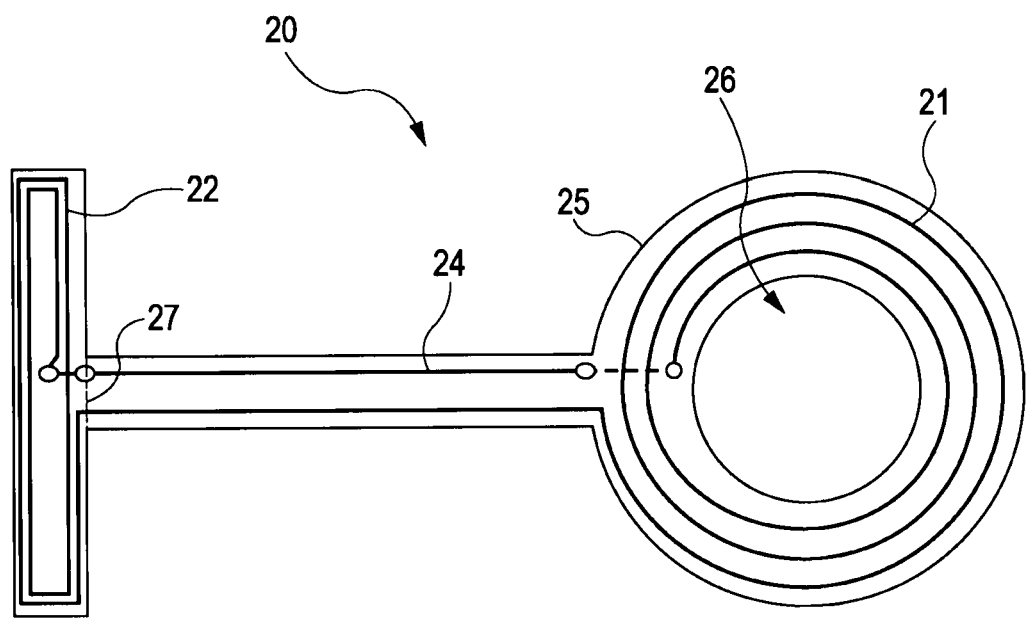
FIG. 32 is a diagram illustrating the basic configuration of a booster antenna unit.

Such an optical disc case 100a is manufactured according to the following processes, for example. First, as described above, the booster antenna unit 20a where the antenna coils 21a and 22a and the connection wiring 24a are formed by printing or the like is manufactured in a flat state as shown in FIG. 32. Also, the booster antenna unit 20b is also manufactured with the same process. On the other hand, the face cover portion 111, rear-face cover portion 112, and case side face portion 113 are formed in an integral manner by injection molding or the like.

Next, the booster antenna unit 20a is fastened to the outer faces of the face cover portion 111 and case side face portion 113 in a state wherein the center of the antenna coil 21a is aligned to the center of the disc holding portion 122. Next, the booster antenna unit 20b is fastened to the outer face of the rear-face cover portion 112 in a state wherein the center of the antenna coil 21b is aligned to the center of the disc holding portion 132. At this time, the region where the antenna coil 22b is formed is fastened to the upper face of the region where the antenna coil 22a of the booster antenna unit 20a is formed.

Here, the booster antenna units 20a and 20b are disposed in the inside of the transparent sheet 151, whereby a card member for package display can be further inserted in the inside of the transparent sheet 151. In this case, an arrangement may be made wherein following the booster antenna units 20a and 20b being fastened to the outer faces of the face cover portion 111, rear-face cover portion 112, and case side face portion 113, the transparent sheet 151 is fastened thereto, or the inverse process thereof may be employed.

Also, when the flexible substrates 25a and 25b of the booster antenna units 20a and 20b are adhered to the face cover portion 111, rear-face cover portion 112, and case side face portion 113, an adhesive or tackiness agent or the like is employed, such as ultraviolet curing resin, hot melt resin, an epoxy resin, cyanoacrylate, synthetic-rubber (preferably a styrene butadiene rubber), or the like. At this time, the faces to be adhered may be reformed so as to be adhered in a sure manner by applying primer to the faces to be adhered beforehand.

Note that the booster antennas are not restricted to such a configuration according to the present embodiment wherein the booster antennas are integral with the substrates, and rather may be configured of only a thin metal wire, for example. In this case, the antenna coils 21a, 21b, 22a, and 22b are formed as air-core coils each subjected to winding by a winding machine or the like, for example.

With the optical disc case 100a according to Embodiment 5-1 thus described above, the antenna coils 22a and 22b of the booster antenna units 20a and 20b are both disposed along the case side face portion 113, whereby as shown in FIG. 35, upon the reader/writer 10 being brought close to the case side face portion 113 in a state wherein the antenna coil 11 of the reader/writer 10 is directed to the case side face portion 113 face to face, communication can be performed between the reader/writer 10 and the IC chips 5a and 5b on the optical discs 1a and 1b.

Particularly, in the case of a great number of such optical disc cases 100a being accommodated in a storage rack, the optical disc cases 100a come into contact with (or come close to) each other at the faces (case principal faces) parallel to the disc faces, and accordingly, it becomes impossible to hold the reader/writer 10 against the case principal faces to communicate with the IC chips 5a and 5b. Note however, even in a state of accommodating the optical disc case 100a in the storage rack, at least one side face (case side face portion 113) of the optical disc case 100a is exposed outside, so the antenna coils 22a and 22b of the booster antennas are disposed on this side face, whereby communication can be performed with the IC chips 5a and 5b by holding the reader/writer 10 against this side face.

If communication can be performed with the IC chips 5a and 5b on the optical discs 1a and 1b in a state of being accommodated in the storage rack, usage which facilitates the search of the optical disc 1 where a desired music or data is recorded, for example, such that information such as a music or the like is recorded in the IC chips 5a and 5b beforehand, and this information is read out by the reader/writer 10 to display this on a display device, or when information matching the specified keyword is recorded in the IC chips 5a and 5b, this is informed by audio or light or the like.

Note that in FIG. 35, an example of the reader/writer 10 only for a non-contact IC chip is illustrated, but the shape and configuration of the reader/writer 10 are only an example. As for another configuration of the reader/writer, for example, it can be conceived that a reader/writer function is provided in a remote controller for a playing/recording device of an optical disc, or the like, and an antenna coil is disposed at the tip portion of the remote controller thereof.

Subsequently, with the optical disc case 100a according to the present embodiment, the booster antennas are mounted with a simple process without changing the configuration and shape of an existing toll-case-type optical disc case, whereby communication can be performed from the case side face portion 113 side as described above. Also, a process is employed wherein booster antennas are formed as the booster antenna units 20a and 20b beforehand, and such units are fastened to the outer faces of a resin case, whereby the efficiency of the manufacturing process can be increased.

Particularly, in the case of employing an arrangement wherein the booster antenna units 20a and 20b are disposed between the outer face of a resin case and the transparent sheet 151, an arrangement can be made wherein the booster antenna units are circulated separately from an existing resin case (tall case), and the booster antenna units are attached to the tall case by another maker or user. In the case of the booster antenna units being sold independently, the user who has owned an existing tall case can obtain the advantages due to the above-mentioned additional functions simply by purchasing the booster antenna units alone, to attach these to the tall case, instead of replacing the entire case thereof.

Note that the antenna coil 22a of the booster antenna unit 20a basically needs to be disposed on either of the side faces to be connected with the four sides of the face cover portion 111. That is to say, communication can be performed with the IC chip 5a on the optical disc 1a by holding the reader/writer 10 against the side face with which the antenna coil 22a comes into contact.

Note however, with the optical disc case 100a having the above-mentioned configuration, in general, the titles of contents recoded in the optical discs 1a and 1b, or the like are frequently displayed on the outer faces of the case side face portion 113. Therefore, when this optical disc case 100a is accommodated in a storage rack, the case side face portion 113 is in a state of being exposed outside the storage rack in many cases. Also, disposing the antenna coil 22a on the case side face portion 113 side can prevent a situation wherein a user comes contact with the antenna coil 22a and destroys it at the time of mounting/detaching of the optical discs 1a and 1b as compared with the case of disposing the antenna coil 22a on the other side faces.

It is most desirable for the antenna coil 22a to be disposed on the case side face portion 113 from such a point, and with all of the following embodiments described in the present Specification, an example will be shown wherein the antenna coil 22a for communication with the reader/writer 10 is disposed on the side face corresponding to the case side face portion 113. Note that this can also be applied to the antenna coil 22b of the booster antenna unit 20b.

Embodiment 5-2

Figure 36:
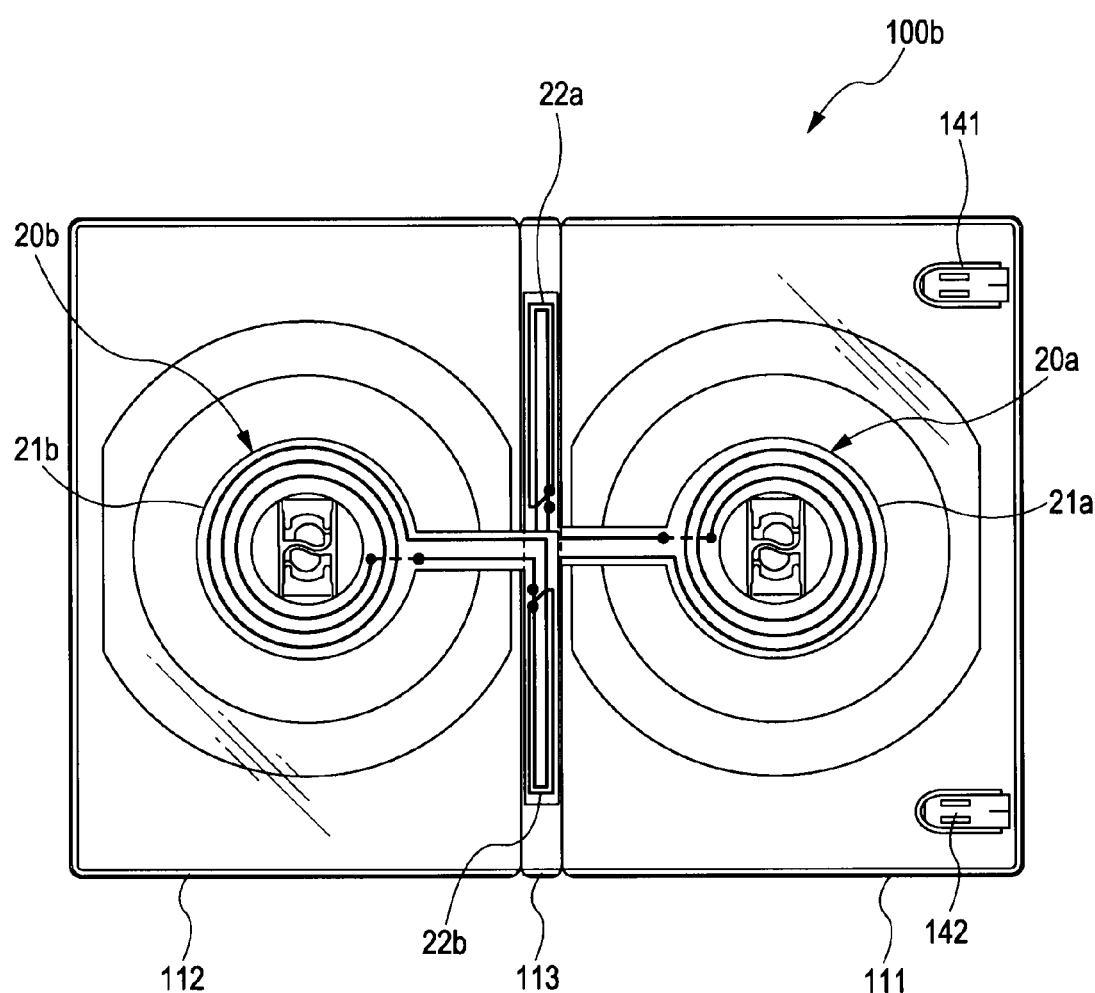
FIG. 36 is a rear view illustrating the configuration of an optical disc case according to Embodiment 5-2.

FIG. 36 is a rear view illustrating the configuration of an optical disc case according to Embodiment 5-2. Note that in FIG. 36, the components corresponding to those in FIG. 34 are denoted with the same reference numerals.

The optical case 100b shown in FIG. 36 is a modification of the optical disc case 100a according to Embodiment 5-1. That is to say, the optical disc case 100b has a configuration wherein in the same way as with Embodiment 5-1, the face cover portion 111 and rear-face cover portion 112 are connected through a case side face portion 113 so as to be bent. Subsequently, the booster antenna unit 20a is fastened to the outer face of the face cover portion 111, and the booster antenna unit 20b is fastened to the outer face of the rear-face cover portion 112.

The antenna coils 22a and 22b at the reader/writer 10 side, of the booster antenna units 20a and 20b are, in the same way as with Embodiment 5-1, disposed on the outer face of the case side face portion 113. Note however, the present embodiment differs from Embodiment 5-1 in that with the booster antenna units 20a and 20b, the intermediate portion between the antenna coil 22a and antenna coil 21a, and the intermediate portion between the antenna coil 22b and antenna coil 21b are each in a bent shape such that the antenna coils 22a and 22b are not overlapped mutually.

When the optical disc case 100b is closed, the antenna coils 22a and 22b are in a state of being perpendicular to the case principal faces. Thus, upon the reader/writer 10 being brought close to the case side face portion 113 in a state wherein the antenna coil 11 of the reader/writer 10 is directed to the case side face portion 113 face to face, electromagnetic coupling between the reader/writer 10, and the antenna coils 22a and 22b can be carried out.

Here, with the above-mentioned Embodiment 5-1, the antenna coils 22a and 22b have been overlapped mutually and disposed. In the case of this placement, upon the antenna coil 11 of the reader/writer 10 being brought close to the case side face portion 113 in a face-to-face state, communication can be performed simultaneously with both of the IC chips 5a and 5b on the optical discs 1a and 1b through the antenna coils 22a and 22b. At this time, if the IC chips 5a and 5b have no function corresponding to simultaneous communication such as a collision prevention function or the like, the reader/writer 10 can communicate only with either of the IC chip 5a or 5b, or cannot communicate with both in some cases.

On the other hand, with the present embodiment, the antenna coils 22a and 22b are disposed so as not to be overlapped mutually. In the case of this placement, when the antenna coil 11 of the reader/writer 10 is directed to the case side face portion 113 face to face, the antenna coil 11 of the reader/writer 10 is brought close to either of the region where the antenna coil 22a is disposed or the region where the antenna coil 22b is disposed, of the case side face portion 113, whereby the degree of electromagnetic coupling between the antenna coil 11 and either of the antenna coil 22a or 22b is increased. Accordingly, even if the IC chips 5a and 5b have no function corresponding to simultaneous communication, communication can be performed selectively between the reader/writer 10 and a desired IC chip 5a or 5b depending on the position against which the reader/writer 10 is holding.

Embodiment 5-3

Figure 37:
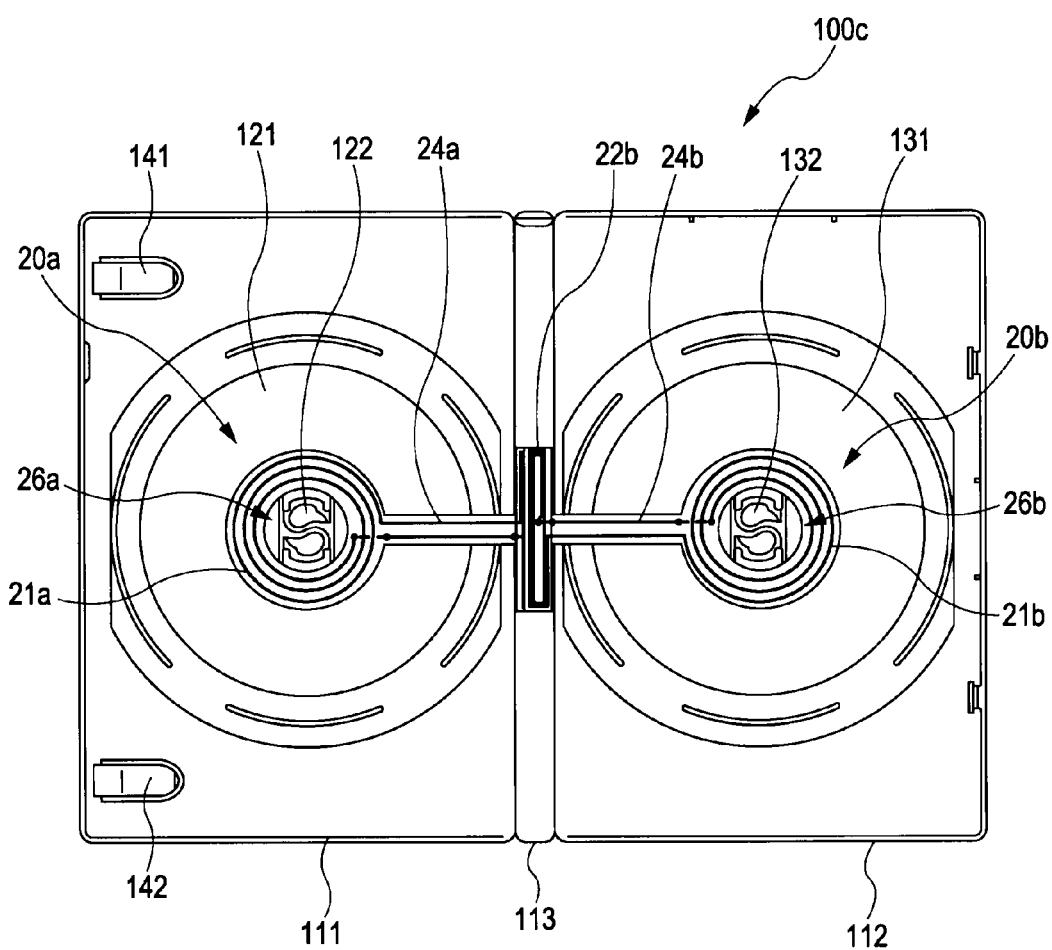
FIG. 37 is a front view illustrating the configuration of an optical disc case according to Embodiment 5-3.

FIG. 37 is a front view illustrating the configuration of an optical disc case according to Embodiment 5-3. In FIG. 37, the components corresponding to those in FIGS. 33 and 34 are denoted with the same reference numerals.

With the optical disc case 100c shown in FIG. 37, the configuration of the case body portion is the same as those according to Embodiments 5-1 and 5-2. That is to say, the optical disc case 100c has a configuration wherein the face cover portion 111 and rear-face cover portion 112 are connected through the case side face portion 113 so as to be bent. Subsequently, with the optical disc case 100c, the booster antenna unit 20a is fastened to the inner face side (disc-mounted face 121 side) of the face cover portion 111, and the booster antenna unit 20b is fastened to the inner face side (disc-mounted face 131 side) of the rear-face cover portion 112.

The booster antenna unit 20a is disposed such that the disc holding portion 122 of the face cover portion 111 passes through the center hole 26a of the antenna coil 21a, and the center of the antenna coil 21a is identical to the center of the disc holding portion 122. Thus, when the optical disc 1a is fitted into and attached to the disc holding portion 122, electromagnetic coupling between the antenna coil 6a at the disc side and the antenna coil 21a at the case side is carried out in a sure manner, thereby enabling a signal to be transmitted/received. Also, the antenna coil 22a (not shown in FIG. 37) at the reader/writer 10 side is fastened to the inner face of the case side face portion 113.

Similarly, the booster antenna unit 20b is disposed such that the disc holding portion 132 of the rear-face cover portion 112 passes through the center hole 26b of the antenna coil 21b, and the center of the antenna coil 21b is identical to the center of the disc holding portion 132. Thus, when the optical disc 1b is fitted into and attached to the disc holding portion 132, electromagnetic coupling between the antenna coil 6b at the disc side and the antenna coil 21b at the case side is carried out in a sure manner, thereby enabling a signal to be transmitted/received. Also, the antenna coil 22b at the reader/writer 10 side is fastened onto the booster antenna unit 20b with the inner face of the case side face portion 113.

When the optical disc case 100c is closed, the antenna coils at the reader/writer 10 side of the booster antenna units 20a and 20b both change to a state of being perpendicular to the case principal faces. Thus, upon the reader/writer 10 being brought close to the case side face portion 113 in a state wherein the antenna coil 11 of the reader/writer 10 is directed to the case side face portion 113 face to face, whereby communication can be performed between the reader/writer 10 and the IC chips 5a and 5b on the optical discs 1a and 1b.

Note that with the configuration in FIG. 37, the region where the antenna coil 22b of the booster antenna unit 20b is formed does not necessarily need to be fastened to the case side face portion 113 side. In the case of being not fastened thereto, the region where the antenna coil 22b is formed is bent beforehand so as to be perpendicular to the region where the antenna coil 21b is formed, and only the region where the antenna coil 21b and connection wiring 24b are formed is fastened to the inner face of the rear-face cover portion 112.

Further, in the case of determining the size of each of the antenna coil 22b, and the antenna coil 22a at the reader/writer 10 side of the booster antenna unit 20a so as not to come into contact with each other at the time of opening and closing, not only the region where one antenna coil 22b is formed but also the region where the other antenna 22a is formed do not need to be fastened to the case side face portion 113 side. In this case, the region where the antenna coil 22a is formed is bent beforehand so as to be perpendicular to the region where the antenna coil 21a is formed, and only the region where the antenna coil 21a and connection wiring 24a are formed is fastened to the inner face of the face cover portion 111.

Also, with the respective booster antenna units 20a and 20b, the regions where the connection wirings 24a and 24b are formed need to be bent along the irregularities of the respective inner faces of the face cover portion 111 and rear-face cover portion 112 as appropriate, and formed so as to come into contact with the inner faces thereof. Alternatively, the fastened regions of the booster antenna units 20a and 20b in the inner faces of the face cover portion 111 and rear-face cover portion 112 may be formed in a flat state beforehand.

Embodiment 5-4

Figure 38:
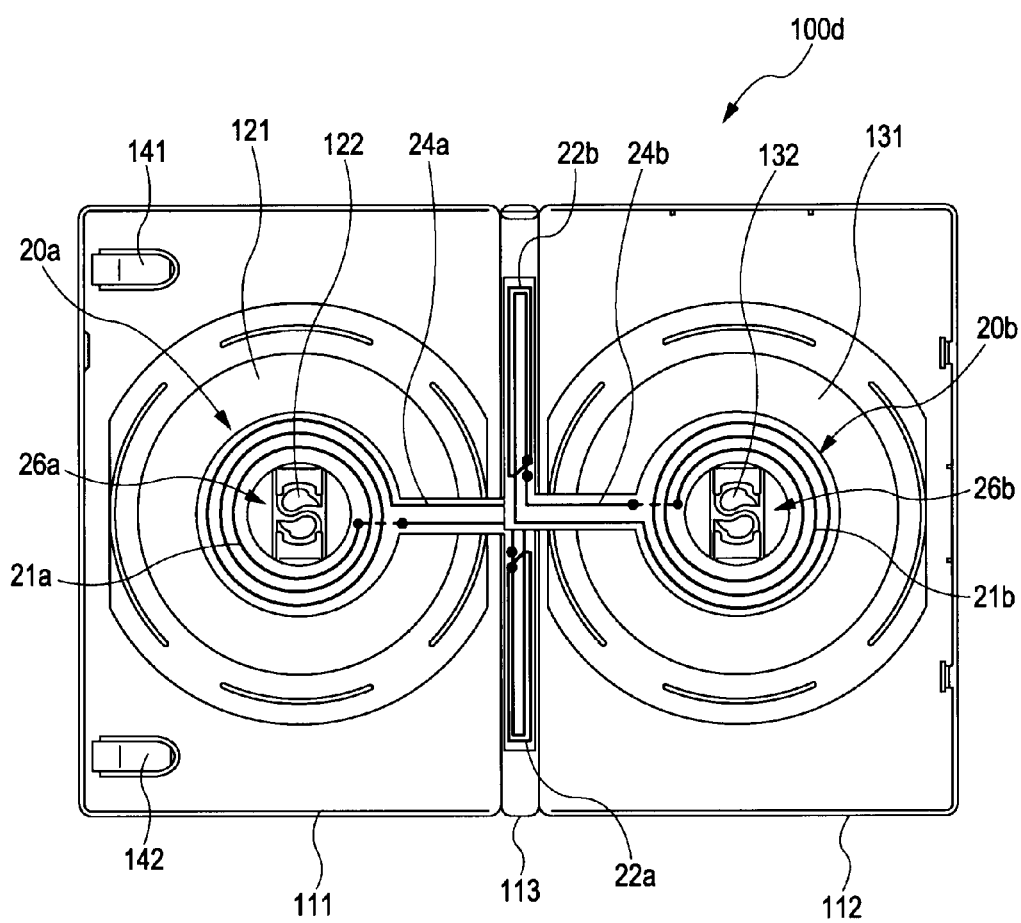
FIG. 38 is a front view illustrating the configuration of an optical disc case according to Embodiment 5-4.

FIG. 38 is a front view illustrating the configuration of an optical disc case according to Embodiment 5-4. Note that in FIG. 38, the components corresponding to those in FIG. 37 are denoted with the same reference numerals.

The optical disc case 100d shown in FIG. 38 is a modification of the optical disc case 100c according to Embodiment 5-3. That is to say, with the optical disc case 100d, in the same way as with Embodiment 5-3, the booster antenna unit 20a is fastened to the inner face of the face cover portion 111, and the antenna unit 20b is fastened to the inner face of the rear-face cover portion 112. Note however, the present embodiment differs from Embodiment 5-3 in that with the booster antenna units 20a and 20b, the intermediate portion between the antenna coil 22a and antenna coil 21a, and the intermediate portion between the antenna coil 22b and antenna coil 21b are each in a bent shape such that the antenna coils 22a and 22b are not overlapped mutually.

When the optical disc case 100d is closed, the antenna coils 22a and 22b are in a state of being perpendicular to the case principal faces. Thus, upon the reader/writer 10 being brought close to the case side face portion 113 in a state wherein the antenna coil 11 of the reader/writer 10 is directed to the case side face portion 113 face to face, communication can be made between the reader/writer 10, and the IC chips 5a and 5b on the optical discs 1a and 1b.

With the present embodiment as well, in the same way as with the above-mentioned Embodiment 5-2, the antenna coils 22a and 22b are disposed so as not to be overlapped mutually. Therefore, even if the IC chips 5a and 5b have no function corresponding to simultaneous communication, communication can be performed selectively between the reader/writer 10 and a desired IC chip 5a or 5b depending on the position (i.e., the region where either the antenna coil 22a or 22b is disposed) which the reader/writer 10 is brought close to of the case side face portion 113.

Note that with the configuration in FIG. 38, in the case of the booster antenna units 20a and 20b being disposed so as not to be overlapped mutually with the inner face of the case side face portion 113, the regions where the antenna coils 22a and 22b at the reader/writer 10 side are formed do not need to be fastened to the case side face portion 113 side. In the case of fastening the regions, the booster antenna units 20a and 20b are fastened to the inner faces of the face cover portion 111 and rear-face cover portion 112 in a state wherein the antenna coils 22a and 22b are bent 90 degrees beforehand as to the corresponding antenna coils 21a and 21b.

Embodiment 5-5

Figure 39:
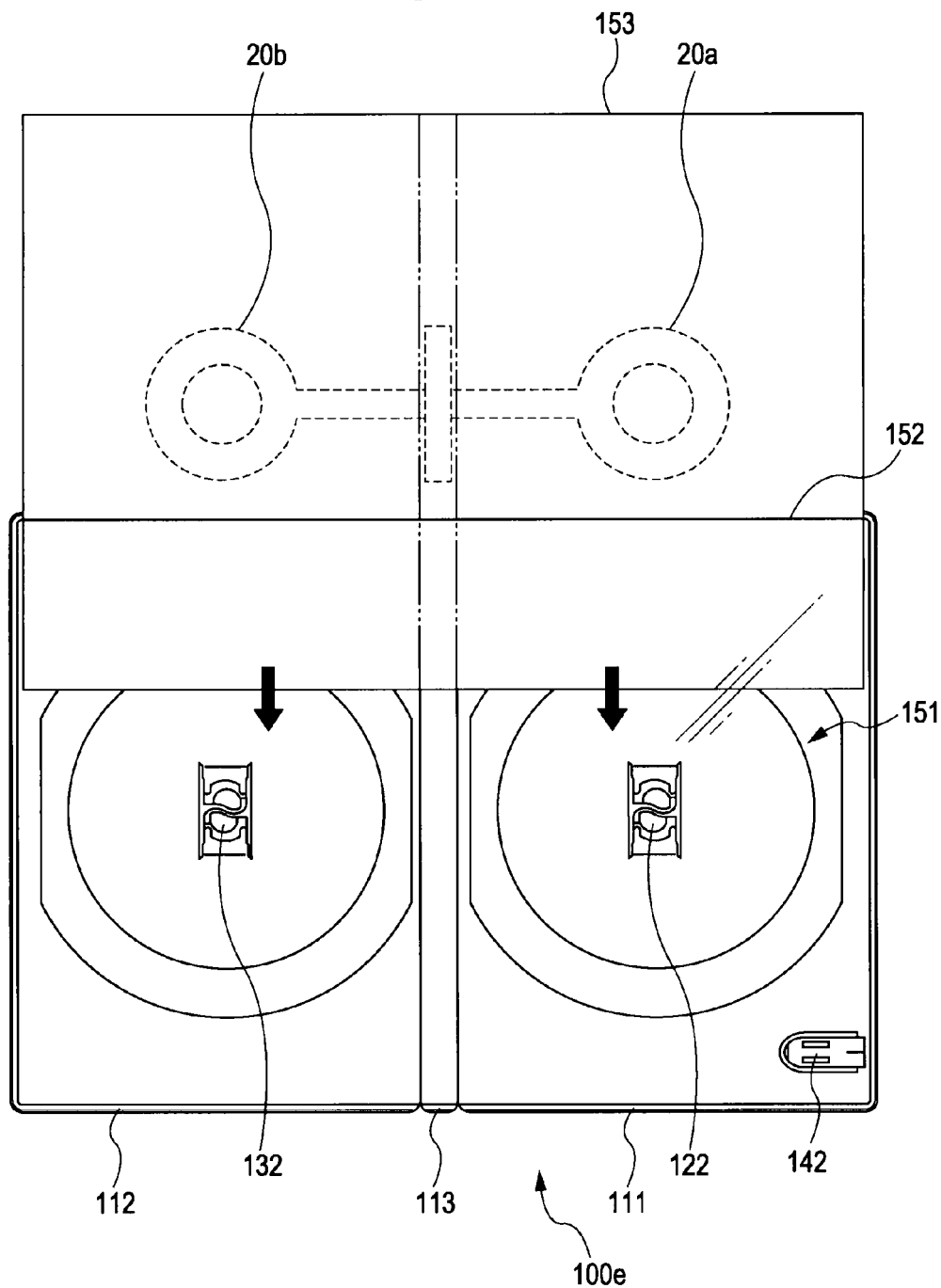
FIG. 39 is a rear view illustrating the configuration of an optical disc case according to Embodiment 5-5.

FIG. 39 is a rear view illustrating the configuration of an optical disc case according to Embodiment 5-5. Note that in FIG. 39, the components corresponding to those in FIG. 34 are denoted with the same reference numerals.

With the optical disc case 100e shown in FIG. 39, the configuration of the case body portion is the same as those according to Embodiments 5-1 and 5-2. That is to say, the optical disc case 100e has a configuration wherein the face cover portion 111 and rear-face cover portion 112 are connected through the case side face portion 113 so as to be bent.

Also, the outer faces of the face cover portion 111, rear-face cover portion 112, and case side face portion 113 are covered with a transparent sheet 151, and a card member 153 for package display is inserted between the transparent sheet 151 and the case body. With this example, the upper side in FIG. 39 is taken as the opened end portion 152 of the transparent sheet 151, and the card member 153 can be inserted from the opened end portion 152. Subsequently, with the present embodiment, the booster antenna units 20a and 20b are mounted as to the card member 153. The booster antenna units 20a 20b are basically fastened to the case body side of the card member 153, thereby preventing influence to the package display face of the card member 153.

Figure 40A:
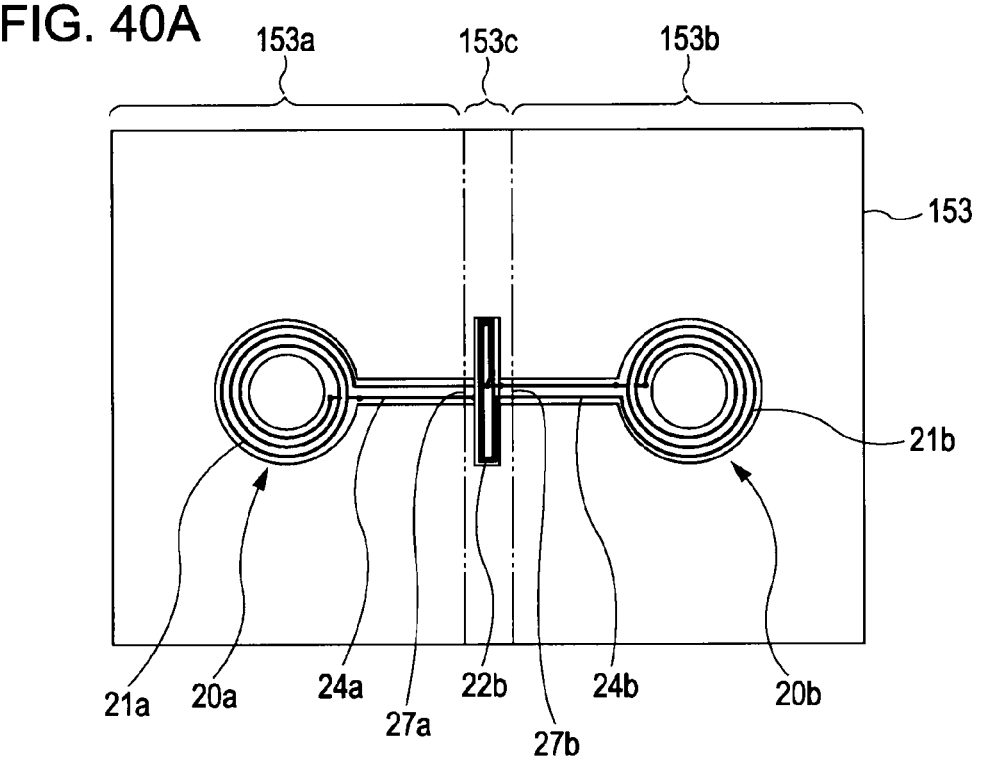
FIGS. 40A and 40B are diagrams illustrating the configuration of a card member on which booster antenna units are mounted, with Embodiment 5-5.
Figure 40B:
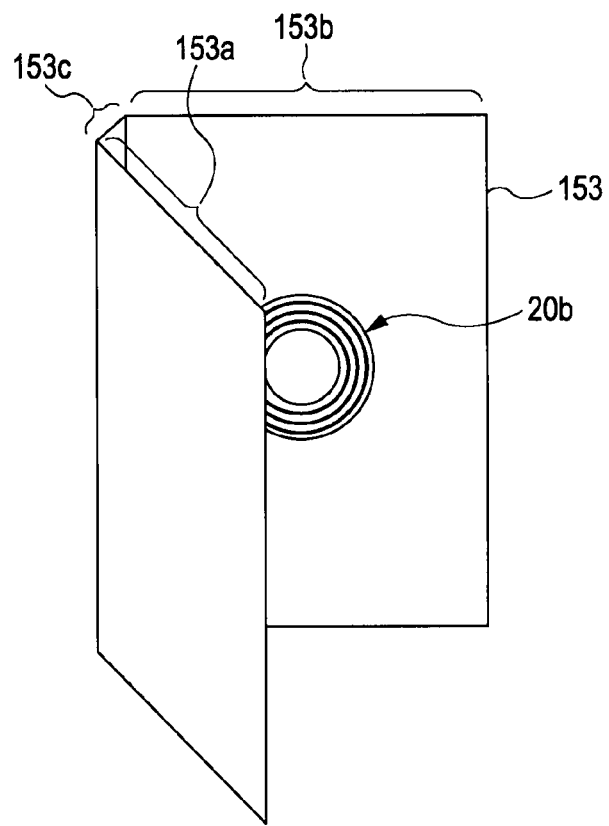

FIGS. 40A and 40B are diagrams illustrating the configuration of the card member on which the booster antenna units are mounted.

FIG. 40A illustrates a diagram illustrating the card member 153 as viewed from the rear side of the package display face (case body side). Such as shown in this drawing, the regions 153a through 153c of the card member 153 are the regions with which the face cover portion 111, rear-face cover portion 112, and case side face portion 113 come into contact at the time of insertion to the case respectively, and as shown in FIG. 40B, when the optical disc case 100e is closed, the boundary portion corresponding to each of the regions 153a through 153c is bent.

Subsequently, the booster antenna units 20a and 20b are fastened to such a card member 153. The booster antenna unit 20a is fastened to the regions 153a and 153c, and the region where the antenna coil 22a (not shown in FIG. 40) at the reader/writer 10 side is formed is disposed on the region 153c. Also, the booster antenna unit 20b is fastened to the regions 153b and 153c, and of these, the region where the antenna coil 22b is formed is overlapped and fastened on the antenna coil 22a of the booster antenna unit 20a.

With the booster antenna unit 20a, the boundary between the region where the antenna coil 22a is formed and the region where the connection wiring 24a is formed is taken as a bending portion 27a, and the bending portion 27a can also be bent in conjunction with bending of the card member 153. Similarly, with the booster antenna unit 20b as well, the boundary between the region where the antenna coil 22b is formed and the region where the connection wiring 24b is formed is taken as a bending portion 27b, and the bending portion 27b can also be bent in conjunction with bending of the card member 153.

Upon such a card member 153 being inserted between the transparent sheet 151 and case body, the booster antenna unit 20a is disposed such that the center of the antenna coil 21a is identical to the center of the disc holding portion 122, and the booster antenna unit 20b is disposed such that the center of the antenna coil 21b is identical to the center of the disc holding portion 132.

Accordingly, when the optical discs 1a and 1b are mounted on the disc holding portions 122 and 132 respectively, electromagnetic coupling between the antenna coil 6a at the optical disc 1a side and the antenna coil 21a of the booster antenna unit 20a is carried out, and electromagnetic coupling between the antenna coil 6b at the optical disc 1b side and the antenna coil 21b of the booster antenna unit 20b is carried out.

Also, the antenna coils 22a and 22b are disposed so as to be positioned on the outer face of the case side face portion 113, and thus, when holding the reader/writer 10 against the outer side of the case side face portion 113, electromagnetic coupling between the antenna coil 11 of the reader/writer 10 and the antenna coils 22a and 22b is carried out, whereby communication can be performed between the reader/writer 10 and IC chips 5a and 5b.

In the case of manufacturing the optical disc case 100e according to the present embodiment, basically, following the case body configured of the face cover portion 111, rear-face cover portion 112, and case side face portion 113 being formed integrally by injection molding, the transparent sheet 151 is attached to the outer face of the case body thereof. With the transparent sheet 151, the end portions corresponding to the three sides thereof are connected (e.g., adhered) to the end portions of the case body, and from the opened end portion corresponding to the remaining one side the card member 153 in a state of being fastened to the booster antenna units 20a and 20b beforehand is inserted.

Therefore, according to the present embodiment, communication can be performed from the case side face portion 113 to the IC chips 5a and 5b only by inserting the card member 153 on which the booster antenna units 20a and 20b are mounted into an existing toll-case-type optical disc case without being subjected to any processing. Also, the card member 153 on which the booster antenna units 20a and 20b are mounted can also be circulated separately from the optical disc case body.

Embodiment 5-6

Figure 41:
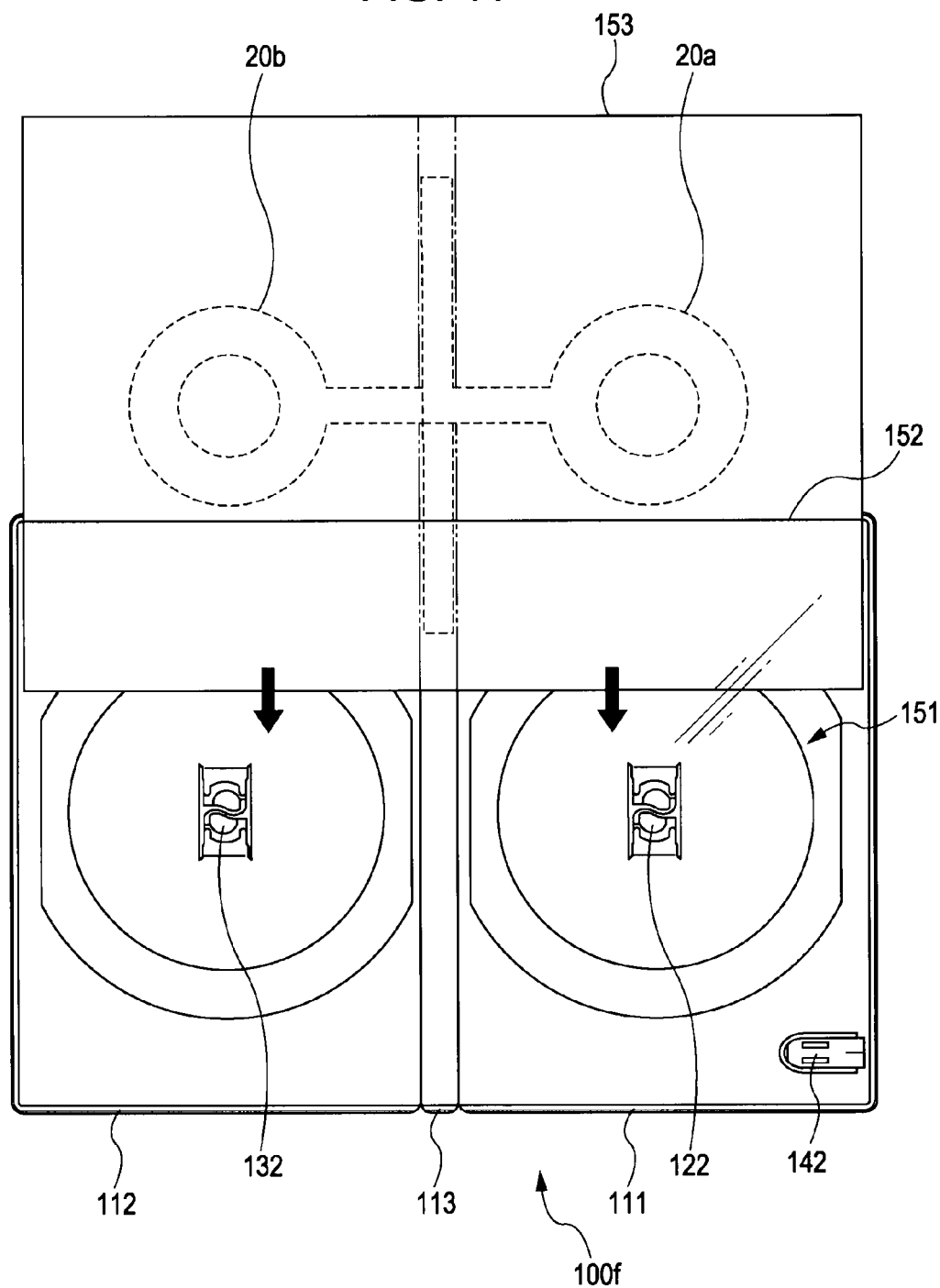
FIG. 41 is a rear view illustrating the configuration of an optical disc case according to Embodiment 5-6.
Figure 42:
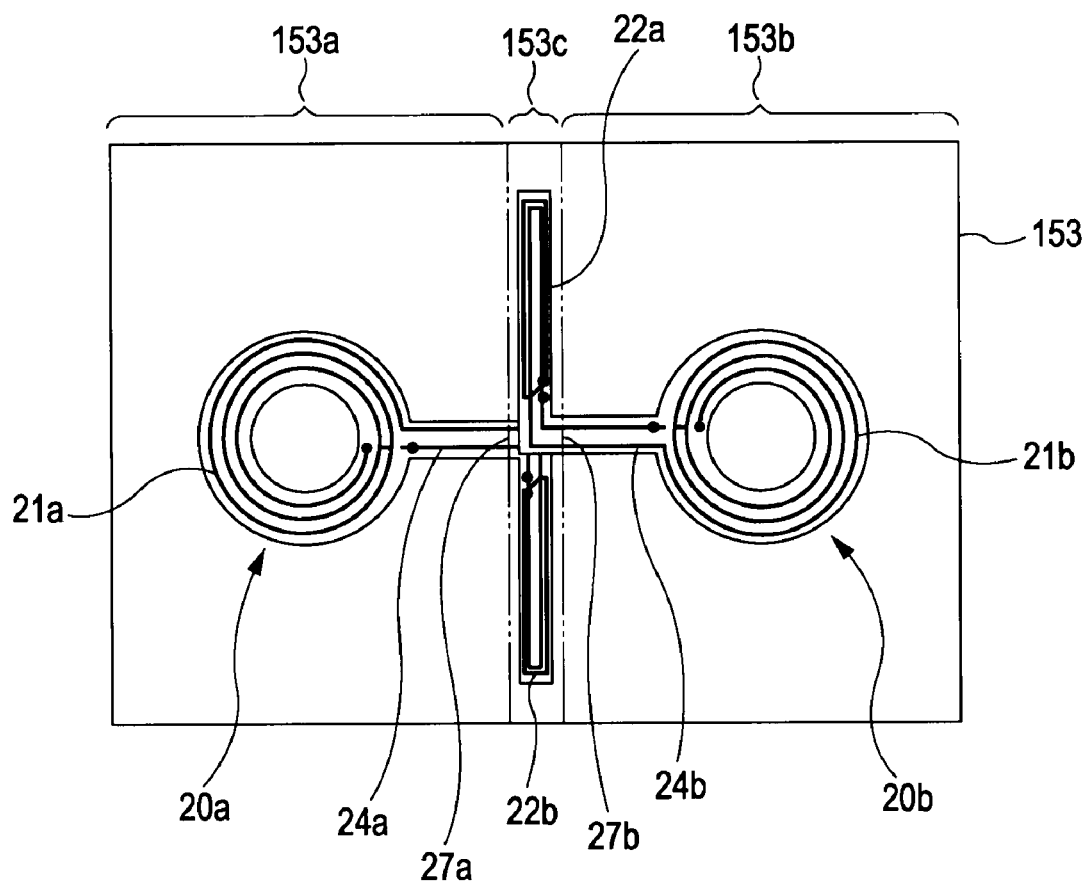
FIG. 42 is a diagram illustrating the configuration of a card member on which booster antenna units are mounted, with Embodiment 5-6.

FIG. 41 is a rear view illustrating the configuration of an optical disc case according to Embodiment 5-6. Also, FIG. 42 is a diagram illustrating the configuration of a card member on which booster antenna units are mounted with Embodiment 5-6. Note that in FIGS. 41 and 42, the components corresponding to those in FIGS. 39 and 40 are denoted with the same reference numerals.

The optical disc case 100f according to the present embodiment is a modification of the optical disc case 100e according to Embodiment 5-5. That is to say, with the optical disc case 100f, in the same way as with Embodiment 5-5, the booster antenna units 20a and 20b are provided on the card member 153 to be inserted between the transparent 151 and case body. Note however, the present embodiment differs from Embodiment 5-5 in that with the booster antenna units 20a and 20b, the intermediate portion between the antenna coil 22a and antenna coil 21a, and the intermediate portion between the antenna coil 22b and antenna coil 21b are each in a bent shape such that the antenna coils 22a and 22b are not overlapped mutually.

With the present embodiment, in the same way as with the case of the above-mentioned Embodiment 5-2 or 5-4, the antenna coils 22a and 22b are disposed so as not to be overlapped mutually. Therefore, even if the IC chips 5a and 5b have no function corresponding to simultaneous communication, communication can be performed selectively between the reader/writer 10 and a desired IC chip 5a or 5b depending on the position (i.e., the region where either the antenna coil 22a or 22b is disposed) which the reader/writer 10 is brought close to of the case side face portion 113.

Note that with the above-mentioned Embodiments 5-5 and 5-6, an arrangement has been made wherein the booster antenna units 20a and 20b where metal wires or the like making up the booster antennas are formed on the flexible substrates are fastened to the card member 153, but an arrangement may be made wherein metal wires are formed directly as to the card member 153 by printing or the like without employing the flexible substrates.

Also, with the above-mentioned Embodiments 5-1 through 5-6, the booster antenna units 20a and 20b corresponding to the optical discs 1a and 1b respectively are formed individually, but each of the booster antennas may be formed on one substrate in a unitized manner. Thus, a process for attaching the booster antenna units to the case body can be facilitated.

Further, with the above-mentioned Embodiments 5-1 through 5-6, the two booster antenna units 20a and 20b have been provided, but only one booster antenna unit may be provided to take care of both communication functions with the IC chips 5a and 5b mounted on the optical discs 1a and 1b.

Also, as an example of an optical disc case having the same basic configuration as the above-described tall case type, an optical disc case also exists wherein a detaching/mounting portion capable of detaching/mounting a memory card including flash memory or the like is provided on the inner face of the case, which is adjacent to the disc-mounted faces of the optical discs 1a and 1b. The booster antennas can be mounted as to such an optical disc case by the techniques shown in Embodiments 5-1 through 5-6.

Embodiment 6

Figure 43:
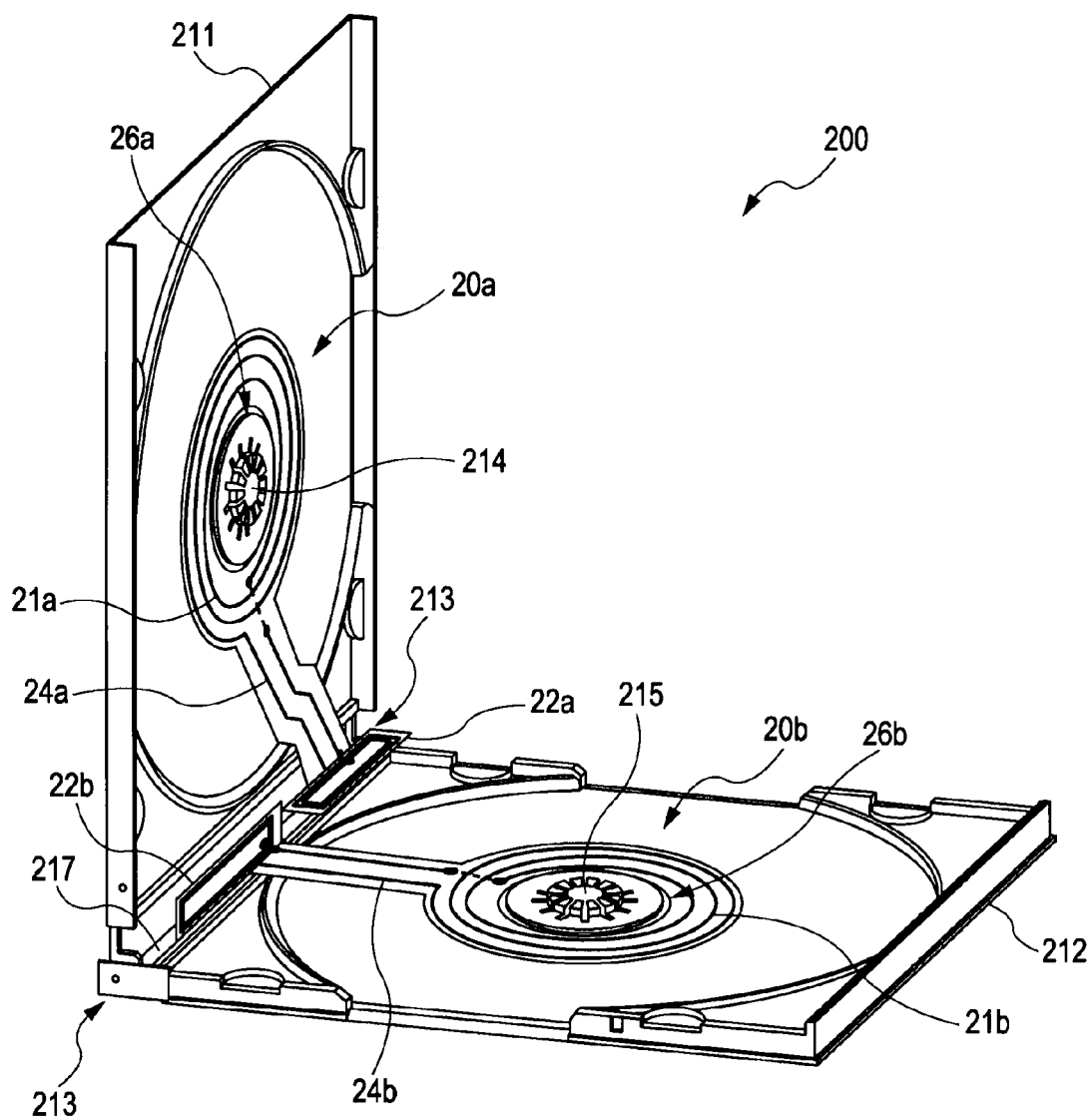
FIG. 43 is a perspective view illustrating the configuration of an optical disc case according to Embodiment 6.

FIG. 43 is a perspective view illustrating the configuration of an optical disc case according to Embodiment 6. Note that in FIG. 43, the components corresponding to those in the above-mentioned drawings (e.g., FIG. 38) are denoted with the same reference numerals.

The optical disc case 200 shown in FIG. 43 has a configuration wherein two cover portions are individually formed as to the configurations shown in Embodiments 5-1 through 5-6. That is to say, the optical disc case 200 is configured of a face cover portion 211 and a rear-face cover portion 212, and the face cover portion 211 and rear-face cover portion 212 are connected at a connection portion 213 so as to be rotated. Subsequently, one optical disc case 1a is held on the inner face of the face cover portion 211, and the other optical disc 1b is held on the inner face of the rear-face cover portion 212. Note that the face cover portion 211 and rear-face cover portion 212 are made of a polystyrene resin material, for example. Cases having such a configuration have already come into widespread use as a relatively thin container case for CDs, DVDs, or the like.

Subsequently, with the present embodiment, the booster antenna unit 20a is fastened to the inner face of the face cover portion 211, and the booster antenna unit 20b is fastened to the inner face of the rear-face cover portion. A protruding disc holding portion 214 is formed integral with the face cover portion 211 generally at the center portion of the inner face of the face cover portion 211, the disc holding portion 214 passes through the center hole 26a formed in the booster antenna unit 20a, and the center of the antenna coil 21a and the center of the disc holding portion 214 are aligned so as to be identical to each other. Thus, electromagnetic coupling between the antenna coil 21a and the antenna coil 6a on the optical disc 1a is carried out in a sure manner.

Similarly, a protruding disc holding portion 215 is formed integral with the rear-face cover portion 212 generally at the center portion of the inner face of the rear-face cover portion 212, the disc holding portion 215 passes through the center hole 26b formed in the booster antenna unit 20b, and the center of the antenna coil 21b and the center of the disc holding portion 215 are aligned so as to be identical to each other. Thus, electromagnetic coupling between the antenna coil 21b and the antenna coil 6b on the optical disc 1b is carried out in a sure manner.

Also, with the booster antenna unit 20a, the region where the antenna coil 22a at the reader/writer 10 side is formed is bent beforehand so as to be perpendicular to the region where the antenna coil 21a is formed. With this example, a case side face portion 217 is molded integral with the end portion at the connection portion 213 side of the face cover portion 211, and the region where the antenna coil 22a is formed is fastened or not fastened to the inner face of the case side face portion 217, and is disposed close to the case side face portion 217.

On the other hand, the region where the antenna coil 22b of the booster antenna coil unit 20b is formed is disposed at a position where the region where the antenna coil 22a is formed is not overlapped. The region where the antenna coil 22b is formed is bent beforehand so as to be perpendicular to the region where the antenna coil 21b is formed. Subsequently, when the face cover portion 211 and rear-face cover portion 212 are closed, the region where the antenna coil 22b is formed is disposed in contact with or close to the inner face of the case side portion 217.

According to such an arrangement, when the face cover portion 211 and rear-face cover portion 212 are closed, communication can be performed between the reader/writer 10 and IC chips 5a and 5b by bringing the reader/writer 10 close to the outer side of the case side face portion 217 from the outer side thereof. Also, the above-mentioned advantages can be obtained by fastening the booster antenna units 20a and 20b which have been already subjected to bending work to this container case without changing the configuration and shape of an existing container case.

Note that with the respective booster antenna units 20a and 20b, the regions where the connection wirings 24a and 24b are formed need to be bent along the irregularities of the respective inner faces of the face cover portion 211 and rear-face cover portion 212 as appropriate, and formed so as to come into contact with the inner faces thereof. Alternatively, the regions fastened to the substrates at the inner faces of the face cover portion 211 and rear-face cover portion 212 may be formed in a flat state beforehand.

Also, with the example in FIG. 43, the antenna coils 22a and 22b have been disposed at a position where the antenna coils 22a and 22b are not overlapped, but such as the example in FIG. 37, the respective coils may be overlapped. In this case, the antenna coils 22a and 22b are fastened so as to be overlapped, and also these are fastened to the inner face of the case side face portion 217. At this time, the boundaries between the regions where the antenna coils 22a and 22b are formed and the regions where the connection wirings 24a and 24b are formed become bending portions, and along with the open/close operations of the face cover portion 211 and rear-face cover portion 212, the bending portions thereof are bent.

Here, regarding whether the antenna coils 22a and 22b are disposed so as not to be overlapped mutually, or so as to be overlapped mutually, selection can be made in light of technical conditions such as regarding whether or not the IC chips 5a and 5b including a function corresponding to simultaneous communication, conditions relating to ease of use of a user such as regarding whether a function which can communicate selectively depending on the position of the antenna coil 22a or 22b is provided, or a function which can communicate regardless of distinction of coil position is provided, and so forth.

Further, with the example in FIG. 43, the booster antenna units 20a and 20b have been fastened to the inner faces of the face cover portion 211 and rear-face cover portion 212 respectively, but for example, as shown in the example in FIG. 36, the booster antenna units 20a and 20b may be fastened to the outer faces of the face cover portion 211 and rear-face cover portion 212 respectively.

Embodiment 7-1

Figure 44:
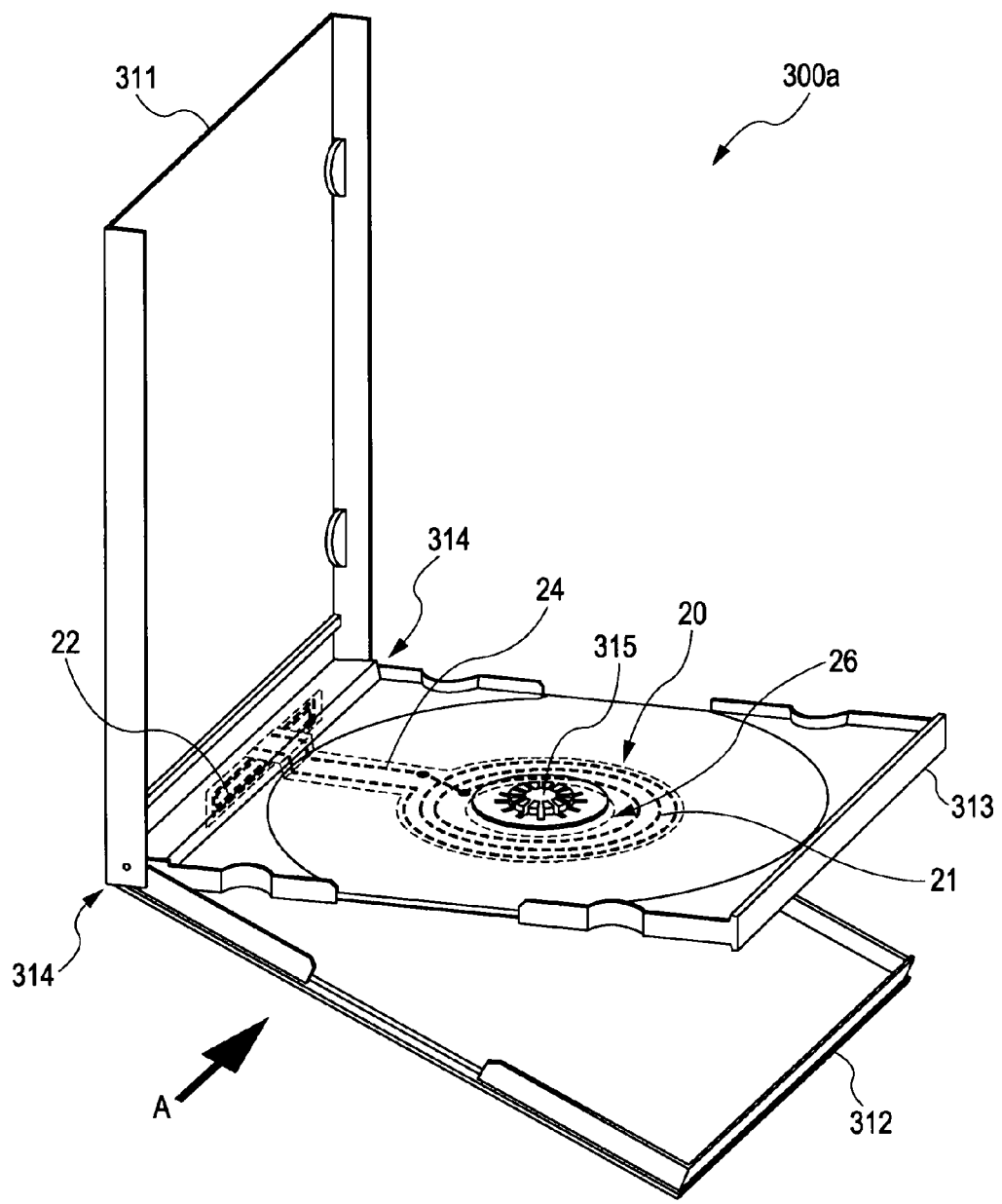
FIG. 44 is a perspective view illustrating the configuration of an optical disc case according to Embodiment 7-1.
Figure 45:
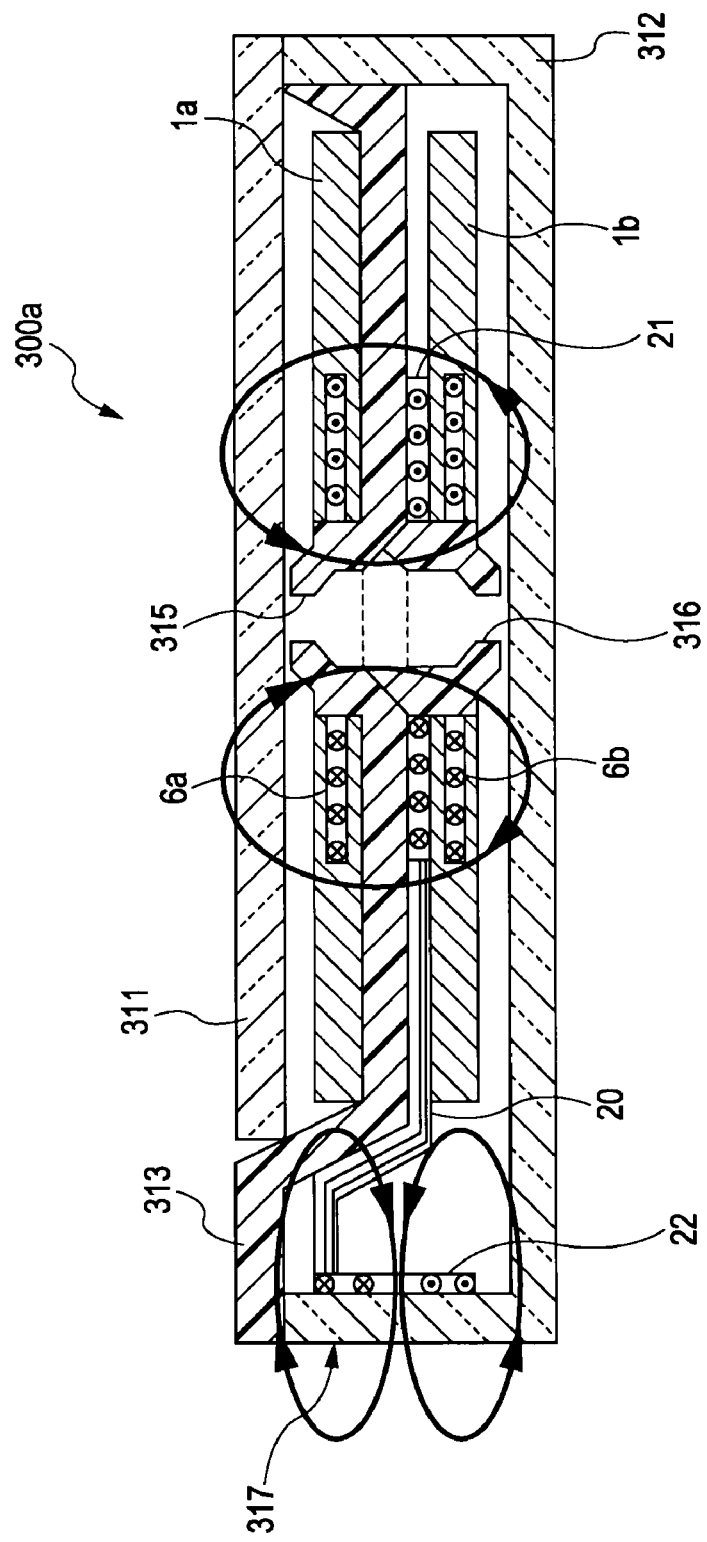
FIG. 45 is a cross-sectional view illustrating the configuration of the optical disc case according to Embodiment 7-1.

FIGS. 44 and 45 are a perspective view and a cross-sectional view illustrating the configuration of an optical disc case according to Embodiment 7-1, respectively. Note that FIG. 45 illustrates a cross section around a case center portion as viewed from arrow A in FIG. 44 (as viewed from almost near side of FIG. 44) in a state wherein optical discs are accommodated, and the case is closed. Also, in FIGS. 44 and 45, the components corresponding to those in the above-mentioned respective drawings are denoted with the same reference numerals.

The optical disc case 300a according to the present embodiment has a configuration wherein a disc tray 313 is provided between a face cover portion 311 and a rear-face cover portion 312, and the optical discs 1a and 1b are held by both faces of the disc tray 313. The face cover portion 311 and rear-face cover portion 312 are connected at a connection portion 314 so as to be rotated, and form a box-shaped appearance when these are closed. Also, the disc tray 313 is connected to the rear-face cover portion 312 at the connection portion 314 so as to be rotated, and almost the entirety thereof is accommodated in the inside of the rear-face cover portion 312 at the time of being closed. With generally the center portion of both faces of the disc tray 313, protruding disc holding portions 315 and 316 for fitting into and attaching to the center holes of the optical discs 1a and 1b are formed integrally.

Note that the face cover portion 311, rear-face cover portion 312, and disc tray 313 are made of a polystyrene resin material, for example. The case having such a configuration has already been circulated principally as a container case for two CDs or DVDs.

With the present embodiment, only one booster antenna is mounted, and this one booster antenna is employed so as to enable communication with the IC chips 5a and 5b mounted on the optical discs 1a and 1b by holding the reader/writer 10 against a case side face portion 317 at the connection portion 314 side.

In the same way as with the above-mentioned embodiments, a booster antenna is realized as the booster antenna unit 20 wherein the antenna coils 21 and 22 and connection wiring 24 are formed integrally on the flexible substrate. Here, as an example, the booster antenna unit 20 is fastened to the rear-face cover portion side 312 of the disc tray 313, but may be fastened to the reverse face thereof. The booster antenna unit 20 is disposed such that the disc holding portion 316 passes through the center hole 26 of the antenna coil 21, and the center of the disc holding portion 316 is identical to the center of the antenna coil 21. Thus, electromagnetic coupling between the antenna coil 21, and the antenna coils 6a and 6b of the optical discs 1a and 1b is carried out in a sure manner.

Also, the region where the antenna coil 22 at the reader/writer 10 side of the booster antenna unit 20 is formed is in a state of being perpendicular to the region where the antenna coil 21 is formed, and is disposed in contact with or close to the inner face of the case side face portion 317 at the time of the case being closed. According to such an arrangement, communication can be performed with the IC chips 5a and 5b mounted on the optical discs 1a and 1b in a good condition by holding the reader/writer 10 against the outside of the case side face portion 317.

Note that in the case of manufacturing each of the optical disc case 300a, first, following the face cover portion 311, rear-face cover portion 312, and disc tray 313 being formed by injection molding, the rear-face cover portion 312 is attached to the face cover portion 311. On the other hand, the booster antenna unit 20 is formed, and following the region where the antenna coil 22 is formed being bent, this is attached to the disc tray 313. Subsequently, the disc tray 313 is attached to the rear-face cover portion 312.

Here, with the present embodiment, an arrangement is made wherein the case side face portion 317 is integral with the rear-face cover portion 312, and the disc tray 313 is movable as to this. Therefore, with the booster antenna unit 20, the regions other than the region where the antenna coil 22 is formed are adhered to the disc tray 313. Note that so as to come into contact with the lower face of the disc tray 313 tightly as much as possible the region where the connection wiring 24 of the booster antenna unit 20 is formed is bent in accordance with the shape of the face thereof as appropriate.

According to such an optical disc case 300a, without changing the configuration and shape of an existing container case the booster antenna unit 20 subjected to bending work beforehand is simply fastened to this container case, whereby communication can be performed with the IC chips 5a and 5b mounted on the optical discs 1a and 1b by holding the reader/writer 10 against the case side face portion 317. Also, the single booster antenna unit 20 serves both as booster antennas for communication with the two IC chips 5a and 5b, so the number of components is reduced, whereby the manufacturing process is simplified, and manufacturing cost can be suppressed.

Embodiment 7-2

Figure 46:
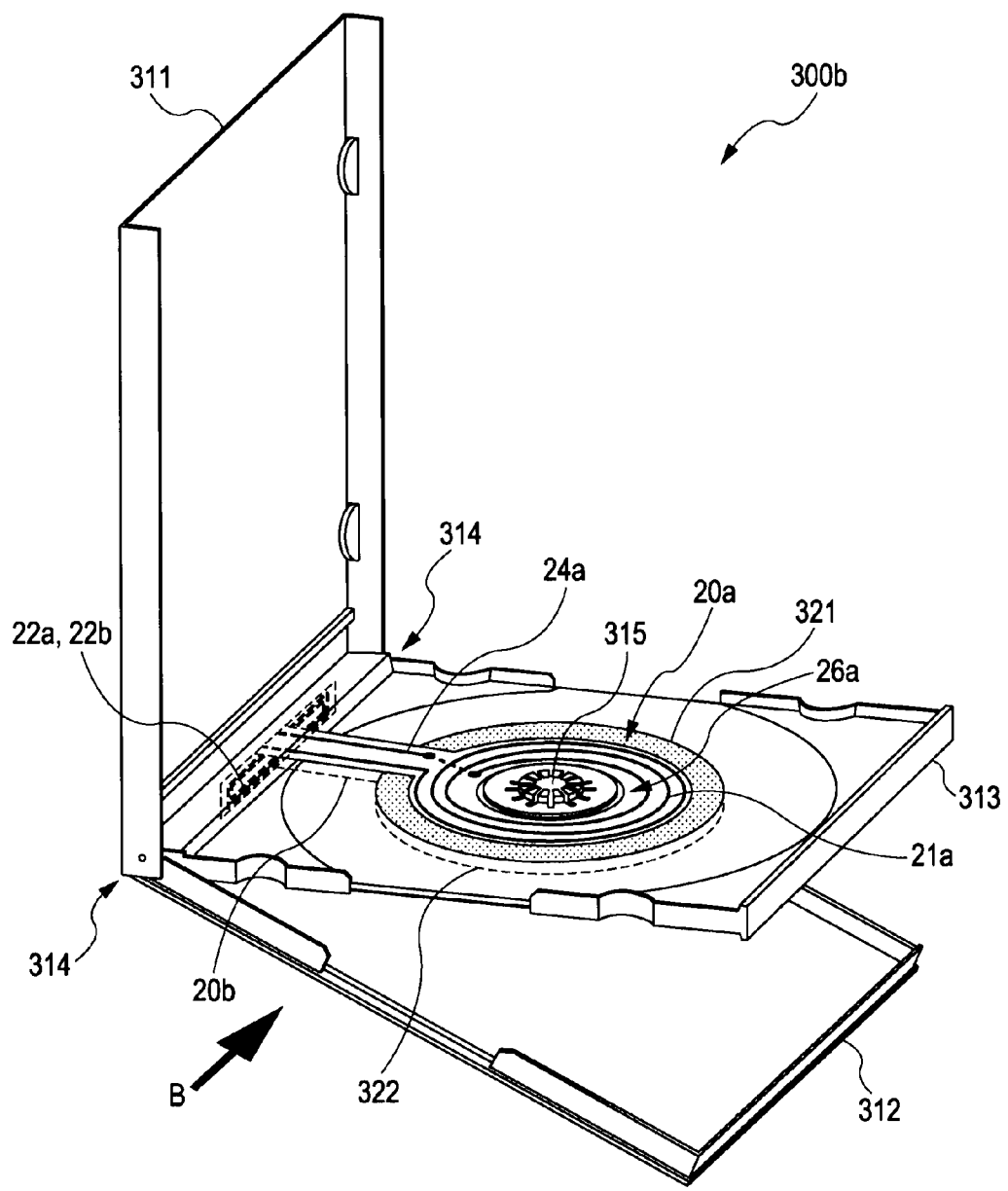
FIG. 46 is a perspective view illustrating the configuration of an optical disc case according to Embodiment 7-2.
Figure 47:
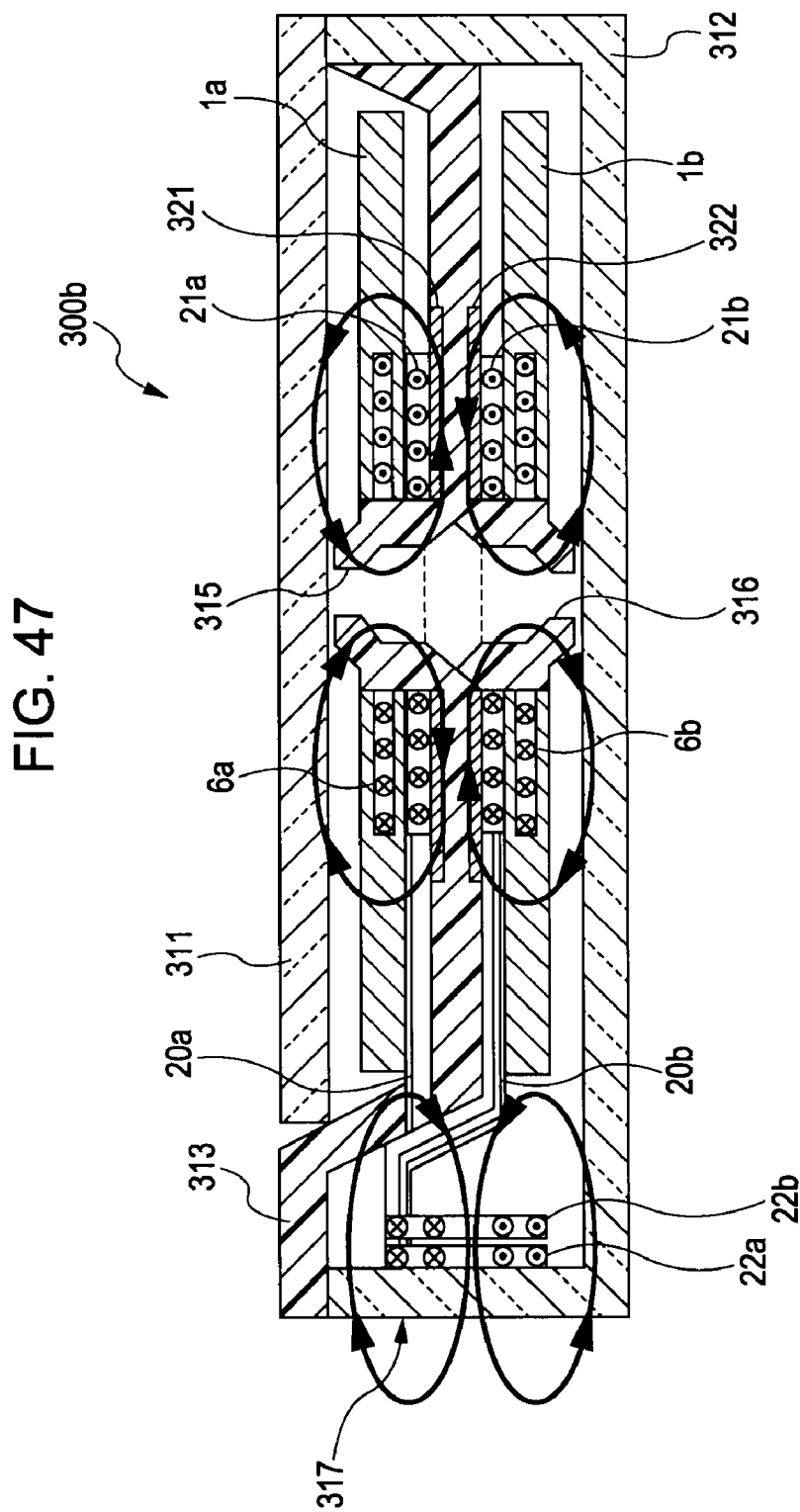
FIG. 47 is a cross-sectional view illustrating the configuration of the optical disc case according to Embodiment 7-2.

FIGS. 46 and 47 are a perspective view and a cross-sectional view illustrating the configuration of an optical disc case according to Embodiment 7-2, respectively. Note that FIG. 47 illustrates a cross section around a case center portion as viewed from arrow B in FIG. 46 (as viewed from almost near side of FIG. 46) in a state wherein optical discs are accommodated, and the case is closed. Also, in FIGS. 46 and 47, the components corresponding to those in the above-mentioned respective drawings are denoted with the same reference numerals.

The optical disc case 300b according to the present embodiment is a modification of the optical disc case 300a according to Embodiment 7-1. That is to say, the optical disc case 300b has a configuration wherein the disc tray 313 is provided between the face cover portion 311 and the rear-face cover portion 312, these are connected at the connection portion 314 so as to be rotated, and the optical discs 1a and 1b are held by both faces of the disc tray 313.

Also, with the present embodiment, the booster antenna units 20a and 20b are individually provided for communication with each of the IC chips 5a and 5b mounted on the optical discs 1a and 1b. The booster antenna unit 20a is fastened to the face cover portion 311 side of the disc tray 313, and the booster antenna unit 20b is fastened to the rear-face cover portion 312 side of the disc tray 313, respectively.

The booster antenna unit 20a is disposed such that the disc holding portion 315 passes through the center hole 26a of the antenna coil 21a, and the center of the disc holding portion 315 is identical to the center of the antenna coil 21a. Similarly, the booster antenna unit 20b is disposed such that the disc holding portion 316 passes through the center hole 26b of the antenna coil 21b, and the center of the disc holding portion 316 is identical to the center of the antenna coil 21b. Thus, electromagnetic coupling between the antenna coil 21a and antenna coil 6a, and the antenna coil 21b and antenna coil 6b is carried out in a sure manner, respectively.

Also, the regions where the antenna coils 22a and 22b at the reader/writer 10 side of the booster antenna units 20a and 20b are formed are in a state of being perpendicular to the regions where the antenna coils 21a and 21b are formed, and are disposed in contact with or close to the inner face of the case side face portion 317 at the time of the case being closed. With the present embodiment, the antenna coils 22a and 22b are disposed in a state of being overlapped, and one of the antenna coils (antenna coil 22a, here) comes into contact with the inner face of the case side face portion 317. Also, a part of the booster antenna unit 20a passes through the disc tray 313, whereby the antenna coil 22b is disposed at the rear side of the disc tray 313.

Further, a sheet-shaped high-magnetic-permeability member 321 is disposed between the antenna coil 21a and the disc tray 313, and a sheet-shaped high-magnetic-permeability member 322 is disposed between the antenna coil 21b and the disc tray 313. The high-magnetic-permeability members 321 and 322 are sheet-shaped members which are molded so as to be slightly greater than each of the regions where the antenna coils 21a and 21b of the booster antenna units 20a and 20b are formed, and serve as rolls for separating the antenna coils 21a and 21b, which are adjacently in a face-to-face state, electrically and electromagnetically.

According to such an arrangement, electromagnetic coupling of each of the antenna coil 6a as to the antenna coil 21a, and the antenna coil 6b as to the antenna coil 21b is carried out in a sure manner, and consequently, the antenna coils 21a and 21b are not readily influenced of a transmitted/received signal at the other antenna coil which sandwiches the disc tray 313 along therewith. Accordingly, communication operations at the booster antenna units 20a and 20b can be stabilized, and communication performance can be improved.

Note that an arrangement may be made wherein the high-magnetic-permeability members 321 and 322 are each fastened to the disc tray 313 side by an adhesive agent or the like, or are each fastened to the booster antenna units 20a and 20b side, and then are fastened to the disc tray 313 in a state of being integral with the booster antenna units 20a and 20b.

Also, the high-magnetic-permeability members 321 and 322 may be manufactured by a method for taking a soft magnetic material as magnetic powder, and sintering the magnetic powder thereof, or a method for mixing the magnetic powder thereof in a binder to shape this, or the like. As for a soft magnetic material, for example, sendust (Fe—Al—Si), permalloy (Ni—Fe), amorphous alloy (Fe—Si—B, Co—Fe—Si—B, etc.), ferrite (Ni—Zn ferrite, Mn—Zn ferrite, etc.), and so forth can be employed.

As for a method for sintering magnetic powder (method for forming a sintered object), for example, a method can be employed wherein following metal paste formed by distributing the impalpable powder of a ferrite material in an organic solvent being applied in a sheet shape, thermolysis of an organic solvent is carried out, thereby obtaining an sintering ferrite plate subjected to actual baking. Also, as for a method for mixing magnetic powder in a binder to shape this, for example, a method can be employed wherein magnetic powder is mixed in a binder using a synthetic resin material such as nylon 12, PPS (polyphenylene sulfide), polyethylene, or the like as a binder, and then this is molded in a sheet shape or plate shape by injection molding or the like.

Also, a sheet member employing a similar magnetic material has been widely circulated as a RFID magnetic sheet, an electromagnetic noise suppression sheet, or the like, for example, and the above-mentioned high-magnetic-permeability members 321 and 322 can also be formed by employing such an existing sheet member.

Embodiment 7-3

Figure 48:
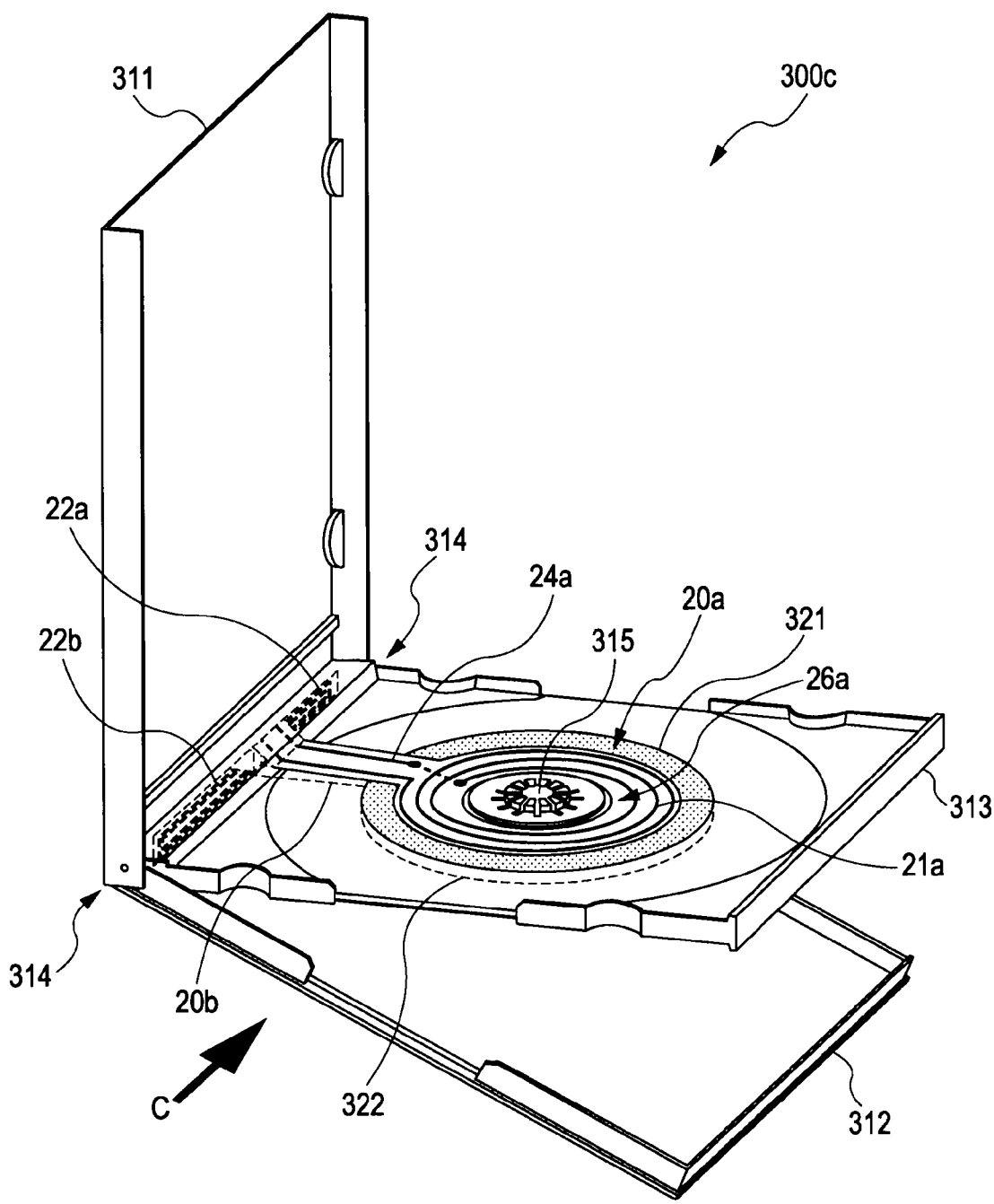
FIG. 48 is a perspective view illustrating the configuration of an optical disc case according to Embodiment 7-3.
Figure 49:
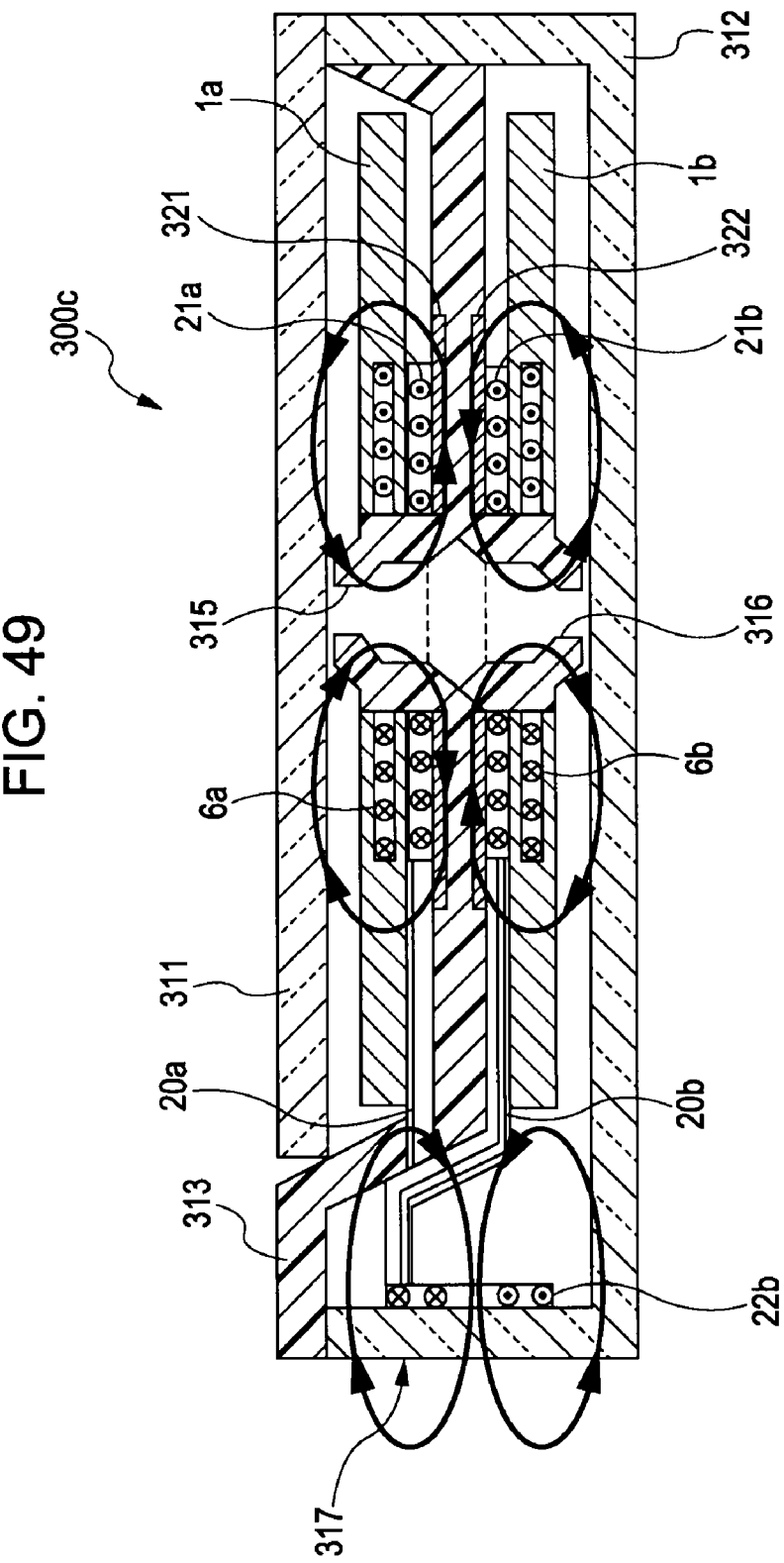
FIG. 49 is a cross-sectional view illustrating the configuration of the optical disc case according to Embodiment 7-3.

FIGS. 48 and 49 are a perspective view and a cross-sectional view illustrating the configuration of an optical disc case according to Embodiment 7-3, respectively. Note that FIG. 49 illustrates a cross section around a case center portion as viewed from arrow C in FIG. 48 (as viewed from almost near side of FIG. 48) in a state wherein optical discs are accommodated, and the case is closed. Also, in FIGS. 48 and 49, the components corresponding to those in FIGS. 46 and 47 are denoted with the same reference numerals.

The optical disc case 300c according to the present embodiment is a modification of the optical disc case 300b according to Embodiment 7-2. That is to say, the optical disc case 300c has a configuration wherein the disc tray 313 is provided between the face cover portion 311 and the rear-face cover portion 312, these are connected at the connection portion 314 so as to be rotated, and the optical discs 1a and 1b are held by both faces of the disc tray 313. Also, the booster antenna units 20a and 20b are fastened to both faces of the disc tray 313, and the high-magnetic-permeability members 321 and 322 are each provided between the disc tray 313 and each of the booster antenna units 20a and 20b.

The configuration of the present embodiment differs from that of Embodiment 7-2 in that with the optical disc case 300c, the antenna coils 22a and 22b are arrayed in parallel so as not to be overlapped. In the case of this placement, when the antenna coil 11 of the reader/writer 10 is directed to the case side face portion 317 face to face, the antenna coil 11 of the reader/writer 10 is brought close to either of the region where the antenna coil 22a is formed, or the region where the antenna coil 22b is formed, of the case side face portion 317, whereby electromagnetic coupling between the antenna coil 11 and either of the antenna coil 22a or 22b is increased. Accordingly, even if the IC chips 5a and 5b have no function corresponding to simultaneous communication, communication can be performed selectively between the reader/writer 10 and a desired IC chip 5a or 5b depending on the position against which the reader/writer 10 is holding.

Embodiment 8-1

Figure 50:
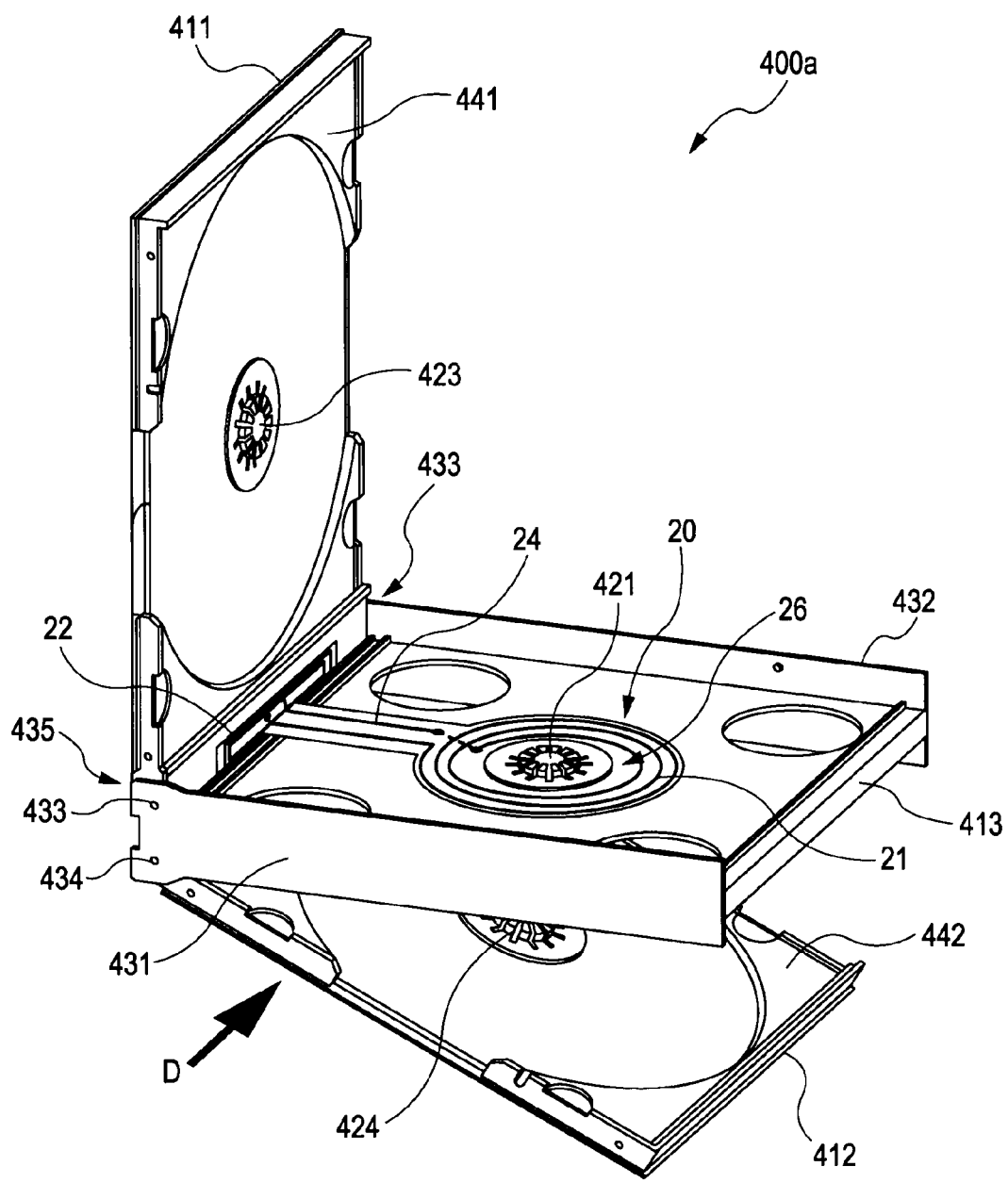
FIG. 50 is a perspective view illustrating the configuration of an optical disc case according to Embodiment 8-1.
Figure 51:
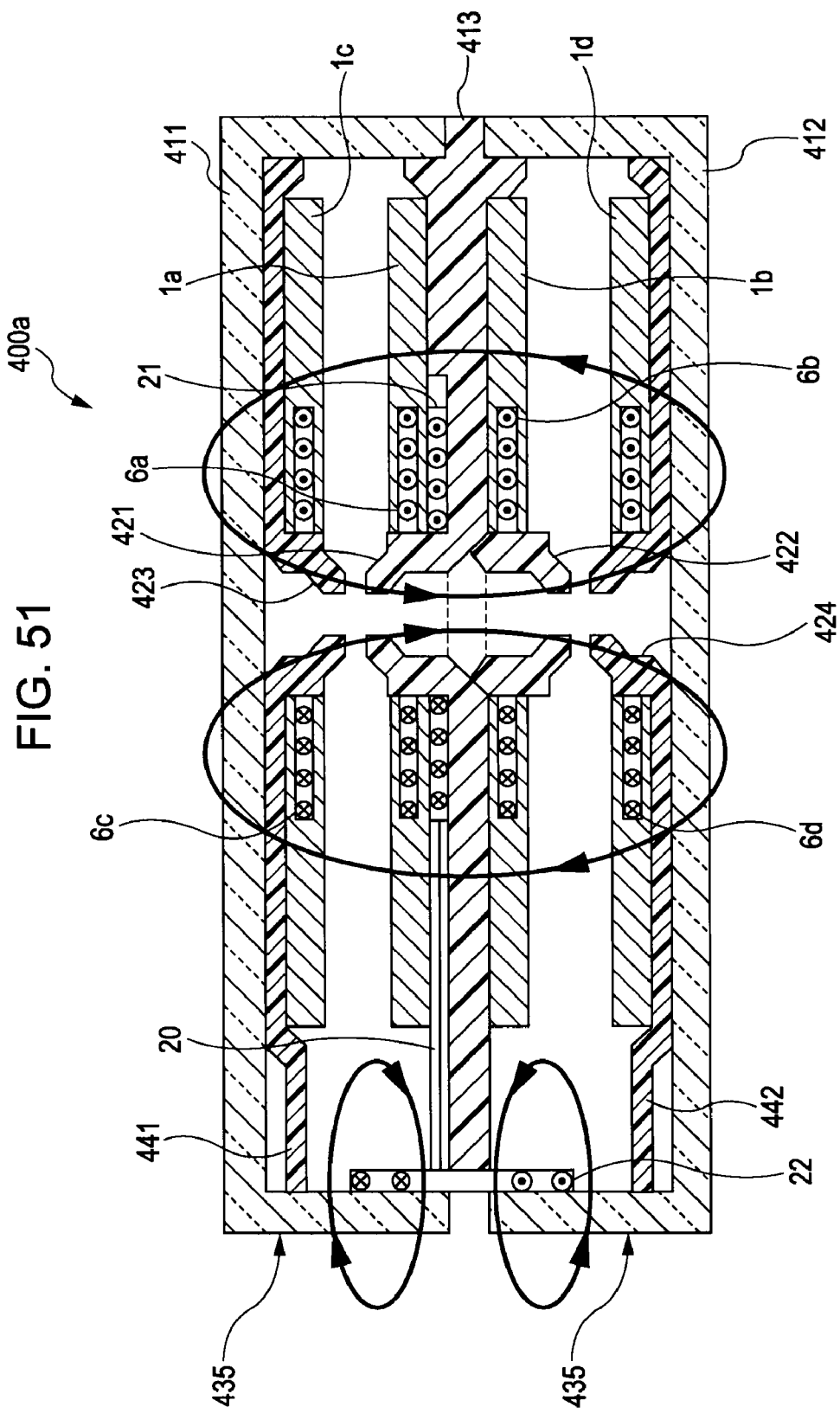
FIG. 51 is a cross-sectional view illustrating the configuration of the optical disc case according to Embodiment 8-1.

FIGS. 50 and 51 are a perspective view and a cross-sectional view illustrating the configuration of an optical disc case according to Embodiment 8-1, respectively. Note that FIG. 51 illustrates a cross section around a case center portion as viewed from arrow D in FIG. 50 (as viewed from almost near side of FIG. 50) in a state wherein optical discs are accommodated, and the case is closed. Also, in FIGS. 50 and 51, the components corresponding to those in the above-mentioned respective drawings are denoted with the same reference numerals.

FIGS. 50 and 51 illustrate an optical disc case 400a capable of accommodating four optical discs 1a through 1d. The optical disc case 400a is principally configured of a face cover portion 411, a rear-face cover portion 412, and an intermediate tray portion 413, and these members make up a box-shaped appearance when closing the case.

With the intermediate tray portion 413, both faces thereof are taken as disc holding faces for holding the optical discs 1a and 1b, and protruding holding portions 421 and 422 for fitting into and attaching to the center holes of the optical discs 1a and 1b are formed in an integral manner generally at the center portions of the respective disc holding faces. Also, case side face portions 431 and 432 having the height necessary for accommodating two optical discs as to both side directions of the disc holding faces are formed in an integral manner at both side portions of the disc holding faces.

Connection portions 433 and 434 are provided in parallel in the height direction in the drawing at one end of the case side face portions 431 and 432. Subsequently, the face cover portion 411 is connected to the connection portion 433 so as to be rotated, and the rear-face cover portion 412 is connected to the connection portion 434 so as to be rotated. That is to say, when the face cover portion 411 and rear-face cover portion 412 are rotated centered on the connection portions 433 and 434 respectively, and become a state of facing the disc holding faces of the intermediate tray portion 413, the inside thereof is closed.

Further, a surface tray portion 441 and a rear-face tray portion 442 are fitted into and attached to the inner faces of the face cover portion 411 and rear-face cover portion 412 (the faces to become the intermediate tray portion sides when closing the case). The inner side face of the surface tray portion 441 (the face opposite of the face cover portion 411) is taken as a disc holding face, and a protruding disc holding portion 423 for fitting into and attaching to the center hold of the optical disc 1c is formed in an integral manner generally at the center portion thereof. Similarly, the inner side face of the rear-face tray portion 442 (the face opposite of the rear-face cover portion 412) is also taken as a disc holding face, and a protruding disc holding portion 424 for fitting into and attaching to the center hold of the optical disc 1d is formed in an integral manner generally at the center portion thereof.

Note that the face cover portion 411, rear-face cover portion 412, intermediate tray 413, surface tray portion 441, and rear-face tray portion 442 are made of a polystyrene resin material, for example. The case having such a configuration has already been circulated principally as a container case for four CDs.

With the present embodiment, only one booster antenna is mounted as to the optical disc case 400a having such a configuration. This one booster antenna is employed so as to enable communication with the IC chips mounted on the optical discs 1a through 1d by holding the reader/writer 10 against a case side face portion 435 in the direction where the face cover portion 411, rear-face cover portion 412, and intermediate tray portion 413 are connected.

In the same way as with the above-mentioned embodiments, a booster antenna is realized as the booster antenna unit 20 wherein the antenna coils 21 and 22 and connection wiring 24 are formed integrally on the flexible substrate. Here, as an example, the booster antenna unit 20 is fastened to the face cover portion 411 of the intermediate tray portion 413, but may be fastened to the reverse face thereof. The booster antenna unit 20 is disposed such that the disc holding portion 421 passes through the center hole 26 of the antenna coil 21, and the center of the disc holding portion 421 is identical to the center of the antenna coil 21. Thus, electromagnetic coupling between the antenna coil 21, and the antenna coils 6a through 6d of the optical discs 1a through 1d is carried out in a sure manner.

Also, the region where the antenna coil 22 at the reader/writer 10 side of the booster antenna unit 20 is formed is in a state of being perpendicular to the region where the antenna coil 21 is formed, and is disposed in contact with or close to the inner face of the case side face portion 435 at the time of the case being closed. According to such an arrangement, communication can be performed with the IC chips mounted on the optical discs 1a through 1d in a good condition by holding the reader/writer 10 against the outside of the case side face portion 435.

Note that the optical disc case 400a can be manufactured with the following processes, for example. First, the face cover portion 411, rear-face cover portion 412, and intermediate tray portion 413, surface tray portion 441, and rear-face tray portion 442 are formed by injection molding. Also, separately from those, the booster antenna unit 20 is formed. Next, the surface tray portion 441 is attached to the face cover portion 411, and the rear-face tray portion 442 is attached to the rear-face cover portion 412. On the other hand, the booster antenna unit 20 is fastened to the intermediate tray portion 413. Next, the face cover portion 411 is connected to the intermediate tray portion 413, and the rear-face cover portion 412 is attached to the intermediate tray portion 413.

According to such an optical disc case 400a, without changing the configuration and shape of an existing container case the booster antenna unit 20 is simply fastened to this container case, whereby communication can be performed with the IC chips mounted on the optical discs 1a through 1d by holding the reader/writer 10 against the case side face portion 435 side. Also, the single booster antenna unit 20 serves both as booster antennas for communication with the four IC chips, so the number of components is reduced, whereby the manufacturing process is simplified, and manufacturing cost can be suppressed.

Embodiment 8-2

Figure 52:
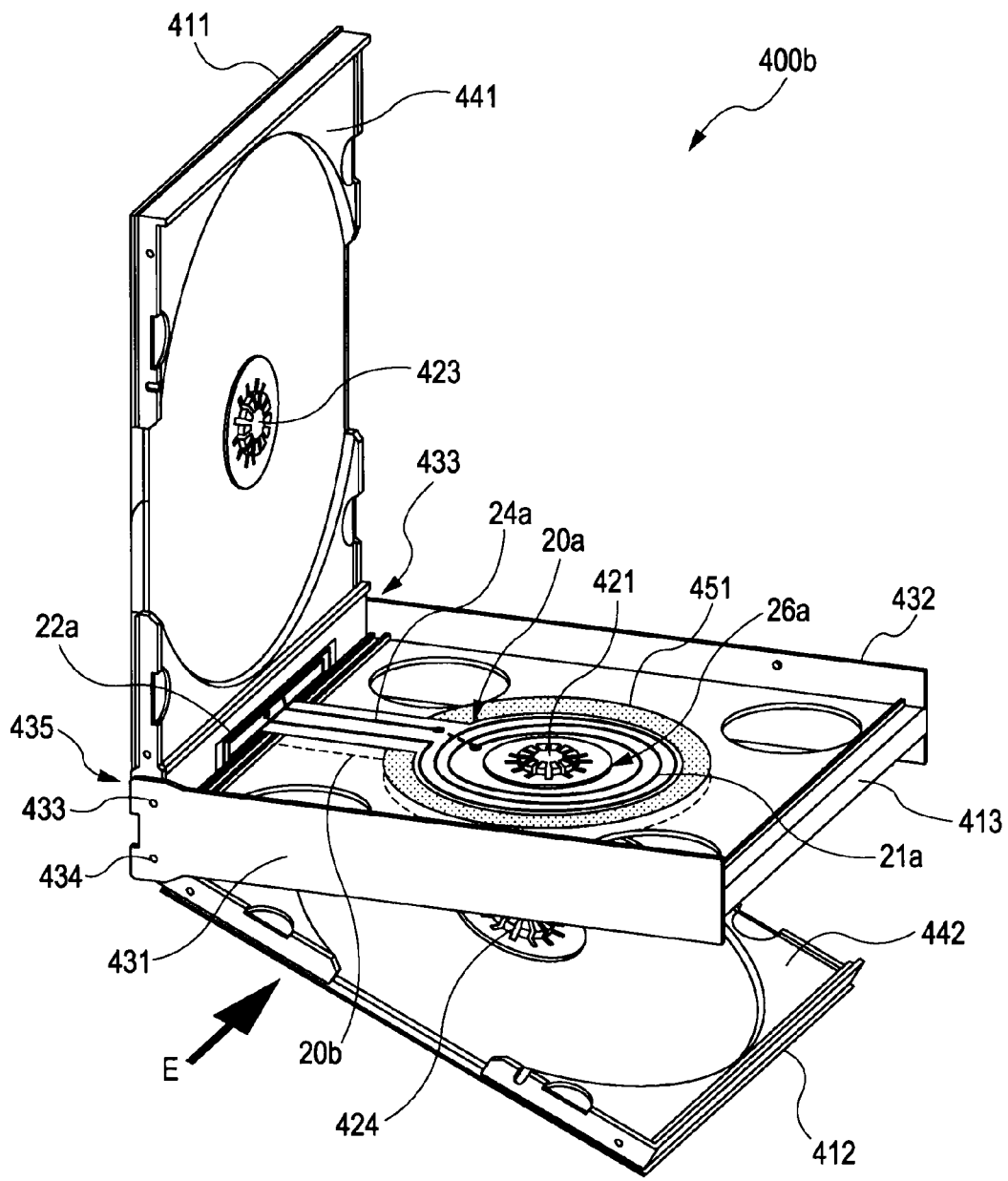
FIG. 52 is a perspective view illustrating the configuration of an optical disc case according to Embodiment 8-2.
Figure 53:
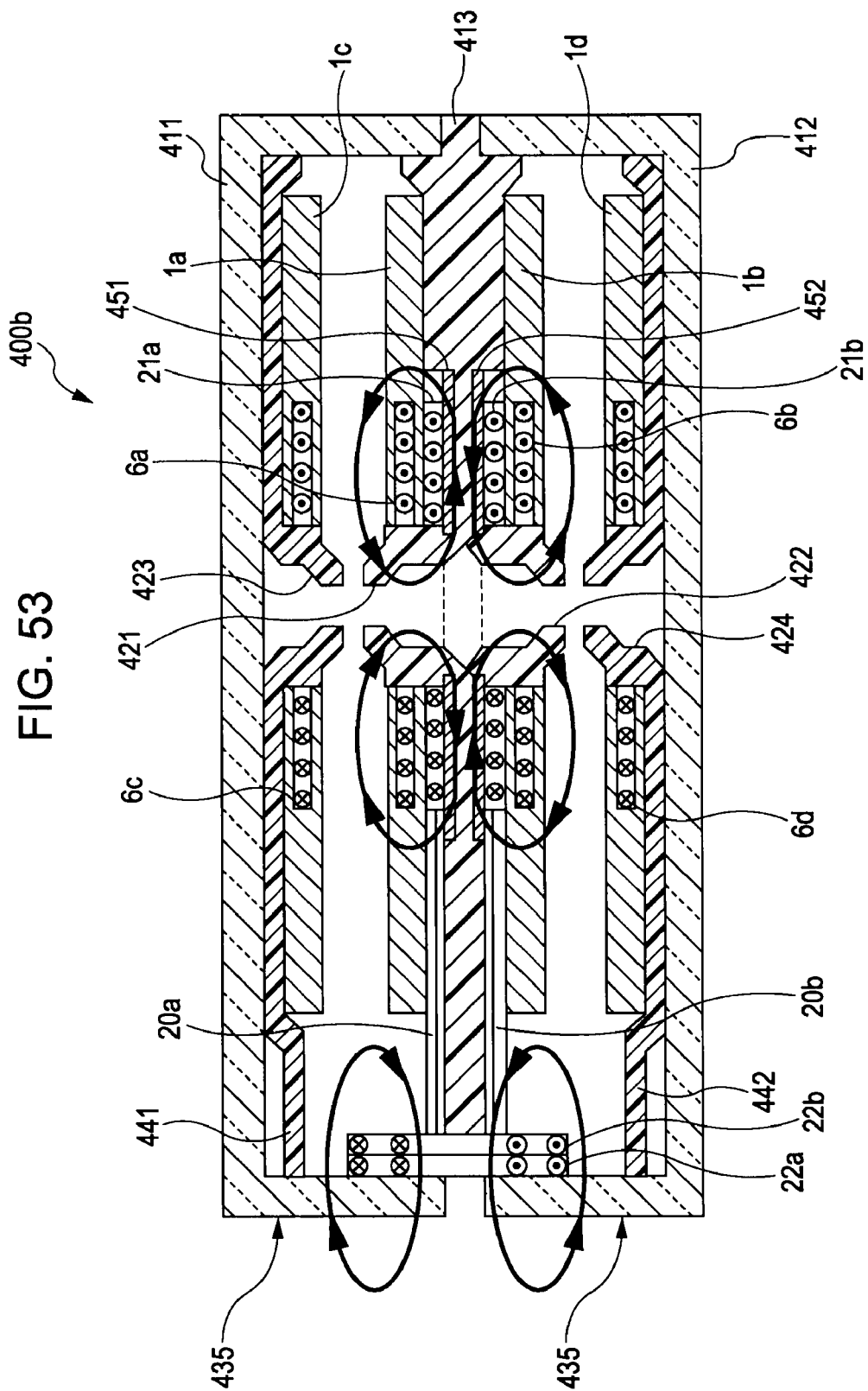
FIG. 53 is a cross-sectional view illustrating the configuration of the optical disc case according to Embodiment 8-2.

FIGS. 52 and 53 are a perspective view and a cross-sectional view illustrating the configuration of an optical disc case according to Embodiment 8-2, respectively. Note that FIG. 53 illustrates a cross section around a case center portion as viewed from arrow E in FIG. 52 (as viewed from almost near side of FIG. 52) in a state wherein optical discs are accommodated, and the case is closed. Also, in FIGS. 52 and 53, the components corresponding to those in the above-mentioned respective drawings are denoted with the same reference numerals.

The optical disc case 400b according to the present embodiment is a modification of the optical disc case 400a according to Embodiment 8-1, and the configuration of the case body is the same as that in the case of Embodiment 8-1. Note however, the present embodiment differs from Embodiment 8-1 in that the two booster antenna units 20a and 20b are mounted on both faces of the intermediate tray portion 413 respectively, and further high-magnetic-permeability members 451 and 452 are disposed between the units.

That is to say, the booster antenna unit 20a is disposed such that the disc holding portion 421 passes through the center hole 26a of the antenna coil 21a, and the center of the disc holding portion 421 is identical to the center of the antenna coil 21a. Similarly, the booster antenna unit 20b is disposed such that the disc holding portion 422 passes through the center hole of the antenna coil 21b, and the center of the disc holding portion 422 is identical to the center of the antenna coil 21b.

Also, the regions where the antenna coils 22a and 22b at the reader/writer 10 side of the booster antenna units 20a and 20b are formed are in a state of being perpendicular to the regions where the antenna coils 21a and 21b are formed, and are disposed in contact with or close to the inner face of the case side face portion 435 at the time of the case being closed. With the present embodiment, the antenna coils 22a and 22b are disposed in a state of being overlapped, and the other antenna coil (antenna coil 22a, here) comes into contact with the inner face of the case side face portion 435 at the time of the case being closed.

Further, the sheet-shaped high-magnetic-permeability member 451 is disposed between the antenna coil 21a and the intermediate tray portion 413, and the sheet-shaped high-magnetic-permeability member 452 is disposed between the antenna coil 21b and the intermediate tray portion 413. The high-magnetic-permeability members 451 and 452 are sheet-shaped members which are molded so as to be slightly greater than each of the regions where the antenna coils 21a and 21b of the booster antenna units 20a and 20b are formed, and serve as rolls for separating the antenna coils 21a and 21b, which are adjacently in a face-to-face state, electrically and electromagnetically. Note that the material and manufacturing method of the high-magnetic-permeability members 451 and 452 are the same as those described in the above-mentioned Embodiment 7-2.

According to such an arrangement, electromagnetic coupling of each of the antenna coil 6a as to the antenna coil 21a, and the antenna coil 6b as to the antenna coil 21b is carried out in a sure manner, and consequently, the antenna coils 21a and 21b are not readily influenced of a transmitted/received signal at the other antenna coil which sandwiches the intermediate tray portion 413 along therewith. Accordingly, communication operations at the booster antenna units 20a and 20b can be stabilized, and communication performance can be improved.

Note that an arrangement may be made wherein the high-magnetic-permeability members 321 and 322 are each fastened to the intermediate tray portion 413 side by an adhesive agent or the like, or are each fastened to the booster antenna units 20a and 20b side, and then are fastened to the intermediate tray portion 413 in a state of being integral with the booster antenna units 20a and 20b.

Embodiment 8-3

Figure 54:
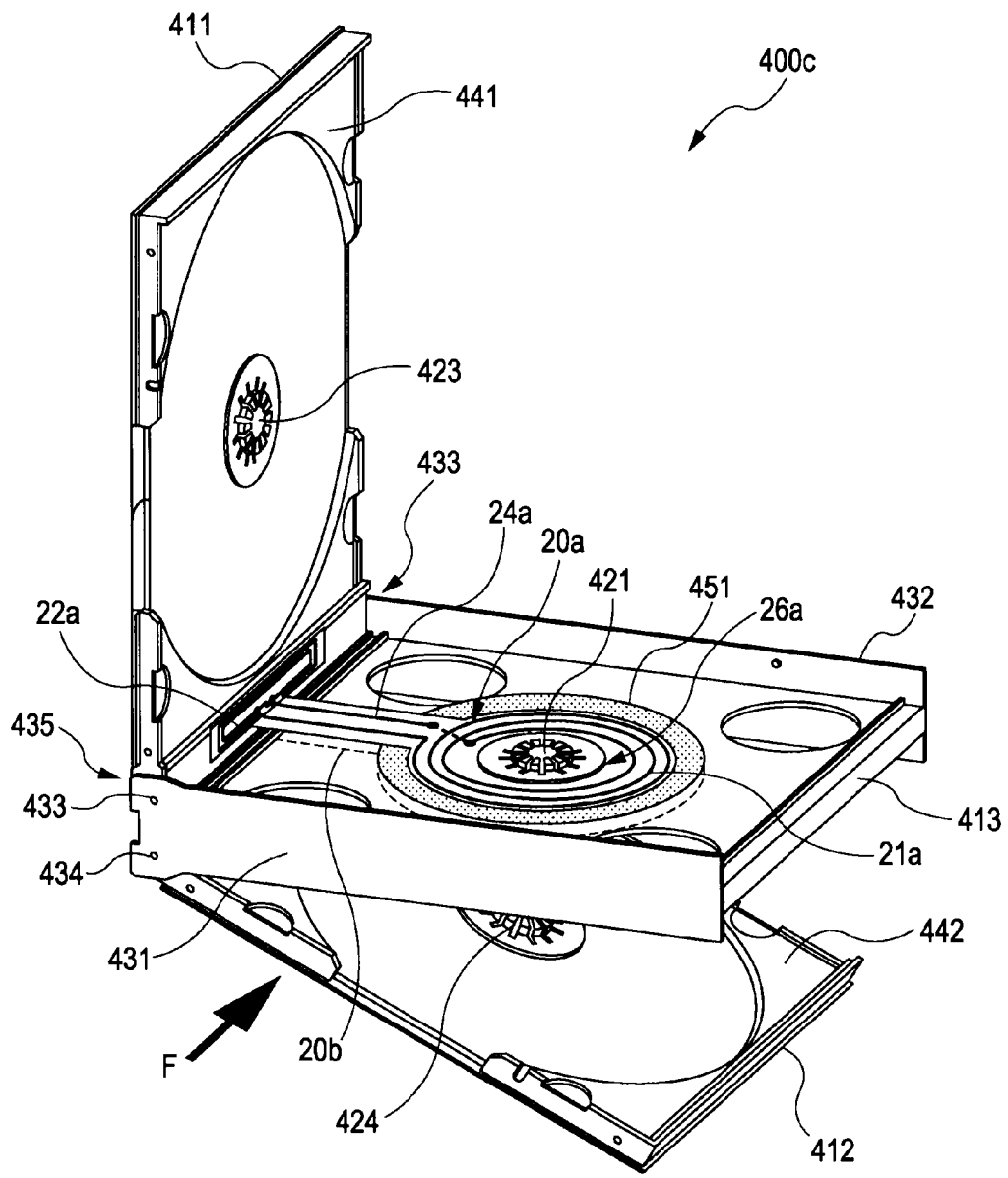
FIG. 54 is a perspective view illustrating the configuration of an optical disc case according to Embodiment 8-3.
Figure 55:
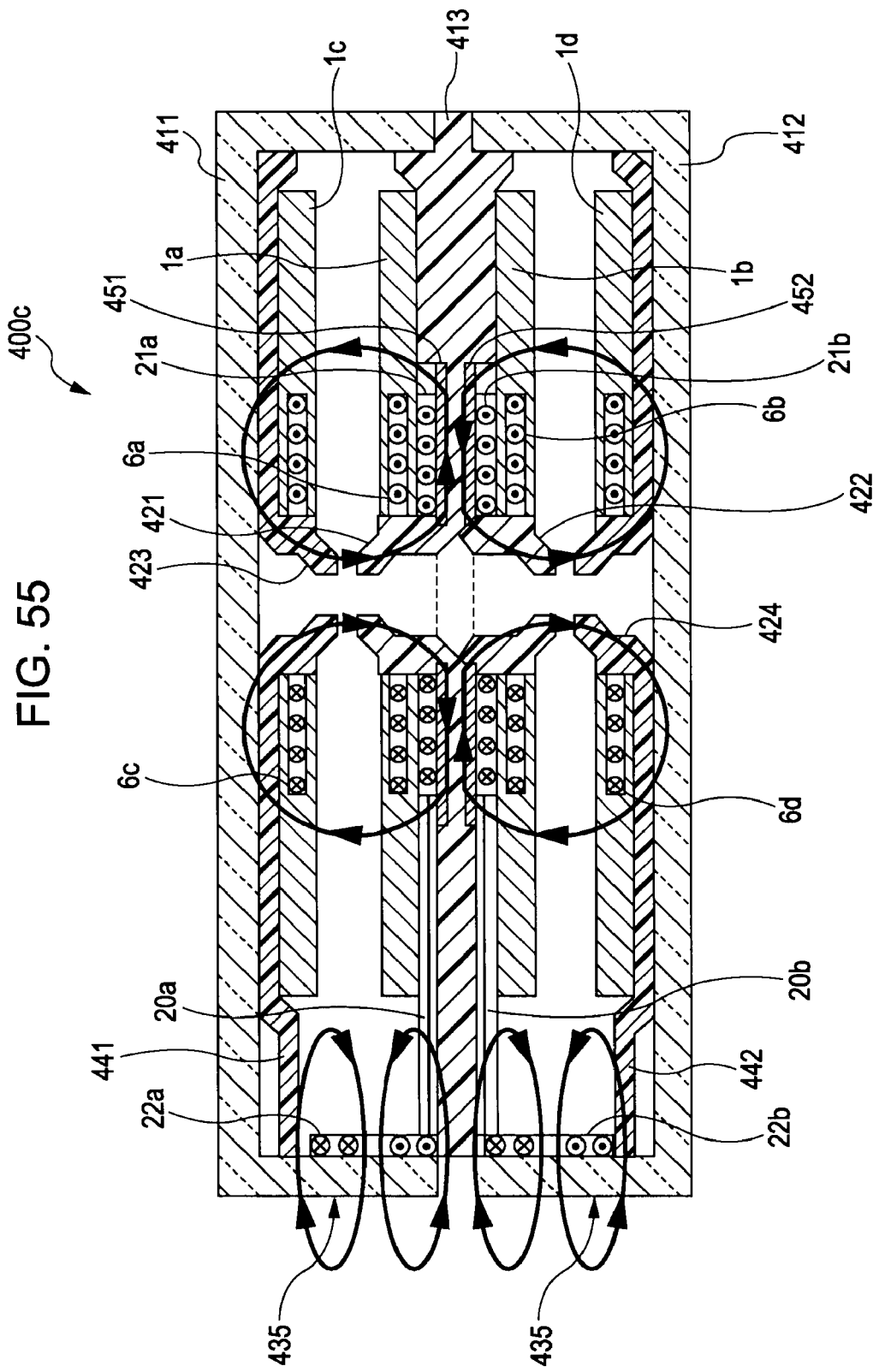
FIG. 55 is a cross-sectional view illustrating the configuration of the optical disc case according to Embodiment 8-3.

FIGS. 54 and 55 are a perspective view and a cross-sectional view illustrating the configuration of an optical disc case according to Embodiment 8-2, respectively. Note that FIG. 55 illustrates a cross section around a case center portion as viewed from arrow F in FIG. 54 (as viewed from almost near side of FIG. 54) in a state wherein optical discs are accommodated, and the case is closed. Also, in FIGS. 54 and 55, the components corresponding to those in the respective drawings of FIGS. 52 and 53 are denoted with the same reference numerals.

The optical disc case 400c according to the present embodiment is a modification of the optical disc case 400b according to Embodiment 8-2, which is the same as Embodiment 8-2 regarding the configuration of the case body, in that the two booster antenna units 20a and 20b are mounted on both faces of the intermediate tray portion 413 respectively, and in that the high-magnetic-permeability members 451 and 452 are disposed between the units. Note however, the present embodiment differs from Embodiment 8-2 in that the antenna coils 22a and 22b are disposed on the respective faces of the intermediate tray portion 413 separately so as not to be overlapped.

With the optical disc case 400c as well, communication can be performed with the IC chip mounted on each of the optical discs 1a through 1d in a good condition by holding the reader/writer 10 against the outer side of the case side face portion 435 at the time of the case being closed.

Embodiment 8-4

Figure 56:
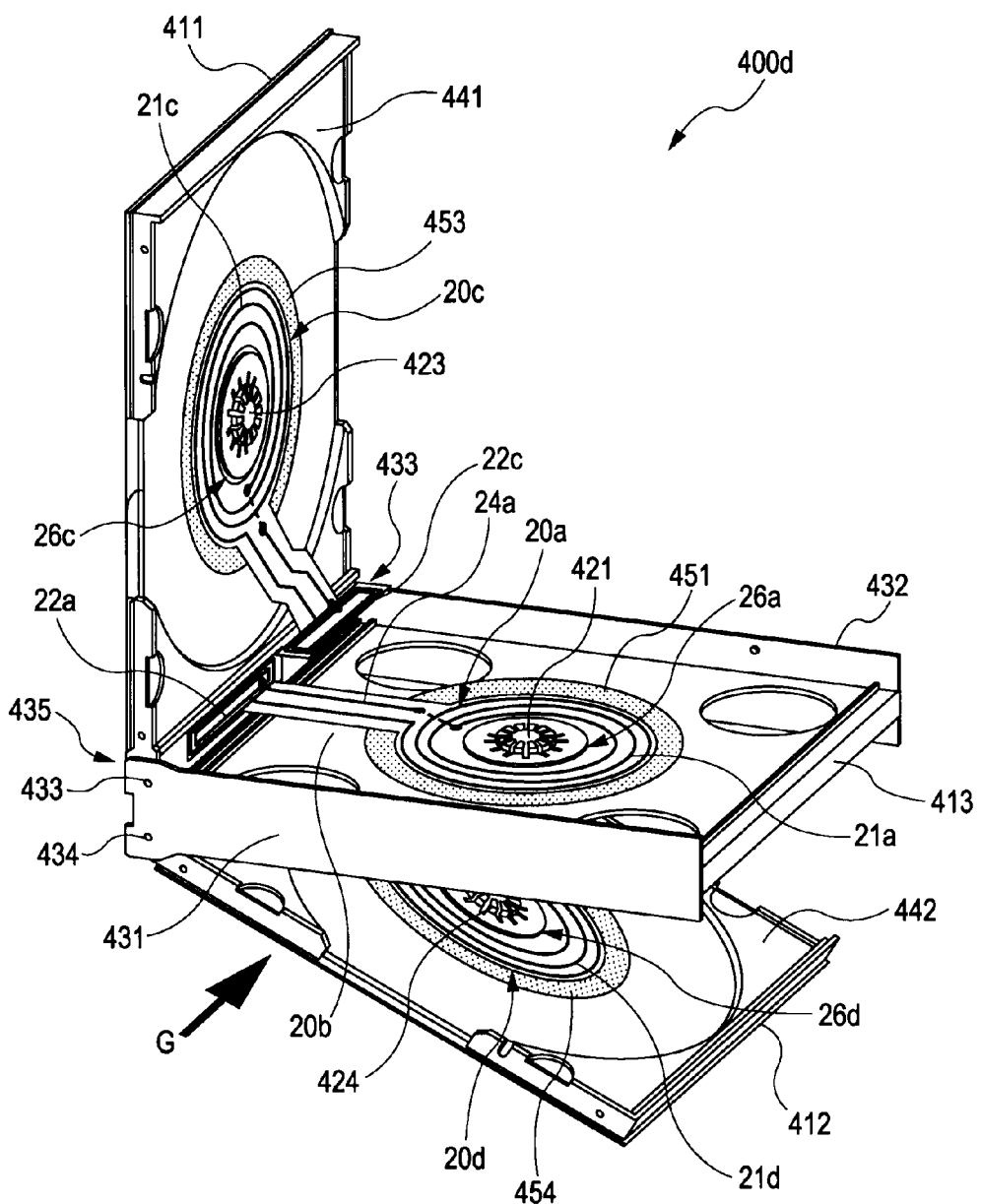
FIG. 56 is a perspective view illustrating the configuration of an optical disc case according to Embodiment 8-4.
Figure 57:
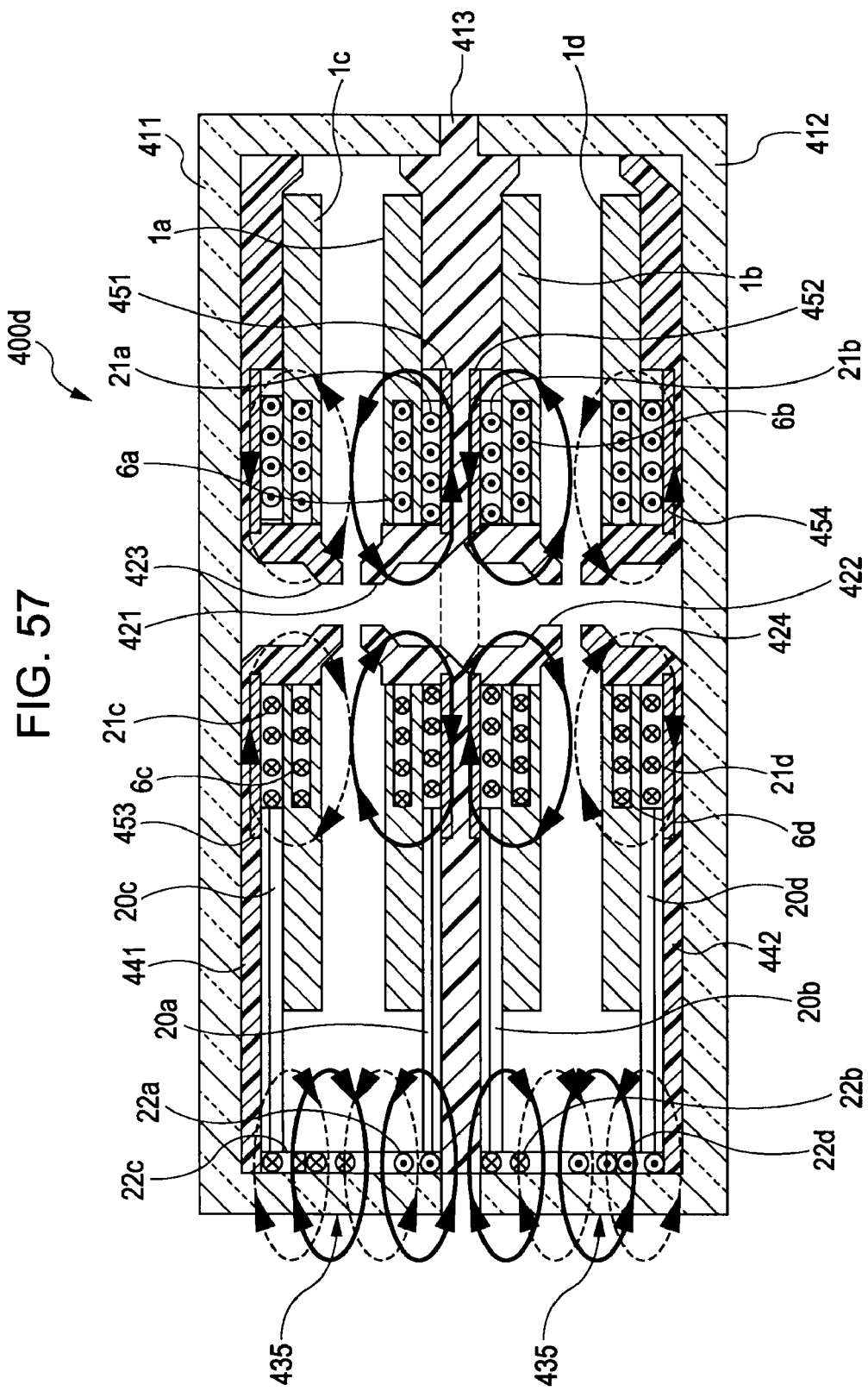
FIG. 57 is a cross-sectional view illustrating the configuration of the optical disc case according to Embodiment 8-4.

FIGS. 56 and 57 are a perspective view and a cross-sectional view illustrating the configuration of an optical disc case according to Embodiment 8-4, respectively. Note that FIG. 57 illustrates a cross section around a case center portion as viewed from arrow G in FIG. 56 (as viewed from almost near side of FIG. 56) in a state wherein optical discs are accommodated, and the case is closed. Also, in FIGS. 56 and 57, the components corresponding to those in the respective drawings of FIGS. 52 through 55 are denoted with the same reference numerals.

The optical disc case 400d according to the present embodiment is a modification of the optical disc case 400c according to Embodiment 8-3, and the configuration of the case body is the same as that in the case of Embodiment 8-3. With the optical disc case 400d, in addition to the booster antenna units 20a and 20b being fastened to both faces of the intermediate tray portion 413 respectively, booster antenna units 20c and 20d are fastened to the inner face of the surface tray portion 441 and the inner face of the rear-face tray portion 442 respectively. Note that in the same way as with Embodiment 8-3, the high-magnetic-permeability members 451 and 452 are disposed between the booster antenna units 20a and 20b.

The basic configurations of the booster antenna units 20c and 20d are the same as those of the booster antenna units 20a and 20b. The booster antenna unit 20c is disposed such that the disc holding portion 423 passes through the center hole 26c of the antenna coil 21c for communication with the IC chip on the optical disc 1c, and the center of the disc holding portion 423 is identical to the center of the antenna coil 21c. Similarly, the booster antenna unit 20d is disposed such that the disc holding portion 424 passes through the center hole of the antenna coil 21d, and the center of the disc holding portion 424 is identical to the center of the antenna coil 21d.

Also, the regions where the antenna coils 22c and 22d at the reader/writer 10 side of the booster antenna units 20c and 20d are formed are bent beforehand so as to be perpendicular to the regions where the antenna coils 21c and 21d are formed, and are disposed so as to be in contact with or close to the inner face of the case side face portion 435 at the time of the case being closed. With the present embodiment, the antenna coil 22c is disposed in parallel with the antenna coil 22a, and the antenna coil 22d is disposed in parallel with the antenna coil 22b. Note that each pair of the antenna coils may be disposed in a state of being overlapped.

Like the present embodiment, in the case of the antenna coils 22a through 22d being disposed so as not to be overlapped, when the antenna coil 11 of the reader/writer 10 is directed to the case side face portion 435 face to face, the antenna coil 11 of the reader/writer 10 is brought close to any one of the region where the antenna coil 22a is disposed, the region where the antenna coil 22b is disposed, the region where the antenna coil 22c is disposed, and the region where the antenna coil 22d is disposed, of the case side face portion 435, whereby the degree of electromagnetic coupling between the antenna coil 11 and any one of the antenna coils 22a through 22d can be increased. Accordingly, even if the IC chips 5a through 5d have no function corresponding to simultaneous communication, communication can be performed selectively between the reader/writer 10 and a desired IC chip depending on the position against which the reader/writer 10 is holding.

Subsequently, like the present embodiment, providing the booster antenna units 20c and 20d enables each of electromagnetic coupling of the antenna coil 6c as to the antenna coil 21c, and electromagnetic coupling of the antenna coil 6d as to the antenna coil 21d to be carried out in a sure manner. At this time, like Embodiment 8-3, the intensity of electric waves to be transmitted/received between the antenna coils 21a and 21b is increased as compared with the case of the antenna coils 6c and 6d being electromagnetic-coupled by the antenna coils 21a and 21b respectively. Accordingly, communication can be performed with all of the IC chips 5a through 5d mounted on the optical discs 1a through 1d in a further good condition by holding the reader/writer 10 against the outer side of the case side face portion 435 at the time of the case being closed.

Also, with the above-mentioned Embodiments 8-1 through 8-4, an arrangement has been made wherein the surface tray portion 441 and rear-face tray portion 442 are fitted into and attached to the face cover portion 411 and rear-face cover portion 412 respectively, but a container case having a configuration wherein the disc holding portions 423 and 424 are formed integral with the face cover portion 411 and rear-face cover portion 412 respectively without employing the surface tray portion 441 and rear-face tray portion 442 has been widely circulated. Even as to the container case having such a configuration, attaching a single or multiple booster antenna units enables the same advantages as those in the above-mentioned embodiments to be obtained.

Incidentally, with the above-mentioned example in Embodiment 8-4, the sheet-shaped high-magnetic-permeability members 453 and 454 are also disposed between the booster antenna unit 20c and surface tray portion 441, and between the booster antenna unit 20d and rear-face tray portion 442 respectively. The high-magnetic-permeability members 453 and 454 are formed greater than the regions where the antenna coils 22c and 22d are formed, in the same way as with the high-magnetic-permeability members 451 and 452.

Providing the high-magnetic-permeability members 453 and 454 enables the antenna coils within the adjacent optical disc cases 400d to be separated electrically and electromagnetically, in the case of the optical disc cases 400d being arrayed and accommodated in a storage rack for example. Accordingly, when the reader/writer 10 is brought close to the outer sides of the case side face portions 435 of the optical disc cases 400d, communication can be performed further in a stable manner with the IC chip a desired optical disc case 400d (e.g., the optical disc case 400d closest to the reader/writer 10).

Thus, in the case of the optical disc cases including the above-mentioned booster antennas being arrayed in parallel in a storage rack or the like, of the booster antennas within each case, the antenna coils take on communication with an IC chip are consequently disposed close to each other in a state wherein the coil faces thereof are in parallel. With such a situation, even if communication is attempted via a single booster antenna from the external reader/writer 10, through not only the booster antenna thereof but also the booster antenna of another adjacent optical disc case, magnetic field for communication is induced to the IC chips within the optical disc case thereof in some cases. In this case, normal communication with a desired IC chip cannot be performed due to shortage of power supply as to the IC chips within each case, or occurrence of a collision state, or the like. Also, in the case of the IC chip corresponding to another adjacent antenna coil having higher communication performance, unintended communication with the IC chip thereof is carried out, and communication with a desired IC chip cannot be performed.

On the other hand, disposing a high-magnetic-permeability member on the outer face parallel to the principal face of the optical disc case (however, in the case of an antenna coil being disposed on the face thereof, outer side than the antenna coil thereof) enables the antenna coils within adjacent optical disc cases to be separated electrically and electromagnetically, and communication with a desired IC chip to be performed in a sure manner. Thus, an arrangement for disposing a high-magnetic-permeability member is not restricted to the above-mentioned Embodiment 8-4, and rather can be applied to all of the above-mentioned embodiments. Also, in this case, a high-magnetic-permeability member may be disposed on one outer face determined beforehand of the outer faces parallel to the principal face (e.g., the outer face at the side closer to the booster antenna unit), and rather it is desirable for the high-magnetic-permeability member to be disposed on the outer faces of both sides, if possible.

Arrangements in the case of a high-magnetic-permeability member being thus disposed on the outer face member of an optical disc case will be exemplified as Embodiments 9-1 through 9-6.

Embodiment 9-1

Figure 58:
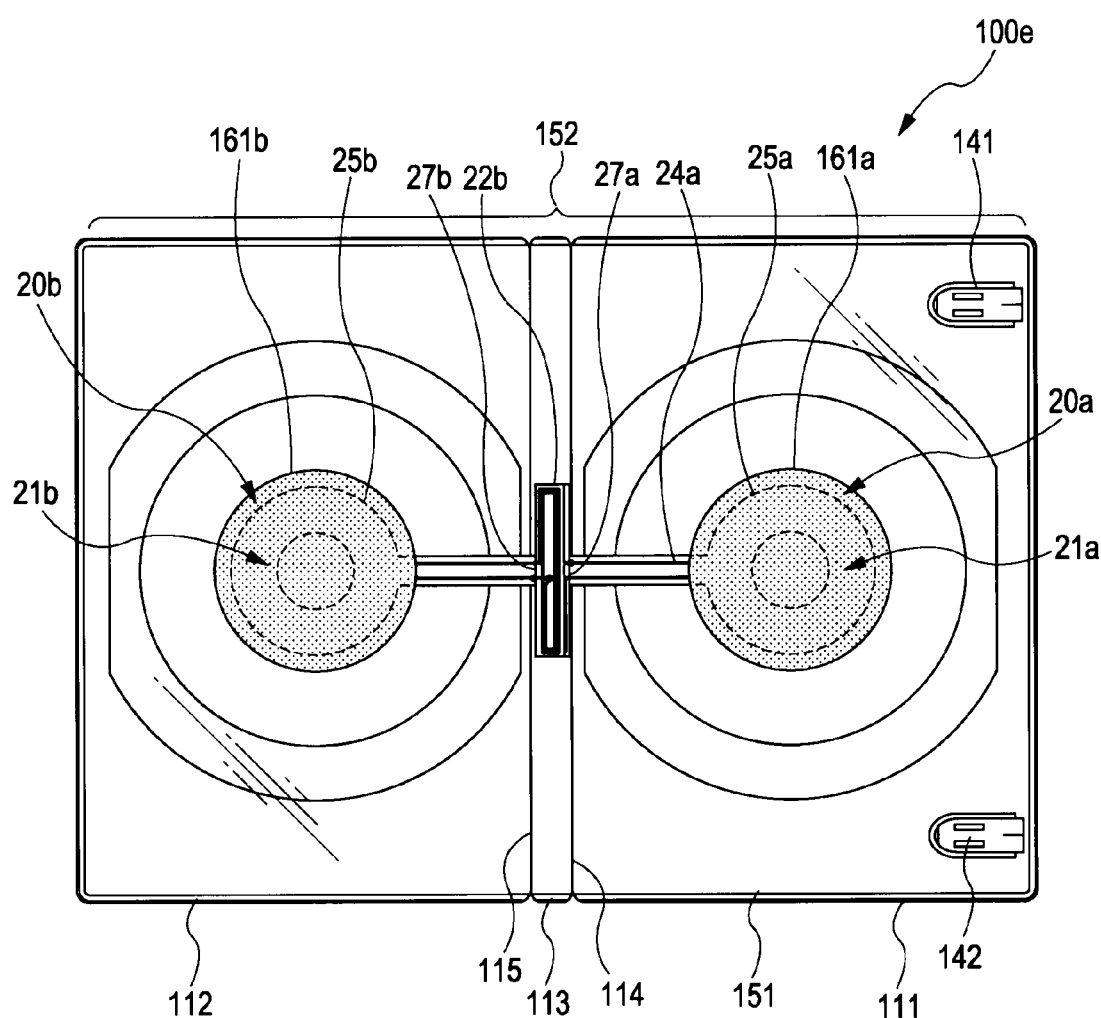
FIG. 58 is a rear view illustrating the configuration of an optical disc case according to Embodiment 9-1.

FIG. 58 is a rear view illustrating the configuration of an optical disc case according to Embodiment 9-1. Note that in FIG. 58, the components corresponding to those in FIG. 34 are denoted with the same reference numerals.

The optical disc case 100e shown in FIG. 58 is an optical disc case wherein with the above-mentioned optical disc case 100a according to Embodiment 5-1, sheet-shaped high-magnetic-permeability members 161a and 161b are disposed further outside the booster antenna units 20a and 20b respectively. The high-magnetic-permeability member 161a is formed as a circular sheet member, which is greater than the region where the antenna coil 21a of the booster antenna unit 20a is formed, and is disposed in a state wherein the center thereof is identical to the center of the antenna coil 21a. Similarly, the high-magnetic-permeability member 161b is formed as a circular sheet member, which is greater than the region where the antenna coil 21b of the booster antenna unit 20b is formed, and is disposed in a state wherein the center thereof is identical to the center of the antenna coil 21b.

Note here that the high-magnetic-permeability members 161a and 161b are each formed in a circular shape, but may be formed in another shape such as an annular shape if the respective members are in a state of covering at least the regions where the antenna coils 21a and 21b are formed.

Even in the case of the optical disc cases 100e being arrayed and accommodated in a storage rack for example, the booster antennas within the adjacent optical discs 100e (particularly, antenna coils at the IC chip side) can be separated electrically and electromagnetically by the high-magnetic-permeability members 161a and 161b. Accordingly, bringing the reader/writer 10 close to the outer side of the case side face portion 113 of a desired optical disc case 100e enables communication to be performed with the IC chip within the case thereof in a sure manner.

Following the high-magnetic-permeability members 161a and 161b being fastened to the booster antenna units 20a and 20b by an adhesive agent or the like respectively, the high-magnetic-permeability members 161a and 161b are fastened to the outer faces of the face cover portion 111 and rear-face cover portion 112 respectively. Alternatively, following the booster antenna units 20a and 20b being fastened to the outer faces of the face cover portion 111 and rear-face cover portion 112 respectively, the high-magnetic-permeability members 161a and 161b may be fastened to thereupon respectively.

Note that with the present Embodiment 9-1, an example wherein with the arrangement in Embodiment 5-1, the high-magnetic-permeability members 161a and 161b are further disposed has been shown, but the present Embodiment 9-1 is not restricted to this, may be applied to a case wherein the booster antenna units are formed in a shape such as shown in Embodiment 5-2, for example.

Embodiment 9-2

Figure 59:
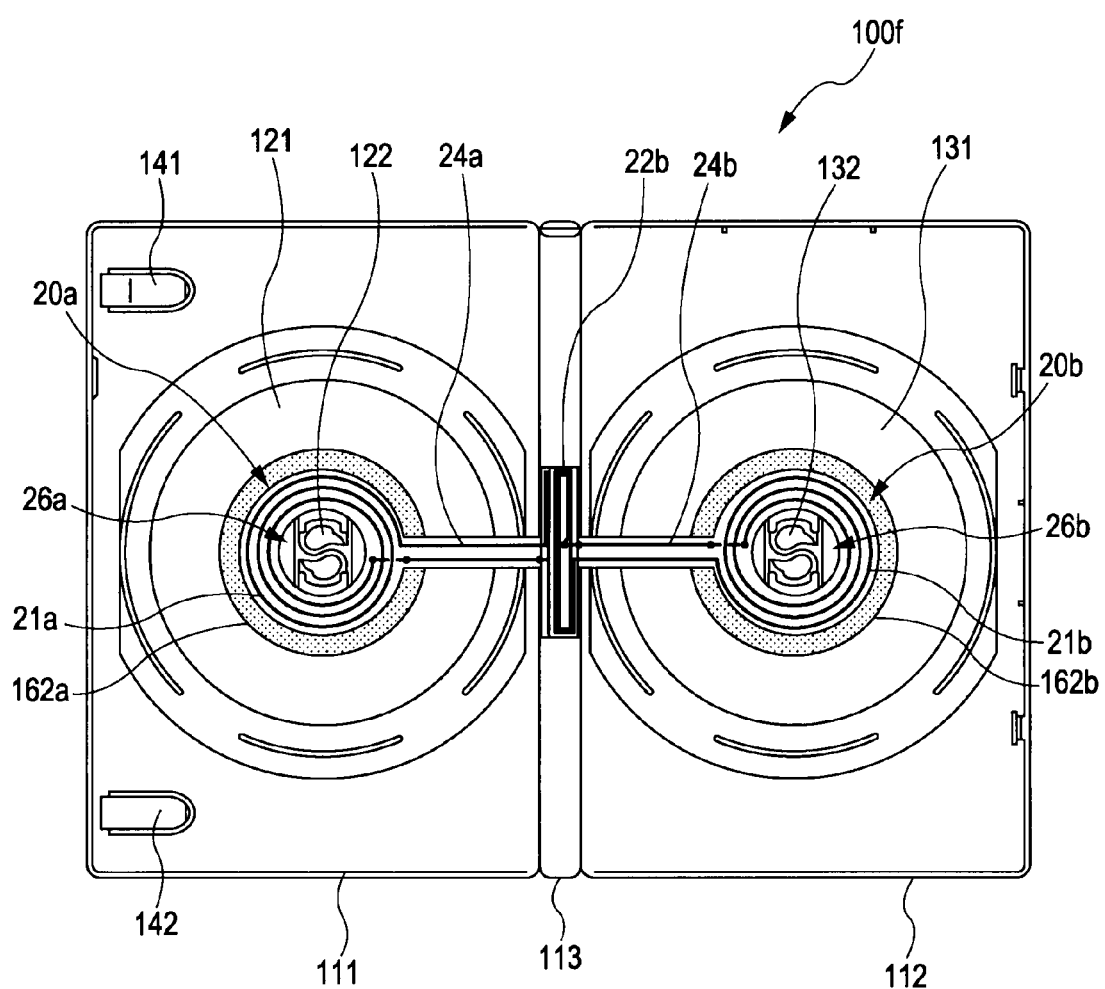
FIG. 59 is a front view illustrating the configuration of an optical disc case according to Embodiment 9-2.

FIG. 59 is a front view illustrating the configuration of an optical disc case according to Embodiment 9-2. Note that in FIG. 59, the components corresponding to those in FIGS. 33 and 34 are denoted with the same reference numerals.

The optical disc case 100f shown in FIG. 59 is an optical disc case wherein with the above-mentioned optical disc case 100c according to Embodiment 5-3, sheet-shaped high-magnetic-permeability members 162a and 162b are further disposed between the booster antenna unit 20a and face cover portion 111, and between the booster antenna unit 20b and rear-face cover portion 112 respectively. The high-magnetic-permeability member 162a is formed as an annular sheet member of which the size is sufficient for covering the region where the antenna coil 21a of the booster antenna unit 20a is formed, and is disposed in a state wherein the center thereof is identical to the center of the antenna coil 21a. Similarly, high-magnetic-permeability member 162b is formed as an annular sheet member of which the size is sufficient for covering the region where the antenna coil 21b of the booster antenna unit 20b is formed, and is disposed in a state wherein the center thereof is identical to the center of the antenna coil 21b.

Even in the case of the optical disc cases 100f being arrayed and accommodated in a storage rack for example, the booster antennas within the adjacent optical discs 100f (particularly, antenna coils at the IC chip side) can be separated electrically and electromagnetically by the high-magnetic-permeability members 162a and 162b, and accordingly, communication can be performed with a desired IC chip using the reader/writer 10 in a sure manner.

Following the high-magnetic-permeability members 162a and 162b being fastened to the booster antenna units 20a and 20b by an adhesive agent or the like respectively, the high-magnetic-permeability members 162a and 162b are fastened to the inner faces of the face cover portion 111 and rear-face cover portion 112 respectively. Alternatively, following the high-magnetic-permeability members 162a and 162b being fastened to the inner faces of the face cover portion 111 and rear-face cover portion 112 respectively, the booster antenna units 20a and 20b may be fastened to thereupon respectively.

Note that with the present Embodiment 9-2, an example wherein with the arrangement in Embodiment 5-3, the high-magnetic-permeability members 162a and 162b are further disposed has been shown, but the present Embodiment 9-2 is not restricted to this, may be applied to a case wherein the booster antenna units are formed in a shape such as shown in Embodiment 5-4, for example. Alternatively, with the present Embodiment 9-2, an arrangement may be made wherein the high-magnetic-permeability members 162a and 162b are adhered not to the inner faces of the face cover portion 111 and rear-face cover portion 112 but to the outer faces thereof, respectively.

Embodiment 9-3

FIG. 60 is a rear view illustrating the configuration of an optical disc case according to Embodiment 9-3. Also, FIG. 61 is a diagram illustrating the configuration of a card member on which booster antenna units are mounted, with Embodiment 9-3. Note that in FIGS. 60 and 61, the components corresponding to those in FIG. 34 are denoted with the same reference numerals.

The optical disc case 100g shown in FIG. 60 is an optical disc wherein with the above-mentioned optical disc case 100e according to Embodiment 5-5, on the card member 153 inserted in the outer circumferential portion thereof sheet-shaped high-magnetic-permeability members 163a and 163b are further disposed. The high-magnetic-permeability member 163a is formed as a circular sheet member which is greater than the region where the antenna coil 21a of the booster antenna unit 20a is formed, and is disposed between the antenna coil 21*a* and the case side face of the card member 153 in a state wherein the center thereof is identical to the center of the antenna coil 21*a*. Similarly, the high-magnetic-permeability member 163*b* is formed as a circular sheet member which is greater than the region where the antenna coil 21*b* of the booster antenna unit 20*b* is formed, and is disposed between the antenna coil 21*b* and the case side face of the card member 153 in a state wherein the center thereof is identical to the center of the antenna coil 21*b*.

Note here that the high-magnetic-permeability members 163*a* and 163*b* are each formed in a circular shape, but if these members are in a state of covering at least the regions where the antenna coils 21*a* and 21*b* are formed, these members may be formed in another shape such as an annular shape or the like.

Even in the case of the optical disc cases 100*g* being arrayed and accommodated in a storage rack for example, the booster antennas within the adjacent optical discs 100*g* (particularly, antenna coils at the IC chip side) can be separated electrically and electromagnetically by the high-magnetic-permeability members 163*a* and 163*b*, and accordingly, communication can be performed with a desired IC chip using the reader/writer 10 in a sure manner.

Following the high-magnetic-permeability members 163*a* and 163*b* being fastened to the booster antenna units 20*a* and 20*b* by an adhesive agent or the like beforehand respectively, the high-magnetic-permeability members 163*a* and 163*b* are fastened to the card member 153. Alternatively, following the high-magnetic-permeability members 163*a* and 163*b* being fastened to the card member 153, the booster antenna units 20*a* and 20*b* may be fastened to thereupon respectively. Subsequently, the card member 153 to which the booster antenna units 20*a* and 20*b* and high-magnetic-permeability members 163*a* and 163*b* are fastened (see FIG. 61) is inserted between the case body and transparent sheet 151 of the optical disc case 100*g*.

Accordingly, the card member 153 to which the booster antenna units 20*a* and 20*b* and high-magnetic-permeability members 163*a* and 163*b* are attached is circulated as another product separately from the case body, whereby a high performance communication function with an IC chip can be readily added to an existing toll-case-type optical disc case.

Note that with the present Embodiment 9-3, an example wherein with the arrangement in Embodiment 5-5, the high-magnetic-permeability members 163*a* and 163*b* are further disposed has been shown, but the present Embodiment 9-3 is not restricted to this, may be applied to a case wherein the booster antenna units are formed in a shape such as shown in Embodiment 5-6, for example.

Embodiment 9-4

Figure 62:
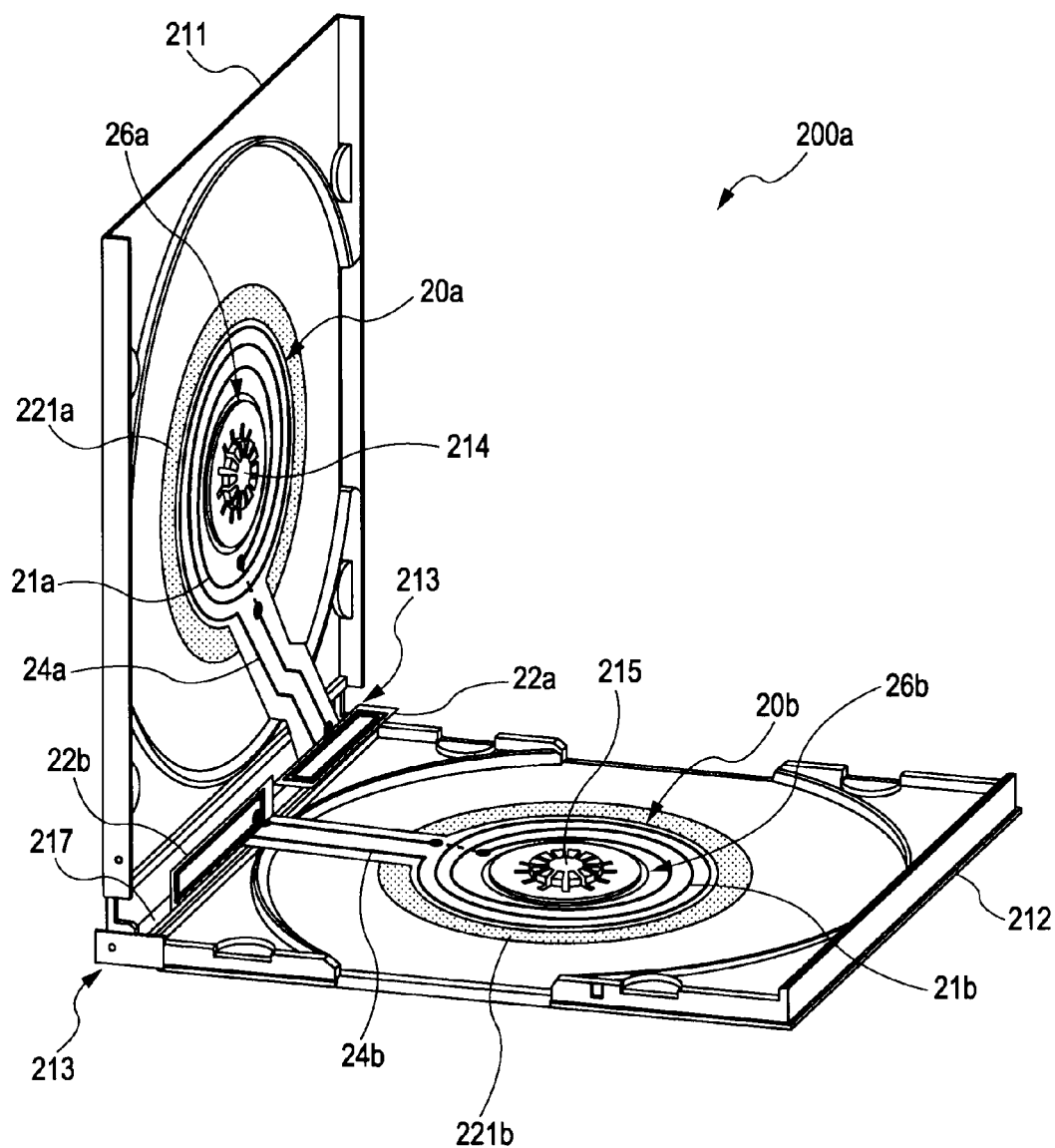
FIG. 62 is a perspective view illustrating the configuration of an optical disc case according to Embodiment 9-4.

FIG. 62 is a perspective view illustrating the configuration of an optical disc case according to Embodiment 9-4. Note that in FIG. 62, the components corresponding to those in FIG. 43 are denoted with the same reference numerals.

The optical disc case 200*a* shown in FIG. 62 is an optical disc case wherein with the above-mentioned optical disc case 200 according to Embodiment 6, sheet-shaped high-magnetic-permeability members 221*a* and 221*b* are further disposed further outside the booster antenna units 20*a* and 20*b* respectively. The high-magnetic-permeability member 221*a* is formed as an annular sheet member of which the size is sufficient for covering the region where the antenna coil 21*a* of the booster antenna unit 20*a* is formed, and is disposed in a state wherein the center thereof is identical to the center of the antenna coil 21*a*. Similarly, high-magnetic-permeability member 221*b* is formed as an annular sheet member of which the size is sufficient for covering the region where the antenna coil 21*b* of the booster antenna unit 20*b* is formed, and is disposed in a state wherein the center thereof is identical to the center of the antenna coil 21*b*.

Even in the case of the optical disc cases 200*a* being arrayed and accommodated in a storage rack for example, the booster antennas within the adjacent optical discs 200*a* (particularly, antenna coils at the IC chip side) can be separated electrically and electromagnetically by the high-magnetic-permeability members 221*a* and 221*b*, and accordingly, communication can be performed with a desired IC chip using the reader/writer 10 in a sure manner.

Following the high-magnetic-permeability members 221*a* and 221*b* being fastened to the booster antenna units 20*a* and 20*b* by an adhesive agent or the like respectively, the high-magnetic-permeability members 221*a* and 221*b* are fastened to the inner faces of the face cover portion 211 and rear-face cover portion 212 respectively. Alternatively, following the high-magnetic-permeability members 221*a* and 221*b* being fastened to the inner faces of the face cover portion 211 and rear-face cover portion 212 respectively, the booster antenna units 20*a* and 20*b* may be fastened to thereupon respectively.

Note that with the present Embodiment 9-4, an example wherein with the arrangement in Embodiment 6, the high-magnetic-permeability members 221*a* and 221*b* are further disposed has been shown, but the present Embodiment 9-4 is not restricted to this, may be applied to a case wherein the antenna coils 22*a* and 22*b* of the booster antenna units 20*a* and 20*b* are overlapped such as shown in the example of FIG. 37, for example. Alternatively, with the present Embodiment 9-4, an arrangement may be made wherein the high-magnetic-permeability members 221*a* and 221*b* are adhered not to the inner faces of the face cover portion 211 and rear-face cover portion 212 but to the outer faces thereof, respectively.

Embodiment 9-5

Figure 63:
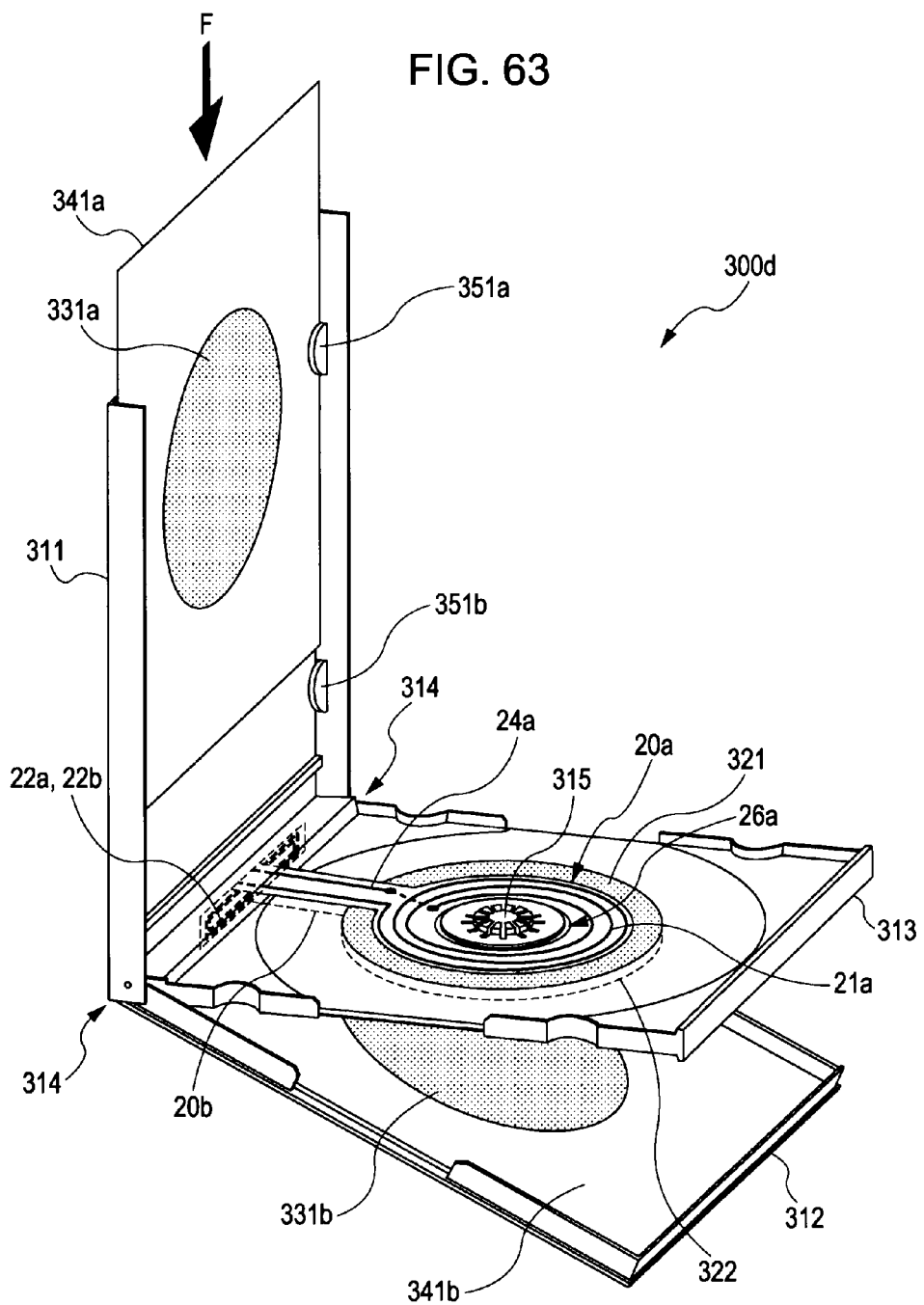
FIG. 63 is a perspective view illustrating the configuration of an optical disc case according to Embodiment 9-5.

FIG. 63 is a perspective view illustrating the configuration of an optical disc case according to Embodiment 9-5. Note that in FIG. 63, the components corresponding to those in FIG. 46 are denoted with the same reference numerals.

The optical disc case 300*d* shown in FIG. 63 is an optical disc case wherein with the above-mentioned optical disc case 300*a* according to Embodiment 7-2, sheet-shaped high-magnetic-permeability members 331*a* and 331*b* are further disposed further outside the booster antenna units 20*a* and 20*b* respectively.

The high-magnetic-permeability member 331*a* is formed as a circular sheet member of which the size is sufficient for covering the region where the antenna coil 21*a* of the booster antenna unit 20*a* is formed, and is disposed at a position where the center thereof is identical to the center of the antenna coil 21*a* when the face cover portion 311 and rear-face cover portion 312 are closed. With the present embodiment, an arrangement is made wherein high-magnetic-permeability member 331*a* is adhered to a card member 341*a* made of paper or the like to be accommodated in the inner face of the face cover portion 311.

The inner face of the face cover portion 311 is a booklet accommodation face for accommodating a booklet or the like for describing contents recorded in the optical discs 1*a* and 1*b* for example, and holding members 351*a* and 351*b* for holding a booklet are formed integral with the face cover portion 311 on this face. The card member 341*a* to which the high-magnetic-permeability member 331*a* is adhered beforehand is inserted between the face cover portion 311 and holding members 351a and 351b in the direction of arrow F in the drawing, and is retained at a predetermined position.

Similarly, the high-magnetic-permeability member 331b is also adhered to a card member 341b made of paper or the like beforehand, and accommodated in the inner face of the rear-face cover portion 312. The high-magnetic-permeability member 331b is formed as a circular sheet member of which the size is sufficient for covering the region where the antenna coil 21b of the booster antenna unit 20b is formed, and is disposed at a position where the center thereof is identical to the center of the antenna coil 21b when the face cover portion 311 and rear-face cover portion 312 are closed.

Even in the case of the optical disc cases 200d being arrayed and accommodated in a storage rack for example, the booster antennas within the adjacent optical discs 300d (particularly, antenna coils at the IC chip side) can be separated electrically and electromagnetically by the high-magnetic-permeability members 331a and 331b, and accordingly, communication can be performed with a desired IC chip using the reader/writer 10 in a sure manner.

Also, an arrangement is made wherein the high-magnetic-permeability members 331a and 331b are disposed on the inner face of the face cover portion 311 and rear-face cover portion 312 in a state of being adhered to the card member beforehand, whereby the high-magnetic-permeability members 331a and 331b can be readily mounted without changing the configuration of an existing optical disc case at all.

Note that either the high-magnetic-permeability member 331a or 331b in FIG. 63 may be adhered directly to not the card member but the face cover portion 311 or rear-face cover portion 312.

Note that with the present Embodiment 9-5, an example wherein with the arrangement in Embodiment 7-2, the high-magnetic-permeability members 331a and 331b are further disposed has been shown, but the present Embodiment 9-5 is not restricted to this, the antenna coils 22a and 22b of the booster antenna units 20a and 20b may be in a shape of being not overlapped mutually such as shown in FIG. 48, for example. Alternatively, as shown in FIG. 44, an arrangement may be made wherein the single booster antenna unit 20 serves both as the communication functions of two IC chips.

Embodiment 9-6

Figure 64:
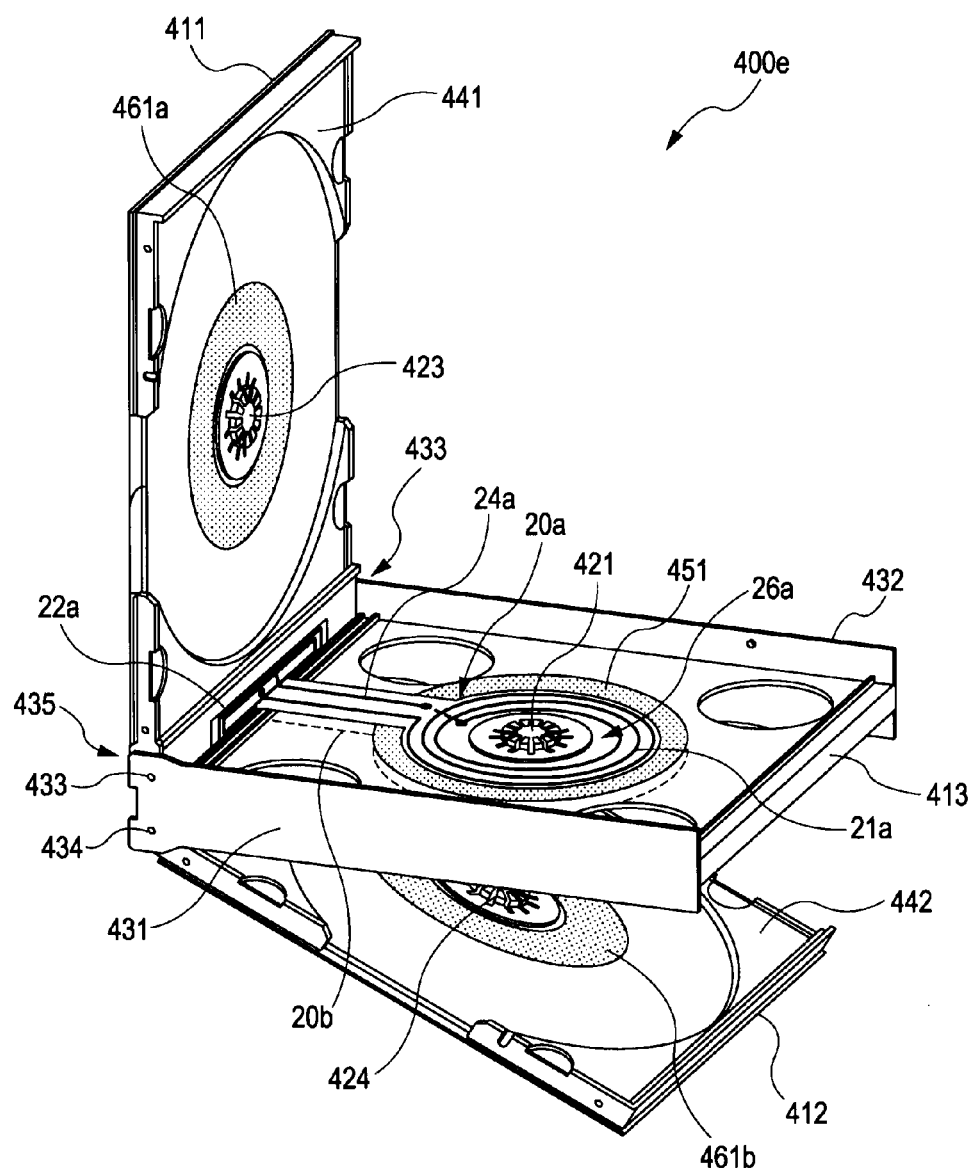
FIG. 64 is a perspective view illustrating the configuration of an optical disc case according to Embodiment 9-6.

FIG. 64 is a perspective view illustrating the configuration of an optical disc case according to Embodiment 9-6. Note that in FIG. 64, the components corresponding to those in FIG. 52 are denoted with the same reference numerals.

The optical disc case 400e shown in FIG. 64 is an optical disc case wherein with the above-mentioned optical disc case 400b according to Embodiment 8-2, sheet-shaped high-magnetic-permeability members 461a and 461b are further disposed further outside the booster antenna units 20a and 20b respectively.

The high-magnetic-permeability member 461a is formed as an annular sheet member of which the size is sufficient for covering the region where the antenna coil 21a of the booster antenna unit 20a is formed, and is adhered to the circumference of the disc holding portion 423 so as to be in a state wherein the center thereof is identical to the center of the antenna coil 21a at the time of the case being closed. Similarly, the high-magnetic-permeability member 461b is formed as an annular sheet member of which the size is sufficient for covering the region where the antenna coil 21b of the booster antenna unit 20a is formed, and is adhered to the circumference of the disc holding portion 424 so as to be in a state wherein the center thereof is identical to the center of the antenna coil 21b at the time of the case being closed.

Even in the case of the optical disc cases 400e being arrayed and accommodated in a storage rack for example, the booster antennas within the adjacent optical discs 400e (particularly, antenna coils at the IC chip side) can be separated electrically and electromagnetically by the high-magnetic-permeability members 461a and 461b, and accordingly, communication can be performed with a desired IC chip using the reader/writer 10 in a sure manner.

Note that an arrangement may be made wherein the high-magnetic-permeability member 461a is adhered to not the case inner face side of the surface tray portion 441 but the case outer face side thereof or one of the faces of the face cover portion 411. Alternatively, an arrangement may be made wherein a card member is inserted between the surface tray portion 441 and face cover portion 411, and the high-magnetic-permeability member 461a is adhered to this card member beforehand. Similarly, an arrangement may be made wherein the high-magnetic-permeability member 461b is adhered to not the case inner face side of the rear-face tray portion 442 but the case outer face side thereof or one of the faces of the rear-face cover portion 412. Alternatively, an arrangement may be made wherein a card member is inserted between the rear-face tray portion 442 and rear-face cover portion 412, and the high-magnetic-permeability member 461b is adhered to this card member beforehand. In these cases, not an annular shape but another shape such as a circular shape or the like can be taken as the shapes of the high-magnetic-permeability members 461a and 461b.

Also, with the present Embodiment 9-6, an example wherein with the arrangement in Embodiment 8-2, the high-magnetic-permeability members 461a and 461b are further disposed has been shown, but the present Embodiment 9-6 is not restricted to this, may be applied to a case wherein the booster antenna units are formed in a shape such as shown in Embodiment 8-3, for example. Also, in the same way as with Embodiment 8-1, an arrangement may be made wherein the single booster antenna unit 20 serves both as the communication functions of four IC chips.

Incidentally, like the above-mentioned Embodiments 9-5 and 9-6, in the case of an arrangement wherein the booster antenna units are mounted on the tray portions provided between the face cover portion and rear-face cover portion, a certain degree of distance is caused between the antenna coil at the IC chip side of the booster antenna and the face cover portion or rear-face cover portion. Accordingly, in the case of optical disc cases having such a configuration being disposed in parallel in a storage rack or the like, distance of around 2 mm through 10 mm is caused between the antenna coils at the IC chip side within the adjacent cases, and electrically and electromagnetically influence to be applied to the mutual antenna coils is reduced by the distance worth thereof.

Accordingly, in this case, it is unnecessary for high-magnetic-permeability members to have the thickness sufficient for completely shielding electromagnetic field to the outside of the case from the antenna coil at the IC chip side, even with even thinner high-magnetic-permeability members, a situation such that communication is performed unintentionally with the antenna coils within the adjacent optical disc cases, or communication is disabled due to occurrence of a collision, can be prevented. That is to say, with regard to these high-magnetic-permeability members, even thinner high-magnetic-permeability members can be employed as long as they have thickness whereby effects for weakening leakage of electromagnetic field can be obtained, and it is substantially impossible to perform communication with the IC chips within the adjacent optical disc cases which are not communication objects.

For example, in the event that the communication frequency of the IC chip is set to 13.56 MHz, it is desirable to set the thickness of the high-magnetic-permeability members to generally 100 μm or less from the perspective of intention to dispose the high-magnetic-permeability members without changing the thickness of an existing optical disc case. Note however, with the optical disc case having a configuration such as that according to Embodiment 9-5 or 9-6, even if the thickness of the high-magnetic-permeability members is set to 50 μm or less, sufficient shielding effects can be obtained between the antenna coils at the IC chip side within the adjacent cases. Also, thinning high-magnetic-permeability members enables material cost to be suppressed.

Also, with the above-mentioned Embodiments 7-2 and 7-3, 8-2 through 8-4, and 9-1 through 9-6, high-magnetic-permeability members are desirable to be the same size as the region where the antenna coil 21 is formed, or wider than that. Note however, in the case in which there is restriction due to a case shape, or restriction due to costs, these high-magnetic-permeability members may be formed narrower than the region where the antenna coil 21 is formed. Note however, it is desirable for the high-magnetic-permeability members and the region where the antenna coil 21 is formed to be disposed such that the centers thereof are matched at the time of the case being closed.

That is to say, in the event that communication is performed with an IC chip through a certain antenna coil by disposing the above-mentioned high-magnetic-permeability members, even if electromagnetic field cannot be shielded completely as to the opposite side of the IC chip of the antenna coil thereof, it is enough to obtain an advantage for weakening electromagnetic field to an extent as to the adjacent IC chips which are not communication objects. Accordingly, the size of the high-magnetic-permeability members needs to be a size whereby an advantage can be obtained wherein leakage of electromagnetic field as to the antenna coil corresponding to the adjacent IC chip is suppressed to a level wherein the IC chip thereof substantially cannot perform communication.

Thus, the thickness or size of the high-magnetic-permeability members, or both, are adjusted as appropriate, whereby shielding effects of electromagnetic field to be obtained can be adjusted, so the above-mentioned respective design values can be appropriately selected so as to substantially disable the antenna coils corresponding to the adjacent IC chips, which are not communication objects, from communication.

According to the above-mentioned embodiments, without greatly changing the configuration of various types of optical disc case which have come into widespread use, a booster antenna can be mounted within the optical disc case thereof with a simple process, and thus, communication can be performed with the IC chip on an optical disc by a reader/writer bringing close to the side face of the optical disc case (the face perpendicular to the case principal face).

Therefore, there is no need to perform a significant change such as metal mold, manufacturing process, manufacturing facilities, or the like, which is necessary for manufacturing optical disc cases, whereby optical disc cases including additional functions such as described above can be manufactured without increasing manufacturing cost as compared with the conventional method.

Also, high-magnetic-permeability sheet members are further provided as members at the case outer face side, and thus, even in the case of optical disc cases being arrayed in parallel and accommodated in a storage rack or the like, communication can be performed with the IC chip within a desired optical disc case in a sure and stable manner, and such an advantage can be readily obtained without changing the configuration of an existing optical disc case greatly.

Also, from the perspective of a user, there is provided an advantage wherein regardless of the above-mentioned additional functions being included, there is no difference regarding carrying and open/close operations of an optical disc case, and detaching/mounting operations of an optical disc as compared with the conventional method. Further, there is no particular modification regarding the shape and size of an optical disc case, optical disc cases including the additional functions can be accommodated in a storage rack in which optical disc cases have been accommodated without problems, and accordingly, inconvenience such as replacing with a new storage rack is not caused.

Also, with regard to a storage rack provided in an optical disc (or contents recorded in an optical disc) dealer or the like, a case (shipping container or the like including packaging such a carton box, etc.) for transporting optical disc cases as well, the conventional one can be employed as it is. Accordingly, the advantage due to the above-mentioned additional functions can also be received at a distribution side, such as merchandise management employing IC chips, or the like, without increasing cost at a distribution process at all.

Note that with the above-mentioned embodiments, the respective antennas at a non-contact IC chip side included in a booster antenna and at the reader/writer side have been taken as a coil shape (spiral shape), but these antennas are not restricted to such a shape, and rather the shape thereof can be selected depending on the communication specification of a non-contact IC chip (such as communication frequency, intensity of electric waves/electromagnetic waves necessary for communication, radiating pattern of electric waves/electromagnetic waves by an antenna, etc.) as appropriate. For example, an antenna at a non-contact IC chip side of a booster antenna needs to be disposed close to the periphery of the disc holding portion of an optical disc case centered on the disc holding portion. Further, in the case of employing a dipole-type antenna as the antenna thereof, the antenna needs to be disposed close to the periphery of the disc holding portion, for example, not in a simple linear but a bent shape or curved shape.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc case in which an optical disc is stored, wherein a face cover portion and a rear-face cover portion are connected so as to be rotated with the end portion side of each of the principal faces thereof as the center, and are configured so as to form a box-shaped appearance when said face cover portion and said rear-face cover portion are closed such that the respective principal faces of said face cover portion and said rear-face cover portion face each other, said optical disc case comprising:

a protruding holding portion, configured to fit into a central hole formed in said optical disc to hold said optical disc, provided to the inner side of the principal face of said rear-face cover portion; and a booster antenna to which a first antenna and a second antenna are connected configured to relay a signal sent/received from one antenna to the other antenna;

wherein said booster antenna is disposed such that said first antenna is disposed such that the central portion thereof is identical to the center of said protruding holding portion, and also the outer shape thereof is in a state of being parallel to the principal face of said rear-face cover portion, and said second antenna is disposed such that the outer shape thereof contacts or comes close to, in a parallel state, one side face at the time of said face cover portion and said rear-face cover portion being closed.

2. An optical disc tray including a function for holding an optical disc, and being disposed within a case casing which is configured of a face cover portion and a rear-face cover portion, which are connected in a rotatable state with the end portion side of each of the principal faces thereof as the center, so as to be fitted into and attached to said rear-face cover portion with the holding face of said optical disc being directed to the inner side of said case casing, thereby configuring an optical disc case in which said optical disc is stored, said optical disc tray comprising:

a protruding holding portion configured to fit into a central hole formed in said optical disc to hold said optical disc; and a booster antenna to which a first antenna and a second antenna are connected configured to relay a signal sent/received from one antenna to the other antenna;

wherein said booster antenna is disposed such that said first antenna is disposed in the holding face of said optical disc or the rear-face thereof and fastened such that the central portion thereof is identical to the center of said protruding holding portion, and said second antenna protrudes from the end portion of said optical disc tray.

3. A card member attachable to an optical disc case wherein a face cover portion and a rear-face cover portion are connected so as to bend at both ends of a side-face portion making up one side face at the time of closing, and are configured so as to form a box-shaped appearance when said face cover portion and said rear-face cover portion are closed such that the respective principal faces of said face cover portion and said rear-face cover portion face each other, so as to cover the outer faces of said face cover portion, said rear-face cover portion, said side-face portion, said card member comprising:

a booster antenna to which a first antenna and a second antenna are connected configured to relay a signal sent/received from one antenna to the other antenna;

wherein said booster antenna is disposed such that said first antenna is disposed in a region corresponding to said rear-face cover portion, and said second antenna is disposed in a region corresponding to said side-face portion, and also said booster antenna is bendable at a portion corresponding to the boundary between said rear-face cover portion and said side-face portion.

4. A card member which is stored between a disc tray member and a rear-face cover portion within an optical disc case including a face cover portion and said rear-face cover portion which are connected so as to be rotated with the end portion side of each of the principal faces thereof as the center, and said disc tray member, which is fitted into and attached to said rear-face cover portion, configured to hold said optical disc by a protruding holding portion provided on one of the faces being fitted into a central hole formed in an optical disc, configured so as to form a box-shaped appearance when said face cover portion and said rear-face cover portion are closed such that the respective principal faces of said face cover portion and said rear-face cover portion face each other sandwiching said disc tray member, said card member comprising:

a booster antenna to which a first antenna and a second antenna are connected configured to relay a signal sent/received from one antenna to the other antenna;

wherein said booster antenna is fastened to either face of said disc tray member side or said rear-face cover portion side such that said first antenna is disposed such that the central portion thereof is identical to the center of said protruding holding portion, and also the outer shape thereof is in a state of being parallel to the principal face of said rear-face cover portion, and said second antenna is disposed such that the outer shape thereof contacts or comes close to, in a parallel state, one side face at the time of said face cover portion and said rear-face cover portion being closed.

5. A method for manufacturing an optical disc case including a face cover portion and a rear-face cover portion which are connected so as to be rotated with the end portion side of each of the principal faces thereof as the center, and a disc tray member, which is fitted into and attached to said rear-face cover portion, configured to hold said optical disc by a protruding holding portion provided on one of the faces being fitted into a central hole formed in an optical disc, configured so as to form a box-shaped appearance when said face cover portion and said rear-face cover portion are closed such that the respective principal faces of said face cover portion and said rear-face cover portion face each other sandwiching said disc tray member, said method comprising the steps of:

attaching a booster antenna, which is formed generally in flat plate shape, to which a first antenna and a second antenna are connected configured to relay a signal sent/received from one antenna to the other antenna, to said disc tray member;

wherein said step of attaching a booster antenna includes the steps of disposing and fastening said first antenna in the holding face of said optical disc or the rear-face thereof and such that the central portion thereof is identical to the center of said protruding holding portion to cause said second antenna to protrude from the end portion of said optical disc tray, and bending said booster antenna such that said second antenna is perpendicular to said first antenna to cause said second antenna to contact or comes close to, in a parallel state, one inner side face of said rear-face cover portion when said disc tray member fits into and attaches to the inner side of said rear-face cover portion.

6. A method for manufacturing an optical disc case including a face cover portion and a rear-face cover portion which are connected so as to be rotated with the end portion side of each of the principal faces thereof as the center, and a disc tray member, which is fitted into and attached to said rear-face cover portion, configured to hold said optical disc by a protruding holding portion provided on one of the faces being fitted into a central hole formed in an optical disc, configured so as to form a box-shaped appearance when said face cover portion and said rear-face cover portion are closed such that the respective principal faces of said face cover portion and said rear-face cover portion face each other sandwiching said disc tray member, said method comprising the steps of:

fastening a booster antenna, which is formed generally in flat plate shape, to which a first antenna and a second antenna are connected configured to relay a signal sent/received from one antenna to the other antenna, to one face of a card member; and disposing said card member between said disc tray member and said rear-face cover portion such that said first antenna is disposed such that the central portion thereof is identical to the center of said protruding holding portion, and also the outer shape thereof is in a state of being parallel to the principal face of said rear-face cover portion, and said second antenna is disposed such that the outer shape thereof contacts or comes close to, in a parallel state, one side face at the time of said face cover portion and said rear-face cover portion being closed.

7. A method for manufacturing an optical disc case wherein a face cover portion and a rear-face cover portion are connected so as to be rotated with the end portion side of each of the principal faces thereof as the center, and are configured so as to form a box-shaped appearance when said face cover portion and said rear-face cover portion are closed such that the respective principal faces of said face cover portion and said rear-face cover portion face each other, and the inner side of the principal face of said rear-face cover portion is provided with a protruding holding portion configured to fit into a central hole formed in an optical disc to hold said optical disc, said method comprising the steps of:

attaching a booster antenna, which is formed generally in flat plate shape, to which a first antenna and a second antenna are connected configured to relay a signal sent/received from one antenna to the other antenna, to said rear-face cover portion such that said first antenna is disposed such that the central portion thereof is identical to the center of said protruding holding portion, and also the outer shape thereof is in a state of being parallel to the principal face of said rear-face cover portion, and said second antenna is disposed such that the outer shape thereof contacts or comes close to, in a parallel state, one side face at the time of said face cover portion and said rear-face cover portion being closed.

8. A method for manufacturing an optical disc case, comprising the steps of:

forming a case casing in an integral manner with injection molding, wherein a face cover portion and a rear-face cover portion are connected at both ends of a side-face portion making up one side face at the time of closing in bendable state;

disposing a square-shaped bright film so as to cover the outer faces of said face cover portion, said rear-face cover portion, and said side-face portion; and attaching a booth antenna to a card member for package display which can be inserted between said bright film and said face cover portion, said rear-face cover portion, and said side-face portion;

wherein with said step of attaching said booth antenna to said rear-side cover portion, said card member to which said booth antenna is attached is inserted between said bright film and said face cover portion, said rear-face cover portion, and said side-face portion.

9. A method for manufacturing an optical disc tray which includes a protruding holding portion configured to fit into a central hole formed in an optical disc to hold said optical disc, and is disposed within a case casing which is configured of a face cover portion and a rear-face cover portion, which are connected in a rotatable state with the end portion side of each of the principal faces thereof as the center, so as to be fitted into and attached to said rear-face cover portion with the holding face of said optical disc being directed to the inner side of said case casing, thereby configuring an optical disc case in which said optical disc is stored, said method comprising the steps of:

attaching a booster antenna, which is formed generally in flat plate shape, to which a first antenna and a second antenna are connected configured to relay a signal sent/received from one antenna to the other antenna, to said optical disc tray; and disposing and fastening said first antenna in the holding face of said optical disc or the rear-face thereof and such that the central portion thereof is identical to the center of said protruding holding portion to cause said second antenna to protrude from the end portion of said optical disc tray.

10. An optical disc case in which a plurality of optical discs are stored, wherein a face cover portion and a rear-face cover portion are connected so as to be rotated with the end portion side of each of the principal faces thereof as the center, and are configured so as to form a box-shaped appearance when said face cover portion and said rear-face cover portion are closed such that the respective principal faces of said face cover portion and said rear-face cover portion face each other; said optical disc case comprising:

a first protruding holding portion, configured to fit into a central hole formed in a first optical disc to hold said first optical disc, provided at the inner side of the principal face of said face cover portion;

a second protruding holding portion, configured to fit into a central hole formed in a second optical disc to hold said second optical disc such that the center of said second protruding holding portion is mutually identical to the center of said first protruding holding portion when closing said face cover portion and said rear-face cover portion, provided to the inner side of the principal face of said rear-face cover portion; and at least one booster antenna to which a first antenna and a second antenna are connected configured to relay a signal sent/received from one antenna to the other antenna;

wherein said booster antenna is disposed such that said first antenna is disposed such that the central portion thereof is identical to the respective centers of said first protruding holding portion and said second protruding holding portion, and also the outer shape thereof is in a state of being parallel to the principal face of said face cover portion or the principal face of said rear-face cover portion, and said second antenna is disposed such that the outer shape thereof contacts or comes close to, in a parallel state, one side face at the time of said face cover portion and said rear-face cover portion being closed.

11. An optical disc case in which a plurality of optical discs are stored, comprising:

a central tray member wherein a first protruding holding portion configured to fit into a central hole formed in a first optical disc to hold said first optical disc is provided on one face of the principal faces thereof, and a second protruding holding portion configured to fit into a central hole formed in a second optical disc to hold said second optical disc is provided on the other face parallel to said one face;

a face cover portion and a rear-face cover portion which are connected in a rotatable state as to said central tray member with one end side of said central tray member as the center; and at least one booster antenna to which a first antenna and a second antenna are connected configured to relay a signal sent/received from one antenna to the other antenna;

wherein when said face cover portion and said rear-face cover portion are closed such that the respective principal faces of said face cover portion and said rear-face cover portion face each other, said face cover portion and said rear-face cover portion are configured so as to form a box-shaped appearance;

and wherein said booster antenna is disposed on at least said one face of said central tray member such that said first antenna is disposed such that the central portion thereof is identical to the respective centers of said first protruding holding portion and said second protruding holding portion, and also the outer shape thereof is in a state of being parallel to the principal face of said central tray member, and said second antenna is disposed such that the outer shape thereof is in a state perpendicular to the outer shape of said first antenna in the vicinity of one end of the principal face of said central tray member.

12. A card member attachable to an optical disc case wherein a face cover portion and a rear-face cover portion are connected so as to bend at both ends of a side-face portion making up one side face at the time of closing, and are configured so as to form a box-shaped appearance when said face cover portion and said rear-face cover portion are closed such that the respective principal faces of said face cover portion and said rear-face cover portion face each other, and an optical disc is held in the inner face of said face cover portion and the inner face of said rear-face cover portion, so as to cover the outer faces of said face cover portion, said rear-face cover portion, said side-face portion, said card member comprising:

at least one booster antenna to which a first antenna and a second antenna are connected configured to relay a signal sent/received from one antenna to the other antenna;

wherein said booster antenna is disposed such that said first antenna is disposed in a region corresponding to said face cover portion or said rear-face cover portion, and said second antenna is disposed in a region corresponding to said side-face portion, and also said booster antenna is bendable at a portion corresponding to the boundary between said rear-face cover portion and said side-face portion.

13. A method for manufacturing an optical disc case wherein a face cover portion and a rear-face cover portion are connected so as to be rotated with the end portion side of each of the principal faces thereof as the center, and are configured so as to form a box-shaped appearance when said face cover portion and said rear-face cover portion are closed such that the respective principal faces of said face cover portion and said rear-face cover portion face each other, the inner side of the principal face of said face cover portion and the inner side of the principal face of said rear-face cover portion are provided with a first protruding holding portion configured to fit into a central hole formed in a first optical disc to hold said first optical disc, and a second protruding holding portion configured to fit into a central hole formed in a second optical disc to hold said second optical disc such that the centers of said first and second protruding holding portion are identical to each other when said face cover portion and said rear-face cover portion are closed, said method comprising the step of:

attaching a booster antenna, which is formed generally in flat plate shape, to which a first antenna and a second antenna are connected configured to relay a signal sent/received from one antenna to the other antenna, to at least either of said face cover portion or said rear-face cover portion, wherein in said step, said booster antenna is disposed such that said first antenna is disposed such that the central portion thereof is identical to the center of said first protruding holding portion or said second protruding holding portion, and also the outer shape thereof is in a state of being parallel to the principal face of said face cover portion or said rear-face cover portion, and said second antenna is disposed such that the outer shape thereof contacts or comes close to, in a parallel state, one side face at the time of said face cover portion and said rear-face cover portion being closed.

14. A method for manufacturing an optical disc case including a central tray member wherein a first protruding holding portion configured to fit into a central hole formed in a first optical disc to hold said first optical disc, and is disposed on one face of the principal faces thereof, a second protruding holding portion configured to fit into a central hole formed in a second optical disc to hold said second optical disc is provided on the other face parallel to said one face such that the center thereof and the center of said first protruding holding portion are identical to each other, and a face cover portion and a rear-face cover portion which are connected so as to each rotate as to said central tray member, and are configured so as to form a box-shaped appearance when said face cover portion and said rear-face cover portion are closed such that the principal face of said face cover portion and the principal face of said rear-face cover portion each face the principal face of said central tray member, said method comprising the step of:

attaching at least one booster antenna, which is formed generally in flat plate shape, to which a first antenna and a second antenna are connected configured to relay a signal sent/received from one antenna to the other antenna, to at least said one face of said central tray member;

wherein in said step, said booster antenna is disposed such that said first antenna is disposed such that the central portion thereof is identical to the respective centers of said first protruding holding portion and said second protruding holding portion, and also the outer shape thereof is in a state of being parallel to the principal face of said central tray member, and said second antenna is disposed such that the outer shape thereof is in a state perpendicular to the outer shape of said first antenna in the vicinity of one end of the principal face of said central tray member.

* * * * *